(12) United States Patent
Carter et al.

(10) Patent No.: US 7,512,544 B2
(45) Date of Patent: Mar. 31, 2009

(54) KNOWLEDGE BASE SYSTEM FOR AN EQUIPMENT MARKET

(75) Inventors: Steven Carter, Katy, TX (US); Stuart Cochrane, Alford (GB); Ryan Isherwood, Houston, TX (US); Jeremy Lindsay, Bury St. Edmunds (GB); Mark Bouzek, Kingwood, TX (US)

(73) Assignee: ODS-Petrodata, Inc., Houston, TX (US)

( * ) Notice: Subject to any disclaimer, the term of this patent is extended or adjusted under 35 U.S.C. 154(b) by 1332 days.

(21) Appl. No.: 10/208,548

(22) Filed: Jul. 30, 2002

(65) Prior Publication Data

US 2003/0074391 A1 Apr. 17, 2003

Related U.S. Application Data

(60) Provisional application No. 60/317,214, filed on Sep. 5, 2001, provisional application No. 60/308,745, filed on Jul. 30, 2001.

(51) Int. Cl.
*G06F 17/30* (2006.01)
(52) U.S. Cl. .............................................. 705/10; 705/7
(58) Field of Classification Search .................. 705/7, 705/10
See application file for complete search history.

(56) References Cited

U.S. PATENT DOCUMENTS

| | | | | |
|---|---|---|---|---|
| 4,819,730 A | * | 4/1989 | Williford et al. ............. | 166/355 |
| 5,878,423 A | * | 3/1999 | Anderson et al. ........... | 707/100 |
| 6,738,748 B2 | * | 5/2004 | Wetzer ........................... | 705/9 |
| 7,155,419 B2 | * | 12/2006 | Blackman et al. ............. | 705/80 |
| 7,216,086 B1 | * | 5/2007 | Grosvenor et al. ............. | 705/7 |
| 2005/0149410 A1 | * | 7/2005 | Livesay ........................ | 705/26 |

FOREIGN PATENT DOCUMENTS

| | | |
|---|---|---|
| GB | 2 375 863 A | 3/2001 |
| WO | WO 00/33212 | 6/2000 |

(Continued)

OTHER PUBLICATIONS

Michael (AvionicsZone Created Chase used Avionics), Aug. 2000, Aviotion Week & Space Technology, vol. 153, Dialog file 624, Accession No. 01103814.*

(Continued)

*Primary Examiner*—Romain Jeanty
(74) *Attorney, Agent, or Firm*—Buskop Law Group, PC; Wendy Buskop

(57) ABSTRACT

A system and method for managing and processing supply and demand information in an equipment market comprises a business logic engine, a database and interface engine and communications engine on a web host server. The communications engine is configured to enable the community of participants in the market to send market inquiries from the demand side of the market, and the business logic engine is configured to process market inquiries and responses to include them in the database of supply and demand information. The database is configured to enable the search engine to retrieve all types of data relevant to business planning and executing of equipment contracts and activities from community data and published data. The business logic engine comprises tools for collaboration, calculation, optimization and forecasting in the equipment market. In the exemplary embodiment the equipment is offshore drilling rigs.

9 Claims, 64 Drawing Sheets

FOREIGN PATENT DOCUMENTS

| WO | WO 00/39736 A3 | 7/2000 |
|---|---|---|
| WO | WO 01/25993 A1 | 4/2001 |
| WO | WO 02/33591 A2 | 4/2002 |
| WO | WO 02/073349 A2 | 9/2002 |

OTHER PUBLICATIONS

Dialog (Primary Knowledge Partners with Kana to Optimize E-Business ROI), Nov. 1999, Dialog file 16, Accession No. 06782068.*

Offshore Data Services, Inc. © 1999, 2000 and Digital Wisdom, Inc. (Global and map images) © 1993; World System Worldwide Offshore Rig Locator Data System; Version 3.2 Software, Houston, Texas; published on CD-ROM.

Petrodata, Ltd., "Polaris 3.0/Knowledge Base", © 1985-99, Scotland; published on CD-ROM.

Petrodata, Ltd., "Polaris 2.0 Installation", undated, files dated 1999-2003, published on CD-ROM.

ODS-Petrodata, Ltd., "Orex Phase One/Polaris", published on CD-ROM.

ODS-Petrodata, Ltd., "Orex Phase Two/Polaris", published on CD-ROM.

ODS-Petrodata, Ltd., "Petrostream/Textbase", undated, files dated 2000, published on CD-ROM.

Offshore Data Services, Inc. "ods World System Worldwide Offshore Rig Locator Data System", undated promotional brochure.

Offshore Data Services, Inc. World "World System Worldwide Offshore Rig Locator Data System" System Advertisement in "Mobile Rig Register", © 2000, 6$^{th}$ Edition, Houston, Texas USA.

Petrodata "Global Offshore Market Intelligence Summary of rig market services" Polaris Database, undated.

Oneoffshore, Inc. "Prototype website and precursor to RigExchange"; undated.

Petrodata "Offshore Rig Exchange Improving Strategic and Tactical Rig Procurement" undated.

Petrodata Global Offshore Market Intelligence "Summary of rig market services" undated.

ODS-Petrodata Group, "Market Intelligence Resource Catalog" © 2001.

* cited by examiner

KNOWLEDGE BASE SYSTEM FOR AN EQUIPMENT MARKET

CROSS REFERENCE TO RELATED APPLICATIONS

This application claims the benefit of the filing date of U.S. provisional patent application Ser. No. 60/308,745, filed Jul. 30, 2001 and U.S. provisional patent application Ser. No. 60/317,214, filed Sep. 5, 2001, the disclosures of which are incorporated herein by reference.

COPYRIGHT NOTICE

A portion of the disclosure of this patent document contains material which is subject to copyright protection. The copyright owner has no objection to the facsimile reproduction by any one of the patent document or the patent disclosure as it appears in the Patent and Trademark Office patent file or records, but otherwise reserves all copyright rights whatsoever.

---

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\Code Templates

| | |
|---|---|
| DataBeanTemplate.java.txt | 552 04/25/2002 10:24am |
| HandlerTemplate.java.txt | 606 04/25/2002 10:26am |
| ServletTemplate.java.txt | 2,446 04/25/2002 10:41am |
| TranslatorTemplate.java.txt | 949 04/25/2002 10:44am |

OneOffshore\html

| | |
|---|---|
| index.jsp.txt.txt | 1,680 04/25/2002 10:27am |
| noSuchSite.jsp.txt | 129 04/25/2002 10:29am |
| printerfriendly.jsp.txt | 6,101 04/25/2002 10:34am |

OneOffshore\html\Rig Insight Wireframe

| | |
|---|---|
| commentary_publications_detail.htm.txt | 8,206 04/25/2002 10:23am |
| compare_tech_specs.htm.txt | 3,161 04/25/2002 10:23am |
| compare_technical_specs.htm.txt | 12,942 04/25/2002 10:23am |
| contact_riginsight.htm.txt | 3,959 04/25/2002 10:24am |
| drilling_plan.htm.txt | 2,912 04/25/2002 10:25am |
| drilling_plan_build_fleet_criteria.htm.txt | 33,515 04/25/2002 10:25am |
| drilling_plan_build_fleet_name.htm.txt | 9,640 04/25/2002 10:25am |
| drilling_plan_build_fleet_tab.htm.txt | 3,384 04/25/2002 10:25am |
| drilling_plan_my_drilling_plan_tab.htm.txt | 4,877 04/25/2002 10:25am |
| faq.htm.txt | 1,985 04/25/2002 10:25am |
| fleet_manager.htm.txt | 2,947 04/25/2002 10:25am |
| fleet_manager_build_fleet_criteria.htm.txt | 33,507 04/25/2002 10:25am |
| fleet_manager_build_fleet_name.htm.txt | 9,589 04/25/2002 10:25am |
| fleet_manager_build_fleet_tab.htm.txt | 3,294 04/25/2002 10:25am |
| fleet_manager_my_drilling_plan_tabular.htm. | 12,453 04/25/2002 10:25am |
| fleet_manager_my_fleet_tab.htm.txt | 4,889 04/25/2002 10:25am |
| fleet_manager_my_fleet_tab_tabular.htm.txt | 11,902 04/25/2002 10:25am |
| homepage.htm.txt | 12,250 04/25/2002 10:26am |
| index.html.txt | 6,998 04/25/2002 10:27am |
| market_insight.htm.txt | 6,620 04/25/2002 10:28am |
| market_insight_market_snapshot_tab.htm.txt | 17,991 04/25/2002 10:28am |
| market_insight_monthly_publications_tab.htm | 13,144 04/25/2002 10:28am |
| market_insight_newswires_tab.htm.txt | 12,240 04/25/2002 10:28am |
| marketing_page_log_in.htm.txt | 2,219 04/25/2002 10:28am |
| member_directory.htm.txt | 2,941 04/25/2002 10:28am |
| member_directory_search_results.htm.txt | 4,042 04/25/2002 10:28am |
| member_profile.htm.txt | 5,615 04/25/2002 10:28am |
| modify_requirements_search.htm.txt | 27,157 04/25/2002 10:29am |
| monthly_publications_detail.htm.txt | 5,102 04/25/2002 10:29am |
| my_insight.htm.txt | 3,952 04/25/2002 10:29am |
| my_insight_requirements_tab.htm.txt | 15,955 04/25/2002 10:29am |
| my_insight_rig_market_tab.htm.txt | 3,357 04/25/2002 10:29am |
| my_insight_rig_my_queries_tab.htm.txt | 3,927 04/25/2002 10:29am |
| my_insight_rig_my_rigs_tab.htm.txt | 9,839 04/25/2002 10:29am |
| my_insight_sublets_tab.htm.txt | 12,856 04/25/2002 10:29am |
| newswire_detail.htm.txt | 6,461 04/25/2002 10:29am |
| notification_window.htm.txt | 4,017 04/25/2002 10:29am |
| plot_detail.htm.txt | 4,763 04/25/2002 10:34am |
| requirement_change_notification_email.htm.t | 3,670 04/25/2002 10:35am |
| requirement_detail.htm.txt | 14,924 04/25/2002 10:35am |
| requirement_history.htm.txt | 5,931 04/25/2002 10:35am |
| requirement_notification_email.htm.txt | 3,477 04/25/2002 10:35am |
| requirement_respond.htm.txt | 18,239 04/25/2002 10:35am |
| requirement_search_results gantt.htm.txt | 4,792 04/25/2002 10:35am |
| requirement_search_results_tabular.htm.txt | 9,633 04/25/2002 10:35am |
| requirements_responses.htm.txt | 6,646 04/25/2002 10:35am |

Computer Program Listing Appendix
The CDRom Appendix incorporated by reference in this application is included on a
single MSDOS compatible compact disk, with the disk containing the following named
files having a size and creation date as indicated in this Listing, organized in File Folders
as indicated below:

| File | Size / Date |
|---|---|
| requirements_search.htm.txt | 28,538 04/25/2002 10:35am |
| rig_detail.htm.txt | 17,655 04/25/2002 10:39am |
| rig_market.htm.txt | 4,313 04/25/2002 10:39am |
| rig_market_compare_technical_specs_tab.htm. | 3,496 04/25/2002 10:39am |
| rig_market_release_marketing_inquiry_tab.ht | 18,149 04/25/2002 10:39am |
| rig_market_release_sublet_tab.htm.txt | 18,261 04/25/2002 10:39am |
| rig_market_research_market_tab.htm.txt | 5,442 04/25/2002 10:39am |
| search_for_rig_by_name.htm.txt | 11,052 04/25/2002 10:41am |
| search_for_rig_by_specifications.htm.txt | 34,920 04/25/2002 10:41am |
| site_map.htm.txt | 737 04/25/2002 10:41am |
| sublet_change_notification_email.htm.txt | 3,250 04/25/2002 10:43am |
| sublet_detail.htm.txt | 11,640 04/25/2002 10:43am |
| sublet_history.htm.txt | 5,929 04/25/2002 10:43am |
| sublet_notification_email.htm.txt | 3,194 04/25/2002 10:43am |
| sublet_respond.htm.txt | 18,406 04/25/2002 10:43am |
| sublet_responses.htm.txt | 5,656 04/25/2002 10:43am |
| update_preferences_confirm.htm.txt | 344 04/25/2002 10:44am |
| user_profile.htm.txt | 45,181 04/25/2002 10:44am |
| view_gantt_rig_search_results.htm.txt | 5,145 04/25/2002 10:45am |
| view_saved_requirements_search_query.htm.tx | 28,690 04/25/2002 10:45am |
| view_saved_rig_search_query.htm.txt | 34,849 04/25/2002 10:45am |
| view_tabular_rig_search_results.htm.txt | 12,707 04/25/2002 10:45am |
| view_tabular_search_results.htm.txt | 8,529 04/25/2002 10:45am |
| OneOffshore\html\riginsight | |
| additionalcategories.jsp.txt | 101,504 06/06/2002 10:53am |
| admincodebase.js.txt | 3,097 04/25/2002 10:22am |
| admintopnav.jsp.txt | 16,279 04/25/2002 10:22am |
| AdvRigDetail.jsp.txt | 35,106 06/26/2002 11:31am |
| AdvRigDetail-print.jsp.txt | 21,594 06/06/2002 10:56am |
| AttachUpload.htm.txt | 4,058 05/14/2002 12:17pm |
| AttachUploadFinish.htm.txt | 1,332 04/29/2002 12:32pm |
| blank-white.html.txt | 56 04/25/2002 10:23am |
| BuildFleet.jsp.txt | 1,231 06/06/2002 10:58am |
| BuildFleetDemand.jsp.txt | 14,858 06/06/2002 11:00am |
| BuildFleetGanttTop.jsp.txt | 424 06/06/2002 11:01am |
| BuildFleetMain.jsp.txt | 351 06/06/2002 11:10am |
| BuildFleetMid.jsp.txt | 25,189 06/06/2002 11:12am |
| changeCustomView.jsp.txt | 4,138 04/25/2002 10:23am |
| ChangeProfile.jsp.txt | 3,096 06/06/2002 11:15am |
| checkPW.js.txt | 2,578 04/25/2002 10:23am |
| codebase.js.txt | 19,872 06/26/2002 11:32am |
| CompareRigs.jsp.txt | 161,972 06/06/2002 11:16am |
| CompareRigs-print.jsp.txt | 81,374 06/06/2002 11:16am |
| contact_list.jsp.txt | 6,800 06/06/2002 11:26am |
| ContactOOS.jsp.txt | 6,371 06/06/2002 11:17am |
| ContractDetail.jsp.txt | 12,244 06/26/2002 11:32am |
| ContractDetailNew.jsp.txt | 11,475 06/06/2002 11:34am |
| ContractHistory.jsp.txt | 3,895 06/06/2002 11:29am |
| cookies.js.txt | 1,373 04/25/2002 10:24am |
| Copy of RigInsightRigSearch.html.txt | 85,944 06/09/2002 2:23pm |
| copyright.jsp.txt | 87 04/25/2002 10:24am |
| CreateCustomView.jsp.txt | 13,930 06/06/2002 11:29am |
| CustomDownload.jsp.txt | 19,806 06/06/2002 11:35am |
| CustomTitle.jsp.txt | 2,561 06/06/2002 11:36am |
| DatabaseErrorPage.jsp.txt | 25,564 06/26/2002 11:32am |
| dateSelect.jsp.txt | 2,825 04/25/2002 10:24am |
| dateSelectWithInitialBlank.jsp.txt | 3,084 04/25/2002 10:24am |
| DownloadableRigRequirementFormat.jsp.txt | 409 04/25/2002 10:25am |
| DownloadPreview.jsp.txt | 4,127 06/06/2002 11:37am |
| EmailSent.jsp.txt | 1,412 04/25/2002 10:25am |
| ErrorMessage.jsp.txt | 686 04/25/2002 10:25am |
| faq_logged_on.jsp.txt | 18,910 06/06/2002 11:45am |
| faq_not_logged_on.jsp.txt | 9,683 06/06/2002 11:45am |
| FileMaintenance.jsp.txt | 26,293 06/06/2002 11:39am |
| fleet_manager_overview.jsp.txt | 7,648 06/06/2002 12:49pm |
| FleetManagerGantt.jsp.txt | 14,684 06/06/2002 12:17pm |
| fleetmanager-gantt.jsp.txt | 2,349 06/06/2002 12:18pm |
| FleetManagerInstructions.jsp.txt | 4,308 06/06/2002 11:41am |
| FleetManagerTable.jsp.txt | 22,030 06/06/2002 4:01pm |
| fleetmanager-table.jsp.txt | 2,383 06/06/2002 12:20pm |
| FltManaBldFltAdd.jsp.txt | 168 06/06/2002 12:20pm |
| fm-bottom.jsp.txt | 15,715 04/25/2002 10:25am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| fm-cso.jsp.txt | 5,803 06/06/2002 12:22pm |
| fm-top.jsp.txt | 404 06/06/2002 12:23pm |
| GanttJavaScript.js.txt | 7,190 04/25/2002 10:26am |
| GlobalFleetStatistics.jsp.txt | 15,361 07/12/2002 9:51am |
| home.jsp.txt | 32,744 06/06/2002 12:25pm |
| index.jsp.txt | 331 04/25/2002 10:27am |
| InktomiRIPubList.jsp.txt | 1,288 04/25/2002 10:27am |
| login.jsp.txt | 16,706 04/25/2002 10:28am |
| maintain_profile.jsp.txt | 92,058 06/06/2002 12:26pm |
| manageCustomDownloads.jsp.txt | 6,473 06/06/2002 12:27pm |
| manageCustomViews.jsp.txt | 3,862 06/06/2002 12:27pm |
| ManageFleetItems.jsp.txt | 6,504 06/06/2002 12:47pm |
| ManageRequirements.jsp.txt | 10,901 06/06/2002 12:50pm |
| market_insight_overview.jsp.txt | 7,189 06/06/2002 12:51pm |
| MarketSnapshotChart.jsp.txt | 4,664 06/14/2002 9:15am |
| MarketSnapshotOptions.jsp.txt | 9,586 06/06/2002 12:52pm |
| MarketSnapshotTable.jsp.txt | 8,256 06/06/2002 12:53pm |
| MatchReq.jsp.txt | 182 06/06/2002 12:53pm |
| member_directory.jsp.txt | 18,630 04/25/2002 10:28am |
| MemberDirectoryMailList.jsp.txt | 44,178 07/12/2002 9:52am |
| memberLoginList.jsp.txt | 3,595 06/06/2002 1:00pm |
| MessageBoard.jsp.txt | 370 04/25/2002 10:28am |
| MonthlySummaries.jsp.txt | 3,987 06/06/2002 1:01pm |
| MonthlySummariesIndex.jsp.txt | 6,031 06/06/2002 1:02pm |
| MonthlySummariesIndexInclude.jsp.txt | 2,913 04/25/2002 10:29am |
| MonthlySummaryAdmin.jsp.txt | 3,774 06/06/2002 1:02pm |
| my_insight_overview.jsp.txt | 7,091 06/06/2002 1:03pm |
| myinvites-bottom.jsp.txt | 1,969 04/25/2002 10:29am |
| myinvites-cso.jsp.txt | 4,514 06/06/2002 2:55pm |
| myinvites-refine.jsp.txt | 8,114 06/06/2002 2:58pm |
| MyInvitesResults.jsp.txt | 1,093 06/06/2002 2:58pm |
| myinvites-table.jsp.txt | 24,749 06/06/2002 2:57pm |
| myinvites-top.jsp.txt | 597 06/06/2002 2:56pm |
| MyMarketInquiryResponse.jsp.txt | 25,805 06/06/2002 3:02pm |
| MyQueries.jsp.txt | 17,067 05/20/2002 6:00pm |
| MyRequirements.jsp.txt | 34,229 06/06/2002 3:03pm |
| MyRigs.jsp.txt | 9,978 06/06/2002 3:03pm |
| myRigsTable.jsp.txt | 2,777 04/25/2002 10:29am |
| MySublets.jsp.txt | 31,532 06/06/2002 3:04pm |
| NamemappingAdmin.jsp.txt | 4,563 06/06/2002 3:04pm |
| new_requirement.jsp.txt | 3,563 06/06/2002 3:08pm |
| Newswires.jsp.txt | 3,368 04/25/2002 10:29am |
| oldDateSelect.jsp.txt | 2,825 04/25/2002 10:29am |
| ORLDayRates.jsp.txt | 24,661 04/25/2002 10:33am |
| overdueList.jsp.txt | 3,684 06/06/2002 3:09pm |
| OwnerHistory.jsp.txt | 4,346 06/06/2002 3:10pm |
| PersonalizedPubsInclude.jsp.txt | 1,734 04/25/2002 10:34am |
| previewFleet-gantt.jsp.txt | 1,745 06/06/2002 3:13pm |
| previewFleet-table.jsp.txt | 1,746 06/06/2002 3:13pm |
| PrintDemandCriteria.jsp.txt | 8,071 04/25/2002 10:34am |
| PrintFleetManagerGantt.jsp.txt | 4,474 06/06/2002 3:43pm |
| PrintKey.jsp.txt | 10,521 06/06/2002 3:12pm |
| PrintRequirementGantt.jsp.txt | 3,350 06/06/2002 3:43pm |
| PrintRigSupplyCriteria.jsp.txt | 30,187 04/25/2002 10:34am |
| PrintRigSupplyGantt.jsp.txt | 4,151 06/06/2002 3:44pm |
| PubArchivedEditionsInclude.jsp.txt | 4,318 04/25/2002 10:34am |
| PublicationSearchInclude.jsp.txt | 13,651 04/25/2002 10:35am |
| PubSearchResultsInclude.jsp.txt | 5,544 04/25/2002 10:35am |
| ReqSearQuery.jsp.txt | 31,365 06/06/2002 3:19pm |
| ReqSearResGantt.jsp.txt | 11,864 06/06/2002 3:20pm |
| ReqSearResTable.jsp.txt | 1,632 06/06/2002 3:20pm |
| RequirementDetail.jsp.txt | 66,465 05/29/2002 11:36am |
| RequirementHistory.jsp.txt | 3,904 06/06/2002 3:20pm |
| RequirementResponse.jsp.txt | 45,423 06/06/2002 3:46pm |
| RevTechSpec.jsp.txt | 20,112 06/06/2002 3:22pm |
| rig_market_overview.jsp.txt | 9,449 06/06/2002 3:25pm |
| RigFullSpecs.jsp.txt | 111,757 06/06/2002 3:22pm |
| rigInsightAdminHome.jsp.txt | 541 06/06/2002 3:25pm |
| RigInsightRigSearch.jsp.txt | 106,285 06/10/2002 3:33pm |
| rignotes.htm.txt | 2,968 04/25/2002 10:39am |
| rigreq-gantt.jsp.txt | 1,865 06/06/2002 3:26pm |
| RigSearchOptionSelect.jsp.txt | 8,082 06/06/2002 3:23pm |
| RigStatusDescription.jsp.txt | 3,129 06/06/2002 3:37pm |

-continued

Computer Program Listing Appendix
The CDRom Appendix incorporated by reference in this application is included on a
single MSDOS compatible compact disk, with the disk containing the following named
files having a size and creation date as indicated in this Listing, organized in File Folders
as indicated below:

| File | Size & Date |
|---|---|
| rigsupply-gantt.jsp.txt | 2,002 06/06/2002 3:34pm |
| RigSupplySearchResGantt.jsp.txt | 12,180 06/06/2002 3:37pm |
| rr-bottom.jsp.txt | 8,916 04/25/2002 10:40am |
| rr-cso.jsp.txt | 5,385 06/06/2002 3:34pm |
| rr-mid.jsp.txt | 5,353 06/06/2002 3:33pm |
| rr-mid-print.jsp.txt | 2,653 06/06/2002 3:47pm |
| rr-table.jsp.txt | 8,381 04/25/2002 10:40am |
| rr-top.jsp.txt | 602 06/06/2002 3:33pm |
| rs-bottom.jsp.txt | 20,043 04/25/2002 10:40am |
| rs-top.jsp.txt | 459 06/06/2002 3:33pm |
| SaveQuery.jsp.txt | 3,481 06/06/2002 3:29pm |
| ScenarioManager.jsp.txt | 26,429 06/06/2002 3:28pm |
| searchtip-riginsight.jsp.txt | 1,041 04/25/2002 10:41am |
| SelectDayRateRegionAdmin.jsp.txt | 1,721 06/06/2002 3:28pm |
| snapShotDateSelect.jsp.txt | 1,818 04/25/2002 10:43am |
| staticDate.jsp.txt | 867 04/25/2002 10:43am |
| style.css.txt | 2,173 04/25/2002 10:43am |
| SubletDetail.jsp.txt | 45,981 06/06/2002 3:27pm |
| SubletHistory.jsp.txt | 3,899 06/06/2002 3:26pm |
| SubletOperatorAdmin.jsp.txt | 5,898 06/06/2002 3:29pm |
| SubletResponse.jsp.txt | 47,119 06/06/2002 3:30pm |
| SubletStatusAdmin.jsp.txt | 6,864 06/06/2002 3:31pm |
| TableRigSearchResults.jsp.txt | 1,337 06/06/2002 3:32pm |
| tabview-bot.jsp.txt | 18,814 04/25/2002 10:43am |
| tabview-cso.jsp.txt | 7,556 04/25/2002 10:43am |
| tabview-mid.jsp.txt | 6,661 04/25/2002 10:43am |
| tabview-mid-print.jsp.txt | 2,497 04/25/2002 10:43am |
| tabview-refine.jsp.txt | 8,058 06/06/2002 3:38pm |
| tabview-table.jsp.txt | 44,587 04/25/2002 10:43am |
| tabview-top.jsp.txt | 676 04/25/2002 10:43am |
| TechSpec.jsp.txt | 14,175 06/06/2002 3:39pm |
| topnav.jsp.txt | 23,312 05/20/2002 6:03pm |
| topnavNF.jsp.txt | 19,712 04/25/2002 10:44am |
| TypeKey.jsp.txt | 2,923 06/06/2002 3:39pm |
| UpgradeHistory.jsp.txt | 5,666 06/06/2002 3:40pm |
| UtilizationResults.jsp.txt | 10,173 06/06/2002 3:40pm |
| UtilizationSummary.jsp.txt | 18,962 07/12/2002 9:52am |
| OneOffshore\html\riginsight\FinishedTemplates | |
| | |
| additionalcategories.jsp.txt | 46,977 04/25/2002 10:22am |
| codebase.js.txt | 7,837 04/25/2002 10:23am |
| compare_specs.jsp.txt | 13,958 04/25/2002 10:23am |
| contract_history.jsp.txt | 2,347 04/25/2002 10:24am |
| demand_overview.jsp.txt | 2,743 04/25/2002 10:24am |
| edit_saved_group.jsp.txt | 7,701 04/25/2002 10:25am |
| fleetmanager_manage_scenarios.jsp.txt | 9,646 04/25/2002 10:25am |
| fleetmanager-buildfleet.jsp.txt | 1,035 04/25/2002 10:25am |
| fleetmanager-gantt.jsp.txt | 910 04/25/2002 10:25am |
| fm-build-demand.jsp.txt | 14,500 04/25/2002 10:25am |
| fm-build-main.jsp.txt | 377 04/25/2002 10:25am |
| fm-build-mid.jsp.txt | 12,094 04/25/2002 10:25am |
| fm-build-supply.jsp.txt | 23,707 04/25/2002 10:25am |
| fm-gannt-bot.jsp.txt | 3,730 04/25/2002 10:25am |
| fm-gannt-mid.jsp.txt | 5,969 04/25/2002 10:25am |
| fm-gannt-mng-req.jsp.txt | 7,543 04/25/2002 10:25am |
| fm-gannt-top.jsp.txt | 389 04/25/2002 10:26am |
| home.jsp.txt | 21,083 04/25/2002 10:26am |
| homepage_overview.jsp.txt | 3,871 04/25/2002 10:26am |
| maintain_profile.jsp.txt | 30,497 04/25/2002 10:28am |
| market_inquiry_overview.jsp.txt | 2,957 04/25/2002 10:28am |
| market_insight_market_snapshot_step2.jsp.tx | 8,195 04/25/2002 10:28am |
| market_insight_market_snapshot_tab.jsp.txt | 28,464 04/25/2002 10:28am |
| market_insight_monthly_publications_tab.jsp | 12,630 04/25/2002 10:28am |
| market_insight_newswires_tab.jsp.txt | 16,224 04/25/2002 10:28am |
| market_snapshot_overview.jsp.txt | 2,590 04/25/2002 10:28am |
| member_directory_search_results.jsp.txt | 9,652 04/25/2002 10:28am |
| member_profile.jsp.txt | 5,638 04/25/2002 10:28am |
| monthly_summaries_overview.jsp.txt | 4,217 04/25/2002 10:29am |
| my_insight_rig_my_queries_tab.jsp.txt | 6,662 04/25/2002 10:29am |
| my_insight_rig_my_rigs_tab.jsp.txt | 7,623 04/25/2002 10:29am |
| my_insight_sublets_tab.jsp.txt | 7,922 04/25/2002 10:29am |
| my_requirements.jsp.txt | 7,182 04/25/2002 10:29am |
| my_requirements_overview.jsp.txt | 2,933 04/25/2002 10:29am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| my_rigs_overview.jsp.txt | 2,651 04/25/2002 10:29am |
| my_saved_queries_overview.jsp.txt | 2,548 04/25/2002 10:29am |
| my_sublets_overview.jsp.txt | 2,919 04/25/2002 10:29am |
| new_requirement.jsp.txt | 3,550 04/25/2002 10:29am |
| news_wires_overview.jsp.txt | 2,805 04/25/2002 10:29am |
| notification_window.jsp.txt | 1,866 04/25/2002 10:29am |
| OwnerHistory.jsp.txt | 3,102 04/25/2002 10:33am |
| requirement_detail.jsp.txt | 25,915 04/25/2002 10:35am |
| requirement_history.jsp.txt | 1,948 04/25/2002 10:35am |
| requirement_respond.jsp.txt | 18,698 04/25/2002 10:35am |
| requirement_responses.jsp.txt | 5,056 04/25/2002 10:35am |
| research-market-demand.jsp.txt | 22,151 04/25/2002 10:35am |
| research-market-supply.jsp.txt | 96,110 04/25/2002 10:35am |
| rig_market_compare_technical_specs_tab.jsp. | 5,941 04/25/2002 10:39am |
| rigdetail.jsp.txt | 14,481 04/25/2002 10:39am |
| rigfullspecs.jsp.txt | 40,324 04/25/2002 10:39am |
| rigfullspecs1.jsp.txt | 36,383 04/25/2002 10:39am |
| savequery.jsp.txt | 1,393 04/25/2002 10:41am |
| settings.ren | 2,093 07/18/2002 4:15pm |
| style.css.txt | 1,814 04/25/2002 10:43am |
| sublet_detail.jsp.txt | 6,817 04/25/2002 10:43am |
| sublet_form.jsp.txt | 22,463 04/25/2002 10:43am |
| sublet_history.jsp.txt | 1,933 04/25/2002 10:43am |
| sublet_overview.jsp.txt | 2,773 04/25/2002 10:43am |
| supply_overview.jsp.txt | 2,908 04/25/2002 10:43am |
| tabular_rig_results.jsp.txt | 914 04/25/2002 10:43am |
| tabview-bot.jsp.txt | 4,009 04/25/2002 10:43am |
| tabview-cso.jsp.txt | 3,574 06/06/2002 3:38pm |
| tabview-mid.jsp.txt | 29,017 04/25/2002 10:43am |
| tabview-top.jsp.txt | 388 06/06/2002 3:39pm |
| technical_specs_overview.jsp.txt | 2,826 04/25/2002 10:43am |
| topnav.jsp.txt | 16,833 04/25/2002 10:44am |
| view_requirements_responses.jsp.txt | 5,909 04/25/2002 10:45am |
| OneOffshore\html\riginsight\Static | |
| contact_form.html.txt | 5,327 04/25/2002 10:24am |
| contact_list.html.txt | 5,251 04/25/2002 10:24am |
| demand_overview.html.txt | 2,743 04/25/2002 10:24am |
| faq_logged_on.html.txt | 17,749 04/25/2002 10:25am |
| faq_not_logged_on.htm.txt | 9,621 04/25/2002 10:25am |
| fleet_manager_overview.html.txt | 4,159 04/25/2002 10:25am |
| homepage_overview.html.txt | 3,871 04/25/2002 10:26am |
| market_inquiry_overview.html.txt | 2,957 04/25/2002 10:28am |
| market_insight_overview.html.txt | 3,588 04/25/2002 10:28am |
| market_snapshot_overview.html.txt | 2,590 04/25/2002 10:28am |
| monthly_summaries_overview.html.txt | 4,217 04/25/2002 10:29am |
| my_insight_overview.html.txt | 2,776 04/25/2002 10:29am |
| my_requirements_overview.html.txt | 2,933 04/25/2002 10:29am |
| my_rigs_overview.html.txt | 2,651 04/25/2002 10:29am |
| my_saved_queries_overview.html.txt | 2,548 04/25/2002 10:29am |
| my_sublets_overview.html.txt | 2,919 04/25/2002 10:29am |
| news_wires_overview.htm.txt | 2,805 04/25/2002 10:29am |
| rig_market_overview.html.txt | 3,420 04/25/2002 10:39am |
| style.css.txt | 1,814 04/25/2002 10:43am |
| sublet_overview.html.txt | 2,773 04/25/2002 10:43am |
| supply_overview.html.txt | 2,908 04/25/2002 10:43am |
| technical_specs_overview.html.txt | 2,826 04/25/2002 10:43am |
| OneOffshore\html\riginsight\templates | |
| blank-white.html.txt | 56 04/25/2002 10:23am |
| codebase.js.txt | 7,434 04/25/2002 10:23am |
| compare_specs.html.txt | 29,717 04/25/2002 10:23am |
| compare_specs.jsp.txt | 14,345 04/25/2002 10:23am |
| contract_history.jsp.txt | 2,610 04/25/2002 10:24am |
| create_new_group.jsp.txt | 9,980 04/25/2002 10:24am |
| delete_func.html.txt | 710 04/25/2002 10:24am |
| edit_saved_group.jsp.txt | 7,274 04/25/2002 10:25am |
| fleetmanager_manage_scenarios.jsp.txt | 9,646 04/25/2002 10:25am |
| fleetmanager-buildfleet.jsp.txt | 1035 04/25/2002 10:25am |
| fleetmanager-gantt.jsp.txt | 910 04/25/2002 10:25am |
| fm-build-demand.jsp.txt | 14,500 04/25/2002 10:25am |
| fm-build-main.jsp.txt | 770 04/25/2002 10:25am |
| fm-build-mid.jsp.txt | 13,048 04/25/2002 10:25am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size | Date | Time |
|---|---|---|---|
| fm-build-supply.jsp.txt | 23,707 | 04/25/2002 | 10:25am |
| fm-gannt-bot.jsp.txt | 3,730 | 04/25/2002 | 10:25am |
| fm-gannt-mid.jsp.txt | 5,969 | 04/25/2002 | 10:25am |
| fm-gannt-mng-req.jsp.txt | 7,543 | 04/25/2002 | 10:25am |
| fm-gannt-top.jsp.txt | 389 | 04/25/2002 | 10:26am |
| home.jsp.txt | 21,083 | 04/25/2002 | 10:26am |
| index.html.txt | 5,646 | 04/25/2002 | 10:27am |
| market_insight.jsp.txt | 1,269 | 04/25/2002 | 10:28am |
| market_insight_market_snapshot_tab.jsp.txt | 27,378 | 04/25/2002 | 10:28am |
| market_insight_monthly_publications_tab.jsp | 12,630 | 04/25/2002 | 10:28am |
| market_insight_newswires_tab.jsp.txt | 14,966 | 04/25/2002 | 10:28am |
| member_directory.jsp.txt | 6,402 | 06/06/2002 | 12:55pm |
| member_directory_search_results.jsp.txt | 9,351 | 04/25/2002 | 10:28am |
| member_profile.jsp.txt | 5,527 | 04/25/2002 | 10:28am |
| my_insight_rig_my_queries_tab.html.txt | 20,053 | 04/25/2002 | 10:29am |
| my_insight_rig_my_queries_tab.jsp.txt | 6,525 | 04/25/2002 | 10:29am |
| my_insight_rig_my_rigs_tab.html.txt | 22,397 | 04/25/2002 | 10:29am |
| my_insight_rig_my_rigs_tab.jsp.txt | 7,623 | 04/25/2002 | 10:29am |
| my_insight_sublets_tab.html.txt | 32,883 | 04/25/2002 | 10:29am |
| my_insight_sublets_tab.jsp.txt | 9,155 | 04/25/2002 | 10:29am |
| my_requirements.html.txt | 27,518 | 04/25/2002 | 10:29am |
| my_requirements.jsp.txt | 11,499 | 04/25/2002 | 10:29am |
| my_requirements2.jsp.txt | 4,904 | 04/25/2002 | 10:29am |
| new_requirement.jsp.txt | 3,550 | 04/25/2002 | 10:29am |
| newswire_detail.jsp.txt | 1,397 | 04/25/2002 | 10:29am |
| notification_window.jsp.txt | 2,183 | 04/25/2002 | 10:29am |
| plot_detail.html.txt | 17,571 | 04/25/2002 | 10:34am |
| requirement_detail.jsp.txt | 25,908 | 04/25/2002 | 10:35am |
| requirement_history.jsp.txt | 4,228 | 04/25/2002 | 10:35am |
| requirement_respond.jsp.txt | 18,698 | 04/25/2002 | 10:35am |
| requirement_search_results_gantt.jsp.txt | 916 | 04/25/2002 | 10:35am |
| requirement_search_results_tabular.jsp.txt | 7,384 | 04/25/2002 | 10:35am |
| research-market.jsp.txt | 59,250 | 04/25/2002 | 10:35am |
| research-market-demand.jsp.txt | 22,154 | 04/25/2002 | 10:35am |
| research-market-supply.jsp.txt | 96,040 | 04/25/2002 | 10:35am |
| rig_market_compare_technical_specs_tab.jsp. | 4,608 | 04/25/2002 | 10:39am |
| rig_market_release_marketing_inquiry_tab.js | 19,057 | 04/25/2002 | 10:39am |
| rig_search_criteria.jsp.txt | 2,136 | 04/25/2002 | 10:39am |
| rigdetail.html.txt | 411 | 04/25/2002 | 10:39am |
| rigdetail.jsp.txt | 14,481 | 04/25/2002 | 10:39am |
| rigfullspecs.jsp.txt | 40,324 | 04/25/2002 | 10:39am |
| rigsearch_results.html.txt | 19,860 | 04/25/2002 | 10:40am |
| rs-gannt-bot.jsp.txt | 3,661 | 04/25/2002 | 10:40am |
| rs-gannt-mid.jsp.txt | 156 | 04/25/2002 | 10:40am |
| rs-gannt-top.jsp.txt | 400 | 04/25/2002 | 10:40am |
| search_for_rig_by_name.jsp.txt | 10,784 | 04/25/2002 | 10:41am |
| search_for_rig_by_specifications.jsp.txt | 22,347 | 04/25/2002 | 10:41am |
| selectlisttest2.html.txt | 3,194 | 04/25/2002 | 10:41am |
| standard-template.html.txt | 4,191 | 04/25/2002 | 10:43am |
| style.css.txt | 1,814 | 04/25/2002 | 10:43am |
| sublet_detail.jsp.txt | 6,817 | 04/25/2002 | 10:43am |
| sublet_form.jsp.txt | 22,463 | 04/25/2002 | 10:43am |
| sublet_respond.jsp.txt | 23,208 | 04/25/2002 | 10:43am |
| tabular_rig_results.jsp.txt | 914 | 04/25/2002 | 10:43am |
| tabview-bot.jsp.txt | 4,022 | 06/06/2002 | 3:37pm |
| tabview-mid.jsp.txt | 29,017 | 04/25/2002 | 10:43am |
| tabview-top.jsp.txt | 389 | 04/25/2002 | 10:43am |
| testnav.html.txt | 16,442 | 04/25/2002 | 10:43am |
| topnav.jsp.txt | 16,796 | 04/25/2002 | 10:44am |
| view_requirements_responses.jsp.txt | 5,909 | 04/25/2002 | 10:45am |
| view_saved_requirements_search_query.jsp.tx | 22,478 | 04/25/2002 | 10:45am |

OneOffshore\html\shared

| File | Size | Date | Time |
|---|---|---|---|
| AdminHome.jsp.txt | 3,915 | 04/25/2002 | 10:22am |
| AdminNavBar.jsp.txt | 3,180 | 04/25/2002 | 10:22am |
| ApplicationError.jsp.txt | 1,029 | 04/25/2002 | 10:23am |
| ArticleAdminMaint.jsp.txt | 3,073 | 04/25/2002 | 10:23am |
| ChangePassword.jsp.txt | 1,314 | 04/25/2002 | 10:23am |
| comingsoon.html.txt | 1,593 | 04/25/2002 | 10:23am |
| cookies.js.txt | 2,237 | 04/25/2002 | 10:24am |
| CreateMember.jsp.txt | 18,873 | 04/25/2002 | 10:24am |
| DirectoriesComingSoon.html.txt | 1,738 | 04/25/2002 | 10:24am |
| error4xx.jsp.txt | 1,761 | 04/25/2002 | 10:25am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| | |
|---|---|
| error5xx.jsp.txt | 1,823 04/25/2002 10:25am |
| ErrorMessage.jsp.txt | 679 04/25/2002 10:25am |
| ErrorPage.jsp.txt | 1,238 04/25/2002 10:25am |
| GlobalNavBar.jsp.txt | 971 04/25/2002 10:26am |
| ImageTest.jsp.txt | 2,454 04/25/2002 10:27am |
| Index.jsp.txt | 1,186 04/25/2002 10:27am |
| LinksToTest.jsp.txt | 4,921 04/25/2002 10:28am |
| Login.jsp.txt | 1,530 04/25/2002 10:28am |
| MemberAddSub.jsp.txt | 4,527 04/25/2002 10:28am |
| MemberAdminMaint.jsp.txt | 14,451 04/25/2002 10:28am |
| MemberStatusMaint.jsp.txt | 3,579 04/25/2002 10:28am |
| MessageBoard.jsp.txt | 777 04/25/2002 10:28am |
| OrgAdmin.jsp.txt | 2,726 04/25/2002 10:33am |
| PersonOrgAssignment.jsp.txt | 3,556 04/25/2002 10:34am |
| RedirectToHTTP.jsp.txt | 670 04/25/2002 10:35am |
| RefreshServer.jsp.txt | 664 04/25/2002 10:35am |
| SchedMaintPage.jsp.txt | 1,350 06/14/2002 2:24pm |
| SearchForMembers.jsp.txt | 5,134 04/25/2002 10:41am |
| ServerStatus.jsp.txt | 411 04/25/2002 10:41am |
| SiteMemberListAdmin.jsp.txt | 4,243 04/25/2002 10:41am |
| TopNav2Inc.jsp.txt | 13,249 04/25/2002 10:44am |
| UserGroupAssignment.jsp.txt | 4,258 04/25/2002 10:44am |
| ViewArticlesList.jsp.txt | 4,045 04/25/2002 10:45am |
| ViewEditionsList.jsp.txt | 5,698 04/25/2002 10:45am |
| ViewPublicationsList.jsp.txt | 3,599 04/25/2002 10:45am |
| OneOffshore\html\shared\publish | |
| | |
| 0 files; 0 bytes | |
| OneOffshore\html\shared\publish\RigImages | |
| | |
| rig_1.jpg | 29,726 04/25/2002 10:37am |
| rig_10.jpg | 16,379 04/25/2002 10:37am |
| rig_100.jpg | 39,965 04/25/2002 10:37am |
| Rig_101.jpg | 17,043 04/25/2002 10:37am |
| rig_102.jpg | 9,485 04/25/2002 10:37am |
| rig_104.jpg | 30,069 04/25/2002 10:37am |
| rig_109.jpg | 14,531 04/25/2002 10:37am |
| rig_110.jpg | 22,365 04/25/2002 10:37am |
| rig_111.jpg | 45,626 04/25/2002 10:37am |
| rig_112.jpg | 8,931 04/25/2002 10:37am |
| rig_113.jpg | 38,131 04/25/2002 10:37am |
| rig_114.jpg | 24,548 04/25/2002 10:37am |
| rig_116.jpg | 37,733 04/25/2002 10:37am |
| rig_118.jpg | 16,426 04/25/2002 10:37am |
| rig_119.jpg | 14,802 04/25/2002 10:37am |
| rig_112.jpg | 11,604 04/25/2002 10:37am |
| rig_122.jpg | 8,930 04/25/2002 10:37am |
| rig_123.jpg | 40,020 04/25/2002 10:37am |
| rig_124.jpg | 20,429 04/25/2002 10:37am |
| rig_125.jpg | 10,607 04/25/2002 10:37am |
| rig_126.jpg | 20,519 04/25/2002 10:37am |
| rig_127.jpg | 20,422 04/25/2002 10:37am |
| rig_128.jpg | 31,698 04/25/2002 10:37am |
| rig_129.jpg | 14,861 04/25/2002 10:37am |
| rig_13.jpg | 63,616 04/25/2002 10:37am |
| rig_133.jpg | 40,136 04/25/2002 10:37am |
| rig_134.jpg | 13,560 04/25/2002 10:37am |
| rig_139.jpg | 9,709 04/25/2002 10:37am |
| rig_143.jpg | 31,688 04/25/2002 10:37am |
| rig_145.jpg | 33,738 04/25/2002 10:37am |
| rig_149.jpg | 40,245 04/25/2002 10:37am |
| rig_15.jpg | 34,229 04/25/2002 10:37am |
| rig_150.jpg | 13,405 04/25/2002 10:37am |
| rig_153.jpg | 32,942 04/25/2002 10:37am |
| rig_156.jpg | 32,657 04/25/2002 10:37am |
| rig_16.jpg | 17,560 04/25/2002 10:37am |
| rig_160.jpg | 29,807 04/25/2002 10:37am |
| rig_161.jpg | 11,549 04/25/2002 10:37am |
| Rig_162.jpg | 17,328 04/25/2002 10:37am |
| rig_167.jpg | 20,422 04/25/2002 10:37am |
| rig_168.jpg | 34,435 04/25/2002 10:37am |
| rig_169.jpg | 16,732 04/25/2002 10:37am |
| rig_17.jpg | 23,624 04/25/2002 10:37am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| Rig_172.jpg | 31,114 04/25/2002 10:37am |
| rig_173.jpg | 27,431 04/25/2002 10:37am |
| Rig_174.jpg | 33,553 04/25/2002 10:37am |
| rig_178.jpg | 27,858 04/25/2002 10:37am |
| rig_18.jpg | 56,554 04/25/2002 10:37am |
| rig_180.jpg | 10,546 04/25/2002 10:37am |
| rig_183.jpg | 17,630 04/25/2002 10:37am |
| Rig_185.jpg | 20,201 04/25/2002 10:37am |
| rig_188.jpg | 16,114 04/25/2002 10:37am |
| rig_189.jpg | 19,194 04/25/2002 10:37am |
| rig_191.jpg | 27,727 04/25/2002 10:37am |
| rig_192.jpg | 30,492 04/25/2002 10:37am |
| rig_193.jpg | 23,246 04/25/2002 10:37am |
| rig_197.jpg | 13,039 04/25/2002 10:37am |
| rig_200.jpg | 47,139 04/25/2002 10:37am |
| rig_201.jpg | 13,689 04/25/2002 10:37am |
| rig_202.jpg | 51,980 04/25/2002 10:37am |
| rig_204.jpg | 31,429 04/25/2002 10:37am |
| rig_207.jpg | 35,057 04/25/2002 10:37am |
| rig_208.jpg | 12,644 04/25/2002 10:37am |
| rig_209.jpg | 59,743 04/25/2002 10:37am |
| rig_21.jpg | 23,578 04/25/2002 10:37am |
| rig_210.jpg | 39,980 04/25/2002 10:37am |
| rig_211.jpg | 17,080 04/25/2002 10:37am |
| rig_212.jpg | 11,220 04/25/2002 10:37am |
| rig_216.jpg | 10,098 04/25/2002 10:37am |
| rig_217.jpg | 39,364 04/25/2002 10:37am |
| rig_218.jpg | 38,788 04/25/2002 10:37am |
| rig_220.jpg | 15,356 04/25/2002 10:37am |
| rig_221.jpg | 20,422 04/25/2002 10:37am |
| rig_222.jpg | 61,125 04/25/2002 10:37am |
| rig_224.jpg | 20,429 04/25/2002 10:37am |
| rig_226.jpg | 20,429 04/25/2002 10:37am |
| rig_227.jpg | 28,591 04/25/2002 10:37am |
| rig_228.jpg | 45,018 04/25/2002 10:37am |
| rig_229.jpg | 20,422 04/25/2002 10:37am |
| rig_232.jpg | 44,235 04/25/2002 10:37am |
| rig_234.jpg | 25,949 04/25/2002 10:37am |
| rig_235.jpg | 26,860 04/25/2002 10:37am |
| rig_236.jpg | 44,235 04/25/2002 10:37am |
| rig_241.jpg | 20,422 04/25/2002 10:37am |
| rig_246.jpg | 11,652 04/25/2002 10:37am |
| rig_248.jpg | 57,168 04/25/2002 10:37am |
| rig_249.jpg | 45,436 04/25/2002 10:37am |
| rig_25.jpg | 40,058 04/25/2002 10:37am |
| rig_250.jpg | 11,947 04/25/2002 10:37am |
| rig_251.jpg | 54,097 04/25/2002 10:37am |
| rig_256.jpg | 23,180 04/25/2002 10:37am |
| rig_257.jpg | 26,994 04/25/2002 10:37am |
| rig_258.jpg | 28,227 04/25/2002 10:37am |
| rig_263.jpg | 7,759 04/25/2002 10:37am |
| rig_264.jpg | 37,452 04/25/2002 10:37am |
| rig_265.jpg | 63,808 04/25/2002 10:37am |
| rig_266.jpg | 33,572 04/25/2002 10:37am |
| rig_268.jpg | 31,547 04/25/2002 10:37am |
| rig_269.jpg | 27,672 04/25/2002 10:37am |
| Rig_27.jpg | 16,827 04/25/2002 10:37am |
| rig_271.jpg | 23,606 04/25/2002 10:37am |
| rig_272.jpg | 64,007 04/25/2002 10:37am |
| rig_275.jpg | 66,669 04/25/2002 10:37am |
| Rig_276.jpg | 11,100 04/25/2002 10:37am |
| rig_277.jpg | 32,707 04/25/2002 10:37am |
| Rig_28.jpg | 32,585 04/25/2002 10:37am |
| Rig_282.jpg | 45,700 04/25/2002 10:37am |
| rig_284.jpg | 22,823 04/25/2002 10:37am |
| Rig_293.jpg | 15,038 04/25/2002 10:37am |
| rig_296.jpg | 13,612 04/25/2002 10:37am |
| rig_298.jpg | 25,408 04/25/2002 10:37am |
| rig_3.jpg | 9,606 04/25/2002 10:37am |
| rig_30.jpg | 23,752 04/25/2002 10:37am |
| rig_300.jpg | 58,528 04/25/2002 10:38am |
| rig_301.jpg | 33,461 04/25/2002 10:38am |
| rig_302.jpg | 27,231 04/25/2002 10:38am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| rig_304.jpg | 64,462 04/25/2002 10:38am |
| rig_305.jpg | 19,706 04/25/2002 10:38am |
| Rig_307.jpg | 13,194 04/25/2002 10:38am |
| rig_308.jpg | 70,962 04/25/2002 10:38am |
| rig_309.jpg | 15,731 04/25/2002 10:38am |
| rig_31.jpg | 21,740 04/25/2002 10:38am |
| rig_310.jpg | 7,725 04/25/2002 10:38am |
| rig_311.jpg | 49,193 04/25/2002 10:38am |
| rig_312.jpg | 44,808 04/25/2002 10:38am |
| rig_313.jpg | 40,501 04/25/2002 10:38am |
| rig_316.jpg | 41,011 04/25/2002 10:38am |
| rig_317.jpg | 14,818 04/25/2002 10:38am |
| rig_318.jpg | 65,860 04/25/2002 10:38am |
| rig_32.jpg | 31,023 04/25/2002 10:38am |
| rig_320.jpg | 16,268 04/25/2002 10:38am |
| rig_321.jpg | 24,084 04/25/2002 10:38am |
| rig_322.jpg | 33,125 04/25/2002 10:38am |
| rig_323.jpg | 38,881 04/25/2002 10:38am |
| rig_324.jpg | 60,574 04/25/2002 10:38am |
| rig_325.jpg | 31,315 04/25/2002 10:38am |
| Rig_326.jpg | 23,160 04/25/2002 10:38am |
| rig_329.jpg | 25,485 04/25/2002 10:38am |
| rig_332.jpg | 43,504 04/25/2002 10:38am |
| rig_336.jpg | 55,951 04/25/2002 10:38am |
| rig_337.jpg | 26,482 04/25/2002 10:38am |
| rig_338.jpg | 31,634 04/25/2002 10:38am |
| rig_340.jpg | 24,646 04/25/2002 10:38am |
| rig_342.jpg | 38,909 04/25/2002 10:38am |
| rig_344.jpg | 41,420 04/25/2002 10:38am |
| rig_345.jpg | 24,703 04/25/2002 10:38am |
| Rig_347.jpg | 21,453 04/25/2002 10:38am |
| rig_349.jpg | 34,132 04/25/2002 10:38am |
| rig_35.jpg | 5,997 04/25/2002 10:38am |
| rig_350.jpg | 36,593 04/25/2002 10:38am |
| rig_351.jpg | 19,058 04/25/2002 10:38am |
| rig_353.jpg | 67,532 04/25/2002 10:38am |
| rig_354.jpg | 43,332 04/25/2002 10:38am |
| rig_356.jpg | 47,626 04/25/2002 10:38am |
| rig_358.jpg | 60,342 04/25/2002 10:38am |
| Rig_36.jpg | 16,904 04/25/2002 10:38am |
| rig_360.jpg | 67,409 04/25/2002 10:38am |
| rig_363.jpg | 37,942 04/25/2002 10:38am |
| rig_364.jpg | 24,706 04/25/2002 10:38am |
| rig_370.jpg | 27,177 04/25/2002 10:38am |
| rig_371.jpg | 48,637 04/25/2002 10:38am |
| rig_372.jpg | 33,670 04/25/2002 10:38am |
| rig_374.jpg | 36,099 04/25/2002 10:38am |
| rig_378.jpg | 20,066 04/25/2002 10:38am |
| rig_379.jpg | 10,296 04/25/2002 10:38am |
| rig_380.jpg | 18,614 04/25/2002 10:38am |
| rig_383.jpg | 13,260 04/25/2002 10:38am |
| rig_387.jpg | 11,365 04/25/2002 10:38am |
| rig_389.jpg | 11,567 04/25/2002 10:38am |
| rig_39.jpg | 12,860 04/25/2002 10:38am |
| rig_390.jpg | 13,675 04/25/2002 10:38am |
| rig_393.jpg | 9,091 04/25/2002 10:38am |
| Rig_394.jpg | 9,207 04/25/2002 10:38am |
| rig_397.jpg | 45,001 04/25/2002 10:38am |
| rig_4.jpg | 6,324 04/25/2002 10:38am |
| Rig_40.jpg | 19,559 04/25/2002 10:38am |
| rig_401.jpg | 22,595 04/25/2002 10:38am |
| Rig_402.jpg | 12,414 04/25/2002 10:38am |
| Rig_406.jpg | 8,715 04/25/2002 10:38am |
| rig_41.jpg | 72,959 04/25/2002 10:38am |
| rig_411.jpg | 54,778 04/25/2002 10:38am |
| rig_412.jpg | 49,177 04/25/2002 10:38am |
| rig_414.jpg | 47,968 04/25/2002 10:38am |
| rig_415.jpg | 37,949 04/25/2002 10:38am |
| rig_418.jpg | 48,458 04/25/2002 10:38am |
| rig_420.jpg | 58,208 04/25/2002 10:38am |
| rig_421.jpg | 38,695 04/25/2002 10:38am |
| rig_422.jpg | 27,919 04/25/2002 10:38am |
| rig_423.jpg | 32,222 04/25/2002 10:38am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| | |
|---|---|
| rig_424.jpg | 21,106 04/25/2002 10:38am |
| rig_425.jpg | 39,875 04/25/2002 10:38am |
| rig_426.jpg | 18,461 04/25/2002 10:38am |
| rig_427.jpg | 36,652 04/25/2002 10:38am |
| Rig_428.jpg | 10,603 04/25/2002 10:38am |
| Rig_429.jpg | 8,169 04/25/2002 10:38am |
| rig_43.jpg | 36,693 04/25/2002 10:38am |
| rig_430.jpg | 35,519 04/25/2002 10:38am |
| rig_431.jpg | 18,461 04/25/2002 10:38am |
| rig_433.jpg | 18,461 04/25/2002 10:38am |
| rig_434.jpg | 37,049 04/25/2002 10:38am |
| rig_435.jpg | 18,593 04/25/2002 10:38am |
| rig_436.jpg | 18,593 04/25/2002 10:38am |
| rig_439.jpg | 39,328 04/25/2002 10:38am |
| rig_440.jpg | 18,591 04/25/2002 10:38am |
| Rig_441.jpg | 16,210 04/25/2002 10:38am |
| rig_442.jpg | 5,164 04/25/2002 10:38am |
| rig_443.jpg | 12,788 04/25/2002 10:38am |
| rig_445.jpg | 6,912 04/25/2002 10:38am |
| rig_446.jpg | 5,164 04/25/2002 10:38am |
| rig_449.jpg | 23,421 04/25/2002 10:38am |
| rig_45.jpg | 65,039 04/25/2002 10:38am |
| rig_452.jpg | 53,960 04/25/2002 10:38am |
| rig_453.jpg | 65,226 04/25/2002 10:38am |
| rig_455.jpg | 34,302 04/25/2002 10:38am |
| rig_456.jpg | 40,069 04/25/2002 10:38am |
| rig_457.jpg | 51,670 04/25/2002 10:38am |
| rig_458.jpg | 37,753 04/25/2002 10:38am |
| rig_459.jpg | 21,763 04/25/2002 10:38am |
| rig_461.jpg | 35,316 04/25/2002 10:38am |
| Rig_462.jpg | 31,395 04/25/2002 10:38am |
| rig_463.jpg | 15,783 04/25/2002 10:38am |
| rig_467.jpg | 39,292 04/25/2002 10:38am |
| rig_469.jpg | 52,519 04/25/2002 10:38am |
| rig_471.jpg | 38,616 04/25/2002 10:38am |
| rig_472.jpg | 32,023 04/25/2002 10:38am |
| rig_475.jpg | 50,965 04/25/2002 10:38am |
| rig_478.jpg | 21,847 04/25/2002 10:38am |
| rig_479.jpg | 20,421 04/25/2002 10:38am |
| rig_48.jpg | 29,054 04/25/2002 10:38am |
| rig_480.jpg | 45,405 04/25/2002 10:38am |
| rig_482.jpg | 25,450 04/25/2002 10:38am |
| rig_483.jpg | 50,650 04/25/2002 10:38am |
| rig_486.jpg | 25,592 04/25/2002 10:38am |
| Rig_488.jpg | 18,036 04/25/2002 10:38am |
| rig_49.jpg | 23,512 04/25/2002 10:38am |
| rig_490.jpg | 13,492 04/25/2002 10:38am |
| rig_493.jpg | 9,746 04/25/2002 10:38am |
| rig_494.jpg | 6,356 04/25/2002 10:38am |
| rig_496.jpg | 18,295 04/25/2002 10:38am |
| Rig_499.jpg | 10,333 04/25/2002 10:38am |
| rig_5.jpg | 42,322 04/25/2002 10:38am |
| rig_50.jpg | 45,945 04/25/2002 10:38am |
| rig_500.jpg | 42,466 04/25/2002 10:38am |
| rig_503.jpg | 12,478 04/25/2002 10:38am |
| Rig_504.jpg | 11,234 04/25/2002 10:38am |
| rig_508.jpg | 48,868 04/25/2002 10:38am |
| rig_510.jpg | 44,347 04/25/2002 10:38am |
| rig_512.jpg | 44,356 04/25/2002 10:38am |
| rig_514.jpg | 6,751 04/25/2002 10:38am |
| Rig_515.jpg | 7,934 04/25/2002 10:38am |
| Rig_516.jpg | 26,083 04/25/2002 10:38am |
| Rig_517.jpg | 9,984 04/25/2002 10:38am |
| rig_518.jpg | 23,425 04/25/2002 10:38am |
| rig_520.jpg | 34,608 04/25/2002 10:38am |
| Rig_521.jpg | 12,683 04/25/2002 10:38am |
| rig_523.jpg | 29,846 04/25/2002 10:38am |
| rig_526.jpg | 56,865 04/25/2002 10:38am |
| Rig_527.jpg | 8,054 04/25/2002 10:38am |
| Rig_528.jpg | 46,350 04/25/2002 10:38am |
| rig_53.jpg | 57,084 04/25/2002 10:38am |
| rig_530.jpg | 38,017 04/25/2002 10:38am |
| rig_531.jpg | 33,108 04/25/2002 10:38am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size | Date | Time |
|---|---|---|---|
| rig_532.jpg | 32,818 | 04/25/2002 | 10:38am |
| rig_534.jpg | 29,244 | 04/25/2002 | 10:38am |
| rig_535.jpg | 28,347 | 04/25/2002 | 10:38am |
| rig_536.jpg | 47,223 | 04/25/2002 | 10:38am |
| Rig_537.jpg | 6,054 | 04/25/2002 | 10:38am |
| rig_538.jpg | 40,739 | 04/25/2002 | 10:38am |
| rig_539.jpg | 47,371 | 04/25/2002 | 10:38am |
| rig_540.jpg | 42,706 | 04/25/2002 | 10:38am |
| rig_543.jpg | 12,506 | 04/25/2002 | 10:38am |
| rig_545.jpg | 36,080 | 04/25/2002 | 10:38am |
| rig_548.jpg | 42,055 | 04/25/2002 | 10:38am |
| rig_550.jpg | 39,323 | 04/25/2002 | 10:38am |
| rig_551.jpg | 15,650 | 04/25/2002 | 10:38am |
| Rig_553.jpg | 9,130 | 04/25/2002 | 10:38am |
| rig_557.jpg | 35,147 | 04/25/2002 | 10:38am |
| rig_559.jpg | 12,184 | 04/25/2002 | 10:38am |
| rig_56.jpg | 11,327 | 04/25/2002 | 10:38am |
| rig_562.jpg | 34,574 | 04/25/2002 | 10:38am |
| rig_564.jpg | 59,627 | 04/25/2002 | 10:38am |
| rig_567.jpg | 56,754 | 04/25/2002 | 10:38am |
| rig_568.jpg | 65,456 | 04/25/2002 | 10:38am |
| rig_569.jpg | 37,579 | 04/25/2002 | 10:38am |
| rig_57.jpg | 44,823 | 04/25/2002 | 10:38am |
| rig_570.jpg | 48,312 | 04/25/2002 | 10:38am |
| rig_571.jpg | 24,162 | 04/25/2002 | 10:38am |
| rig_572.jpg | 41,447 | 04/25/2002 | 10:38am |
| rig_573.jpg | 49,329 | 04/25/2002 | 10:38am |
| rig_574.jpg | 33,901 | 04/25/2002 | 10:38am |
| rig_575.jpg | 33,420 | 04/25/2002 | 10:38am |
| rig_576.jpg | 45,675 | 04/25/2002 | 10:38am |
| rig_577.jpg | 34,526 | 04/25/2002 | 10:38am |
| rig_579.jpg | 57,620 | 04/25/2002 | 10:38am |
| rig_581.jpg | 50,747 | 04/25/2002 | 10:38am |
| rig_582.jpg | 25,311 | 04/25/2002 | 10:38am |
| rig_583.jpg | 49,810 | 04/25/2002 | 10:38am |
| rig_584.jpg | 46,350 | 04/25/2002 | 10:38am |
| rig_587.jpg | 48,950 | 04/25/2002 | 10:38am |
| rig_588.jpg | 37,670 | 04/25/2002 | 10:38am |
| rig_59.jpg | 27,391 | 04/25/2002 | 10:38am |
| rig_591.jpg | 37,189 | 04/25/2002 | 10:38am |
| rig_594.jpg | 31,508 | 04/25/2002 | 10:38am |
| rig_595.jpg | 39,364 | 04/25/2002 | 10:38am |
| rig_596.jpg | 15,125 | 04/25/2002 | 10:38am |
| rig_597.jpg | 6,630 | 04/25/2002 | 10:38am |
| rig_598.jpg | 12,247 | 04/25/2002 | 10:38am |
| rig_599.jpg | 32,576 | 04/25/2002 | 10:38am |
| rig_6.jpg | 9,790 | 04/25/2002 | 10:38am |
| rig_600.jpg | 47,411 | 04/25/2002 | 10:38am |
| rig_601.jpg | 73,811 | 04/25/2002 | 10:38am |
| rig_602.jpg | 32,669 | 04/25/2002 | 10:38am |
| rig_603.jpg | 29,139 | 04/25/2002 | 10:38am |
| rig_604.jpg | 14,369 | 04/25/2002 | 10:38am |
| rig_605.jpg | 20,421 | 04/25/2002 | 10:38am |
| rig_606.jpg | 50,913 | 04/25/2002 | 10:38am |
| rig_607.jpg | 36,608 | 04/25/2002 | 10:38am |
| rig_608.jpg | 41,053 | 04/25/2002 | 10:38am |
| rig_609.jpg | 20,840 | 04/25/2002 | 10:38am |
| rig_610.jpg | 10,324 | 04/25/2002 | 10:38am |
| rig_612.jpg | 32,924 | 04/25/2002 | 10:38am |
| rig_613.jpg | 18,282 | 04/25/2002 | 10:38am |
| rig_616.jpg | 10,473 | 04/25/2002 | 10:38am |
| rig_617.jpg | 7,016 | 04/25/2002 | 10:38am |
| rig_619.jpg | 9,907 | 04/25/2002 | 10:38am |
| Rig_62.jpg | 22,804 | 04/25/2002 | 10:38am |
| rig_622.jpg | 11,309 | 04/25/2002 | 10:38am |
| rig_624.jpg | 13,765 | 04/25/2002 | 10:38am |
| rig_626.jpg | 29,026 | 04/25/2002 | 10:38am |
| rig_63.jpg | 21,468 | 04/25/2002 | 10:38am |
| rig_631.jpg | 10,986 | 04/25/2002 | 10:38am |
| Rig_633.jpg | 19,517 | 04/25/2002 | 10:38am |
| rig_638.jpg | 14,159 | 04/25/2002 | 10:38am |
| rig_639.jpg | 10,670 | 04/25/2002 | 10:38am |
| rig_641.jpg | 11,744 | 04/25/2002 | 10:38am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size Date Time |
|---|---|
| rig_644.jpg | 14,133 04/25/2002 10:38am |
| rig_646.jpg | 6,867 04/25/2002 10:38am |
| rig_649.jpg | 6,867 04/25/2002 10:38am |
| rig_65.jpg | 15,575 04/25/2002 10:38am |
| rig_651.jpg | 10,990 04/25/2002 10:38am |
| rig_652.jpg | 17,340 04/25/2002 10:38am |
| rig_653.jpg | 17,031 04/25/2002 10:38am |
| rig_655.jpg | 9,290 04/25/2002 10:38am |
| rig_664.jpg | 9,399 04/25/2002 10:38am |
| rig_665.jpg | 13,169 04/25/2002 10:38am |
| rig_666.jpg | 10,397 04/25/2002 10:38am |
| rig_667.jpg | 19,598 04/25/2002 10:38am |
| rig_670.jpg | 5,744 04/25/2002 10:38am |
| rig_674.jpg | 19,293 04/25/2002 10:38am |
| rig_68.jpg | 16,985 04/25/2002 10:38am |
| rig_680.jpg | 11,521 04/25/2002 10:38am |
| rig_683.jpg | 14,576 04/25/2002 10:38am |
| rig_686.jpg | 5,912 04/25/2002 10:38am |
| Rig_69.jpg | 13,468 04/25/2002 10:38am |
| rig_693.jpg | 11,771 04/25/2002 10:38am |
| rig_694.jpg | 10,173 04/25/2002 10:38am |
| rig_695.jpg | 11,475 04/25/2002 10:38am |
| rig_696.jpg | 21,962 04/25/2002 10:38am |
| rig_699.jpg | 10,829 04/25/2002 10:38am |
| rig_7.jpg | 10,097 04/25/2002 10:38am |
| rig_70.jpg | 5,897 04/25/2002 10:38am |
| rig_700.jpg | 16,524 04/25/2002 10:38am |
| Rig_701.jpg | 9,060 04/25/2002 10:38am |
| rig_702.jpg | 6,325 04/25/2002 10:38am |
| rig_703.jpg | 10,907 04/25/2002 10:38am |
| rig_704.jpg | 17,302 04/25/2002 10:38am |
| rig_705.jpg | 5,558 04/25/2002 10:38am |
| rig_706.jpg | 17,938 04/25/2002 10:38am |
| rig_707.jpg | 12,067 04/25/2002 10:38am |
| rig_711.jpg | 19,137 04/25/2002 10:38am |
| rig_712.jpg | 16,282 04/25/2002 10:38am |
| Rig_714.jpg | 6,588 04/25/2002 10:38am |
| rig_715.jpg | 9,519 04/25/2002 10:38am |
| rig_718.jpg | 11,709 04/25/2002 10:38am |
| rig_728.jpg | 5,103 04/25/2002 10:38am |
| rig_73.jpg | 13,071 04/25/2002 10:38am |
| rig_731.jpg | 3,673 04/25/2002 10:38am |
| rig_74.jpg | 14,969 04/25/2002 10:38am |
| rig_742.jpg | 5,173 04/25/2002 10:38am |
| rig_743.jpg | 5,173 04/25/2002 10:38am |
| rig_744.jpg | 3,673 04/25/2002 10:38am |
| rig_745.jpg | 3,673 04/25/2002 10:38am |
| rig_747.jpg | 8,395 04/25/2002 10:38am |
| rig_75.jpg | 10,886 04/25/2002 10:38am |
| rig_750.jpg | 3,673 04/25/2002 10:38am |
| rig_751.jpg | 5,173 04/25/2002 10:38am |
| rig_752.jpg | 3,673 04/25/2002 10:38am |
| rig_753.jpg | 12,145 04/25/2002 10:38am |
| rig_758.jpg | 9,853 04/25/2002 10:38am |
| rig_766.jpg | 7,884 04/25/2002 10:38am |
| rig_767.jpg | 20,298 04/25/2002 10:38am |
| rig_77.jpg | 15,780 04/25/2002 10:38am |
| rig_771.jpg | 36,235 04/25/2002 10:38am |
| rig_772.jpg | 8,873 04/25/2002 10:38am |
| rig_773.jpg | 5,148 04/25/2002 10:38am |
| rig_775.jpg | 10,311 04/25/2002 10:38am |
| rig_776.jpg | 11,288 04/25/2002 10:38am |
| rig_777.jpg | 8,535 04/25/2002 10:38am |
| rig_778.jpg | 10,818 04/25/2002 10:38am |
| rig_78.jpg | 21,492 04/25/2002 10:38am |
| rig_780.jpg | 8,463 04/25/2002 10:38am |
| rig_781.jpg | 24,978 04/25/2002 10:38am |
| rig_782.jpg | 18,800 04/25/2002 10:38am |
| rig_784.jpg | 9,466 04/25/2002 10:38am |
| rig_788.jpg | 10,818 04/25/2002 10:38am |
| rig_790.jpg | 11,009 04/25/2002 10:38am |
| rig_791.jpg | 12,644 04/25/2002 10:38am |
| rig_792.jpg | 9,363 04/25/2002 10:38am |

-continued

Computer Program Listing Appendix
The CDRom Appendix incorporated by reference in this application is included on a
single MSDOS compatible compact disk, with the disk containing the following named
files having a size and creation date as indicated in this Listing, organized in File Folders
as indicated below:

| File | Size, Date, Time |
|---|---|
| rig_793.jpg | 28,517 04/25/2002 10:38am |
| rig_794.jpg | 9,363 04/25/2002 10:38am |
| rig_795.jpg | 11,504 04/25/2002 10:38am |
| rig_796.jpg | 7,989 04/25/2002 10:38am |
| rig_797.jpg | 10,818 04/25/2002 10:38am |
| rig_798.jpg | 10,818 04/25/2002 10:38am |
| rig_80.jpg | 18,688 04/25/2002 10:38am |
| rig_804.jpg | 6,627 04/25/2002 10:38am |
| Rig_806.jpg | 9,835 04/25/2002 10:38am |
| Rig_808.jpg | 6,881 04/25/2002 10:38am |
| Rig_809.jpg | 16,329 04/25/2002 10:38am |
| rig_81.jpg | 10,199 04/25/2002 10:38am |
| Rig_815.jpg | 7,366 04/25/2002 10:38am |
| Rig_819.jpg | 12,896 04/25/2002 10:38am |
| rig_82.jpg | 16,152 04/25/2002 10:38am |
| Rig_820.jpg | 6,621 04/25/2002 10:38am |
| rig_821.jpg | 3,673 04/25/2002 10:38am |
| rig_822.jpg | 5,173 04/25/2002 10:38am |
| rig_823.jpg | 3,673 04/25/2002 10:38am |
| rig_824.jpg | 14,426 04/25/2002 10:38am |
| Rig_825.jpg | 6,528 04/25/2002 10:38am |
| Rig_832.jpg | 6,786 04/25/2002 10:38am |
| rig_833.jpg | 8,342 04/25/2002 10:38am |
| rig_837.jpg | 24,273 04/25/2002 10:38am |
| rig_843.jpg | 8,314 04/25/2002 10:38am |
| rig_844.jpg | 33,141 04/25/2002 10:38am |
| rig_87.jpg | 8,755 04/25/2002 10:38am |
| rig_90.jpg | 12,419 04/25/2002 10:38am |
| rig_94.jpg | 43,993 04/25/2002 10:39am |
| rig_97.jpg | 8,556 04/25/2002 10:39am |
| rig_98.jpg | 16,839 04/25/2002 10:39am |

OneOffshore\src

| default.dfPackage.txt | 487 04/25/2002 10:24am |
|---|---|
| OOS.tpr.txt | 912 04/25/2002 10:31am |

OneOffshore\src\com

| com.dfPackage.txt | 785 04/25/2002 10:23am |
|---|---|

OneOffshore\src\com\lowagie 0 files; 0 bytes
OneOffshore\src\com\lowagie\text

| Anchor.java.txt | 10,688 04/25/2002 10:23am |
|---|---|
| Annotation.java.txt | 19,136 04/25/2002 10:23am |
| BadElementException.java.txt | 3,263 04/25/2002 10:23am |
| Cell.java.txt | 25,931 04/25/2002 10:23am |
| Chapter.java.txt | 6,052 04/25/2002 10:23am |
| Chunk.java.txt | 17,584 04/25/2002 10:23am |
| DocListener.java.txt | 5,309 04/25/2002 10:25am |
| Document.java.txt | 22,341 04/25/2002 10:25am |
| DocumentException.java.txt | 3,264 04/25/2002 10:25am |
| DocWriter.java.txt | 13,588 04/25/2002 10:25am |
| Element.java.txt | 10,574 04/25/2002 10:25am |
| ElementListener.java.txt | 3,232 04/25/2002 10:25am |
| ElementTags.java.txt | 17,212 05/22/2002 5:10pm |
| Entities.java.txt | 16,629 04/25/2002 10:25am |
| ExceptionConverter.java.txt | 1,982 04/25/2002 10:25am |
| Font.java.txt | 16,963 04/25/2002 10:26am |
| FontFactory.java.txt | 22,188 04/25/2002 10:26am |
| Gif.java.txt | 6,661 04/25/2002 10:26am |
| Graphic.java.txt | 7,382 04/25/2002 10:26am |
| Greek.java.txt | 7,365 04/25/2002 10:26am |
| Header.java.txt | 3,640 04/25/2002 10:26am |
| HeaderFooter.java.txt | 6,249 04/25/2002 10:26am |
| Image.java.txt | 39,622 04/25/2002 10:27am |
| ImgCCITT.java.txt | 8,099 04/25/2002 10:27am |
| ImgRaw.java.txt | 4,019 04/25/2002 10:27am |
| ImgTemplate.java.txt | 3,819 04/25/2002 10:27am |
| ImgWMF.java.txt | 6,697 04/25/2002 10:27am |
| Jpeg.java.txt | 12,114 04/25/2002 10:28am |
| IgpI.txt.txt | 23,244 04/25/2002 10:28am |
| List.java.txt | 15,525 04/25/2002 10:28am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| ListItem.java.txt | 8,731 04/25/2002 10:28am |
| MarkupAttributes.java.txt | 3,991 04/25/2002 10:28am |
| Meta.java.txt | 8,130 04/25/2002 10:28am |
| MPL-1.1.txt.txt | 25,755 04/25/2002 10:29am |
| PageSize.java.txt | 5,942 04/25/2002 10:33am |
| Paragraph.java.txt | 11,693 04/25/2002 10:33am |
| Phrase.java.txt | 18,567 04/25/2002 10:34am |
| Png.java.txt | 8,933 04/25/2002 10:34am |
| Rectangle.java.txt | 14,143 04/25/2002 10:35am |
| Row.java.txt | 14,788 04/25/2002 10:40am |
| Section.java.txt | 21,081 04/25/2002 10:41am |
| SplitCharacter.java.txt | 3,002 04/25/2002 10:43am |
| StringCompare.java.txt | 3,738 04/25/2002 10:43am |
| Table.java.txt | 63,948 04/25/2002 10:43am |
| TextElementArray.java.txt | 3,154 04/25/2002 10:43am |
| Watermark.java.txt | 4,141 04/25/2002 10:45am |
| OneOffshore\src\com\lowagie\text\html | |
| HtmlEncoder.java.txt | 7,546 04/25/2002 10:26am |
| HtmlTags.java.txt | 11,690 04/25/2002 10:26am |
| HtmlWriter.java.txt | 39,614 04/25/2002 10:26am |
| OneOffshore\src\com\lowagie\text\markup | |
| MarkupParser.java.txt | 8,722 04/25/2002 10:28am |
| MarkupTags.java.txt | 5,654 04/25/2002 10:28am |
| OneOffshore\src\com\lowagie\text\pdf | |
| BadPdfFormatException.java.txt | 3,348 04/25/2002 10:23am |
| Barcode.java.txt | 14,386 04/25/2002 10:23am |
| Barcode128.java.txt | 20,062 04/25/2002 10:23am |
| Barcode39.java.txt | 12,883 04/25/2002 10:23am |
| BarcodeEAN.java.txt | 24,943 04/25/2002 10:23am |
| BarcodeEANSUPP.java.txt | 6,232 04/25/2002 10:23am |
| BarcodeInter25.java.txt | 10,835 04/25/2002 10:23am |
| BarcodePostnet.java.txt | 6,889 04/25/2002 10:23am |
| BaseFont.java.txt | 31,760 04/25/2002 10:23am |
| ByteBuffer.java.txt | 20,349 04/25/2002 10:23am |
| CCITTG4Encoder.java.txt | 21,281 04/25/2002 10:23am |
| CJKFont.java.txt | 36,486 04/25/2002 10:23am |
| CMYKColor.java.txt | 3,655 04/25/2002 10:23am |
| ColorDetails.java.txt | 4,131 04/25/2002 10:23am |
| ColumnText.java.txt | 22,415 04/25/2002 10:23am |
| DefaultFontMapper.java.txt | 8,525 04/25/2002 10:24am |
| EnumerateTTC.java.txt | 4,902 04/25/2002 10:25am |
| ExtendedColor.java.txt | 3,678 04/25/2002 10:25am |
| FontDetails.java.txt | 10,902 04/25/2002 10:26am |
| FontMapper.java.txt | 3,439 04/25/2002 10:26am |
| GlyphList.java.txt | 44,008 04/25/2002 10:26am |
| GrayColor.java.txt | 3,041 04/25/2002 10:26am |
| HyphenationAuto.java.txt | 5,494 04/25/2002 10:26am |
| HyphenationEvent.java.txt | 3,547 04/25/2002 10:26am |
| IntHashtable.java.txt | 7,912 04/25/2002 10:27am |
| LZWDecoder.java.txt | 7,484 04/25/2002 10:28am |
| PatternColor.java.txt | 684 04/25/2002 10:34am |
| PdfAction.java.txt | 13,250 04/25/2002 10:34am |
| PdfAnnotation.java.txt | 15,807 04/25/2002 10:34am |
| PdfAppearance.java.txt | 3,788 04/25/2002 10:34am |
| PdfArray.java.txt | 6,928 04/25/2002 10:34am |
| PdfBarcode.java.txt | 9,907 04/25/2002 10:34am |
| PdfBoolean.java.txt | 5,179 04/25/2002 10:34am |
| PdfBorderArray.java.txt | 3,426 04/25/2002 10:34am |
| PdfBorderDictionary.java.txt | 4,164 04/25/2002 10:34am |
| PdfCell.java.txt | 19,906 04/25/2002 10:34am |
| PdfChunk.java.txt | 23,583 04/25/2002 10:34am |
| PdfColor.java.txt | 3,383 04/25/2002 10:34am |
| PdfColorDictionary.java.txt | 3,762 04/25/2002 10:34am |
| PdfContentByte.java.txt | 78,115 04/25/2002 10:34am |
| PdfContents.java.txt | 6,373 04/25/2002 10:34am |
| PdfDashPattern.java.txt | 5,224 04/25/2002 10:34am |
| PdfDate.java.txt | 5,348 04/25/2002 10:34am |
| PdfDestination.java.txt | 7,989 04/25/2002 10:34am |
| PdfDictionary.java.txt | 10,465 04/25/2002 10:34am |
| PdfDocument.java.txt | 110,488 04/25/2002 10:34am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| PdfEncryption.java.txt | 10,606 04/25/2002 10:34am |
| PdfException.java.txt | 3,217 04/25/2002 10:34am |
| PdfFont.java.txt | 10,352 04/25/2002 10:34am |
| PdfFontDictionary.java.txt | 4,038 04/25/2002 10:34am |
| PdfFormField.java.txt | 16,349 04/25/2002 10:34am |
| PdfFormXObject.java.txt | 4,305 04/25/2002 10:34am |
| PdfGraphics2D.java.txt | 30,591 04/25/2002 10:34am |
| PdfImage.java.txt | 25,620 04/25/2002 10:34am |
| PdfImportedPage.java.txt | 5,160 04/25/2002 10:34am |
| PdfIndirectObject.java.txt | 6,712 04/25/2002 10:34am |
| PdfIndirectReference.java.txt | 4,595 04/25/2002 10:34am |
| PdfLine.java.txt | 11,169 04/25/2002 10:34am |
| PdfLiteral.java.txt | 2,804 04/25/2002 10:34am |
| PdfName.java.txt | 36,836 04/25/2002 10:34am |
| PdfNull.java.txt | 3,755 04/25/2002 10:34am |
| PdfNumber.java.txt | 6,932 04/25/2002 10:34am |
| PdfObject.java.txt | 10,672 04/25/2002 10:34am |
| PdfOutline.java.txt | 14,428 04/25/2002 10:34am |
| PdfPage.java.txt | 7,317 04/25/2002 10:34am |
| PdfPageElement.java.txt | 3,307 04/25/2002 10:34am |
| PdfPageEvent.java.txt | 7,166 04/25/2002 10:34am |
| PdfPageEventHelper.java.txt | 7,390 04/25/2002 10:34am |
| PdfPageLabels.java.txt | 8,416 04/25/2002 10:34am |
| PdfPages.java.txt | 5,402 04/25/2002 10:34am |
| PdfPattern.java.txt | 1,530 04/25/2002 10:34am |
| PdfPatternDictionary.java.txt | 1,188 04/25/2002 10:34am |
| PdfPatternPainter.java.txt | 6,799 04/25/2002 10:34am |
| PdfPCell.java.txt | 13,150 04/25/2002 10:34am |
| PdfPrintable.java.txt | 4,523 04/25/2002 10:34am |
| PdfProcSet.java.txt | 6,240 04/25/2002 10:34am |
| PdfPRow.java.txt | 12,351 04/25/2002 10:34am |
| PdfPTable.java.txt | 23,090 04/25/2002 10:34am |
| PdfPTableEvent.java.txt | 4,905 04/25/2002 10:34am |
| PdfReader.java.txt | 22,098 04/25/2002 10:34am |
| PdfReaderInstance.java.txt | 8,997 04/25/2002 10:34am |
| PdfRectangle.java.txt | 7,910 04/25/2002 10:34am |
| PdfResource.java.txt | 3,120 04/25/2002 10:34am |
| PdfResources.java.txt | 3,920 04/25/2002 10:34am |
| PdfSignature.java.txt | 4,283 04/25/2002 10:34am |
| PdfSpotColor.java.txt | 6,429 04/25/2002 10:34am |
| PdfStream.java.txt | 10,343 04/25/2002 10:34am |
| PdfString.java.txt | 6,542 04/25/2002 10:34am |
| PdfStringLiteral.java.txt | 3,245 04/25/2002 10:34am |
| PdfTable.java.txt | 8,336 04/25/2002 10:34am |
| PdfTemplate.java.txt | 15,049 04/25/2002 10:34am |
| PdfTextArray.java.txt | 3,762 04/25/2002 10:34am |
| PdfWriter.java.txt | 54,993 04/25/2002 10:34am |
| PdfXObjectDictionary.java.txt | 4,053 04/25/2002 10:34am |
| PRArray.java.txt | 6,835 04/25/2002 10:34am |
| PRDictionary.java.txt | 6,675 04/25/2002 10:34am |
| PRIndirectReference.java.txt | 4,267 04/25/2002 10:34am |
| PRLiteral.java.txt | 2,828 04/25/2002 10:34am |
| PRName.java.txt | 6,082 04/25/2002 10:34am |
| PRNumber.java.txt | 4,522 04/25/2002 10:34am |
| PRObject.java.txt | 5,250 04/25/2002 10:34am |
| PRStream.java.txt | 6,027 04/25/2002 10:34am |
| PRString.java.txt | 4,793 04/25/2002 10:34am |
| PRTokeniser.java.txt | 15,082 04/25/2002 10:34am |
| RandomAccessFileOrArray.java.txt | 9,185 04/25/2002 10:35am |
| SpotColor.java.txt | 3,355 04/25/2002 10:43am |
| TrueTypeFont.java.txt | 43,763 04/25/2002 10:44am |
| TrueTypeFontSubSet.java.txt | 16,720 04/25/2002 10:44am |
| TrueTypeFontUnicode.java.txt | 14,152 04/25/2002 10:44am |
| Type1Font.java.txt | 29,518 04/25/2002 10:44am |
| OneOffshore\src\com\lowagie\text\pdf\afm | |
| Courier.java.txt | 21,149 04/25/2002 10:24am |
| CourierBold.java.txt | 21,167 04/25/2002 10:24am |
| CourierBoldOblique.java.txt | 21,245 04/25/2002 10:24am |
| CourierOblique.java.txt | 21,267 04/25/2002 10:24am |
| Helvetica1.java.txt | 57,960 04/25/2002 10:26am |
| Helvetica2.java.txt | 51,947 04/25/2002 10:26am |
| HelveticaBold1.java.txt | 54,896 04/25/2002 10:26am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| HelveticaBold2.java.txt | 47,764 04/25/2002 10:26am |
| HelveticaBoldOblique1.java.txt | 57,394 04/25/2002 10:26am |
| HelveticaBoldOblique2.java.txt | 45,386 04/25/2002 10:26am |
| HelveticaOblique1.java.txt | 58,072 04/25/2002 10:26am |
| HelveticaOblique2.java.txt | 51,959 04/25/2002 10:26am |
| Symbol.java.txt | 14,276 04/25/2002 10:43am |
| TimesBold.java.txt | 92,464 04/25/2002 10:44am |
| TimesBoldItalic.java.txt | 85,827 04/25/2002 10:44am |
| TimesItalic1.java.txt | 54,768 04/25/2002 10:44am |
| TimesItalic2.java.txt | 43,335 04/25/2002 10:44am |
| TimesRoman.java.txt | 86,985 04/25/2002 10:44am |
| ZapfDingbats.java.txt | 14,113 04/25/2002 10:46am |
| OneOffshore\src\com\lowagie\text\pdf\hyphenation | |
| ByteVector.java.txt | 2,433 04/25/2002 10:23am |
| CharVector.java.txt | 2,638 04/25/2002 10:23am |
| Hyphen.java.txt | 1,721 04/25/2002 10:26am |
| Hyphenation.java.txt | 1,770 04/25/2002 10:26am |
| HyphenationException.java.txt | 493 04/25/2002 10:26am |
| HyphenationTree.java.txt | 19,129 04/25/2002 10:26am |
| Hyphenator.java.txt | 9,850 04/25/2002 10:26am |
| PatternConsumer.java.txt | 1,372 04/25/2002 10:34am |
| PatternInternalParser.java.txt | 4,151 04/25/2002 10:34am |
| TernaryTree.java.txt | 19,389 04/25/2002 10:43am |
| OneOffshore\src\com\lowagie\text\pdf\wmf | |
| InputMeta.java.txt | 3,997 04/25/2002 10:27am |
| MetaBrush.java.txt | 3,715 04/25/2002 10:28am |
| MetaDo.java.txt | 22,805 04/25/2002 10:28am |
| MetaFont.java.txt | 7,939 04/25/2002 10:28am |
| MetaObject.java.txt | 3,042 04/25/2002 10:28am |
| MetaPen.java.txt | 3,557 04/25/2002 10:28am |
| MetaState.java.txt | 12,078 04/25/2002 10:28am |
| OneOffshore\src\com\lowagie\text\rtf | |
| RtfCell.java.txt | 21,730 04/25/2002 10:40am |
| RtfField.java.txt | 3,214 04/25/2002 10:40am |
| RtfHeaderFooter.java.txt | 3,784 04/25/2002 10:40am |
| RtfHeaderFooters.java.txt | 4,809 04/25/2002 10:40am |
| RtfPageNumber.java.txt | 4,527 04/25/2002 10:40am |
| RtfRow.java.txt | 16,716 04/25/2002 10:40am |
| RtfTable.java.txt | 6,145 04/25/2002 10:40am |
| RtfTOC.java.txt | 7,022 04/25/2002 10:40am |
| RtfTOCEntry.java.txt | 5,585 04/25/2002 10:40am |
| RtfWriter.java.txt | 65,165 04/25/2002 10:40am |
| OneOffshore\src\com\oneoffshore | |
| oneoffshore.dfPackage.txt | 2,108 04/25/2002 10:29am |
| OneOffshore\src\com\oneoffshore\components | |
| ActionIconPathBean.java.txt.txt | 6,506 09/24/2002 5:35pm |
| DayRateDataEntryBean.java.txt | 6,168 04/25/2002 10:24am |
| DropDownDateBean.java.txt | 3,636 05/01/2002 4:23pm |
| RigIconPathBean.java.txt | 5,814 06/14/2002 9:15am |
| WSOHeaderBean.java.txt | 2,539 04/25/2002 10:46am |
| OneOffshore\src\com\oneoffshore\databean | |
| AdminSearchDataBean.java.txt | 1,052 04/25/2002 10:22am |
| AdvRigDataBean.java.txt | 26,161 04/29/2002 12:32pm |
| AdvRigSearchDataBean.java.txt | 50,071 06/26/2002 11:32am |
| AreaDataBean.java.txt | 3,805 04/25/2002 10:23am |
| BlockDataBean.java.txt | 3,183 04/25/2002 10:23am |
| BuildFleetDataBean.java.txt | 5,568 04/25/2002 10:23am |
| BusinessCategoryDataBean.java.txt | 1,308 04/25/2002 10:23am |
| CDBRequirementDataBean.java.txt | 14,457 04/25/2002 10:23am |
| ChartDataSource.java.txt | 4,212 04/25/2002 10:23am |
| ChartSpecsBean.java.txt | 4,233 04/25/2002 10:23am |
| ChartStyleBean.java.txt | 11,375 04/25/2002 10:23am |
| CompanyDataBean.java.txt | 6,734 04/25/2002 10:23am |
| CompanyScenarioDataBean.java.txt | 2,797 04/25/2002 10:23am |
| CountryDataBean.java.txt | 2,146 04/25/2002 10:24am |
| DataBean.java.txt | 10,547 04/25/2002 10:24am |
| DateDoubleBean.java.txt | 1,478 04/25/2002 10:24am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| DayRateBean.java.txt | 23,302 06/14/2002 9:15am |
| DirectoriesDataAccessor.java.txt | 36,806 06/19/2002 10:24am |
| DirectoriesSearchDataBean.java.txt | 4,117 04/25/2002 10:24am |
| DivisionDataBean.java.txt | 8,104 04/25/2002 10:24am |
| DownloadDataBean.java.txt | 2,043 04/25/2002 10:25am |
| FiieMaintenanceDataBean.java.txt | 4,442 05/01/2002 4:23pm |
| FleetDataBean.java.txt | 11,293 04/25/2002 10:25am |
| FleetItemDataBean.java.txt | 6,177 04/25/2002 10:25am |
| FleetItemLegacyDataBean.java.txt | 9,981 04/25/2002 10:25am |
| FleetLegacyDataBean.java.txt | 11,171 04/25/2002 10:25am |
| FleetUtilizationDataBean.java.txt | 2,192 04/25/2002 10:25am |
| FleetUtilizationSearchDataBean.java.txt | 3,095 04/25/2002 10:25am |
| FullSpecRigDataBean.java.txt | 62,688 04/25/2002 10:26am |
| GenericStringBean.java.txt | 8,724 09/24/2002 5:35pm |
| JackupTypeDataBean.java.txt | 1,743 04/25/2002 10:27am |
| JobDataBean.java.txt | 24,467 05/01/2002 4:23pm |
| JobSearchDataBean.java.txt | 5,275 05/01/2002 4:23pm |
| ListDataBean.java.txt | 1,068 04/25/2002 10:28am |
| ManageFleetItemsDataBean.java.txt | 6,091 04/25/2002 10:28am |
| ManageRequirementsDataBean.java.txt | 2,920 04/25/2002 10:28am |
| MemberDirectoryDataBean.java.txt | 2,772 04/25/2002 10:28am |
| MonthlySummaryTaggingBean.java.txt | 1,290 04/25/2002 10:29am |
| MonthStatusDataBean.java.txt | 1,374 04/25/2002 10:29am |
| OnlineServiceUserBean.java.txt | 1,728 04/25/2002 10:31am |
| PDFDataBean.java.txt | 1,343 04/25/2002 10:34am |
| PersonnelDataBean.java.txt | 2,344 04/25/2002 10:34am |
| PubEditionsListDataBean.java.txt | 2,142 04/25/2002 10:35am |
| RegionDataBean.java.txt | 3,202 04/25/2002 10:35am |
| RequirementDataBean.java.txt | 9,891 06/26/2002 11:32am |
| RequirementSearchDataBean.java.txt | 10,324 06/26/2002 11:32am |
| ResponseDataBean.java.txt | 10,573 04/25/2002 10:35am |
| RigAnchorDataBean.java.txt | 5,038 04/25/2002 10:39am |
| RigBuildDetailDataBean.java.txt | 6,984 04/25/2002 10:39am |
| RigChartDataBean.java.txt | 1,891 04/25/2002 10:39am |
| RigContractDataBean.java.txt | 33,303 04/25/2002 10:39am |
| RigCraneDataBean.java.txt | 4,461 04/25/2002 10:39am |
| RigEngineDataBean.java.txt | 3,981 04/25/2002 10:39am |
| RigGeneratorDataBean.java.txt | 3,660 04/25/2002 10:39am |
| RigMooringLineDataBean.java.txt | 4,375 04/25/2002 10:39am |
| RigMudPumpDataBean.java.txt | 3,515 04/25/2002 10:39am |
| RigNotesDataBean.java.txt | 5,138 06/26/2002 11:32am |
| RigOwnerDataBean.java.txt | 6,430 04/25/2002 10:39am |
| RigPreventorDataBean.java.txt | 3,468 04/25/2002 10:40am |
| RigPreviousNameDataBean.java.txt | 2,404 04/25/2002 10:40am |
| RigRiserDataBean.java.txt | 2,138 04/25/2002 10:40am |
| RigRiserTensionerDataBean.java.txt | 3,035 04/25/2002 10:40am |
| RigSearchResultDataBean.java.txt | 20,813 04/25/2002 10:40am |
| RigStatusDataBean.java.txt | 2,628 04/25/2002 10:40am |
| RigTypeAtRegionDataBean.java.txt | 8,712 07/12/2002 9:52am |
| RigTypeAtStatusDataBean.java.txt | 4,801 07/12/2002 9:52am |
| RigTypeDataBean.java.txt | 1,483 04/25/2002 10:40am |
| RigWellheadConnectorDataBean.java.txt | 3,595 04/25/2002 10:40am |
| RigWinchDataBean.java.txt | 2,524 04/25/2002 10:40am |
| SavedQueryDataBean.java.txt | 3,031 04/25/2002 10:41am |
| ScenarioManagerDataBean.java.txt | 1,754 04/25/2002 10:41am |
| SearchDataBean.java.txt | 1,764 04/25/2002 10:41am |
| SubletAdminBean.java.txt | 2,543 04/25/2002 10:43am |
| SubletDataBean.java.txt | 7,702 04/29/2002 12:32pm |
| SubletSearchDataBean.java.txt | 1,236 04/25/2002 10:43am |
| TechSpecDataBean.java.txt | 1,999 04/25/2002 10:43am |
| UserPrefsDataBean.java.txt | 14,337 04/25/2002 10:44am |
| OneOffshore\src\com\oneoffshore\ejb | |
| ejb.dfPackage.txt | 5,063 04/25/2002 10:25am |
| OOSBMPEntityBean.java.txt | 2,263 04/25/2002 10:31am |
| OOSCMPEntityBean.java.txt | 3,987 04/25/2002 10:31am |
| OOSEJB.java.txt | 2,101 04/25/2002 10:31am |
| OOSEntityEJB.java.txt | 7,231 04/25/2002 10:31am |
| OOSStatefulSessionBean.java.txt | 1,540 04/25/2002 10:32am |
| OOSStatelessSessionBean.java.txt | 1,760 04/25/2002 10:32am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\address

| | |
|---|---|
| address.dfPackage.txt | 814 04/25/2002 10:22am |
| AddressEJB.java.txt | 8,276 04/25/2002 10:22am |
| IAddress.java.txt | 2,748 04/25/2002 10:26am |
| IAddressHome.java.txt | 3,071 04/25/2002 10:26am |

OneOffshore\src\com\oneoffshore\ejb\address\META-INF

| | |
|---|---|
| ejb-jar.xml.txt | 2,056 04/25/2002 10:25am |
| weblogic-cmp-rdbms-jar.xml.txt | 2,241 04/25/2002 10:45am |
| weblogic-ejb-jar.xml.txt | 1,069 04/25/2002 10:45am |

OneOffshore\src\com\oneoffshore\ejb\address\META-INF

| | |
|---|---|
| AdvRigAccessor.java.txt | 202,560 07/12/2002 9:51am |
| AdvRigEJB.java.txt | 24,966 06/26/2002 11:31am |
| AdvRigException.java.txt | 1,294 04/25/2002 10:23am |
| IAdvRig.java.txt | 17,058 06/26/2002 11:32am |
| IAdvRigHome.java.txt | 1,327 04/25/2002 10:26am |

OneOffshore\src\com\oneoffshore\ejb\advRig\META-INF

| | |
|---|---|
| ejb-jar.xml.txt | 853 04/25/2002 10:25am |
| weblogic-ejb-jar.xml.txt | 481 04/25/2002 10:45am |

OneOffshore\src\com\oneoffshore\ejb\article

| | |
|---|---|
| ArticleEJB.java.txt | 5,443 04/25/2002 10:23am |
| IArticle.java.txt | 1,819 04/25/2002 10:26am |
| IArticleHome.java.txt | 2,503 04/25/2002 10:26am |

OneOffshore\src\com\oneoffshore\ejb\article\META-INF

| | |
|---|---|
| ejb-jar.xml.txt | 1,880 04/25/2002 10:25am |
| weblogic-cmp-rdbms-jar.xml.txt | 2,231 04/25/2002 10:45am |
| weblogic-ejb-jar.xml.txt | 1,070 04/25/2002 10:45am |

OneOffshore\src\com\oneoffshore\ejb\authentication

| | |
|---|---|
| authentication.dfPackage.txt | 1,016 04/25/2002 10:23am |
| AuthenticationEJB.java.txt | 18,892 05/31/2002 12:59pm |
| AuthenticationException.java.txt | 1,294 04/25/2002 10:23am |
| IAuthentication.java.txt | 4,927 04/25/2002 10:26am |
| IAuthenticationHome.java.txt | 1,402 04/25/2002 10:26am |
| UserAccessor.java.txt | 4,179 04/25/2002 10:44am |

OneOffshore\src\com\oneoffshore\ejb\authentication\META-INF

| | |
|---|---|
| ejb-jar.xml.txt | 917 04/25/2002 10:25am |
| weblogic-ejb-jar.xml.txt | 507 04/25/2002 10:45am |

OneOffshore\src\com\oneoffshore\ejb\authorization

| | |
|---|---|
| AdminAuthorizer.java.txt | 5,086 04/25/2002 10:22am |
| AdminAuthorizerBean.java.txt | 8,481 04/25/2002 10:22am |
| AdminAuthorizerHome.java.txt | 1,223 04/25/2002 10:22am |
| authorization.dfPackage.txt | 8,246 04/25/2002 10:23am |
| CustomerAuthorizer.java.txt | 3,391 04/25/2002 10:24am |
| CustomerAuthorizerBean.java.txt | 4,124 04/25/2002 10:24am |
| CustomerAuthorizerHome.java.txt | 1,239 04/25/2002 10:24am |
| OOSAuthorizer.java.txt | 3,585 04/25/2002 10:31am |
| RoleImpl.java.txt | 8,222 04/25/2002 10:40am |
| SubscriptionAccessor.java.txt | 10,402 04/25/2002 10:43am |
| UserGroupAccessor.java.txt | 6,167 04/25/2002 10:44am |
| ViewPubAuthorizer.java.txt | 4,134 04/25/2002 10:45am |
| ViewPubAuthorizerBean.java.txt | 7,850 04/25/2002 10:45am |
| ViewPubAuthorizerHome.java.txt | 1,141 04/25/2002 10:45am |

OneOffshore\src\com\oneoffshore\ejb\authorization\META-INF

| | |
|---|---|
| ejb-jar.xml.txt | 2,209 04/25/2002 10:25am |
| weblogic-ejb-jar.xml.txt | 1,109 04/25/2002 10:45am |

OneOffshore\src\com\oneoffshore\ejb\cdbRequirements

| | |
|---|---|
| CdbRequirementsAccessor.java.txt | 31,211 06/26/2002 11:32am |
| CdbRequirementsEJB.java.txt | 2,558 05/01/2002 4:23pm |
| CdbRequirementsException.java.txt | 1,403 04/25/2002 10:23am |
| ICdbRequirements.java.txt | 2,009 05/01/2002 4:23pm |
| ICdbRequirementsHome.java.txt | 230 04/25/2002 10:26am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\cdbRequirements\META-INF

| | |
|---|---|
| ejb-jar.xml.txt | 916 04/25/2002 10:25am |
| weblogic-ejb-jar.xml.txt | 510 04/25/2002 10:45am |

OneOffshore\src\com\oneoffshore\ejb\cdbRig

| | |
|---|---|
| CdbRigAccessor.java.txt.txt | 123,743 07/12/2002 9:51am |
| CdbRigEJB.java.txt | 15,610 06/20/2002 9:09am |
| CdbRigException.java.txt | 1,295 04/25/2002 10:23am |
| ICdbRig.java.txt | 12,719 06/20/2002 9:09am |
| ICdbRigHome.java.txt | 203 04/25/2002 10:26am |

OneOffshore\src\com\oneoffshore\ejb\cdbRig\META-INF

| | |
|---|---|
| ejb-jar.xml.txt | 844 04/25/2002 10:25am |
| weblogic-ejb-jar.xml.txt | 483 04/25/2002 10:45am |

OneOffshore\src\com\oneoffshore\ejb\cdbUtilSummary

| | |
|---|---|
| IUtilDataService.java.txt | 637 09/24/2002 5:35pm |
| IUtilDataServiceHome.java.txt | 229 04/25/2002 10:27am |
| UtilAccessor.java.txt | 10,891 07/12/2002 9:52am |
| UtilDataServiceEJB.java.txt | 1,106 09/24/2002 5:36pm |

OneOffshore\src\com\oneoffshore\ejb\cdbUtilSummary\META-INF

| | |
|---|---|
| ejb-jar.xml.txt | 911 04/25/2002 10:25am |
| weblogic-ejb-jar.xml.txt | 508 04/25/2002 10:45am |

OneOffshore\src\com\oneoffshore\ejb\chartData

| | |
|---|---|
| ChartAccessor.java.txt | 30,725 05/20/2002 6:00pm |
| ChartDataServiceEJB.java.txt | 5,322 04/25/2002 10:23am |
| IChartDataService.java.txt | 3,817 04/25/2002 10:26am |
| IChartDataServiceHome.java.txt | 1,200 04/25/2002 10:26am |

OneOffshore\src\com\oneoffshore\ejb\chartData\META-INF

| | |
|---|---|
| ejb-jar.xml.txt | 903 04/25/2002 10:25am |
| weblogic-ejb-jar.xml.txt | 513 04/25/2002 10:45am |

OneOffshore\src\com\oneoffshore\ejb\com 0 files, 0 bytes
OneOffshore\src\com\oneoffshore\ejb\com\oneoffshore 0 files, 0 bytes
OneOffshore\src\com\oneoffshore\ejb\com\oneoffshore\servlet

| | |
|---|---|
| RigInsightStaticPagesServlet.jbx.txt | 84 06/14/2002 5:31am |
| WSOStaticPagesServlet.jbx.txt | 84 06/14/2002 5:31am |

OneOffshore\src\com\oneoffshore\ejb\contactOOS

| | |
|---|---|
| ContactAccessor.java.txt | 3,987 04/25/2002 10:24am |
| ContactOOSEJB.java.txt | 5,382 04/25/2002 10:24am |
| IContactOOS.java.txt | 1,523 04/25/2002 10:27am |
| IContactOOSHome.java.txt | 1,372 04/25/2002 10:27am |

OneOffshore\src\com\oneoffshore\ejb\contactOOS\META-INF

| | |
|---|---|
| ejb-jar.xml.txt | 885 04/25/2002 10:25am |
| weblogic-ejb-jar.xml.txt | 495 04/25/2002 10:45am |

OneOffshore\src\com\oneoffshore\ejb\db

| | |
|---|---|
| DataAccessor.java.txt | 10,358 06/14/2002 9:15am |
| db.dfPackage.txt | 542 04/25/2002 10:24am |
| Table.java.txt | 1,832 04/25/2002 10:43am |
| TableMaintenanceDataBean.java.txt | 4,118 04/25/2002 10:43am |
| Transaction.java.txt | 1,250 04/25/2002 10:44am |

OneOffshore\src\com\oneoffshore\ejb\deliveryFmtPayMethod

| | |
|---|---|
| DeliveryFmtPayMethodEJB.java.txt | 4,693 04/25/2002 10:24am |
| DeliveryFmtPayMethodPK.java.txt | 2,230 04/25/2002 10:24am |
| IDeliveryFmtPayMethod.java.txt | 1,752 04/25/2002 10:27am |
| IDeliveryFmtPayMethodHome.java.txt | 2,770 04/25/2002 10:27am |

OneOffshore\src\com\oneoffshore\ejb\deliveryFmtPayMethod\META-INF

| | |
|---|---|
| ejb-jar.xml.txt | 1,775 04/25/2002 10:25am |
| weblogic-cmp-rdbms-jar.xml.txt | 1,649 04/25/2002 10:45am |
| weblogic-ejb-jar.xml.txt | 1,108 04/25/2002 10:45am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\editionEditor

| File | Size / Date |
|---|---|
| EditionEditorEJB.java.txt | 4,060 04/25/2002 10:25am |
| EditionEditorPK.java.txt | 2,831 04/25/2002 10:25am |
| IEditionEditor.java.txt | 1,729 04/25/2002 10:27am |
| IEditionEditorHome.java.txt | 3,291 04/25/2002 10:27am |

OneOffshore\src\com\oneoffshore\ejb\editionEditor\META-INF

| File | Size / Date |
|---|---|
| ejb-jar.xml.txt | 1,757 04/25/2002 10:25am |
| weblogic-cmp-rdbms-jar.xml.txt | 2,262 04/25/2002 10:45am |
| weblogic-ejb-jar.xml.txt | 1,087 04/25/2002 10:45am |

OneOffshore\src\com\oneoffshore\ejb\email

| File | Size / Date |
|---|---|
| email.dfPackage.txt | 661 04/25/2002 10:25am |
| EMailEJB.java.txt | 1,668 04/25/2002 10:25am |
| IEMail.java.txt | 1,263 04/25/2002 10:27am |
| IEMailHome.java.txt | 1,280 04/25/2002 10:27am |

OneOffshore\src\com\oneoffshore\ejb\email\META-INF

| File | Size / Date |
|---|---|
| ejb-jar.xml.txt | 845 04/25/2002 10:25am |
| weblogic-ejb-jar.xml.txt | 480 04/25/2002 10:45am |

OneOffshore\src\com\oneoffshore\ejb\fileMaintenance

| File | Size / Date |
|---|---|
| FileMaintenanceAccessor.java.txt | 7,891 05/08/2002 12:07pm |
| FileMaintenanceException.java.txt | 661 04/29/2002 12:32pm |
| FiieMaintenanceServiceEJB.java.txt | 2,069 05/08/2002 12:07pm |
| IFileMaintenanceDataService.java.txt | 1,061 05/08/2002 12:07pm |
| IFileMaintenanceDataServiceHome.java.txt | 653 04/29/2002 12:32pm |

OneOffshore\src\com\oneoffshore\ejb\fileMaintenance\META-INF

| File | Size / Date |
|---|---|
| ejb-jar.xml.txt | 959 04/29/2002 12:32pm |
| weblogic-ejb-jar.xml.txt | 539 04/29/2002 12:32pm |

OneOffshore\src\com\oneoffshore\ejb\fleet

| File | Size / Date |
|---|---|
| FleetEjb.java.txt | 25,635 04/25/2002 10:25am |
| FleetEjbTestClient.java.txt | 5,518 04/25/2002 10:25am |
| FleetException.java.txt | 805 04/25/2002 10:25am |
| FleetInternalException.java.txt | 837 04/25/2002 10:25am |
| FleetPersistenceManager.java.txt | 20,573 04/25/2002 10:25am |
| IFleet.java.txt | 2,269 04/25/2002 10:27am |
| IFleetHome.java.txt | 1,102 04/25/2002 10:27am |

OneOffshore\src\com\oneoffshore\ejb\fleet\META-INF

| File | Size / Date |
|---|---|
| ejb-jar.xml.txt | 1,078 04/25/2002 10:25am |
| weblogic-ejb-jar.xml.txt | 916 04/25/2002 10:45am |

OneOffshore\src\com\oneoffshore\ejb\job

| File | Size / Date |
|---|---|
| IJob.java.txt | 10,179 04/25/2002 10:27am |
| IPersistance.java.txt | 1,703 04/25/2002 10:27am |
| IPersistanceHome.java.txt | 3,158 04/25/2002 10:27am |
| IRequirement.java.txt | 926 04/25/2002 10:27am |
| IRequirementHome.java.txt | 1,209 04/25/2002 10:27am |
| ISublet.java.txt | 870 04/25/2002 10:27am |
| ISubletHome.java.txt | 1,174 04/25/2002 10:27am |
| JobEJB.java.txt | 43,877 04/25/2002 10:28am |
| JobEJBAccessor.java.txt | 4,010 04/25/2002 10:28am |
| package.uml.txt | 1,534 04/25/2002 10:33am |
| PersistanceEJB.java.txt | 7,070 04/25/2002 10:34am |
| PersistanceManager.java.txt | 43,072 04/25/2002 10:34am |
| RequirementEJB.java.txt | 5,185 04/25/2002 10:35am |
| SubletEJB.java.txt | 3,230 04/25/2002 10:43am |

OneOffshore\src\com\oneoffshore\ejb\job\META-INF

| File | Size / Date |
|---|---|
| ejb-jar.xml.txt | 3,151 04/25/2002 10:25am |
| weblogic-ejb-jar.xml.txt | 1,528 04/25/2002 10:45am |

OneOffshore\src\com\oneoffshore\ejb\memberDirectory

| File | Size / Date |
|---|---|
| IMemberDirectory.java.txt | 2,230 04/25/2002 10:27am |
| IMemberDirectoryHome.java.txt | 2,531 04/25/2002 10:27am |
| MemberDirectoryEJB.java.txt | 7,167 04/25/2002 10:28am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| | |
|---|---|
| MemberDirectoryException.java.txt | 998 04/25/2002 10:28am |
| MemberDirectoryPersistenceManager.java.txt | 13,717 04/25/2002 10:28am |
| OneOffshore\src\com\oneoffshore\ejb\memberDirectory\META-INF | |
| | |
| ejb-jar.xml.txt | 1,160 04/25/2002 10:25am |
| weblogic-ejb-jar.xml.txt | 980 04/25/2002 10:45am |
| OneOffshore\src\com\oneoffshore\ejb\organization | |
| | |
| IOrganization.java.txt | 3,130 04/25/2002 10:27am |
| IOrganizationHome.java.txt | 3,399 04/25/2002 10:27am |
| organization.dfPackage.txt | 703 04/25/2002 10:33am |
| OrganizationEJB.java.txt | 9,086 04/25/2002 10:33am |
| OneOffshore\src\com\oneoffshore\ejb\organization\META-INF | |
| | |
| ejb-jar.xml.txt | 1,926 04/25/2002 10:25am |
| weblogic-cmp-rdbms-jar.xml.txt | 1999 04/25/2002 10:45am |
| weblogic-ejb-jar.xml.txt | 1,084 04/25/2002 10:45am |
| OneOffshore\src\com\oneoffshore\ejb\person | |
| | |
| IPerson.java.txt | 3,811 04/25/2002 10:27am |
| IPersonHome.java.txt | 3,162 04/25/2002 10:27am |
| person.dfPackage.txt | 667 04/25/2002 10:34am |
| PersonEJB.java.txt | 17,760 04/25/2002 10:34am |
| OneOffshore\src\com\oneoffshore\ejb\person\META-INF | |
| | |
| ejb-jar.xml.txt | 3,003 04/25/2002 10:25am |
| weblogic-cmp-rdbms-jar.xml.txt | 4,060 04/25/2002 10:45am |
| weblogic-ejb-jar.xml.txt | 1,066 04/25/2002 10:45am |
| OneOffshore\src\com\oneoffshore\ejb\profile | |
| | |
| IProfile.java.txt | 2,394 04/25/2002 10:27am |
| IProfileHome.java.txt | 1,332 04/25/2002 10:27am |
| ProfileEJB.java.txt | 13,720 04/25/2002 10:34am |
| ProfileException.java.txt | 1,122 04/25/2002 10:34am |
| OneOffshore\src\com\oneoffshore\ejb\profile\META-INF | |
| | |
| ejb-jar.xml.txt | 861 04/25/2002 10:25am |
| weblogic-ejb-jar.xml.txt | 486 04/25/2002 10:45am |
| OneOffshore\src\com\oneoffshore\ejb\pubDataService | |
| | |
| EditionAccessor.java.txt | 44,294 04/25/2002 10:25am |
| EditorAccessor.java.txt | 3,918 04/25/2002 10:25am |
| IPubDataService.java.txt | 13,112 04/25/2002 10:27am |
| IPubDataServiceHome.java.txt | 1,428 04/25/2002 10:27am |
| PubDataServiceEJB.java.txt | 39,841 04/25/2002 10:34am |
| PubDeliveryFormatAccessor.java.txt | 5,942 04/25/2002 10:35am |
| OneOffshore\src\com\oneoffshore\ejb\pubDataService\META-INF | |
| | |
| ejb-jar.xml.txt | 4917 04/25/2002 10:25am |
| weblogic-ejb-jar.xml.txt | 507 04/25/2002 10:45am |
| OneOffshore\src\com\oneoffshore\ejb\publication | |
| | |
| IPublication.java.txt | 3,593 04/25/2002 10:27am |
| IPublicationHome.java.txt | 2,066 04/25/2002 10:27am |
| publication.dfPackage.txt | 1,935 04/25/2002 10:35am |
| PublicationEJB.java.txt | 9,092 04/25/2002 10:35am |
| PublicationException.java.txt | 1,193 04/25/2002 10:35am |
| PublicationPersistenceManager.java.txt | 18,670 04/25/2002 10:35am |
| ViewFact.dfSequence.txt | 4,445 04/25/2002 10:45am |
| OneOffshore\src\com\oneoffshore\ejb\publication\META-INF | |
| | |
| ejb-jar.xml.txt | 1,426 04/25/2002 10:25am |
| weblogic-ejb-jar.xml.txt | 962 04/25/2002 10:45am |
| OneOffshore\src\com\oneoffshore\ejb\publication\Edition | |
| | |
| IPublicationEdition.java.txt | 3,090 04/25/2002 10:27am |
| IPublicationEditionHome.java.txt | 2,224 04/25/2002 10:27am |
| PublicationEditionAccessor.java.txt | 17,723 04/25/2002 10:35am |
| PublicationEditionEJB.java.txt | 6,753 04/25/2002 10:35am |
| PublicationEditionException.java.txt | 1,375 04/25/2002 10:35am |
| PublicationEditionPK.java.txt | 1,671 04/25/2002 10:35am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\publicationEdition\META-INF

| | |
|---|---|
| ejb-jar.xml.txt | 1,385 04/25/2002 10:25am |
| weblogic-ejb-jar.xml.txt | 974 04/25/2002 10:45am |

OneOffshore\src\com\oneoffshore\ejb\publicationEditor

| | |
|---|---|
| IPublicationEditor.java.txt | 1,742 04/25/2002 10:27am |
| IPublicationEditorHome.java.txt | 2,749 04/25/2002 10:27am |
| PublicationEditorEJB.java.txt | 3,731 04/25/2002 10:35am |
| PublicationEditorPK.java.txt | 2,431 04/25/2002 10:35am |

OneOffshore\src\com\oneoffshore\ejb\publication\META-INF

| | |
|---|---|
| ejb-jar.xml.txt | 1,729 04/25/2002 10:25am |
| weblogic-cmp-rdbms-jar.xml.txt | 1,844 04/25/2002 10:45am |
| weblogic-ejb-jar.xml.txt | 1,099 04/25/2002 10:45am |

OneOffshore\src\com\oneoffshore\ejb\publicationSearch

| | |
|---|---|
| IPublicationSearch.java.txt | 5,416 04/25/2002 10:27am |
| IPublicationSearchHome.java.txt | 1,399 04/25/2002 10:27am |
| NewsAccessor.java.txt | 21,285 04/25/2002 10:29am |
| PublicationSearchEJB.java.txt | 6,935 04/25/2002 10:35am |
| PublicationSearchException.java.txt | 1,174 04/25/2002 10:35am |

OneOffshore\src\com\oneoffshore\ejb\publicationSearch\META-INF

| | |
|---|---|
| ejb-jar.xml.txt | 925 04/25/2002 10:25am |
| weblogic-ejb-jar.xml.txt | 498 04/25/2002 10:45am |

OneOffshore\src\com\oneoffshore\ejb\reference

| | |
|---|---|
| IReferenceLookup.java.txt | 5,054 05/20/2002 6:00pm |
| IReferenceLookupHome.java.txt | 1,140 04/25/2002 10:27am |
| reference.dfPackage.txt | 848 04/25/2002 10:35am |
| ReferenceAccessor.java.txt | 30,721 06/26/2002 11:32am |
| ReferenceLookupEJB.java.txt | 12,750 05/20/2002 6:00pm |

OneOffshore\src\com\oneoffshore\ejb\reference\META-INF

| | |
|---|---|
| ejb-jar.xml.txt | 907 04/25/2002 10:25am |
| weblogic-ejb-jar.xml.txt | 510 04/25/2002 10:45am |

OneOffshore\src\com\oneoffshore\ejb\response

| | |
|---|---|
| IResponse.java.txt | 958 04/25/2002 10:27am |
| IResponseHome.java.txt | 1,505 04/25/2002 10:27am |
| ResponseEJB.java.txt | 4,987 04/25/2002 10:35am |

OneOffshore\src\com\oneoffshore\ejb\response\META-INF

| | |
|---|---|
| ejb-jar.xml.txt | 2,576 04/25/2002 10:25am |
| weblogic-cmp-rdbms-jar.xml.txt | 4,148 04/25/2002 10:45am |
| weblogic-ejb-jar.xml.txt | 1,072 04/25/2002 10:45am |

OneOffshore\src\com\oneoffshore\ejb\reviseSavedQuery

| | |
|---|---|
| IRevisedSavedQuery.java.txt | 3,325 05/20/2002 6:00pm |
| IRevisedSavedQueryHome.java.txt | 721 04/25/2002 10:27am |
| RevisedSavedQueryAccessor.java.txt | 64,200 05/20/2002 6:00pm |
| RevisedSavedQueryEJB.java.txt | 8,263 05/20/2002 6:00pm |
| RevisedSavedQueryException.java.txt | 966 04/25/2002 10:36am |

OneOffshore\src\com\oneoffshore\ejb\revisedSavedQuery\META-INF

| | |
|---|---|
| ejb-jar.xml.txt | 939 04/25/2002 10:25am |
| weblogic-ejb-jar.xml.txt | 512 04/25/2002 10:45am |

OneOffshore\src\com\oneoffshore\ejb\rig

| | |
|---|---|
| IRig.java.txt | 1,284 04/25/2002 10:27am |
| IRigHome.java.txt | 1,931 04/25/2002 10:27am |
| rig.dfPackage.txt | 1,769 04/25/2002 10:36am |
| RigEJB.java.txt | 4,807 04/25/2002 10:39am |
| RigException.java.txt | 1,230 04/25/2002 10:39am |
| RigPersistenceManager.java.txt | 7,856 04/25/2002 10:39am |

OneOffshore\src\com\oneoffshore\ejb\rig\META-INF

| | |
|---|---|
| ejb-jar.xml.txt | 1,062 04/25/2002 10:25am |
| weblogic-ejb-jar.xml.txt | 758 04/25/2002 10:45am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\rigNotes

| | |
|---|---|
| IRigNotesDataService.java.txt | 1,748 04/25/2002 10:27am |
| IRigNotesDataServiceHome.java.txt | 632 04/25/2002 10:27am |
| RigNotesAccessor.java.txt | 4,775 06/26/2002 11:32am |
| RigNotesException.java.txt | 619 04/25/2002 10:39am |
| RigNotesServiceEJB.java.txt | 2,225 04/25/2002 10:39am |

OneOffshore\src\com\oneoffshore\ejb\rigNotes\META-INF

| | |
|---|---|
| ejb-jar.xml.txt | 903 04/25/2002 10:25am |
| weblogic-ejb-jar.xml.txt | 518 04/25/2002 10:45am |

OneOffshore\src\com\oneoffshore\ejb\rigSearch

| | |
|---|---|
| IRigSearch.java.txt | 6,416 04/25/2002 10:27am |
| IRigSearchHome.java.txt | 1,303 04/25/2002 10:27am |
| RigAccessor.java.txt | 17,085 05/31/2002 12:59pm |
| rigSearch.dfPackage.txt | 267 04/25/2002 10:40am |
| RigSearchEJB.java.txt | 7,918 04/25/2002 10:40am |
| RigSearchException.java.txt | 1,308 04/25/2002 10:40am |

OneOffshore\src\com\oneoffshore\ejb\rigSearch\META-INF

| | |
|---|---|
| ejb-jar.xml.txt | 877 04/25/2002 10:25am |
| weblogic-ejb-jar.xml.txt | 490 04/25/2002 10:45am |

OneOffshore\src\com\oneoffshore\ejb\savedQuery

| | |
|---|---|
| ISavedQuery.java.txt | 970 04/25/2002 10:27am |
| ISavedQueryHome.java.txt | 1,199 04/25/2002 10:27am |
| SavedQueryEJB.java.txt | 5,279 04/25/2002 10:41am |

OneOffshore\src\com\oneoffshore\ejb\savedQuery\META-INF

| | |
|---|---|
| ejb-jar.xml.txt | 1,717 04/25/2002 10:25am |
| weblogic-cmp-rdbms-jar.xml.txt | 1,991 04/25/2002 10:45am |
| weblogic-ejb-jar.xml.txt | 1,058 04/25/2002 10:45am |

OneOffshore\src\com\oneoffshore\ejb\sequence

| | |
|---|---|
| ISequence.java.txt | 1,378 04/25/2002 10:27am |
| ISequenceHome.java.txt | 2,105 04/25/2002 10:27am |
| SequenceEJB.java.txt | 3,082 04/25/2002 10:41am |

OneOffshore\src\com\oneoffshore\ejb\sequence\META-INF

| | |
|---|---|
| ejb-jar.xml.txt | 1,598 04/25/2002 10:25am |
| weblogic-cmp-rdbms-jar.xml.txt | 1,492 04/25/2002 10:45am |
| weblogic-ejb-jar.xml.txt | 1,071 04/25/2002 10:45am |

OneOffshore\src\com\oneoffshore\ejb\siteMember

| | |
|---|---|
| ISiteMember.java.txt | 5,835 04/25/2002 10:27am |
| ISiteMemberHome.java.txt | 2,820 04/25/2002 10:27am |
| siteMember.dfPackage.txt | 688 04/25/2002 10:41am |
| SiteMemberEJB.java.txt | 15,909 04/25/2002 10:41am |
| SiteMemberException.java.txt | 969 04/25/2002 10:41am |
| SiteMemberPersistenceManager.java.txt | 15,712 05/20/2002 6:00pm |
| SiteMemberPK.java.txt | 2,262 04/25/2002 10:41am |

OneOffshore\src\com\oneoffshore\ejb\siteMember\META-INF

| | |
|---|---|
| ejb-jar.xml.txt | 1,146 04/25/2002 10:25am |
| weblogic-ejb-jar.xml.txt | 966 04/25/2002 10:45am |

OneOffshore\src\com\oneoffshore\ejb\subscription

| | |
|---|---|
| ISubscription.java.txt | 3,113 04/25/2002 10:27am |
| ISubscriptionHome.java.txt | 3,192 04/25/2002 10:27am |
| SubscriptionEJB.java.txt | 7,629 04/25/2002 10:43am |
| SubscriptionException.java.txt | 1,024 04/25/2002 10:43am |
| SubscriptionPK.java.txt | 2,602 04/25/2002 10:43am |

OneOffshore\src\com\oneoffshore\ejb\subscription\META-INF

| | |
|---|---|
| ejb-jar.xml.txt | 2,424 04/25/2002 10:25am |
| weblogic-cmp-rdbms-jar.xml.txt | 3,211 04/25/2002 10:45am |
| weblogic-ejb-jar.xml.txt | 1,084 04/25/2002 10:45am |

OneOffshore\src\com\oneoffshore\ejb\subscriptionService

| | |
|---|---|
| ISubscriptionService.java.txt | 1,794 04/25/2002 10:27am |
| ISubscriptionServiceHome.java.txt | 1,532 04/25/2002 10:27am |
| SubscriptionServiceEJB.java.txt | 3,254 04/25/2002 10:43am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\oneoffshore\ejb\subscriptionService\META-INF

| File | Size Date Time |
|---|---|
| ejb-jar.xml.txt | 967 04/25/2002 10:25am |
| weblogic-ejb-jar.xml.txt | 522 04/25/2002 10:45am |

OneOffshore\src\com\oneoffshore\ejb\userService

| File | Size Date Time |
|---|---|
| IUserService.java.txt | 9,362 04/25/2002 10:27am |
| IUserServiceHome.java.txt | 1,516 04/25/2002 10:27am |
| UserDataAccessor.java.txt | 16,005 04/25/2002 10:44am |
| UserServiceEJB.java.txt | 17,902 04/25/2002 10:45am |

OneOffshore\src\com\oneoffshore\ejb\userService\META-INF

| File | Size Date Time |
|---|---|
| ejb-jar.xml.txt | 893 04/25/2002 10:25am |
| weblogic-ejb-jar.xml.txt | 497 04/25/2002 10:45am |

OneOffshore\src\com\oneoffshore\handler

| File | Size Date Time |
|---|---|
| AdvRigHandler.java.txt | 59,155 06/26/2002 11:32am |
| ArticleHandler.java.txt | 4,316 04/25/2002 10:23am |
| AuthorizationHandler.java.txt | 26,837 04/25/2002 10:23am |
| BuildFleetHandler.java.txt | 4,698 04/25/2002 10:23am |
| CdbReqHandler.java.txt | 13,221 05/23/2002 1:37pm |
| CommunicationHandler.java.txt | 3,481 04/25/2002 10:23am |
| ContentSearchHandler.java.txt | 11,052 04/25/2002 10:24am |
| CreateFleetHandler.java.txt | 9,031 04/25/2002 10:24am |
| CustomDownloadHandler.java.txt | 11,846 06/14/2002 9:15am |
| DeleteFleetHandler.java.txt | 2,174 04/25/2002 10:24am |
| DownloadHandler.java.txt | 4,145 04/25/2002 10:25am |
| FileMaintenanceHandler.java.txt | 4,632 05/08/2002 12:07pm |
| FleetHandler.java.txt | 3,508 04/25/2002 10:25am |
| handler.dfPackage.txt | 1,590 04/25/2002 10:26am |
| HomePageHandler.java.txt | 2,644 04/25/2002 10:26am |
| JobHandler.java.txt | 6,587 04/25/2002 10:28am |
| MailHandler.java.txt | 1,474 04/25/2002 10:28am |
| ManageFleetItemsHandler.java.txt | 7,350 04/25/2002 10:28am |
| ManageRequirementsHandler.java.txt | 9,213 04/25/2002 10:28am |
| MarketSnapshotHandler.java.txt | 18,381 04/25/2002 10:28am |
| MemberDirectoryHandler.java.txt | 14,223 04/25/2002 10:28am |
| MonitorSiteUseHandler.java.txt | 1,950 09/24/2002 5:35pm |
| OnlineServiceHandler.java.txt | 3,400 04/25/2002 10:31am |
| OOSHandler.java.txt | 1,236 04/25/2002 10:31am |
| PubAdminHandler.java.txt | 11,897 04/25/2002 10:34am |
| PublicationHandler.java.txt | 14,863 04/25/2002 10:35am |
| ReferenceHandler.java.txt | 24,115 05/20/2002 6:00pm |
| RequirementHandler.java.txt | 38,884 05/29/2002 1:18pm |
| RevisedSavedQueryHandler.java.txt | 16,826 05/20/2002 6:00pm |
| RigHandler.java.txt | 5,017 05/31/2002 12:59pm |
| RigNotesHandler.java.txt | 1,832 04/25/2002 10:39am |
| RigSearchResultsHandler.java.txt | 5,738 04/25/2002 10:40am |
| SavedQueryHandler.java.txt | 9,567 04/25/2002 10:41am |
| ScenarioManagerHandler.java.txt | 4,335 04/25/2002 10:41am |
| SubletHandler.java.txt | 28,418 04/25/2002 10:43am |
| SubmitOrderHandler.java.txt | 14,176 04/25/2002 10:43am |
| SubscriptionHandler.java.txt | 1,620 04/25/2002 10:43am |
| UpdateFleetHandler.java.txt | 3,080 04/25/2002 10:44am |
| UpdateFleetItemsHandler.java.txt | 6,083 04/25/2002 10:44am |
| UserHandler.java.txt | 23,847 06/20/2002 9:09am |
| UtilSummaryHandler.java.txt | 3,608 09/24/2002 5:36pm |

OneOffshore\src\com\oneoffshore\jsp

| File | Size Date Time |
|---|---|
| AboutOOS.jsp.txt | 476 04/25/2002 10:22am |
| ApplicationError.jsp.txt | 1,168 04/25/2002 10:23am |
| ChangePassword.jsp.txt | 1,314 04/25/2002 10:23am |
| ContactOOS.jsp.txt | 1,859 04/25/2002 10:24am |
| CustomerHome.jsp.txt | 1,144 04/25/2002 10:24am |
| EMailAcknowledgement.jsp.txt | 386 04/25/2002 10:25am |
| ErrorMessage.jsp.txt | 318 04/25/2002 10:25am |
| ErrorPage.jsp.txt | 1,238 04/25/2002 10:25am |
| FairDisclosure.jsp.txt | 534 04/25/2002 10:25am |
| GlobalNavBar.jsp.txt | 971 04/25/2002 10:26am |
| Index.jsp.txt | 1,186 04/25/2002 10:27am |
| jsp.dfPackage.txt | 495 04/25/2002 10:28am |
| Login.jsp.txt | 1,368 04/25/2002 10:28am |
| MessageBoard.jsp.txt | 423 04/25/2002 10:28am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| | |
|---|---|
| OrgAdmin.jsp.txt | 2,532 04/25/2002 10:33am |
| Registration.jsp.txt | 4,534 04/25/2002 10:35am |
| RigInsightHome.jsp.txt | 1,367 04/25/2002 10:39am |
| RigSearch.jsp.txt | 1,189 04/25/2002 10:40am |
| SearchHome.jsp.txt | 1,186 04/25/2002 10:41am |
| SearchResult.jsp.txt | 1,398 04/25/2002 10:41am |
| SearchResultComparison.jsp.txt | 1,606 04/25/2002 10:41am |
| SearchResultDetail.jsp.txt | 1,921 04/25/2002 10:41am |
| SearchRig.jsp.txt | 1,371 04/25/2002 10:41am |
| SiteMap.jsp.txt | 469 04/25/2002 10:41am |
| SiteSearch.jsp.txt | 454 04/25/2002 10:41am |
| UserProfile.jsp.txt | 4,710 04/25/2002 10:45am |
| OneOffshore\src\com\oneoffshore\properties | |
| | |
| ChartParameters.java.txt | 6,975 06/14/2002 9:15am |
| CustomDownloadProperties.java.txt | 4,499 04/25/2002 10:24am |
| CustomViewConstants.java.txt | 1906 06/26/2002 11:31am |
| IEnvInfoBean.java.txt | 7,542 09/24/2002 5:35pm |
| IErrMsgsBean.java.txt | 1,110 04/25/2002 10:27am |
| IOOSPropertiesBean.java.txt | 1,259 04/25/2002 10:27am |
| IPageNamesBean.java.txt | 25,206 04/25/2002 10:27am |
| IPDLInfoBean.java.txt | 766 04/25/2002 10:27am |
| ITableNamesBean.java.txt | 3,122 04/25/2002 10:27am |
| LoadProperties.dfSequence.txt | 5,791 04/25/2002 10:28am |
| OOSProperties.java.txt | 3,232 04/25/2002 10:32am |
| OOSPropertiesBean.java.txt | 141,380 09/24/2002 5:36pm |
| OOSPropertiesFactory.java.txt | 3,181 04/25/2002 10:32am |
| properties.dfPackage.txt | 5,267 04/25/2002 10:34am |
| PropertiesTester.java.txt | 825 04/25/2002 10:34am |
| TextStrings.java.txt | 2,753 05/31/2002 12:59pm |
| OneOffshore\src\com\oneoffshore\pubs | |
| | |
| ArticleDataBean.java.txt | 4,206 04/25/2002 10:23am |
| DeliveryFmtPayMethodDataBean.java.txt | 2,487 04/25/2002 10:24am |
| DeliveryFormatDataBean.java.txt | 2,623 04/25/2002 10:24am |
| EditionStatusDataBean.java.txt | 2,007 04/25/2002 10:25am |
| NewsDataBean.java.txt | 6,044 04/25/2002 10:29am |
| PubDeliveryFormatDataBean.java.txt | 4,679 04/25/2002 10:35am |
| PubFile_upload.dfSequence.txt | 15,412 04/25/2002 10:35am |
| PublicationDataBean.java.txt | 12,132 04/25/2002 10:35am |
| PublicationEditionDataBean.java.txt | 7,745 04/25/2002 10:35am |
| PublicationFrequencyDataBean.java.txt | 2,481 04/25/2002 10:35am |
| PublicationStatusDataBean.java.txt | 1,902 04/25/2002 10:35am |
| PublicationTypeDataBean.java.txt | 1,840 04/25/2002 10:35am |
| pubs.dfPackage.txt | 1,921 04/25/2002 10:35am |
| SubmitOrderDataBean.java.txt | 18,784 04/25/2002 10:43am |
| SubscriptionDataBean.java.txt | 9,672 04/25/2002 10:43am |
| ViewPublications.dfSequence.txt | 7,078 04/25/2002 10:45am |
| OneOffshore\src\com\oneoffshore\rig | |
| | |
| rig.dfPackage.txt | 657 04/25/2002 10:36am |
| RigColumn.java.txt | 2,151 04/25/2002 10:39am |
| RigDataBean.java.txt | 17,935 04/25/2002 10:39am |
| rigSearch.dfSequence.txt | 11,315 04/25/2002 10:40am |
| RigSearchCriterion.java.txt | 3,608 04/25/2002 10:40am |
| OneOffshore\src\com\oneoffshore\search | |
| | |
| ContentSearch.dfSequence.txt | 10,151 04/25/2002 10:24am |
| search.dfPackage.txt | 756 04/25/2002 10:41am |
| SearchRequestDataBean.java.txt | 5,358 04/25/2002 10:41am |
| SearchResultDataBean.java.txt | 6,254 04/25/2002 10:41am |
| OneOffshore\src\com\oneoffshore\servlet | |
| | |
| AdminHomeServlet.java.txt | 3,533 04/25/2002 10:22am |
| AdminServlet.java.txt | 4,617 04/25/2002 10:22am |
| AdvRigDetailServlet.java.txt | 9,869 04/25/2002 10:23am |
| ArticleAdminServlet.java.txt | 6,186 04/25/2002 10:23am |
| AuthenticationServlet.java.txt | 20,077 06/26/2002 11:32am |
| AuthenticationServletDirectories.java.txt | 12,646 04/25/2002 10:23am |
| BuildFleetServlet.java.txt | 8,922 04/25/2002 10:23am |
| CacheManagerServlet.java.txt | 1,644 04/25/2002 10:23am |
| CatalogSearchServlet.java.txt | 5,192 04/25/2002 10:23am |
| ChangeProfileServlet.java.txt | 4,437 04/25/2002 10:23am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| ChartUtil.java.txt | 51,455 04/25/2002 10:23am |
| ContactOOSServlet.java.txt | 4,974 04/25/2002 10:24am |
| ContentSearchServlet.java.txt | 2,917 04/25/2002 10:24am |
| ContextAttribute.java.txt | 3,839 04/25/2002 10:24am |
| ContractDetailServlet.java.txt | 3,391 04/25/2002 10:24am |
| ContractHistoryServlet.java.txt | 4,747 04/25/2002 10:24am |
| CreateCustomViewServlet.java.txt | 7,749 04/25/2002 10:24am |
| CreateFleetServlet.java.txt | 4,424 04/25/2002 10:24am |
| CreateMemberAdminServlet.java.txt | 15,195 04/25/2002 10:24am |
| CustomDownloadRigNamePopulatorServlet.java. | 10,583 04/25/2002 10:24am |
| CustomDownloadServlet.java.txt | 11,452 04/25/2002 10:24am |
| DatabaseErrorServlet.java.txt | 3,481 06/19/2002 10:24am |
| DayRateEntryPageServlet.java.txt | 3,128 09/24/2002 5:35pm |
| DayRatePDFServlet.java.txt | 29,957 06/26/2002 11:32am |
| DayRateSeriesRegionServlet.java.txt | 1,822 04/25/2002 10:24am |
| DBReferenceFields.java.txt | 3,322 04/25/2002 10:24am |
| DeleteFleetServlet.java.txt | 2,304 04/25/2002 10:24am |
| DirectoriesAdminServlet.java.txt | 9,697 06/19/2002 9:42pm |
| DirectoriesAuthenticationServlet.java.txt | 1,696 04/25/2002 10:24am |
| DirectoriesServlet.java.txt | 67,509 05/08/2002 12:07pm |
| DrillingPlanServlet.java.txt | 9,337 04/25/2002 10:25am |
| FileMaintenanceServlet.java.txt | 9,058 05/08/2002 12:07pm |
| FleetGanttServlet.java.txt | 30,947 04/25/2002 10:25am |
| FleetManagerGanttChartServlet.java.txt | 32,887 04/25/2002 10:25am |
| FleetManagerImageMapServlet.java.txt | 28,891 06/14/2002 9:15am |
| FullSpecsServlet.java.txt | 20,174 04/25/2002 10:26am |
| GetRequirementDetailsServlet.java.txt | 7,450 04/25/2002 10:26am |
| GetRigDetailsServlet.java.txt | 7,850 04/25/2002 10:26am |
| GlobalFleetStatisticsServlet.java.txt | 2,936 04/25/2002 10:26am |
| HomePageServlet.java.txt | 5,508 05/17/2002 10:38am |
| IndexedMonthlySummariesServlet.java.txt | 2,471 04/25/2002 10:27am |
| IndexServlet.java.txt | 2,366 04/25/2002 10:27am |
| InktomiAdminServlet.java.txt | 2,463 04/25/2002 10:27am |
| ITransHandler.java.txt | 353 04/25/2002 10:27am |
| JSP.java.txt | 5,150 06/14/2002 9:15am |
| LeadGenServlet.java.txt | 13,023 04/25/2002 10:28am |
| LoginControlServlet.java.txt | 3,068 04/25/2002 10:28am |
| LoginNumberServlet.java.txt | 2,897 04/25/2002 10:28am |
| LogOutServlet.java.txt | 1,112 04/25/2002 10:28am |
| ManageCustomDownloadServlet.java.txt | 3,445 04/25/2002 10:28am |
| ManageCustomViewsServlet.java.txt | 3,224 04/25/2002 10:28am |
| ManageFleetItemsServlet.java.txt | 6,790 04/25/2002 10:28am |
| ManageRequirementsServlet.java.txt | 6,319 04/25/2002 10:28am |
| MarketSnapshotChartServlet.java.txt | 19,348 04/25/2002 10:28am |
| MarketSnapshotRigServlet.java.txt | 3,578 04/25/2002 10:28am |
| MarketSnapshotServlet.java.txt | 15,178 04/25/2002 10:28am |
| MemberAdminListServlet.java.txt | 2,795 04/25/2002 10:28am |
| MemberAdminServlet.java.txt | 11,388 04/25/2002 10:28am |
| MemberServlet.java.txt | 2,907 04/25/2002 10:28am |
| MemberStatusAdminServlet.java.txt | 2,864 04/25/2002 10:28am |
| MonthlySummaryAdminServlet.java.txt | 3,182 04/25/2002 10:29am |
| MyMarketInquiryResponseServlet.java.txt | 13,879 04/25/2002 10:29am |
| MyQueriesServlet.java.txt | 6,871 04/25/2002 10:29am |
| MyRequirementsServlet.java.txt | 9,582 04/25/2002 10:29am |
| MyRequirementsServletMT.java.txt | 16,173 05/08/2002 12:07pm |
| MyRigsServlet.java.txt | 7,169 04/29/2002 12:32pm |
| MySubletsServlet.java.txt | 9,236 04/25/2002 10:29am |
| MySubletsServletMT.java.txt | 12,780 04/25/2002 10:29am |
| NameMappingAdminServlet.java.txt | 2,030 04/25/2002 10:29am |
| NavigationServlet.java.txt | 2,213 04/25/2002 10:29am |
| NewsSearchServlet.java.txt | 6,797 04/25/2002 10:29am |
| OneoffshoreAdmin.java.txt | 1,818 04/25/2002 10:31am |
| OnlineDirShowCaseServlet.java.txt | 9,362 06/26/2002 11:32am |
| OOSAuthenticationServlet.java.txt | 2,116 04/25/2002 10:31am |
| OOSCacheServlet.java.txt | 24,431 04/25/2002 10:31am |
| OOSJobServlet.java.txt | 34,491 05/31/2002 12:59pm |
| OOSServlet.java.txt | 24,451 05/17/2002 10:38am |
| OOSServletDirectories.java.txt | 20,907 04/25/2002 10:32am |
| OPGAuthenticationServlet.java.txt | 1,562 04/25/2002 10:32am |
| OPGStaticPagesServlet.java.txt | 1,807 06/20/2002 6:38pm |
| OPGStaticPagesServlet.jbx.txt | 84 06/20/2002 6:50pm |
| OrgAdminServlet.java.txt | 4,621 04/25/2002 10:33am |
| ORLDayRatesServlet.java.txt | 2,474 04/25/2002 10:33am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size and Date |
|---|---|
| OverdueSubscriptionServlet.java.txt | 2,170 04/25/2002 10:33am |
| OwnerHistoryServlet.java.txt | 3,764 04/25/2002 10:33am |
| Parameter.java.txt | 36,943 05/01/2002 4:23pm |
| PDTrialServlet.java.txt | 12,778 05/14/2002 7:49am |
| PersonOrgAdminServlet.java.txt | 3,389 04/25/2002 10:34am |
| PolarisDownloadServlet.java.txt | 1,977 04/25/2002 10:34am |
| PressKitServlet.java.txt | 8,175 04/25/2002 10:34am |
| PrintableFleetManagerTableServlet.java.txt | 17,642 04/25/2002 10:34am |
| PrintablePDFMonthlySummary.java.txt | 4,918 04/25/2002 10:34am |
| PrintableRequirementPDFServlet.java.txt | 17,671 04/29/2002 12:32pm |
| PrintableRigSupplyGanttChartServlet.java.tx | 19,988 04/25/2002 10:34am |
| PrintableSupplySearchTableServlet.java.txt | 53,904 05/08/2002 12:07pm |
| PrintFleetManagerGanttServlet.java.txt | 33,813 04/25/2002 10:34am |
| PrintFriendlyPersonalizedSummaryServlet.jav | 6,680 04/25/2002 10:34am |
| PrintRequirementGantt.java.txt | 13,488 04/25/2002 10:34am |
| PubAdminBaseServlet.java.txt | 1,705 04/25/2002 10:34am |
| PubEditionAdminServlet.java.txt | 14,818 04/25/2002 10:35am |
| PubEditionArticleAdminServlet.java.txt | 5,034 04/25/2002 10:35am |
| PublicationAdminServlet.java.txt | 6,718 04/25/2002 10:35am |
| PubTaggingRegionServlet.java.txt | 2,166 04/25/2002 10:35am |
| PWMaintenanceServlet.java.txt | 7,668 04/25/2002 10:35am |
| RequestAttribute.java.txt | 8,658 06/26/2002 11:32am |
| RequirementHistoryServlet.java.txt | 5,265 04/25/2002 10:35am |
| RequirementImageMapServlet.java.txt | 10,743 06/14/2002 9:15am |
| RequirementSearchServlet.java.txt | 24,445 05/01/2002 4:23pm |
| RequirementServlet.java.txt | 28,822 05/29/2002 1:19pm |
| ResponseServlet.java.txt | 43,163 04/25/2002 10:35am |
| RevTechSpecServlet.java.txt | 19,557 04/25/2002 10:36am |
| RigDetailServlet.java.txt | 5,662 04/25/2002 10:39am |
| RigInsightAuthenticationServlet.java.txt | 3,546 04/25/2002 10:39am |
| RigInsightCacheServlet.java.txt | 51,837 04/25/2002 10:39am |
| RigInsightMemberDirectoryServlet.java.txt | 21,499 05/29/2002 1:19pm |
| RigInsightMemberProfileServlet.java.txt | 25,325 04/25/2002 10:39am |
| RigInsightPrintablePDFServlet.java.txt | 2,188 05/17/2002 10:38am |
| RigInsightPubsServlet.java.txt | 12,782 04/25/2002 10:39am |
| RigInsightServlet.java.txt | 2,942 04/25/2002 10:39am |
| RigInsightStaticPagesServlet.java.txt | 2,412 04/25/2002 10:39am |
| RigReqGanttChartServlet.java.txt | 15,835 04/25/2002 10:40am |
| RigSearchResultsServlet.java.txt | 42,803 06/14/2002 9:15am |
| RigSearchServlet.java.txt | 7,052 04/25/2002 10:40am |
| RigStatusDescriptionServlet.java.txt | 2,095 05/20/2002 6:00pm |
| RigSupplyGanttServlet.java.txt | 19,016 04/25/2002 10:40am |
| RigSupplyGanttServletMT.java.txt | 21,294 04/25/2002 10:40am |
| RigSupplyImageMapServlet.java.txt | 23,347 04/25/2002 10:40am |
| RIPersonalHomePageServlet.java.txt | 23,560 04/25/2002 10:40am |
| RIPersonalHomePageServletMT.java.txt | 30,313 04/25/2002 10:40am |
| RIPersonalHomePageServletMT.java__fixture.tx | 31,533 05/17/2002 10:39am |
| SaveQueryServlet.java.txt | 7,773 04/25/2002 10:41am |
| ScenarioManagerServlet.java.txt | 4,439 04/25/2002 10:41am |
| SearchForMembersServlet.java.txt | 2,844 04/25/2002 10:41am |
| servlet.dfPackage.txt | 10,480 04/25/2002 10:41am |
| ServletAlias.java.txt | 3,935 05/17/2002 10:38am |
| SessionAttribute.java.txt | 2,936 05/29/2002 1:19pm |
| SubletHistoryServlet.java.txt | 4,485 04/25/2002 10:43am |
| SubletServlet.java.txt | 22,723 04/25/2002 10:43am |
| SubletStatusAdminServlet.java.txt | 2,106 04/25/2002 10:43am |
| SubmitDayRateToDatabaseServlet.java.txt | 3,257 04/25/2002 10:43am |
| SubmitOrderServlet.java.txt | 16,194 04/25/2002 10:43am |
| TechSpecServlet.java.txt | 21,305 04/25/2002 10:43am |
| TimeLineServlet.java.txt | 4,296 04/25/2002 10:44am |
| TrialSubServlet.java.txt | 9,305 05/17/2002 10:38am |
| TrialSubServlet.java~1~.txt | 9,278 05/08/2002 3:32pm |
| TrialSubServlet.java~2~.txt | 9,296 05/08/2002 4:01pm |
| TrialSubServlet.java~3~.txt | 9,307 05/08/2002 4:02pm |
| TrialSubServlet.java~4~.txt | 9,280 05/08/2002 4:17pm |
| TrialSubServlet.java~5~.txt | 9,282 05/08/2002 9:25pm |
| UpdateFleetItemsReturnServlet.java.txt | 5,360 04/25/2002 10:44am |
| UpdateFleetItemsServlet.java.txt | 5,815 04/25/2002 10:44am |
| UpdateFleetServlet.java.txt | 4,076 04/25/2002 10:44am |
| UpgradeHistoryServlet.java.txt | 4,055 04/25/2002 10:44am |
| UpgradeRptServlet.java.txt | 9,223 04/25/2002 10:44am |
| UserGroupAdminServlet.java.txt | 3,886 04/25/2002 10:44am |
| UserProfileServlet.java.txt | 8,315 04/25/2002 10:45am |

-continued

Computer Program Listing Appendix
The CDRom Appendix incorporated by reference in this application is included on a
single MSDOS compatible compact disk, with the disk containing the following named
files having a size and creation date as indicated in this Listing, organized in File Folders
as indicated below:

| | |
|---|---|
| UtilizationPieChartServlet.java.txt | 3,244 06/26/2002 11:32am |
| UtilizationResultsServlet.java.txt | 5,436 07/12/2002 9:52am |
| UtilizationSummaryServlet.java.txt | 3,522 07/12/2002 9:52am |
| ViewMySubscriptionsServlet.java.txt | 3,202 04/25/2002 10:45am |
| ViewProductDescriptionServlet.java.txt | 2,793 04/25/2002 10:45am |
| ViewPublicationServlet.java.txt | 5,892 04/25/2002 10:45am |
| WSOActivityDetailServlet.java.txt | 2,886 06/14/2002 9:15am |
| WSOAdminServlet.java.txt | 2,632 06/26/2002 11:32am |
| WSOAuthenticationServlet.java.txt | 1,184 05/17/2002 10:39am |
| WSOContractHistoryServlet.java.txt | 4,637 05/17/2002 10:38am |
| WSOCreateCustomViewServlet.java.txt | 8,356 06/14/2002 9:15am |
| WSOCustomDownloadServlet.java.txt | 11,375 06/26/2002 11:32am |
| WSODayRatesServlet.java.txt | 3,162 06/14/2002 9:15am |
| WSOFullSpecsServlet.java.txt | 20,210 06/14/2002 9:15am |
| WSOGetRequirementDetailsServlet.java.txt | 7,458 05/22/2002 5:08pm |
| WSOGetRigDetailsServlet.java.txt | 7,418 05/17/2002 10:39am |
| WSOGlobalFleetStatisticsServlet.java.txt | 3,108 06/14/2002 9:15am |
| WSOHomePageServlet.java.txt | 2,206 06/14/2002 9:15am |
| WSOManageCustomDownloadServlet.java.txt | 3,959 09/24/2002 5:36pm |
| WSOMarketActivityServlet.java.txt | 7,125 06/14/2002 10:13am |
| WSOMarketSnapshotChartServlet.java.txt | 19,339 05/17/2002 10:39am |
| WSOMarketSnapshotRigServlet.java.txt | 3,572 05/17/2002 10:39am |
| WSOMarketSnapshotServlet.java.txt | 15,757 06/14/2002 9:15am |
| WSOOwnerHistoryServlet.java.txt | 3,697 06/14/2002 9:15am |
| WSOPrintableReqGanttServlet.java.txt | 13,488 05/22/2002 5:08pm |
| WSOPrintableRigSupplyGanttChartServlet.java | 19,818 06/14/2002 9:15am |
| WSOPrintableSupplySearchTableServletjava.t | 59,826 06/26/2002 11:32am |
| WSOQueriesServlet.java.txt | 6,185 06/14/2002 9:15am |
| WSOReqDetailServlet.java.txt | 3,011 06/26/2002 11:32am |
| WSOReqGanttChartServlet.java.txt | 20,236 05/22/2002 5:10pm |
| WSORequirementImageMapServlet.java.txt | 11,459 05/22/2002 5:10pm |
| WSORequirementPDFServlet.java.txt | 20,816 06/26/2002 11:32am |
| WSORequirementSearchResultsServlet.java.txt | 11,776 06/26/2002 11:32am |
| WSORequirementSearchServlet.java.txt | 4,380 05/20/2002 6:00pm |
| WSORigDetailServlet.java.txt | 9,551 05/17/2002 10:38am |
| WSORigNamePopulatorServlet.java.txt | 10,383 05/22/2002 5:10pm |
| WSORigSearchResultsServlet.java.txt | 46,259 07/12/2002 9:52am |
| WSORigSupplyGanttServletMT.java.txt | 21,606 06/14/2002 9:15am |
| WSORigSupplyImageMapServlet.java.txt | 23,345 06/26/2002 11:32am |
| WSOServlet.java.txt | 29,390 05/17/2002 10:39am |
| WSOStaticPagesServlet.java.txt | 1,887 06/14/2002 5:38am |
| WSOStaticPagesServlet.java~1~.txt | 1,886 06/13/2002 10:10pm |
| WSOStaticPagesServlet.java~2~.txt | 1,887 06/13/2002 10:37pm |
| WSOStaticPagesServlet.java~3~.txt | 1,889 06/13/2002 10:38pm |
| WSOSubletDetailServlet.java.txt | 2,701 06/26/2002 11:32am |
| WSOTechSpecServlet.java.txt | 19,644 06/26/2002 11:32am |
| WSOUpgradeHistoryServlet.java.txt | 3,589 06/14/2002 9:15am |
| WSOUtilizationResultsServlet.java.txt | 5,430 07/12/2002 9:52am |
| WSOUtilizationSummaryServlet.java.txt | 3,707 07/12/2002 9:52am |
| OneOffshore\src\com\oneoffshore\servlet\translator | |
| | |
| AdminRequestTranslator.java.txt | 6,933 04/25/2002 10:22am |
| AdvRigTranslator.java.txt | 4,197 04/25/2002 10:23am |
| ArticleAdminTranslator.java.txt | 2,639 04/25/2002 10:23am |
| BuildFleetTranslator.java.txt | 7,369 04/25/2002 10:23am |
| ChartTranslator.java.txt | 3,926 04/25/2002 10:23am |
| CommunicationRequestTranslator.java.txt | 2,490 04/25/2002 10:23am |
| ContentSearchTranslator.java.txt | 4,277 04/25/2002 10:24am |
| CreateFleetTranslator.java.txt | 11,399 04/25/2002 10:24am |
| DeleteFleetTranslator.java.txt | 1,685 04/25/2002 10:24am |
| FileMaintenanceTranslator.java.txt | 5,374 05/01/2002 4:23pm |
| FleetUtilizationTranslator.java.txt | 3,875 05/20/2002 6:00pm |
| HomePageTranslator.java.txt | 4,438 04/25/2002 10:26am |
| HttpRequestTranslator.java.txt | 3,935 05/20/2002 6:00pm |
| JobTranslator.java.txt | 23,286 05/29/2002 1:18pm |
| ManageFleetItemsTranslator.java.txt | 5,080 04/25/2002 10:28am |
| ManageRequirementsTranslator.java.txt | 6,571 04/25/2002 10:28am |
| MemberAdminTranslator.java.txt | 10,092 04/25/2002 10:28am |
| MemberDirectoryRequestTranslator.java.txt | 6,053 04/25/2002 10:28am |
| MultipartTranslator.java.txt | 4,659 04/25/2002 10:29am |
| MyInvitesSpecsTranslator.java.txt | 9,023 04/25/2002 10:29am |
| MyQueriesTranslator.java.txt | 2,942 04/25/2002 10:29am |
| PressKitTranslator.java.txt | 2,269 04/25/2002 10:34am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| File | Size Date Time |
|---|---|
| PubAdminTranslator.java.txt | 16,399 04/25/2002 10:34am |
| PublicationTranslator.java.txt | 5,329 04/25/2002 10:35am |
| RequirementTranslator.java.txt | 19,319 05/29/2002 1:19pm |
| RigSpecsTranslator.java.txt | 29,380 06/26/2002 11:32am |
| RigTranslator.java.txt | 3,385 04/25/2002 10:40am |
| ScenarioManagerTranslator.java.txt | 1,121 04/25/2002 10:41am |
| SubletTranslator.java.txt | 4,141 04/25/2002 10:43am |
| SubmitOrderTranslator.java.txt | 7,743 04/25/2002 10:43am |
| UpdateFleetItemsTranslator.java.txt | 3,879 04/25/2002 10:44am |
| UpdateFleetTranslator.java.txt | 10,102 04/25/2002 10:44am |
| UserPrefsRequestTranslator.java.txt | 20,321 04/25/2002 10:45am |
| UserRequestTranslator.java.txt | 17,342 04/25/2002 10:45am |
| OneOffshore\src\com\oneoffshore\test | |
| | |
| DBMTest.java.txt | 4,428 04/25/2002 10:24am |
| JobEJBTest.java.txt | 26,035 04/25/2002 10:28am |
| JUnit.java.txt | 1,162 04/25/2002 10:28am |
| SavedQueryEJBTest.java.txt | 6,304 04/25/2002 10:41am |
| SiteMemberEJBTest.java.txt | 2,531 04/25/2002 10:41am |
| OneOffshore\src\com\oneoffshore\user | |
| | |
| AddressDataBean.java.txt | 6,673 04/25/2002 10:22am |
| authentication.dfSequence.txt | 16,134 04/25/2002 10:23am |
| ContactOOSDataBean.java.txt | 4,606 04/25/2002 10:24am |
| CustomerRole.java.txt | 2,183 04/25/2002 10:24am |
| EditorDataBean.java.txt | 2,272 04/25/2002 10:25am |
| login.dfSequence.txt | 25,039 04/25/2002 10:28am |
| MemberDataBean.java.txt | 1,859 04/25/2002 10:28am |
| OOSUserRole.java.txt | 1,671 04/25/2002 10:32am |
| OrganizationDataBean.java.txt | 5,430 04/25/2002 10:33am |
| PersonDataBean.java.txt | 11,695 04/25/2002 10:34am |
| PressKitOrderInfo.java.txt | 3,680 04/25/2002 10:34am |
| SiteMemberDataBean.java.txt | 19,741 04/25/2002 10:41am |
| SiteUserDataBean.java.txt | 3,519 04/25/2002 10:41am |
| updateProfile.dfSequence.txt | 18,656 04/25/2002 10:44am |
| user.dfPackage.txt | 2,983 04/25/2002 10:44am |
| UserDataBean.java.txt | 12,819 05/20/2002 6:00pm |
| UserProfile.java.txt | 3,754 04/25/2002 10:45am |
| OneOffshore\src\com\oneoffshore\util | |
| | |
| ActivityFilter.java.txt | 6,438 04/25/2002 10:22am |
| ByteGrabber.java.txt | 19,856 04/25/2002 10:23am |
| Cache.java.txt | 10,127 04/25/2002 10:23am |
| Constants.java.txt | 7,866 06/26/2002 11:32am |
| CustomDownloadString.java.txt | 59,107 04/25/2002 10:24am |
| DataBeanMatricizer.java.txt | 758 04/25/2002 10:24am |
| DateUtil.java.txt | 1,392 04/25/2002 10:24am |
| EmailNotification.java.txt | 29,415 04/25/2002 10:25am |
| Environment.java.txt | 2,729 04/25/2002 10:25am |
| ErrorMessage.java.txt | 1,122 04/25/2002 10:25am |
| Gif.java.txt | 18,362 04/25/2002 10:26am |
| HttpPost.java.txt | 1,832 04/25/2002 10:26am |
| InktomiSorter.java.txt | 3,221 04/25/2002 10:27am |
| InternalAccessException.java.txt | 1,285 04/25/2002 10:27am |
| InvalidPathTreeException.java.txt | 1,016 04/25/2002 10:27am |
| JNDIName.java.txt | 5,470 06/14/2002 9:15am |
| ListUtility.java.txt | 5,010 06/14/2002 9:15am |
| Lookup.java.txt | 9,691 05/29/2002 1:18pm |
| MyInvitesRefiner.java.txt | 7,335 04/25/2002 10:29am |
| ObjectMap.java.txt | 1,266 04/25/2002 10:29am |
| OOSEnvBean.java.txt | 2,583 04/25/2002 10:31am |
| OOSErrorBean.java.txt | 3,305 04/25/2002 10:31am |
| RequirementSearchRefiner.java.txt | 10,274 05/20/2002 6:00pm |
| RigSearchRefiner.java.txt | 17,471 04/25/2002 10:40am |
| util.dfPackage.txt | 3,297 04/25/2002 10:45am |
| WebSiteDataBean.java.txt | 2,284 04/25/2002 10:46am |
| XmlErrorHandler.java.txt | 2,686 04/25/2002 10:46am |
| XMLParserClass.java.txt | 2,623 04/25/2002 10:46am |
| OneOffshore\src\com\oneoffshore\util\dataloads | |
| | |
| dataloads.dfPackage.txt | 1,156 04/25/2002 10:24am |
| LoadPDLArticles.dfSequence.txt | 11,213 04/25/2002 10:28am |
| PDLArticle.java.txt | 5,368 04/25/2002 10:34am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

| | |
|---|---|
| PDLArticleConverter.java.txt | 11,777 04/25/2002 10:34am |
| PolarisDownload.java.txt | 3,004 04/25/2002 10:34am |
| OneOffshore\src\com\oneoffshore\util\GIFEncoder | |
| | |
| GifEncoder.java.txt | 22,052 04/25/2002 10:26am |
| ImageEncoder.java.txt | 8,758 04/25/2002 10:27am |
| IntHashtable.java.txt | 13,275 04/25/2002 10:27am |
| OneOffshore\src\com\oneoffshore\util\imageconverter | |
| | |
| AllImageConverter.java.txt | 4,646 04/25/2002 10:23am |
| NightlyPDLImageConverter.java.txt | 4,437 04/25/2002 10:29am |
| PDLImageConverter.java.txt | 4,071 04/25/2002 10:34am |
| OneOffshore\src\com\oneoffshore\util\PathParser | |
| | |
| Token.java.txt | 2,769 04/25/2002 10:44am |
| TokenMgrError.java.txt | 4,363 04/25/2002 10:44am |
| OneOffshore\src\com\oneoffshore\util\pinger | |
| | |
| HTTPPinger.java.txt | 11,488 04/25/2002 10:26am |
| HttpPingerApp.java.txt | 2,219 04/25/2002 10:26am |
| HttpPingerAppFrame.java.txt | 8,890 04/25/2002 10:26am |
| HTTPPingFailureMsgEvent.java.txt | 1,309 04/25/2002 10:26am |
| HTTPPingMsgEvent.java.txt | 1,341 04/25/2002 10:26am |
| HTTPPingMsgListener.java.txt | 1,196 04/25/2002 10:26am |
| OneOffshore\src\com\oneoffshore\util\serverstatus | |
| | |
| ServerStatus.java.txt | 3,794 04/25/2002 10:41am |
| OneOffshore\src\com\oreilly | |
| | |
| oreilly.dfPackage.txt | 267 04/25/2002 10:33am |
| OneOffshore\src\com\oreilly\servlet | |
| | |
| Base64Decoder.java.txt | 5,343 04/25/2002 10:23am |
| Base64Encoder.java.txt | 5,274 04/25/2002 10:23am |
| CacheHttpServlet.java.txt | 11,704 04/25/2002 10:23am |
| CookieNotFoundException.java.txt | 770 04/25/2002 10:24am |
| CookieParser.java.txt | 9,599 04/25/2002 10:24am |
| DaemonHttpServlet.java.txt | 4,436 04/25/2002 10:24am |
| HttpMessage.java.txt | 8,091 04/25/2002 10:26am |
| HttpsMessage.java.txt | 5,746 04/25/2002 10:26am |
| LocaleNegotiator.java.txt | 7,901 04/25/2002 10:28am |
| LocaleToCharsetMap.java.txt | 2,497 04/25/2002 10:28am |
| MailMessage.java.txt | 10,782 04/25/2002 10:28am |
| MultipartRequest.java.txt | 12,116 04/25/2002 10:29am |
| MultipartResponse.java.txt | 4,395 04/25/2002 10:29am |
| ParameterNotFoundException.java.txt | 789 04/25/2002 10:33am |
| ParameterParser.java.txt | 13,192 04/25/2002 10:33am |
| RemoteDaemonHttpServlet.java.txt | 4,493 04/25/2002 10:35am |
| RemoteHttpServlet.java.txt | 4,599 04/25/2002 10:35am |
| servlet.dfPackage.txt | 3,432 04/25/2002 10:41am |
| ServletUtils.java.txt | 7,582 04/25/2002 10:41am |
| VersionDetector.java.txt | 3,059 04/25/2002 10:45am |
| OneOffshore\src\com\oreilly\server\multipart | |
| | |
| BufferedServletInputStream.java.txt | 7,122 04/25/2002 10:23am |
| FilePart.java.txt | 5,173 04/25/2002 10:25am |
| LimitedServletInputStream.java.txt | 3,465 04/25/2002 10:28am |
| MacBinaryDecoderOutputStream.java.txt | 1,964 04/25/2002 10:28am |
| MultipartParser.java.txt | 13,112 04/25/2002 10:29am |
| ParamPart.java.txt | 2,562 04/25/2002 10:33am |
| Part.java.txt | 1,145 04/25/2002 10:33am |
| PartInputStream.java.txt | 6,440 04/25/2002 10:33am |
| OneOffshore\src\com\viant | |
| | |
| viant.dfPackage.txt | 267 04/25/2002 10:45am |
| OneOffshore\src\com\viant\mail | |
| | |
| EMailManager.java.txt | 4,183 04/25/2002 10:25am |
| EMailMessage.java.txt | 4,038 04/25/2002 10:25am |
| mail.dfPackage.txt | 267 04/25/2002 10:28am |
| MailException.java.txt | 1,490 04/25/2002 10:28am |

-continued

Computer Program Listing Appendix
The CDRom Appendix incorporated by reference in this application is included on a single MSDOS compatible compact disk, with the disk containing the following named files having a size and creation date as indicated in this Listing, organized in File Folders as indicated below:

OneOffshore\src\com\viant\util

| | |
|---|---|
| AdvancedArrayList.java.txt | 7,494 04/25/2002 10:22am |
| AdvancedHashtable.java.txt | 1,527 04/25/2002 10:22am |
| AdvancedStringArrayList.java.txt | 2,210 04/25/2002 10:22am |
| ApplicationException.java.txt | 1,556 04/25/2002 10:23am |
| ArrayListBean.java.txt | 3,184 04/25/2002 10:23am |
| Attribute.java.txt | 1,573 04/25/2002 10:23am |
| Base64.java.txt | 10,472 04/25/2002 10:23am |
| BeanBag.java.txt | 3,486 04/25/2002 10:23am |
| BooleanUtil.java.txt | 1,504 04/25/2002 10:23am |
| Browser.java.txt | 3,023 04/25/2002 10:23am |
| Copier.java.txt | 2,883 04/25/2002 10:24am |
| CurrencyUtil.java.txt | 3,604 04/25/2002 10:24am |
| DataMissingException.java.txt | 1,598 04/25/2002 10:24am |
| DateUtil.java.txt | 8,803 04/25/2002 10:24am |
| JCrypt.java.txt | 26,638 04/25/2002 10:27am |
| JNDIContext.java.txt | 3,317 04/25/2002 10:27am |
| MessageDataBean.java.txt | 1,557 04/25/2002 10:28am |
| NameValue.java.txt | 5,096 04/25/2002 10:29am |
| NumberFormatUtil.java.txt | 1,622 04/25/2002 10:29am |
| ParameterNotFoundException.java.txt | 1,372 04/25/2002 10:33am |
| ParameterParser.java.txt | 8,247 04/25/2002 10:33am |
| SessionHelper.java.txt | 2,343 04/25/2002 10:41am |
| SingletonCache.java.txt | 2,330 04/25/2002 10:41am |
| StartUpServlet.java.txt | 4,158 04/25/2002 10:43am |
| StringMatrixUtil.java.txt | 13,663 04/25/2002 10:43am |
| User.java.txt | 1,925 04/25/2002 10:44am |
| UserInputException.java.txt | 1,337 04/25/2002 10:44am |
| util.dfPackage.txt | 267 04/25/2002 10:45am |

OneOffshore\src\com\viant\util\DataBeanMatricizer

| | |
|---|---|
| DataBeanMatricizer.java.txt | 36,704 04/25/2002 10:24am |
| DataBeanMatricizerException.java.txt | 1,061 04/25/2002 10:24am |

OneOffshore\src\com\viant\util\DataBeanMatricizer\PathParser

| | |
|---|---|
| ASCII_CharStream.java.txt | 9,763 04/25/2002 10:23am |
| ParseException.java.txt | 6,569 04/25/2002 10:33am |
| PathException.java.txt | 1,039 04/25/2002 10:33am |
| PathListString.java.txt | 3,110 04/25/2002 10:33am |
| PathNode.java.txt | 21,572 04/25/2002 10:33am |
| PathParser.java.txt | 22,310 04/25/2002 10:33am |
| PathParser.jj.txt | 6,099 04/25/2002 10:33am |
| PathParserConstants.java.txt | 737 04/25/2002 10:33am |
| PathParserTokenManager.java.txt | 9,304 04/25/2002 10:34am |
| PathString.java.txt | 3,213 04/25/2002 10:34am |
| PathTree.java.txt | 4,649 04/25/2002 10:34am |
| Token.java.txt | 2,782 04/25/2002 10:44am |
| TokenMgrError.java.txt | 4,374 04/25/2002 10:44am |

OneOffshore\src\com\viant\util\exception

| | |
|---|---|
| ExceptionUtils.java.txt | 2,052 04/25/2002 10:25am |

OneOffshore\src\com\viant\util\log

| | |
|---|---|
| LogClient.java.txt | 4,231 04/25/2002 10:28am |
| LogFailureException.java.txt | 2,167 04/25/2002 10:28am |
| LogLevel.java.txt | 4,112 04/25/2002 10:28am |
| LogProxy.java.txt | 9,205 04/25/2002 10:28am |
| LogTester.java.txt | 17,846 04/25/2002 10:28am |
| LogWriter.java.txt | 9,339 04/25/2002 10:28am |
| SimpleLogProxy.java.txt | 5,347 04/25/2002 10:41am |

OneOffshore\src\com\viant\util\test

| | |
|---|---|
| TestEvaluator.java.txt | 5,487 04/25/2002 10:43am |

FIELD OF THE INVENTION

This invention relates generally to a knowledge based system providing for the collecting, presenting, exchanging and analyzing of information relevant to participation in an equipment market which creates market transparency of supply, demand and prevailing equipment lease rate and enables market participants to match supply with demand requirements. The invention more particularly relates to a knowledge base system for use in the field of utilization of equipment and more particularly of offshore drilling rigs where equipment lease rates are known as "day rates". In the offshore drilling rigs market, a rig owner may act as a contractor or lessor of the equipment. Equipment is leased under contracts between a lessor and a lessee, where the lessee is generally an oil and gas company. Contracts for this equipment can run from a few weeks to several years with day rates generally negotiated or indexed to the prevailing supply and demand market conditions.

SUMMARY OF THE INVENTION

In general, the present invention involves a system for exchanging information among equipment owners, contractors, and operators/non-operators in oil and gas exploration and production using the Internet. The system includes a host computer programmed to provide selected access to a database of information and to collect, store and manage information in the database. The host computer is also programmed to enable users to search selected information and to use that information to formulate requests for equipment and contracts to other users of the system and to respond to requests from other users while collecting and storing within the database selected request and response information. The system provides a user interface to enable users to search the database and to formulate requests and responses based on information in the published information portion, community information portion, and the user company's private information portion. On the supply side, the private information typically relates to the user's inventory of equipment and on the supply side to the user's equipment needs. The system provides the user with the ability to organize and store and use virtually all categories of information relevant to participation in the equipment market.

The invention includes a computer-implemented system for managing and processing supply and demand information for participants in an equipment market. The system includes a data processor programmed to receive and store electronically received data in a relational database in an electronic storage medium, a business logic engine comprising computer readable program code stored on a host computer wherein the business logic program code includes a search engine for selectively retrieving data from the database, and an interface engine for communication between a system user and the data processor and the business logic engine whereby the business logic engine operates on data processed by the data processor and the interface engine displays the results of operation by the business logic engine. The system also includes a communications engine for receiving a market inquiry from a demand side market participant and forwarding said inquiry to a supply side market participant and for receiving a response to said inquiry from a supply side market participant and forwarding the received response to the demand side market participant.

In one embodiment of the invention, the search engine and the communications engine of the system each include computer readable program code and the business logic engine includes computer readable program code modules. In one embodiment, those modules can include a personalization tool module, a search engine module, a report engine module, a forecast tool module, an equipment planning tool module, an equipment usage sequences tool module, a collaboration tool module, an equipment deployment optimization tool module and a day rate calculation tool module. An embodiment of the interface engine includes means for generating graphical output, means for generating a graphical user interface and means for generating tabular output.

An exemplary embodiment of the invention includes a computer implemented system for managing and processing supply and demand information for participants in an offshore drilling rigs market, and the database includes one or more equipment related performance records, each record including one or more unique equipment identifiers and data associated with the identifiers. In the exemplary embodiment of the invention, the associated data includes equipment performance data. The equipment performance data can include well specifications, well location, water depth, drilled depth, well angle, hole size, casing design, mud type, displacement, mechanical details, rig name, operator, hole problem incidents, HSE incidents, lost time incidents, downtime incidents, drilling costs, downtime, flat time and total time, stratigraphic description and stratigraphic penetration indices.

The system of the invention is particularly suited for an embodiment where the data processor, communications engine, and business logic engine are stored on a host computer coupled to the Internet.

It is a feature of the system that graphical output of the system includes Gantt charts where the Gantt charts are generated utilizing a means for creating a session object from each of the search criteria and the search results to generate result objects and a server-side script that can generate a hypertext markup language page having embedded therein image tags wherein each image tag has embedded therein an "src" component. An image-rendering engine enables the system to use the "src" component of the embedded image tags created by the server-side script to pull the search criteria from the session object. This feature of the invention also includes means for calculating the width and height of the image to be produced by the rendering engine, means for generating an image map from the calculated width and height of the image in combination with the search results, means for generating a buffered object for receiving a drawn image, means for drawing rows on the buffered object, means for drawing each of the result objects on the buffered object wherein each result object becomes a chart element that relates to a discrete event in time, means for compressing the buffered object having the result subjects drawn thereon, means for encoding the buffered object as a streamed encoded image, and means for sending the encoded image to an Internet browser for display by the browser to the user.

It is a feature of the invention particularly suited for equipment that includes offshore rigs that the forecast tool module includes means for building a query to invoke operation of the search engine to retrieve data selected from the data group comprising rig data, contract data and activities data to facilitate creation of a set of market assumptions and the forecast tool module includes means for operating on the market assumption set to forecast equipment supply, demand and pricing.

Another feature of the system for use with drilling rigs as the equipment is the equipment planning tool module which includes means for building a query to invoke operation of the search engine to retrieve data selected from the data group comprising data, contract data and activities data to facilitate creation and updating of rig deployment plans for effective utilization of available rigs in the rig market. Another feature of the equipment planning tool module is inclusion of a means for building an equipment supply query from data selected from the data group comprising equipment location, equipment operator, equipment contractor, equipment type, equipment activity status and equipment technical capabilities. Yet another feature of the equipment planning tool module is the inclusion of means for building an equipment demand query from data selected from the group comprising equipment location, equipment operator, equipment type, equipment status and demand requirements. Yet another feature of the equipment planning tool module if the invention is the inclusion of means for building an equipment specifications query from data selected from the group comprising equipment technical specifications and wherein the query invokes the search engine to cause the report engine to produce a report presenting a side by side comparison of the equipment specifications responsive to the query.

It is a feature of the invention that the business logic engine includes computer readable program code for operating on selected data stored in the relational database and those operations can include searching for selected data, comparing selected data, applying an optimization algorithm to selected data, and applying a forecasting algorithm to selected data. In an exemplary embodiment of the invention, the forecasting algorithm includes drilling activity factors selected from the group comprising well location, well water depth, total drilling depth, maximum well angle, hole size, maximum well displacement, number of casing strings, and drilling mud type.

In an exemplary embodiment of the invention where the equipment includes rigs, the equipment usage sequencing tool module comprises means for building a query to invoke operation of the search engine to retrieve data selected from the data group comprising rig data, contract data and activities data to facilitated selection of a rig, activity of the selected rig, and contract activity of the selected rig to invoke operation of the report engine tool to create an activity sequence for the rig.

In an exemplary embodiment of the invention where the equipment includes rigs, the collaboration tool module includes means for invoking operation of the interface engine to display a data entry form for defining a set of requirements for a project requiring use of equipment, means for invoking operation of the search engine to retrieve rig data for rigs matching the project requirements input, and means for invoking the communications engine to submit the requirements to selected supply side market participants.

Another feature of the computer implemented system for managing and processing supply and demand information for participants in an equipment market the relational database includes: a plurality of equipment records containing information about specific pieces of equipment within an equipment category wherein each record comprises a unique equipment identifier and data associated with that identifier wherein the associated data is selected from the data group comprising technical specifications for the equipment, type of equipment, equipment owner, equipment contractor, current equipment activity, current equipment status, equipment availability date, equipment ownership history, and equipment technical upgrade history; and one or more equipment related activity records wherein each record comprises a unique activity identifier and data associated with that identifier wherein the associated data comprises data selected from the data group comprising activity location, activity status, activity operator, activity technical specifications, and equipment rental rate for the activity.

In an exemplary embodiment of the equipment deployment optimization tool module, the equipment deployment optimization tool module includes: means for invoking the interface engine to display a data entry form for defining a plurality of sets of requirements for a plurality of projects requiring use of equipment, a set of supply side market participants, and a set of objective project functions; means for invoking the communications engine to send the data entered in the data entry form to the data processor to invoke operation of the search engine to query the database in response to the entered data; and means for invoking the business logic engine to apply an optimization algorithm to the data resulting from operation of the search engine to determine optimal trades and economic incentives for optimal trades with the supply side market participants.

In connection with the equipment deployment optimization feature of the invention, in an exemplary embodiment, the database further includes one or more equipment contract records wherein each record comprises contract data selected from the group of data comprising equipment operator, equipment rental rate, and contract length.

Another feature of the invention is a method for creating a plan for equipment usage including providing a database contained in a computer storage medium for storing information relevant to participation in an equipment market. In this feature, the database can include a plurality of equipment records containing information about specific pieces of equipment within an equipment category. In this feature, each record can include a unique equipment identifier and data associated with that identifier, and the associated data can include technical specifications for the equipment, type of equipment, equipment owner, equipment contractor, current equipment activity, current equipment status, equipment availability date, equipment ownership history, and equipment technical upgrade history. In method for creating a plan for equipment usage, the method of this feature, the database can further include one or more equipment related activity records with each record including a unique activity identifier and data associated with that identifier. The associated data can include activity location, activity status, activity operator, activity technical specifications, and equipment rental rate for the activity. The method for creating a plan for equipment usage involves querying a database to identify and select an equipment group, querying the database to identify activities for which the equipment can be used, and assigning activities identified in the activity identification query step to equipment identified in the equipment identification querying step.

Another feature of the invention is a method for calculating economical day rates for a group of drilling rig for use in drilling wells in underwater formations. The method for calculating economical day rates includes determining a mechanical difficulty index for the well based on factors selected from the group comprising well location, well water depth, total drilling depth, maximum well angle, hole size, maximum well displacement, number of casing strings and type of drilling mud, determining a drilling performance index based on factors selected from the group comprising stratigraphic well description and drilling performance as a function of the described stratigraphy, determining a capability index based on identification of rigs available for the project, contractor capabilities associated with each of the available rigs, and combined contractor and rig performance histories, calculating a rig/hole performance index based on the mechanical difficulty, drilling performance and contractor capability indices, calculating the number of days required to complete the drilling project, and calculating an economic day rate for each of the available rigs based on the rig/hole performance index and the days requirement to complete the drilling project.

In one embodiment, determining the well mechanical difficulty index in the method for calculating economical day rates includes determining drilling performance as a function of mechanical difficulty and a real earth model.

The invention further includes a computer implemented method for analyzing supply and demand information in an equipment market, the method including the steps of providing a relational database for receiving and storing in an electronic storage medium data relevant to supply and data relevant to demand, providing a first set of computer readable program code for processing incoming data for storage in the relational database, providing a second set computer readable program code for selectively retrieving data stored in the relational database, providing a third set of computer readable program code for performing operations on data stored in the relational database wherein the operations are selected from the group comprising searching for selected data, applying an optimization algorithm to selected data, applying a forecasting algorithm to selected data and calculating a price based on historical and current data stored in the relational database, and providing a user interface for selectively invoking operating of each of the first, second and third sets of computer readable program code. The method further includes a fourth set of computer readable program code for providing a user interface for invoking the functions performable by each of the first, second and third sets of computer readable program code.

The computer implemented method for analyzing supply and demand information in an equipment market having a discrete number of market participants can include creating a database from published information sources containing equipment supply data and equipment demand data, selectively adding to the database information received from one or more of the discrete market participants, providing a graphical user interface for the discrete number of market participants to organize and access selected information and to provide data for inclusion in the database, and providing analytical tools for operating on data in the database wherein the analytical tools include an optimization tool and a forecasting tool.

The computer implemented method for analyzing supply and demand information in an equipment market having a discrete number of market participants, the step of selectively adding to the database information received from one or more of the discrete market participants can include segregating public information so that private information can be accessed only by subsets of the discrete number of market participants.

The invention further includes an Internet based knowledge base system for participants in a market for equipment wherein the participants include owners of the equipment and users of the equipment with the system including a relational database for receiving and storing information relevant to the market. The information relevant to the market that can be received and stored by the system of the invention includes equipment information, which in turn can include equipment technical specifications and equipment activity information, and market participant information, which in turn can include participant identification information and participant market activities information. The knowledge base system of the invention can further include computer readable program code for selectively retrieving information from the database in response to input queries from one or more of the market participants, computer readable program code for selectively receiving information from market participants and storing the information in the relational database, and computer readable program code for enabling the real time exchange among market participants of information about availability of equipment and needs for equipment.

A feature of the knowledge base system of the invention where the equipment includes drilling rigs for drilling in underwater formations is that the equipment technical specifications and equipment activity information can include data that includes rig performance information, and the rig performance information can include well specifications, well location, water depth, drilled depth, well angle, hole size, casing design, mud type, displacement, mechanical details, rig name, operator, hole problem incidents, HSE incidents, lost time incidents, downtime incidents, drilling costs, downtime, flat time and total time, stratigraphic description and stratigraphic penetration indices.

Another feature of the knowledge base system of the invention is that the equipment technical specifications and equipment activity can include mechanical specifications, type of equipment, equipment owner, equipment contractor, current equipment activity, current equipment status, equipment availability date, equipment ownership history, and equipment technical upgrade history.

Another feature of the invention is a method for generating a Gantt chart image from data stored in a database in response to search criteria entered by a program user where the image generating method includes providing a search engine in communication with the database for receiving the search criteria entered by program user and for generating search results in response to the entered search criteria, creating a session object from each of the search criteria and the search results to generate result objects, providing a server-side script for generating a hypertext markup language page having embedded therein image tags wherein each image tag has embedded therein an "src" component, providing an image rendering engine, using the "src" component of the embedded image tags created by the server-side script to pull the search criteria from the session object, calculating the width and height of the image to be produced by the rendering engine, generating an image map from the calculated width and height of the image in combination with the search results, generating a buffered object for receiving a drawn image, drawing rows on the buffered object, drawing each of the result objects on the buffered object wherein each result object becomes a chart element that relates to a discrete event in time, compressing the buffered object having the result subjects drawn thereon, encoding the buffered object as a streamed encoded image, and sending the encoded image to an Internet browser for display by the browser to the user.

Another feature of the invention is a computer program product for generating a Gantt chart image from data stored in a database in response to search criteria entered by a program user that includes a search engine in communication with the database for receiving the search criteria entered by program user and for generating search results in response to the entered search criteria, means for creating a session object from each of the search criteria and the search results to generate result objects, a server-side script for generating a hypertext markup language page having embedded therein image tags wherein each image tag has embedded therein an "src" component, an image rendering engine; means for using the "src" component of the embedded image tags created by the server-side script to pull the search criteria from the session object, means for calculating the width and height of the image to be produced by the rendering engine, means for generating an image map from the calculated width and height of the image in combination with the search results, means for generating a buffered object for receiving a drawn image, means for drawing rows on the buffered object, means for drawing each of the result objects on the buffered object wherein each result object becomes a chart element that relates to a discrete event in time, means for compressing the buffered object having the result subjects drawn thereon, means for encoding the buffered object as a streamed encoded image, and means for sending the encoded image to an Internet browser for display by the browser to the user.

BRIEF DESCRIPTION OF THE DRAWING

FIGS. 8A, 8B, and 8C are top, middle and bottom portions of a screen capture illustrating the personalized viewing features of the invention.

FIGS. 10 through 13 are screen captures illustrating the search/view publications feature of the invention.

FIGS. 19, 20 and 21 are screen captures illustrating the rig utilization feature of the invention.

FIGS. 23A, 23B, 24, 25, 26, 27, 28, and 29 are screen captures illustrating the search supply feature of the invention.

FIGS. 36, 37, 38, 39, and 40 are screen captures illustrating the market inquiries feature of the invention.

DETAILED DESCRIPTION OF EXEMPLARY EMBODIMENTS

Figure 1:
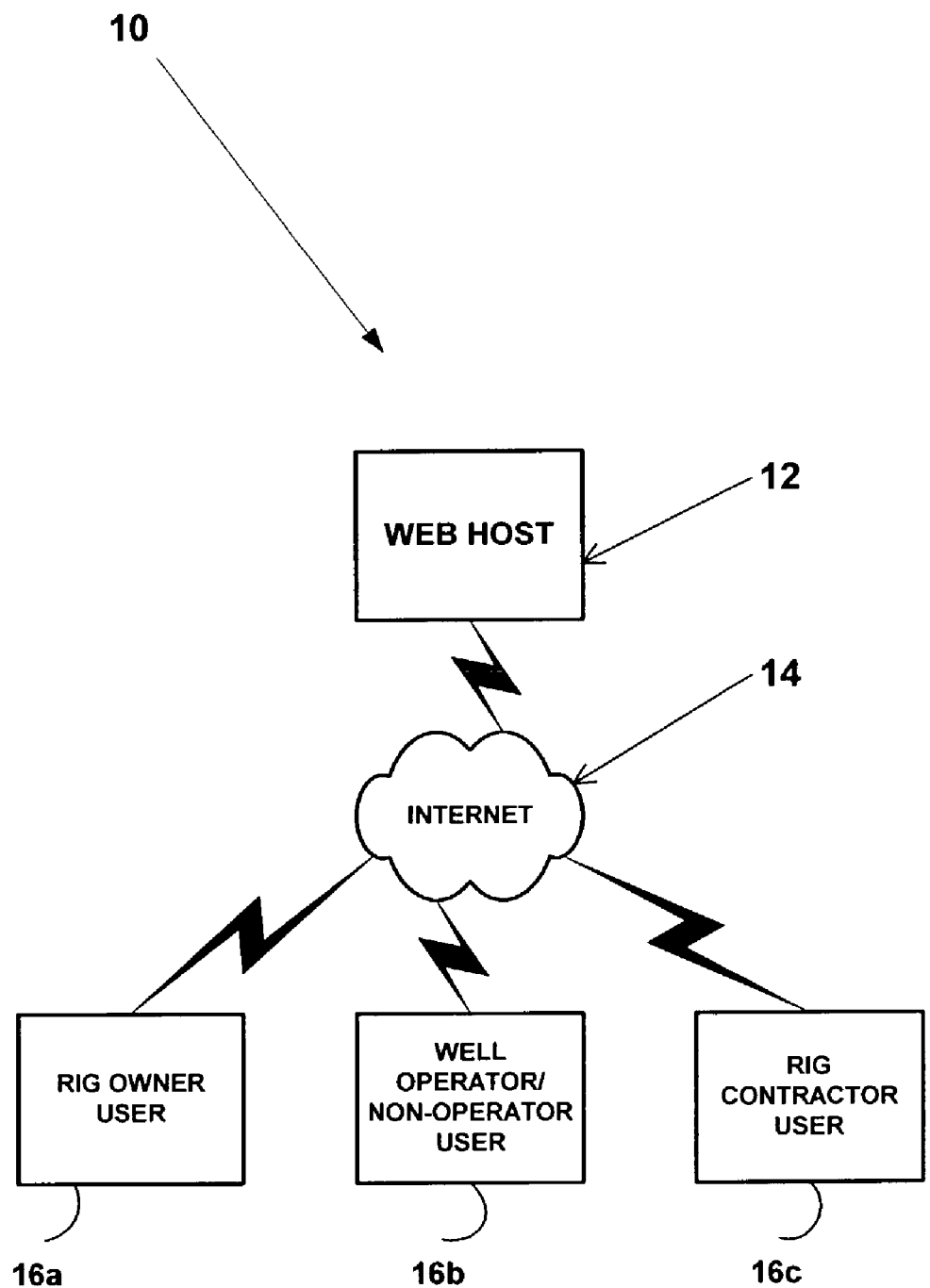
FIG. 1 is a schematic illustration of an exemplary embodiment of a knowledge base system.

The Drawing illustrates various functional features of an embodiment of the invention for creating, maintaining and sharing a knowledge base among participants in a market comprised of equipment owners or lessors and equipment users. In the exemplary embodiment of the invention illustrated in the Drawing and described in detail below, the equipment is offshore drilling rigs used in the oil and gas drilling and production industry and the market participants are owners of rigs and users of those rigs.

Figure 2:
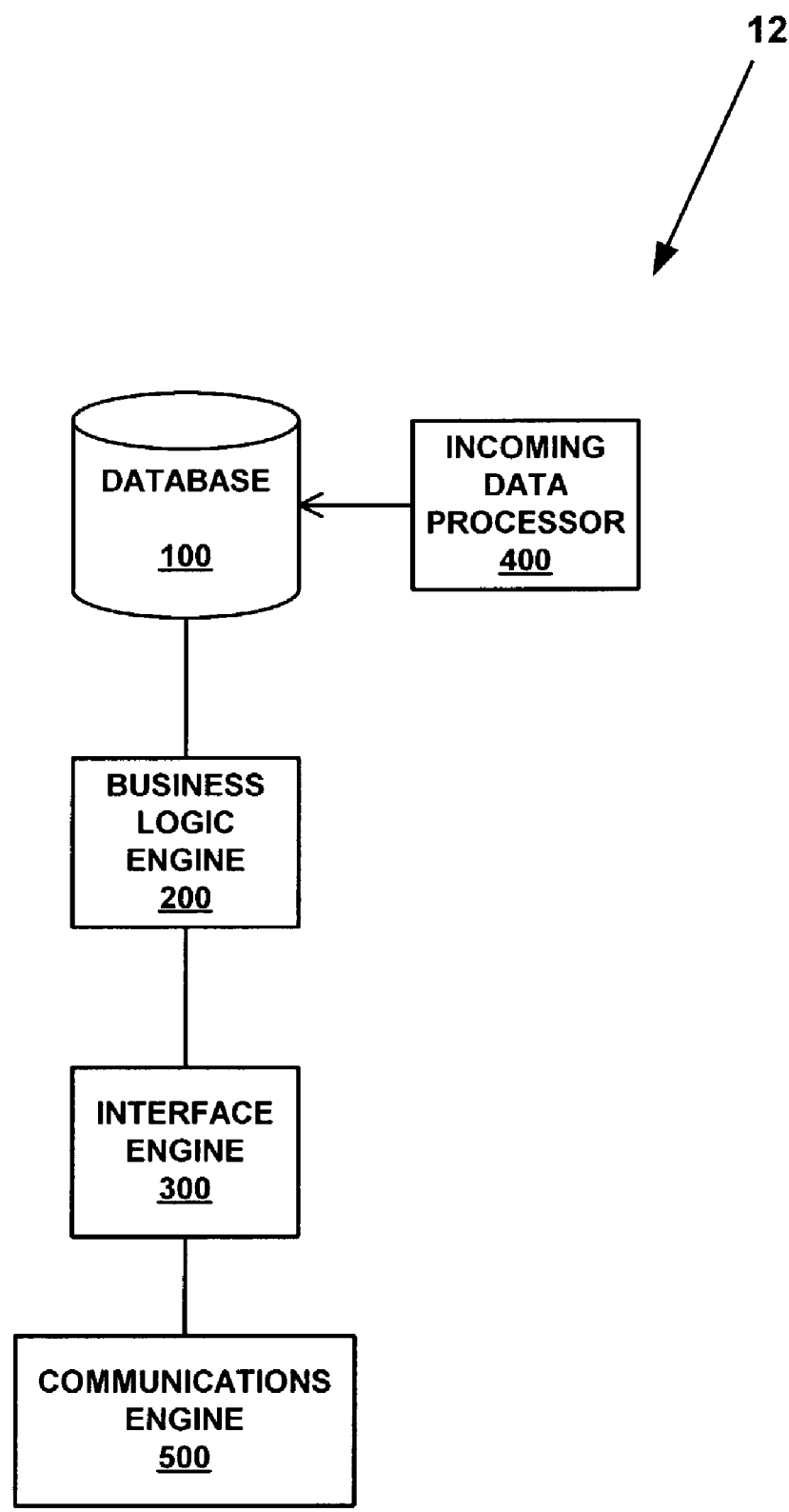
FIG. 2 is a flow chart illustration of an exemplary embodiment of the components of the web host server of the knowledge base system.

With reference to FIG. 1 of the Drawing, there is shown an overview of a system 10 in accordance with the invention, including Web Host 12 coupled to the Internet shown at 14, and Users 16 coupled to the web host 12 via the Internet 14. For purposes of illustrating features of the invention, FIG. 1 shows three categories of possible users of the system 10—Rig Owner User 16a; Well Operator/Non-Operator User 16b and Rig Contractor User 16c. As used herein, Well Operator/Non Operator is used to refer to the entity that leases the equipment and therefore is typically a demand side market participant. With reference to FIG. 2, the Web Host 12 includes a Database 100 where information is stored for selective retrieval in accordance with the features discussed below. The Web Host 12 further includes a Business Logic Engine 200, Interface Engine 300, and Incoming Data Processing Engine 400. As can be appreciated, the Business Logic Engine 200 is the portion of the system that processes queries or requests from the Users 16 and the Interface Engine 300 provides the user interfaces (shown in other figures and discussed below) that enable users to communicate their queries and requests to the system and enables the system 10 to display responses to those queries and requests.

Figure 3A:
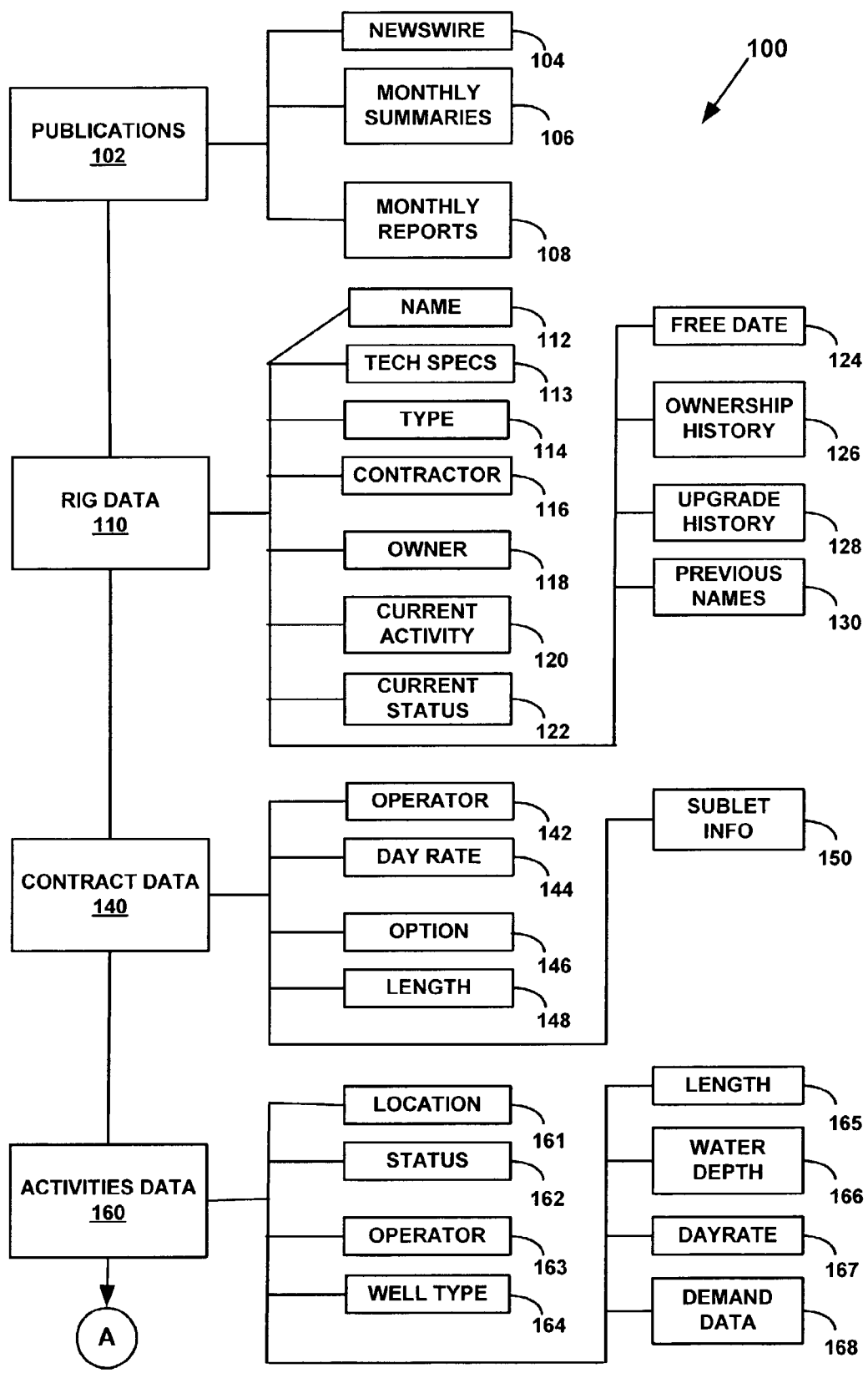
FIGS. 3A and 3B schematically illustrate components of an exemplary embodiment of a database for the knowledge base system.
Figure 3B:
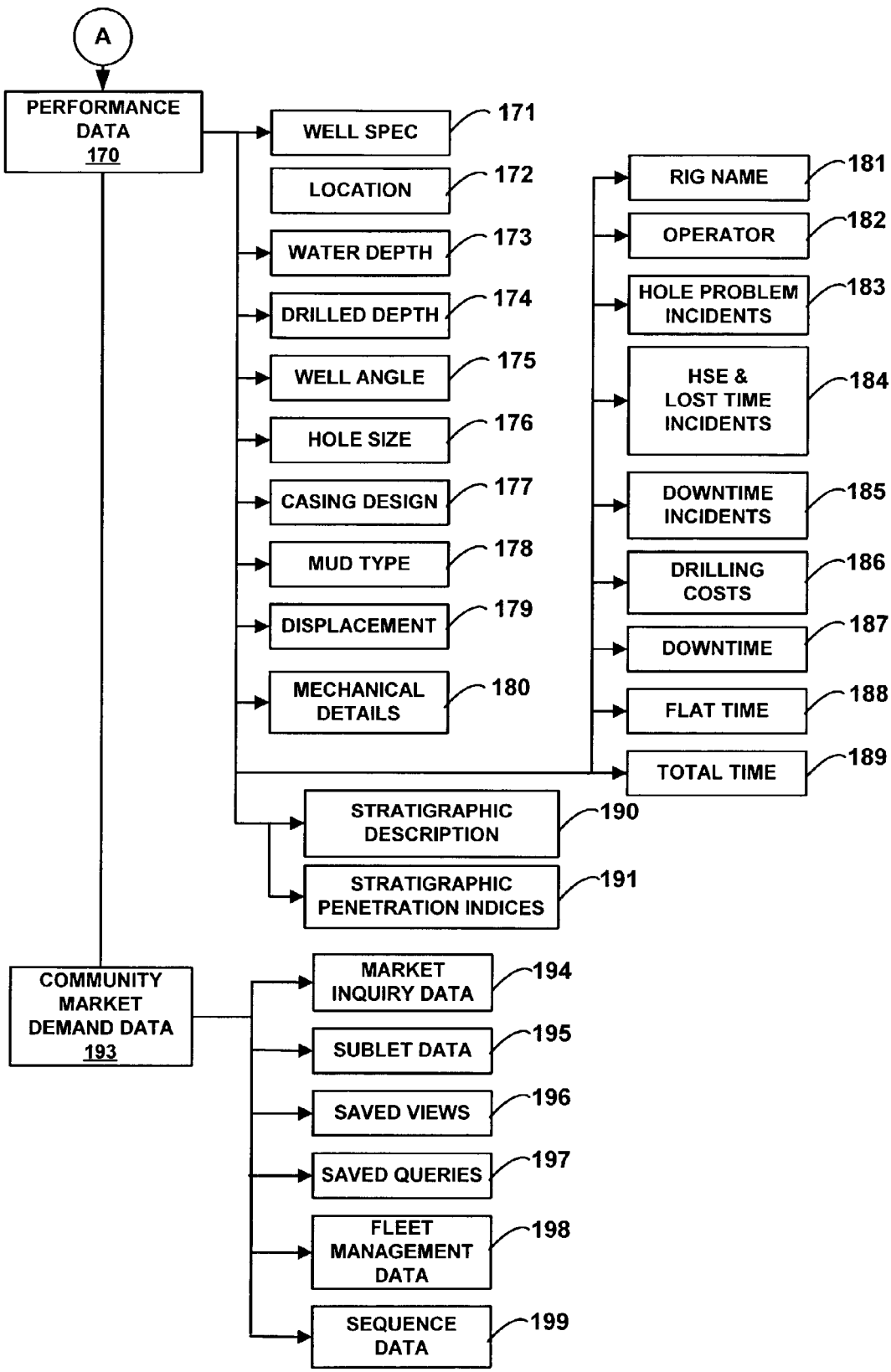

As illustrated in FIGS. 3A and 3B, the Database 100 stores various categories of information useful to the Users 16 in connection with planning for, utilizing and marketing any number of drilling rigs in a drilling rig fleet, as well as managing contracts for utilizing drilling rigs. As illustrated in FIGS. 3A and 3B, the system 10 organizes database information into categories which facilitate operation of the system in providing users with tools needed to plan, use, select and manage drilling rigs, drilling rig fleets, and contracts for the use of rigs and rig fleets and to predict/evaluate demand for said rigs. To that end, the database 100 includes data in six basic categories: publications 102, rig data 110, contract data 140, and activities data 160, performance data 170 and community market demand data 193. Within those categories are details relating to the categories.

The publications 102 category includes newswires 104, monthly summaries 105, and monthly reports 108. In the offshore drilling rig market, each piece of equipment or rig has a name, is of a particular type, and has its own set of technical specifications. Accordingly, the rig data category 110 includes name 112, previous names 130, tech specs 113, type 114, and upgrade history 128. Rigs can be owned and managed by rig owners or rig contractors, hence the rig data category 110 includes contractor 116, owner 118, ownership history 126. Rigs can be in operation or not in operation or under construction and the location of the rig depends on that activity and status. To organize that information, the rig data category 110 also includes current activity 120, current status 122, and free date 124.

The contract data 140 category includes details typically included in any contract for operation of a rig, namely operator 142, day rate 144, option 146, length 148 and sublet info 150. The activities data 160 category is meant to house information relating to drilling projects and hence includes location 161, status 162, operator 163, well type 164, length 165, water depth 166, and day rate 167.

The performance data 170 category 170 houses information about how particular rigs have performed in particular projects and hence includes a mixture of project specific information and information about the rig and operator involved in the project. The subcategories within the performance data 170 category therefore include well spec 171, well location 172, water depth 173, drilled depth 174, well angle 175, hole size 176, casing design 177, mud type 178, displacement 179, mechanical details 180, rig name 181, operator 182, hole problem incidents 183, HSE and Lost time incidents 184, downtime incidents 185, drilling costs 186, downtime 187, flat time 188 and total time 189. Additional project difficulty factors included as subcategories of performance data 170 are stratigraphic description 190 and stratigraphic penetration indices 191.

The Community market demand data 193 is an important part of the invention as it relates to the data collected from the community of users of the system 10. The community market demand data 193 includes market inquiry data 194, sublet data 195, saved views 196, saved queries 197, fleet management data 198, and sequence data 199.

Figure 7:
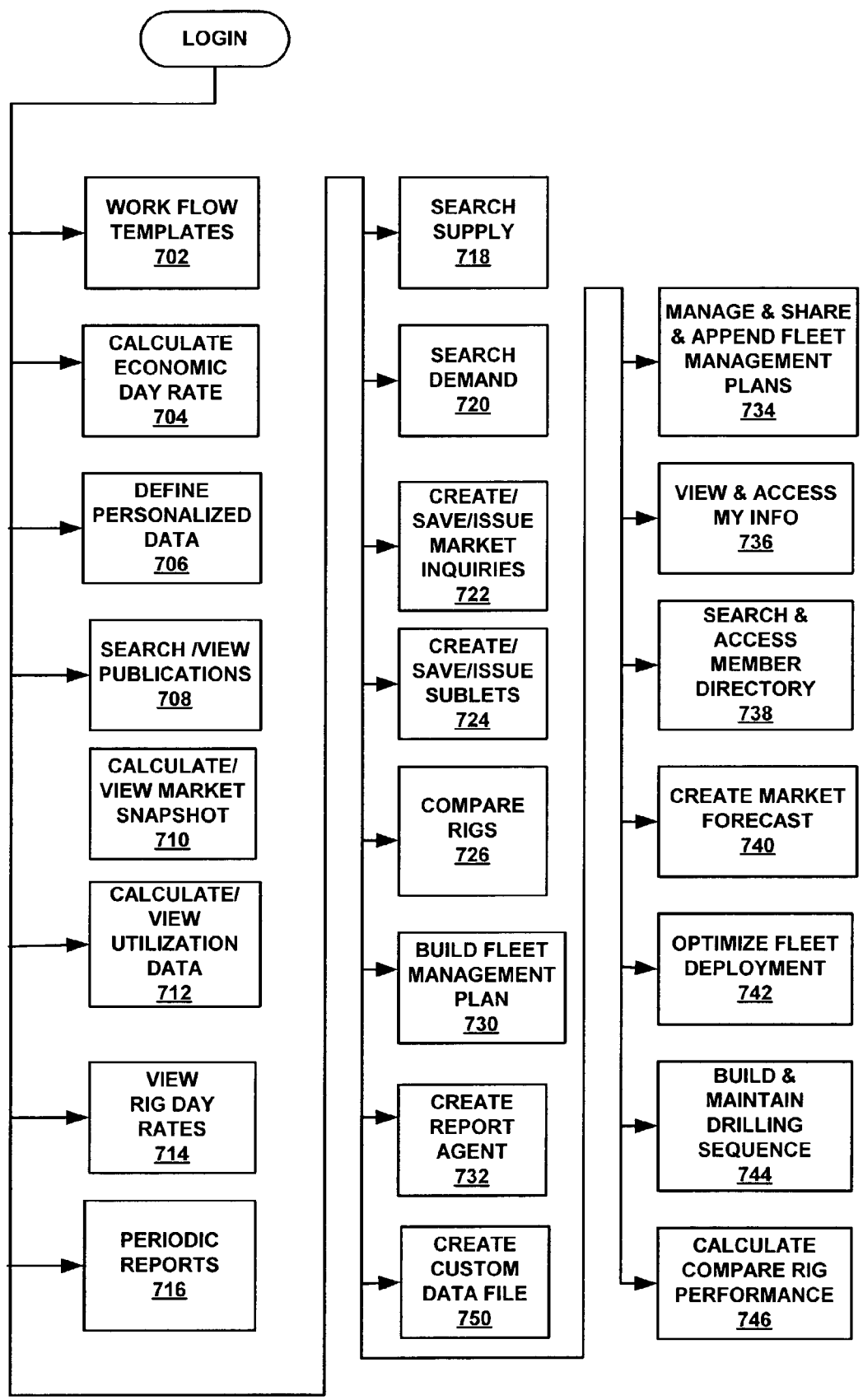
FIG. 7 is a schematic illustration of functional features available to a user of the knowledge base system.

As will be appreciated in light of the following detailed description of various features of the system from a functional perspective and end user perspective, this conceptual organization of information within the knowledge base system 10 facilitates the ability of the system to perform all of the functions shown in FIG. 7. In the Figures to be discussed later that consist of screen captures, elements of the functionality of the system which draw information from the above described categories of data base information are sometimes numbered in the screen capture illustration of that functionality to include the screen capture figure number followed by the last two digits of the database category element numbers of FIG. 3A.

Figure 4:
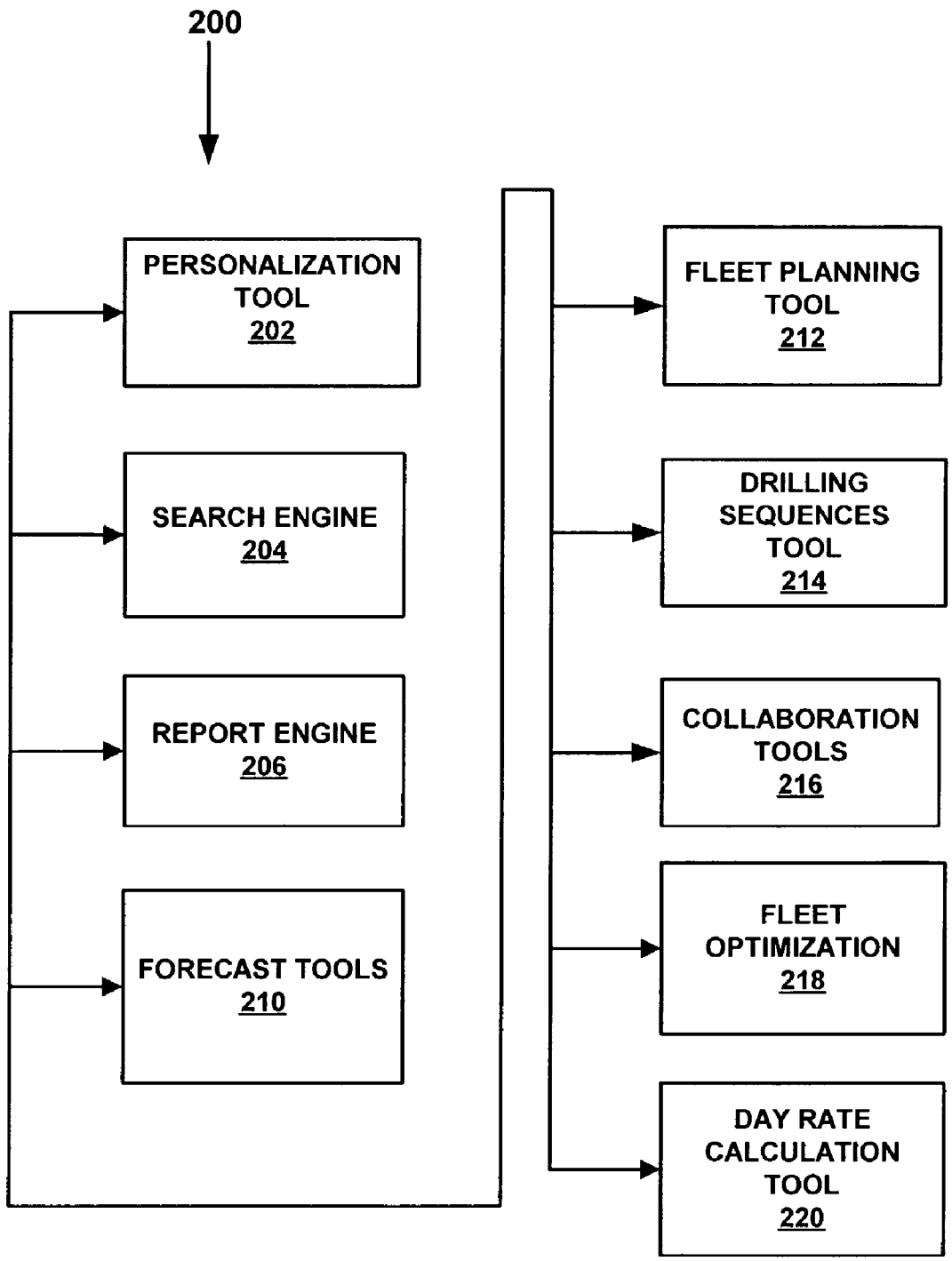
FIG. 4 is a schematic illustration of components of an exemplary embodiment of a business logic engine for the knowledge base system.

With reference to FIG. 4, in the illustrated embodiment, the Business Logic Engine 200 includes various functional components that operate on information in the database 100. Those components include a means for personalizing user viewable features of the invention illustrated as Personalization Tool 202, and Search Engine 204 and Report Engine 206 to enable users to search the database and create various reports from information in the database. Other functions within the business logic engine 200 include tools for: forecasting rig supply and demand, illustrated as Forecast Tools 210; for planning for efficient fleet deployments, illustrated as Fleet Planning 212, for coordinating drilling operations by one or more rigs within a fleet, illustrated as Drilling Sequences 214; means for collecting and exchanging information within a user organization or among users, illustrated as Collaboration Tools 216; and means for optimizing fleet deployments, illustrated as Fleet Optimization Tool 218, and Day Rate Calculation Tool 220.

Figure 5:
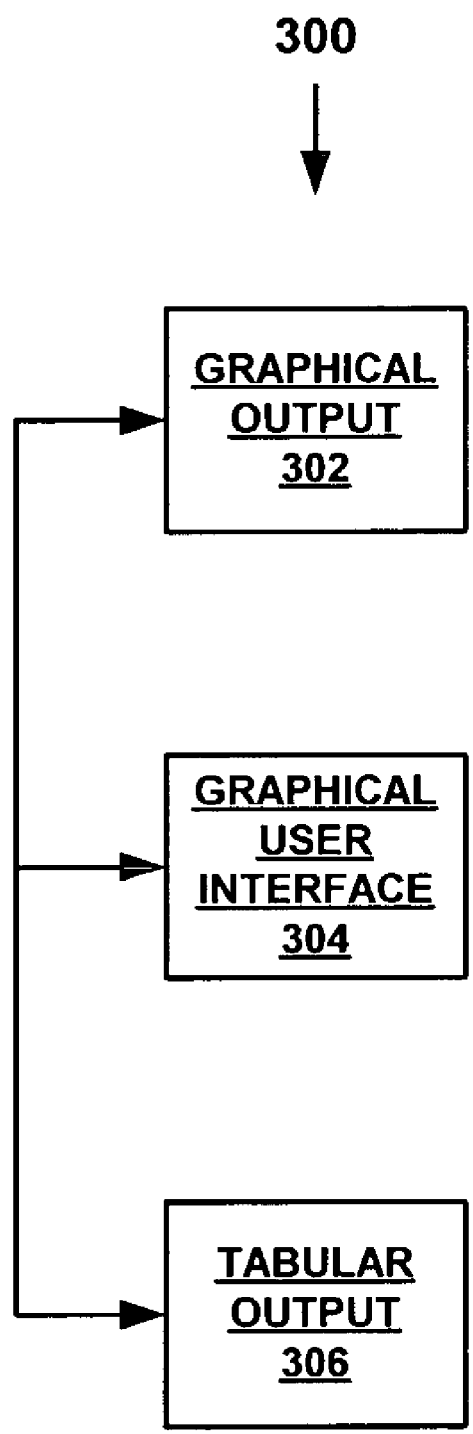
FIG. 5 is a schematic illustration of an interface engine for the knowledge base system.
Figure 6:
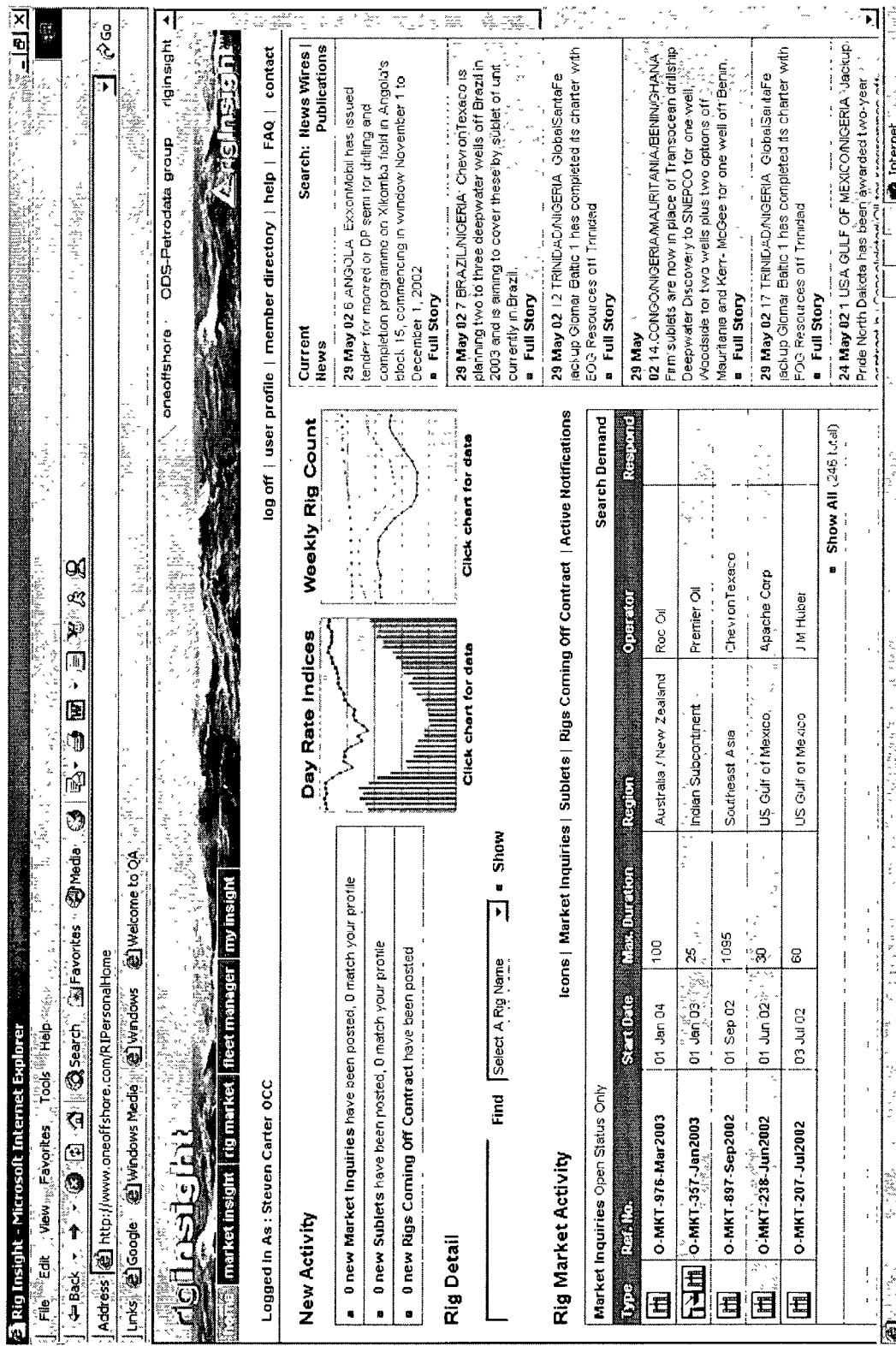
FIG. 6 is a screen capture illustrating output from the interface engine of the knowledge base system.

Each of the tools provided by the business logic engine is made accessible to users by way of the Interface Engine 300 which provides Graphical Output 302, Graphical User Interface 304, and Tabular Output 306, as illustrated in the flow chart of FIG. 5. An example of a screen display produced by the Interface Engine 300 is provided in FIG. 6.

FIG. 7 is an overview of the various functional features provided by the system 10 to the Users 16, each illustrated by other figures and/or discussed further below.

Figure 8A:
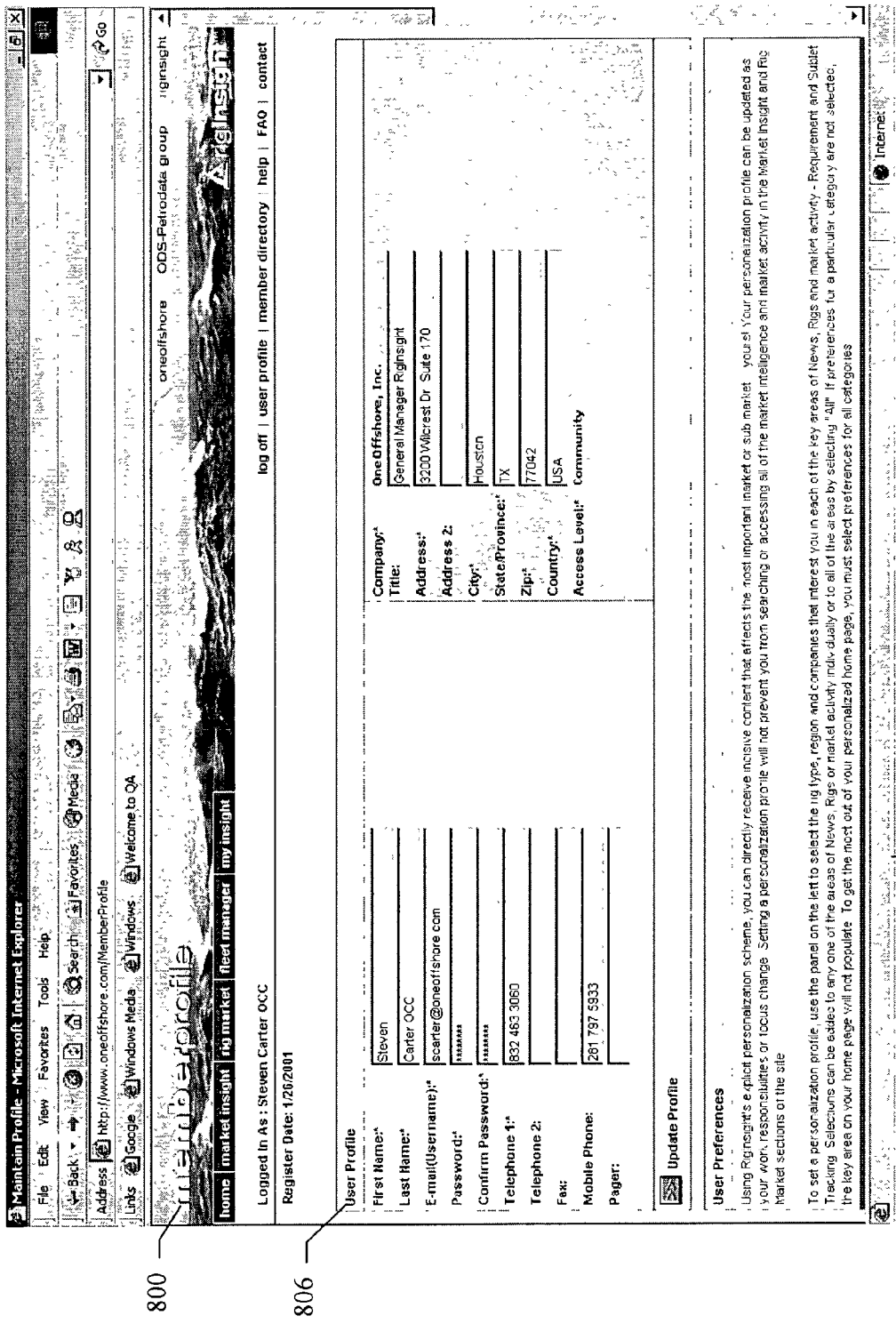
Figure 8B:
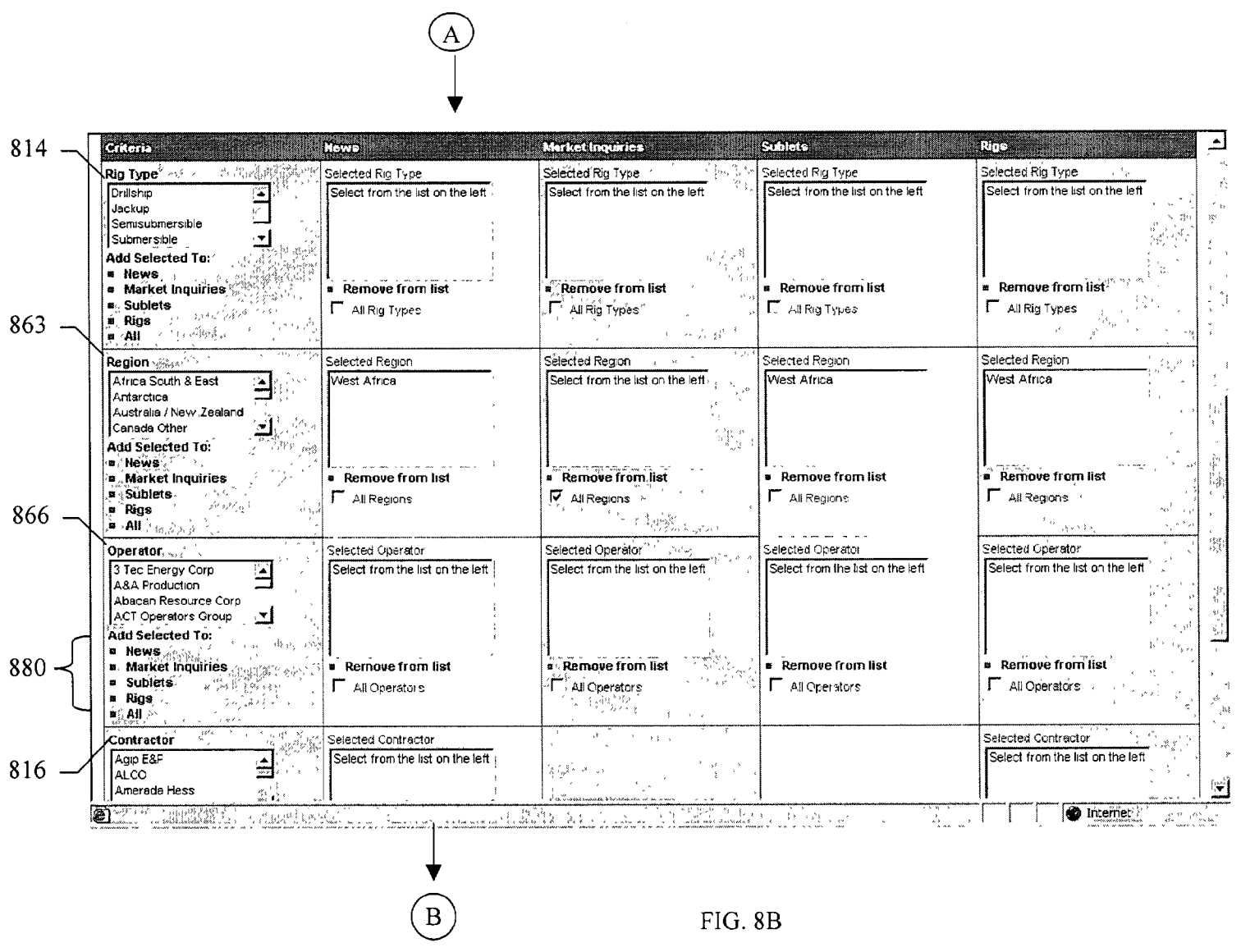
Figure 8C:
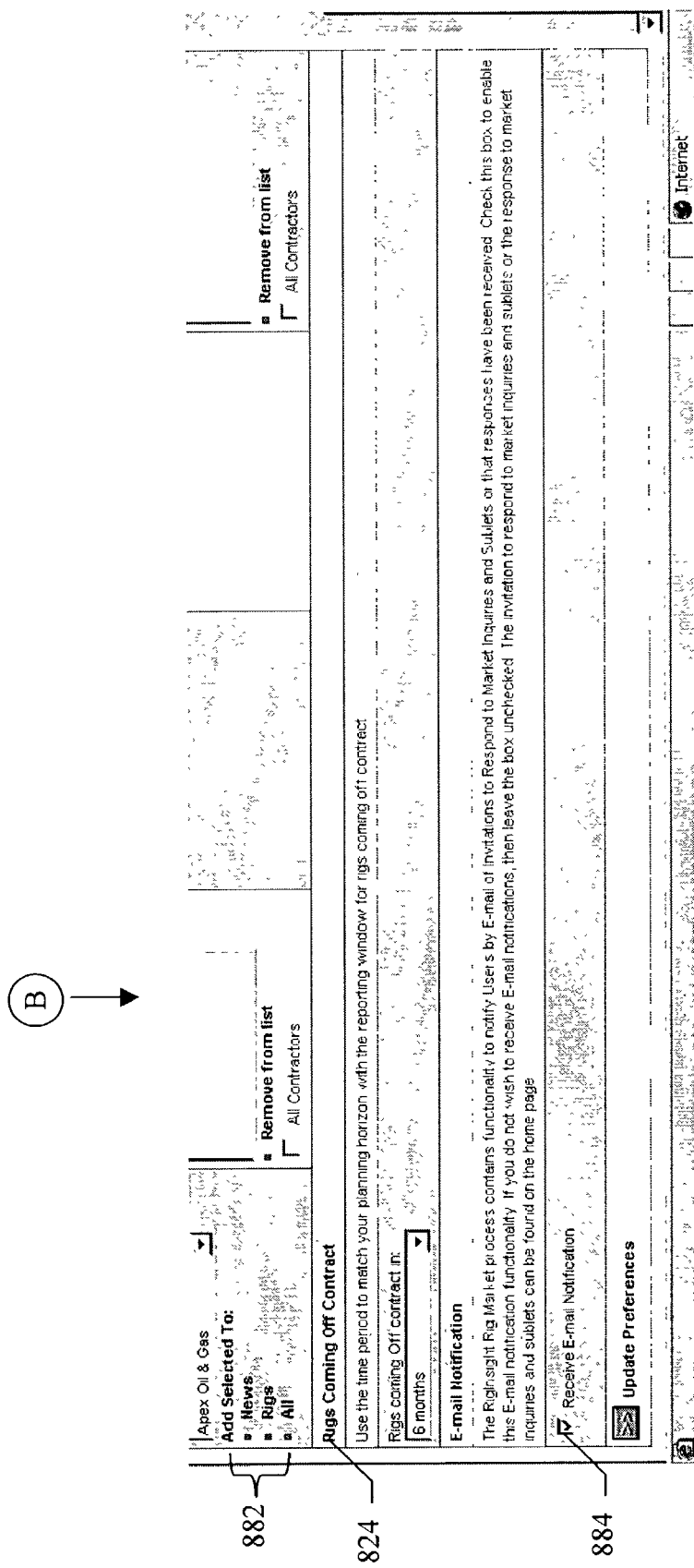

Each User 16 of the system 10 has access to the Define Personalized Data function 706 illustrated by the screen capture of FIGS. 8A, 8B, and 8C. With this feature, which in the exemplary embodiment is entitled "member profile" 800, the user 16 can choose particular published information to be displayed as the user's home page when using the system 10 thereby personalizing the system for the user. In the exemplary embodiment shown in FIGS. 8A, 8B, and 8C, the personalized data function 706 includes the ability to designate a rig type or group of rig types of interest via rig type 814 selection box, select locations of interest by way of Region selection boxes 863, operators by Operator selection box 866 and contractors by Contractor selection boxes 816. These selections can each be added to the user's personalized data query file to be used by the system to generate the user's personalized home page by way of the "Add Selected To" buttons 880 and 882. Another feature of the define personalized Data function is the ability for a user to elect at any time to receive E-mail notifications 884 through the system 10, such as market inquiries that other system subscribers or "members" present to the community of members using the system. The E-mail notifications 884 feature of the system will be discussed further below in connection with the market inquiries 722 and sublet 724 functions of the system 10.

User profile 806 enables the user to input or change contact information. As a subscriber to the system 10, the User 16 has access to published periodicals specifically designed for participants in the off shore drilling rig market. Using the member profile screen 800, the user effectively selects default search criteria which enables the Search Engine 204 to generate search results for display immediately on logon or when the user selects the home tab 800.

Figure 9:
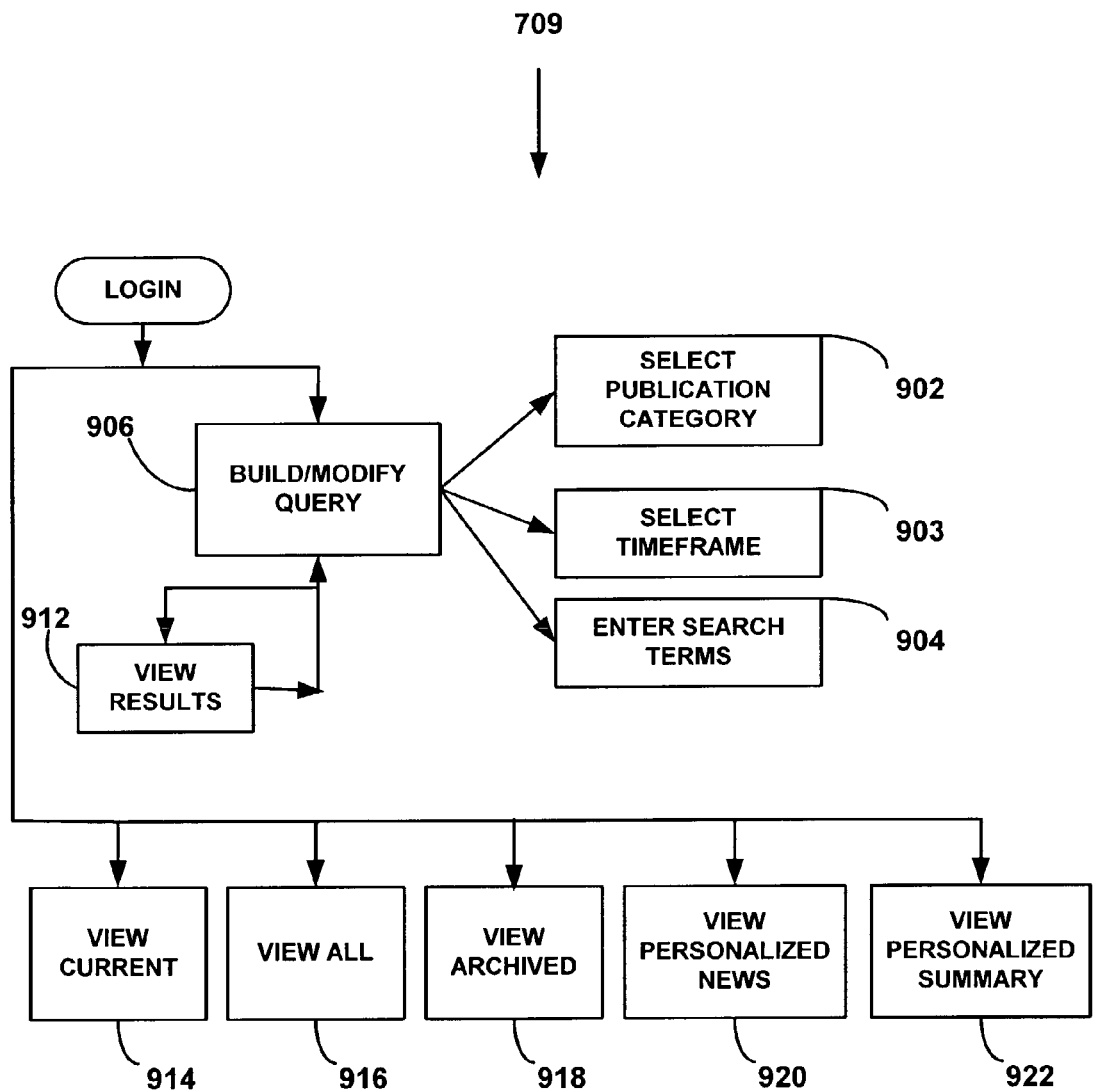
FIG. 9 is a flow chart illustration of an exemplary embodiment of the search/view publications feature of the knowledge base system of the invention.
Figure 10:
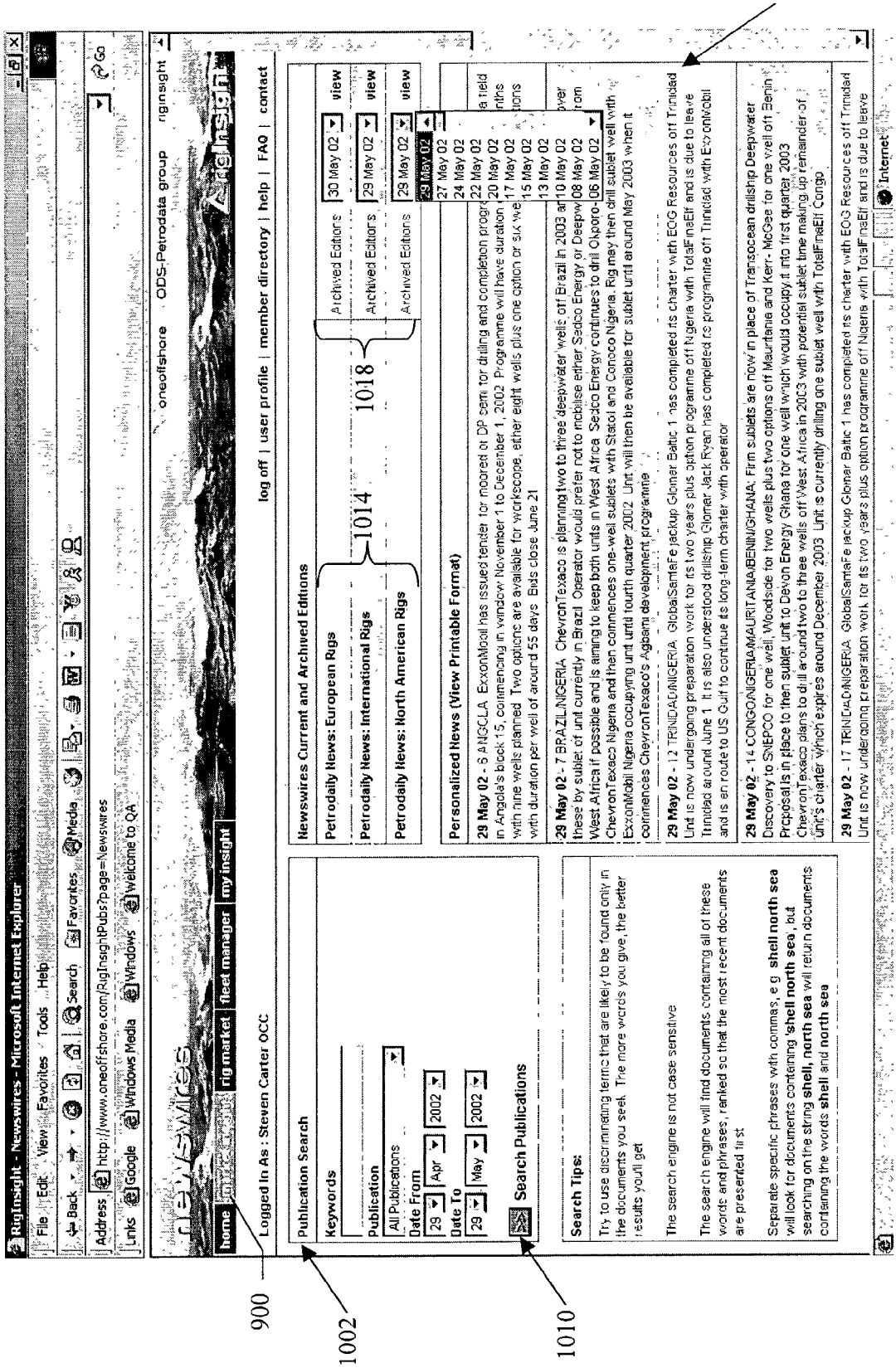

In addition to the member profile 800 default display of publications 102 in the database 100, by way of Market Insight tab 900 shown highlighted in FIG. 10, the system 10 makes the search publications 708 function available. This function permits the user to enter a query and select ways to view the information that matches the query drawn from the publications 102 portion of the database. As shown in FIG. 9, invoking the search publications 708 feature after login enables the user 16 to build a query 906 by selecting a publication category 902, a timeframe 903 and entering search terms 904. The search engine 204 then finds matching information from the publications 102 portion of the database 100 and the interface engine 300 displays the resulting information. The user may also select to view publications using one of several view options, which can include view current 914, view all 916, view archived 919, view personalized news 920 or view personalized summary 922.

Figure 11:
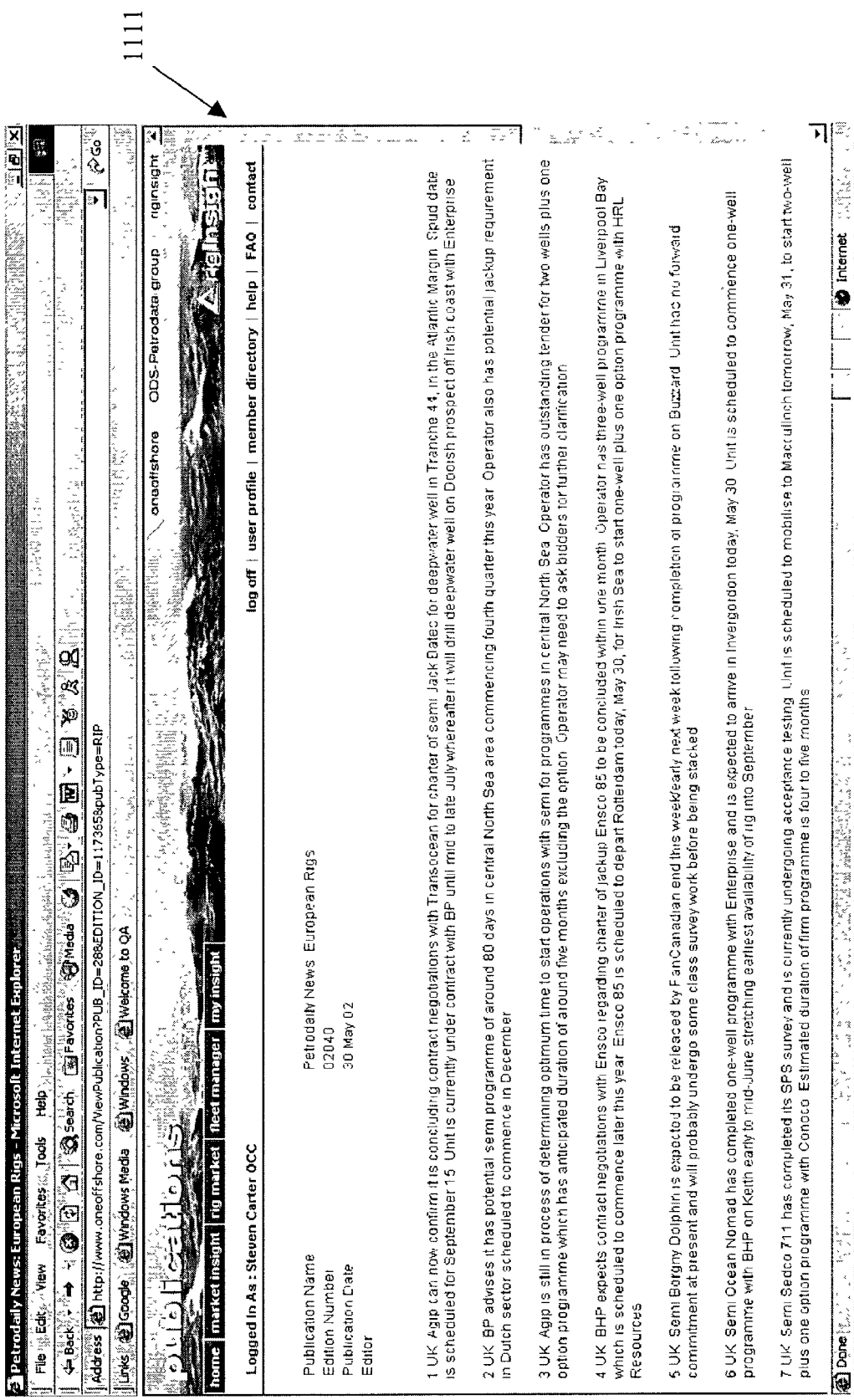
Figure 12:
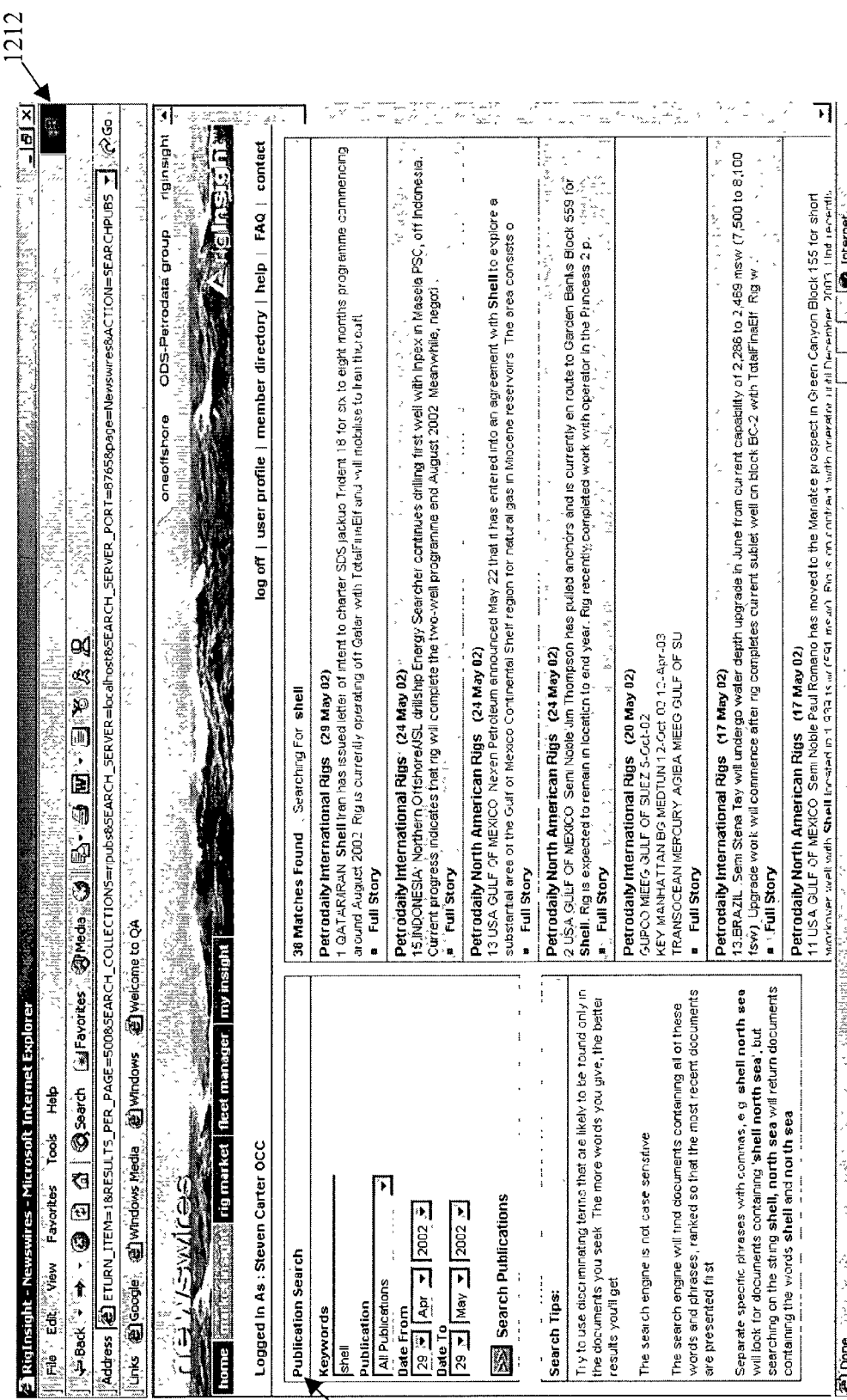

The build/modify query 906 function is illustrated by the screen capture of FIG. 10 where is shown a Publication Search box 1002. In FIG. 10, the view archived function is shown at 1018, and the view personalized news function is shown at 1020. Clicking on the search publications button 1010 shown in FIG. 10 causes the system 10 to display the summaries of the publications that match the entered query, as shown in the screen capture 1111 of FIG. 11. The screen capture 1212 shown in FIG. 12 illustrates the view results 912 function after entry of a sample query in the Publication Search box 1202.

Figure 13:
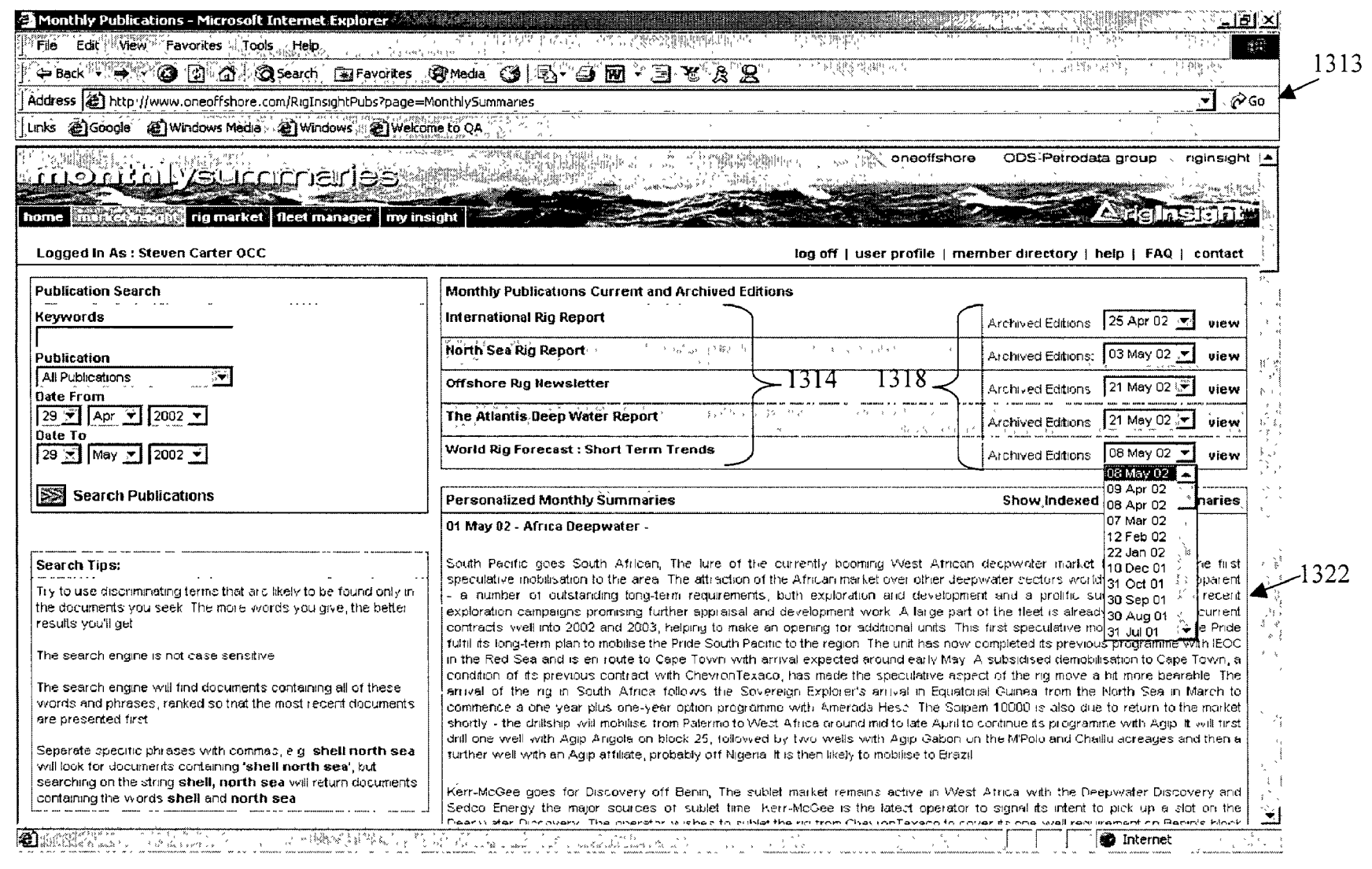

The screen capture 1313 shown in FIG. 13 illustrates the publications 102 information drawn from the monthly summaries 106 portion of the database 100, with the view current 914 function shown at 1314 and the view archived function 919 shown at 1319 and view personalized summary function 9922 shown at 1322. In this way, the Business Logic Engine 200, together with the Interface Engine 300 provide the User 16 with information that enhances the user's ability to design, develop, refine and execute rig fleet management plans using the Fleet Planning 212, Fleet Optimization 218, Collaboration Tools 216 and Day Rate Tool 220 discussed below.

Figure 14:
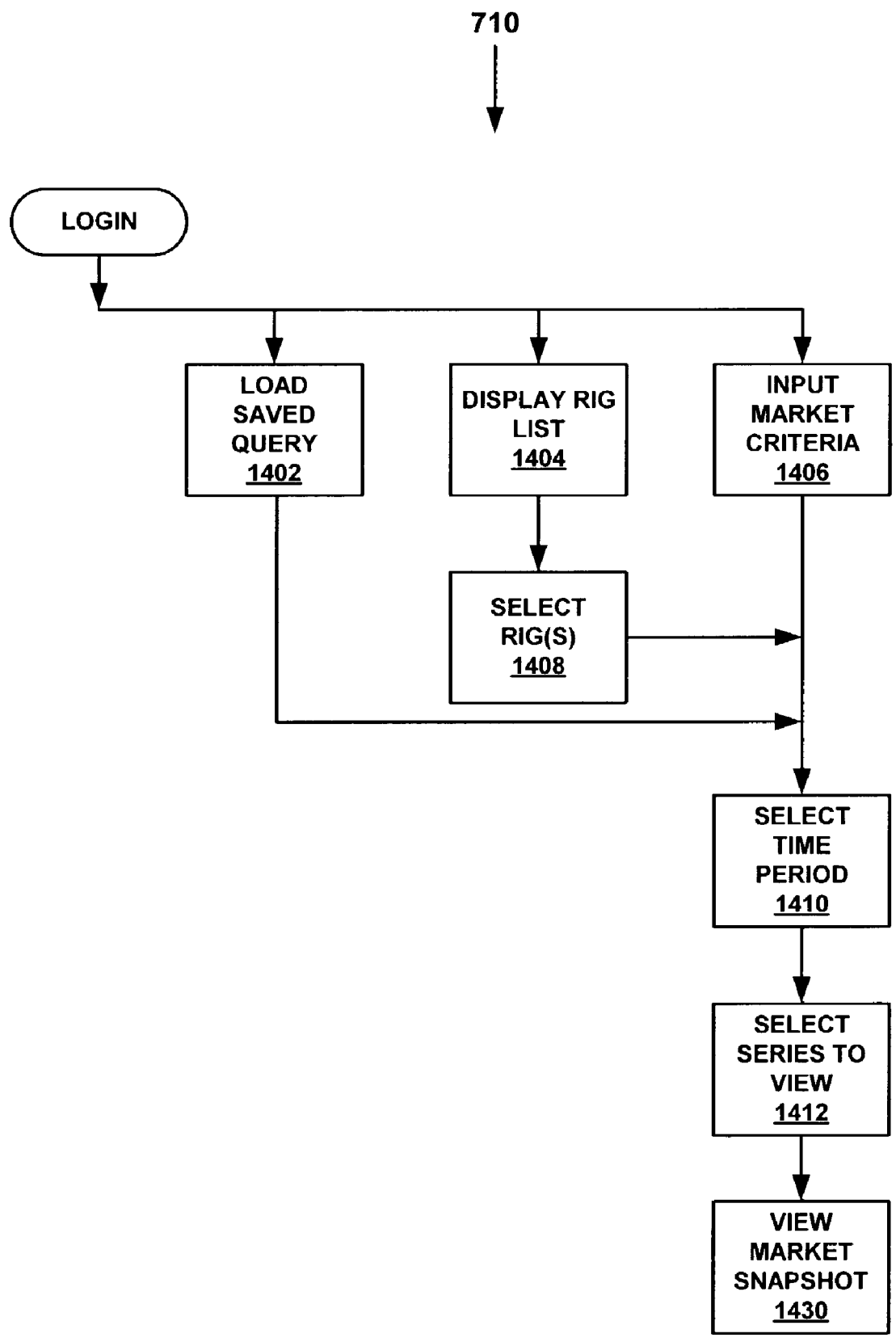
FIG. 14 is a flow chart illustration of an exemplary embodiment of the market snapshot feature of the invention.
Figure 15:
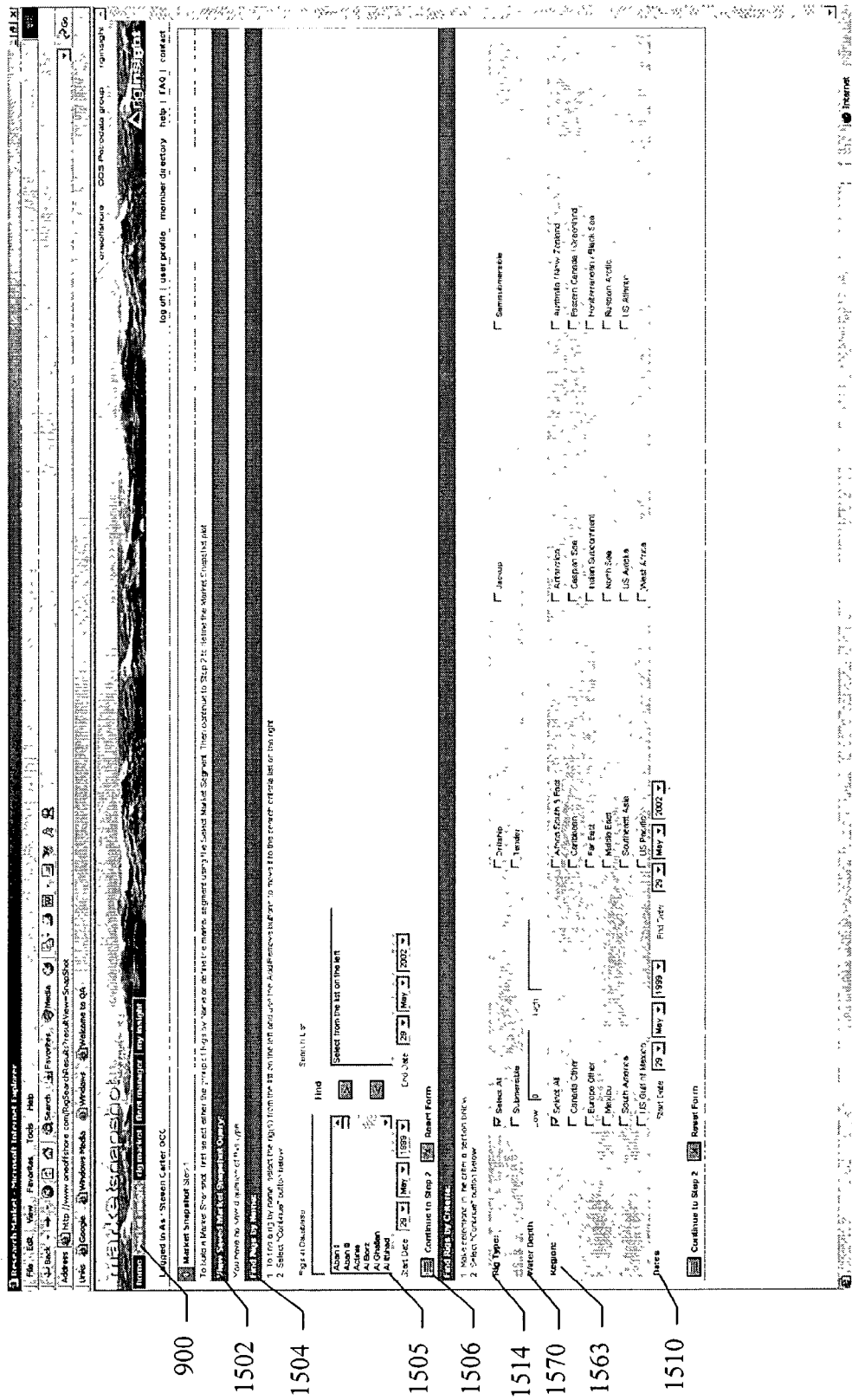
FIGS. 15, 16 and 17 are screen captures illustrating the market snapshot feature of the invention.
Figure 16:
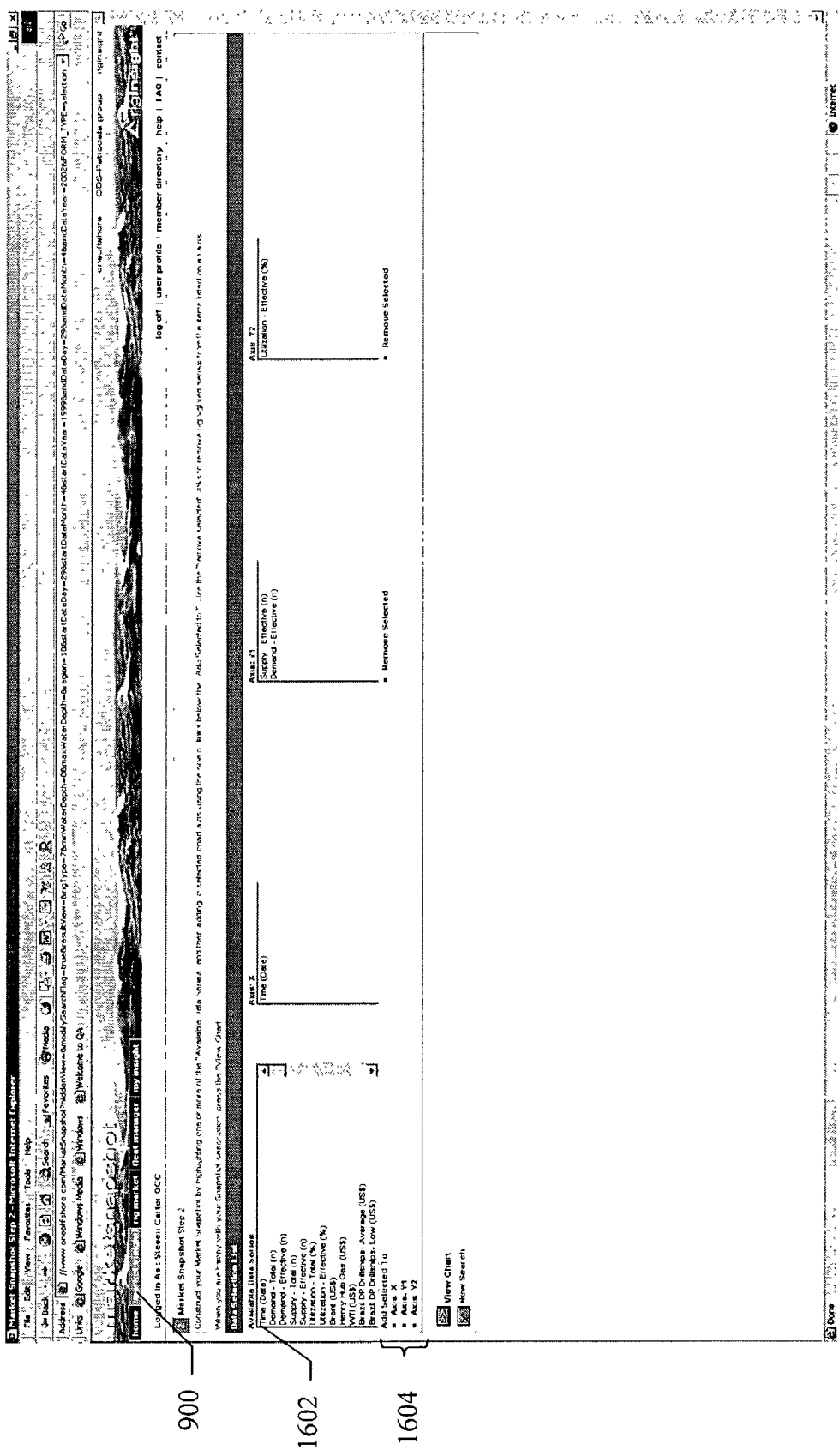
Figure 17:
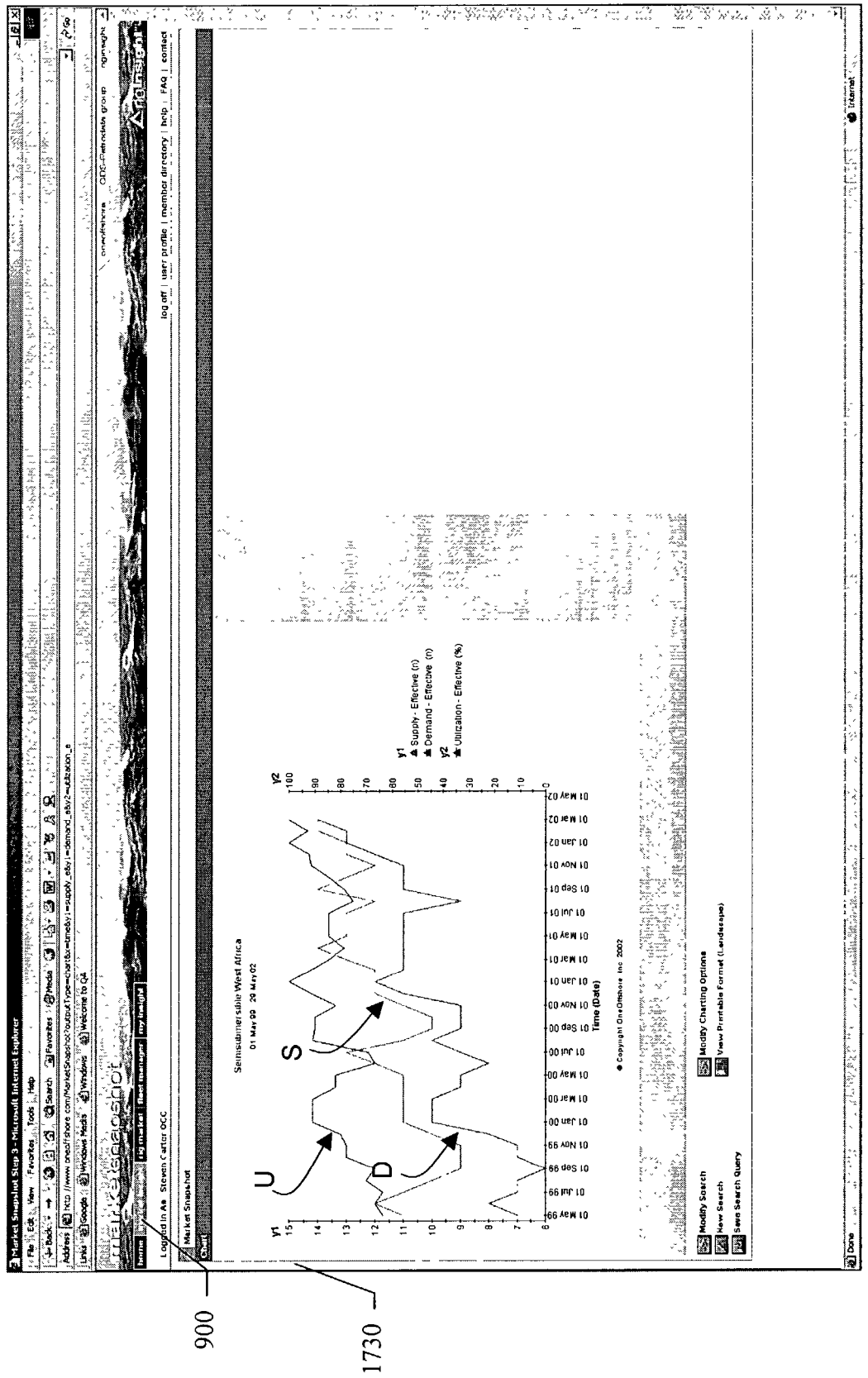

The system 10 provides the users 16 with a custom designed snapshot of the drilling rig market by way of the Market Snapshot function 710 illustrated in the flowchart of FIG. 14 and further illustrated by the screen shots presented in FIGS. 15, 16, and 17. In the illustrated embodiment, this feature is available under the Market Insight tab 900. The user can begin creating a customized snapshot by either loading a saved query 1502 or calling up from the database 100 the list of rig names 112 (see FIG. 3) by way of the Rig List function 1504. The user further selects a time frame by selecting a start and end date, shown at 1505 in FIG. 15. Those dates will determine the time frame to be displayed in the customized market snapshot. An alternative to selecting rig names is to enter rig data by way of the Find Rigs by Criteria function 1506. Invoking this function causes the Search Engine component 204 of the Business Logic Engine 400 to search the rig data to determine the group of rigs to include in the customized market snapshot. When the Market Criteria function is used to generate a list of rig names for the user-customized market snapshot, the user selects one or more rig types 1514, a water depth 1570, a time frame and one or more geographic regions or locations 1562 by way of the screen shown in FIG. 15.

As illustrated in the screen shown in FIG. 16, by way of a Data Selection List 1602 and axis selection radio buttons 1604, the user selects the particular data to include in the snapshot as well as the way the data will be displayed. Once the user selects all data options, the Report Engine 206 of the Business Logic Engine 200 processes the data input using data stored in the Database 100. The Interface Engine 300 generates the market snapshot in a chart such as chart 1730 shown in FIG. 17, where the line "U" represents effective utilization percentage over the time period of the X axis, "S" represents effective numerical supply and "D" represents effective numerical demand. The market snapshot feature of the invention provides the user with a useful tool to research the drilling rig fleet market from both the demand and supply side of the market and to evaluate trends in the market or the balance of supply and demand.

Figure 18:
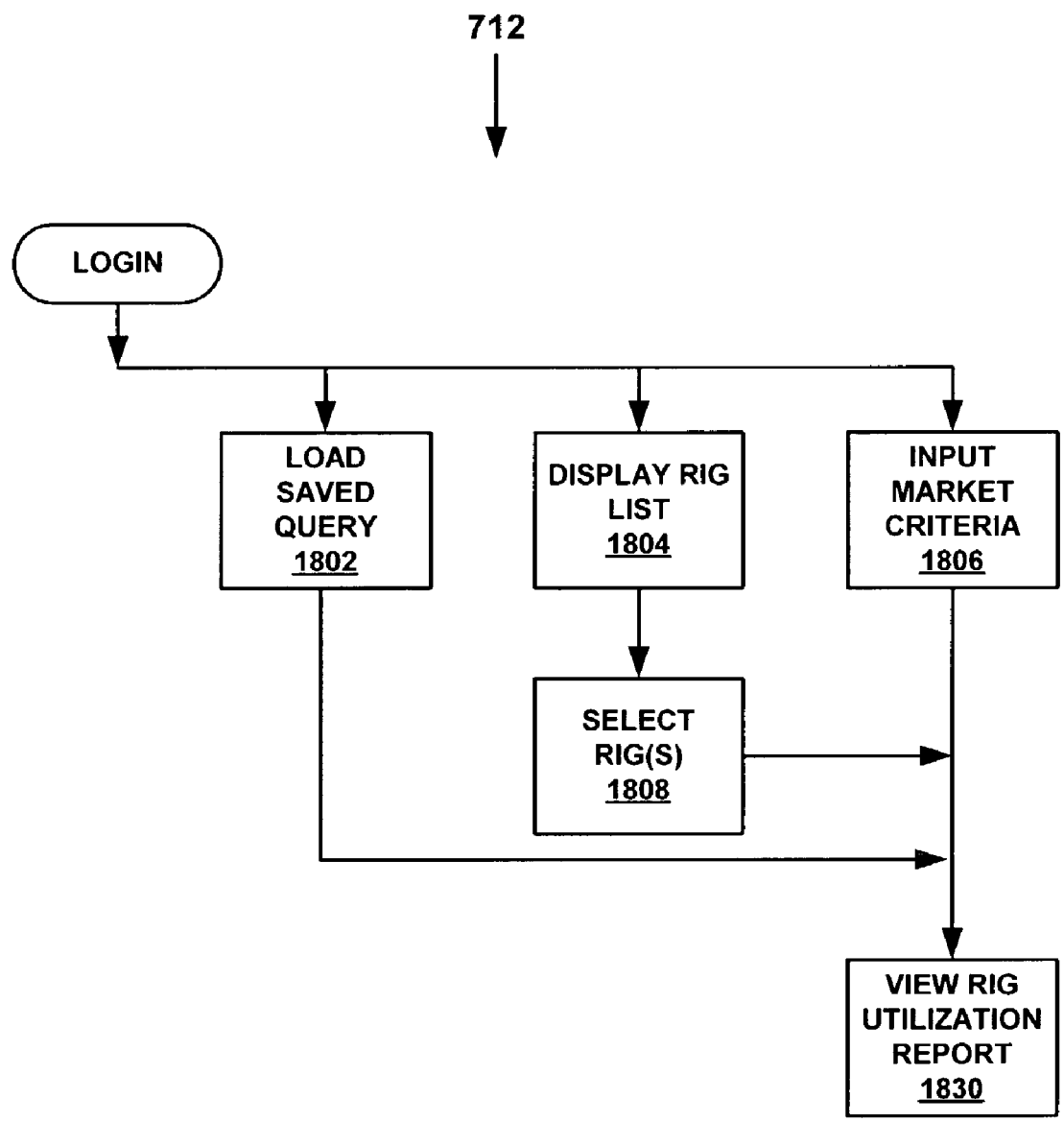
FIG. 18 a flow chart illustration of an exemplary embodiment of the rig utilization feature of the invention.
Figure 19:
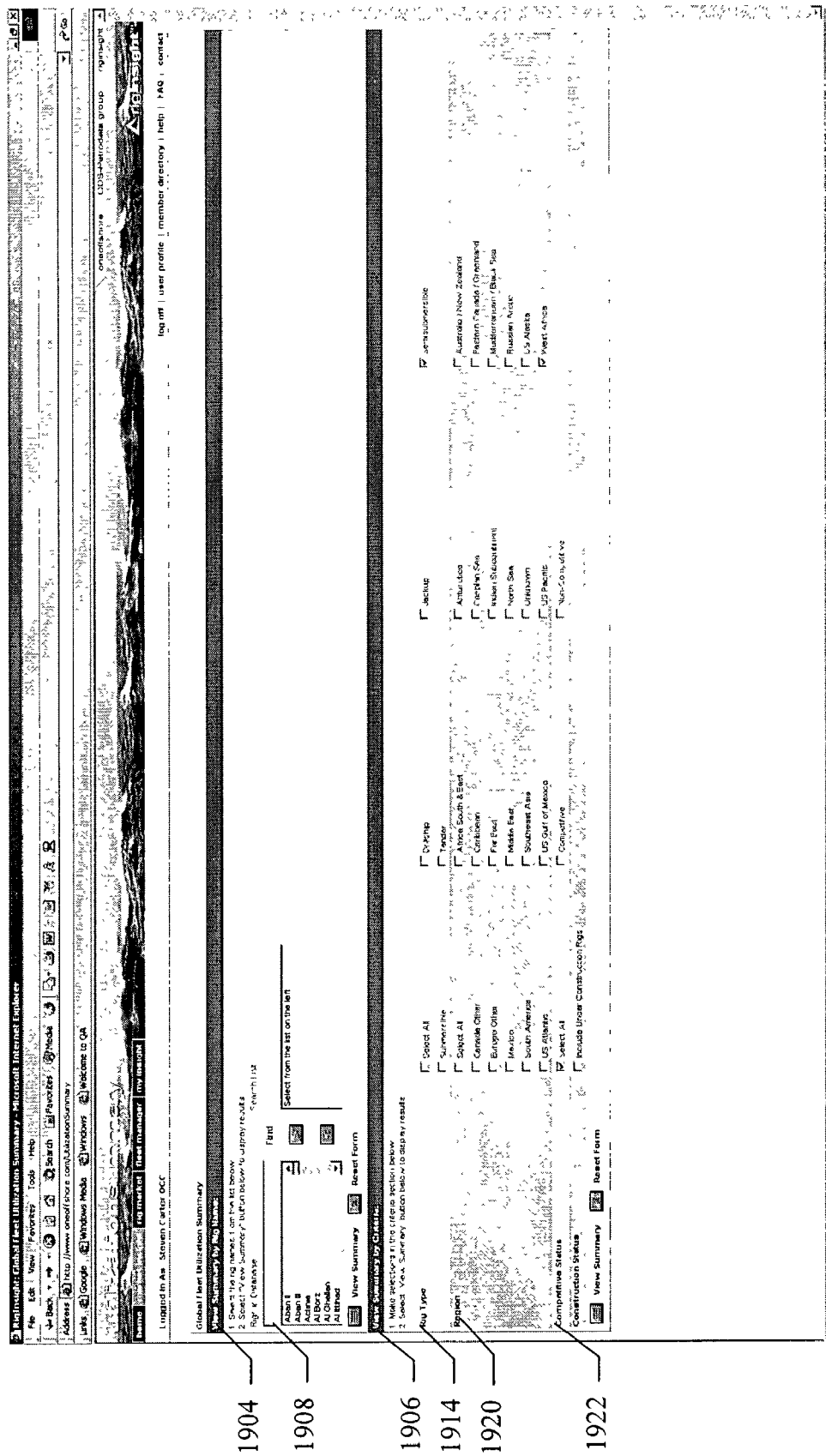
Figure 20:
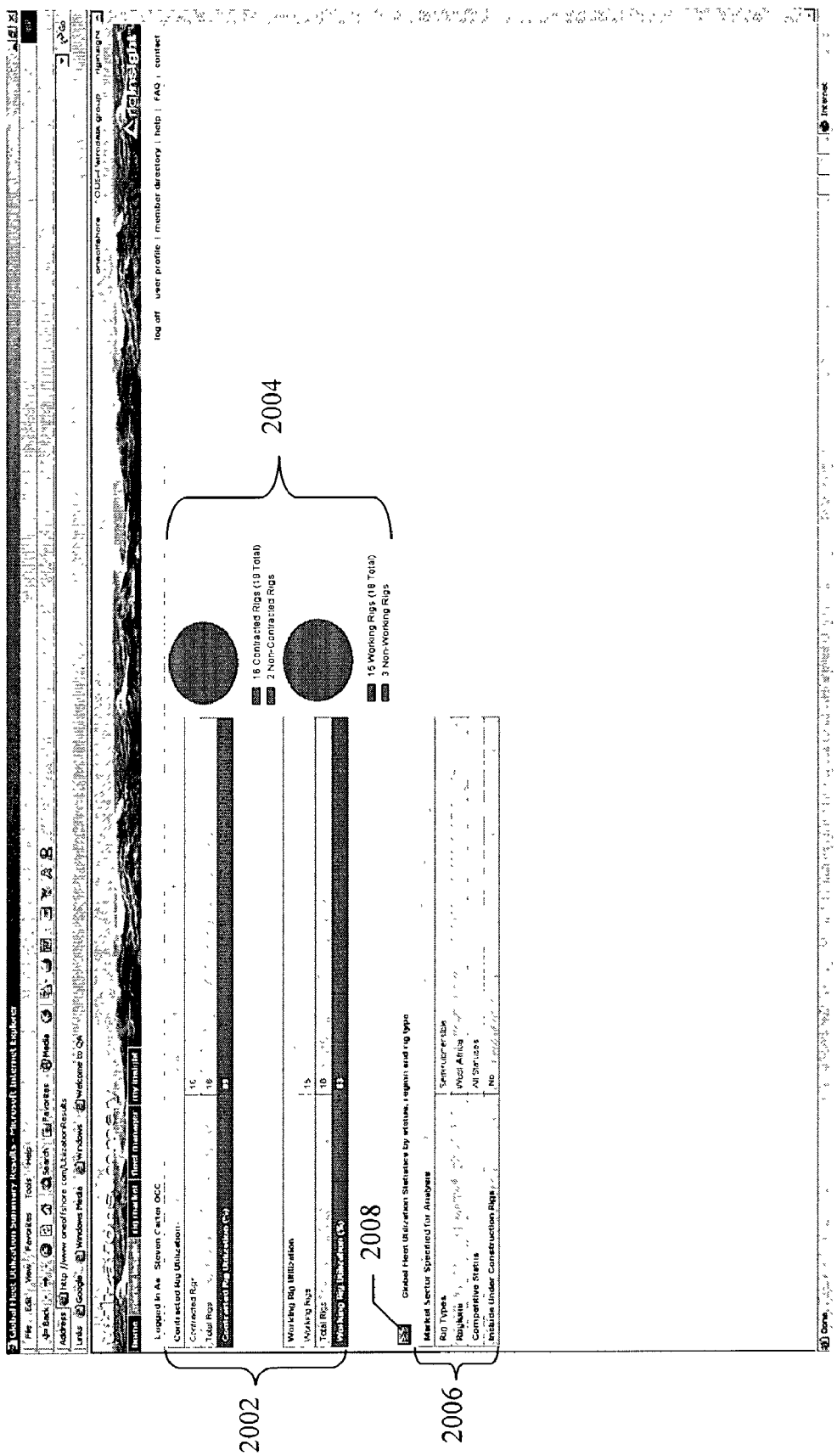
Figure 21:
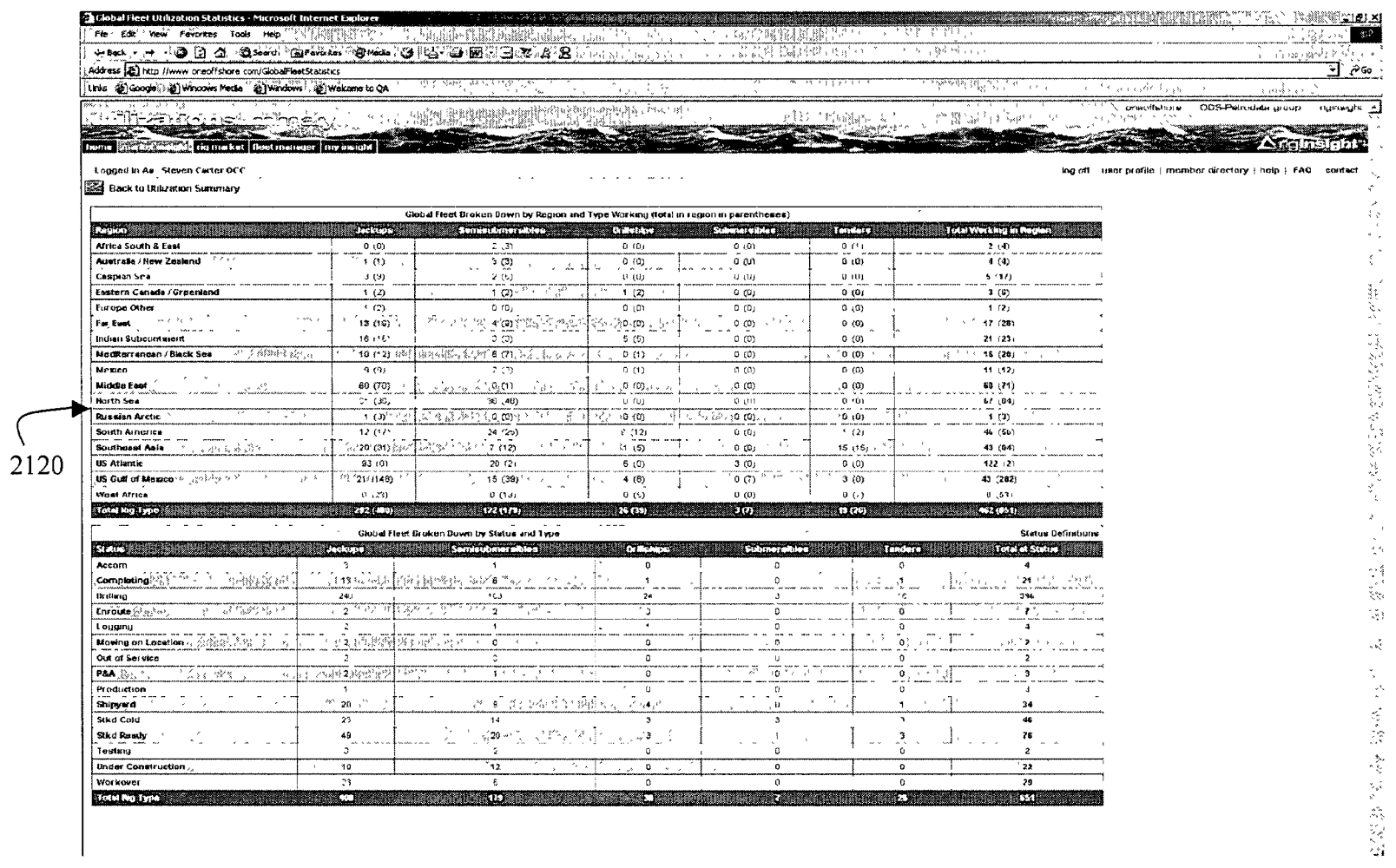

Another feature available when the Market Insight tab 900 is selected is the View Utilization Data function 712 shown in the flow chart of FIG. 18, and illustrate in the exemplary embodiment by way of the screens of FIGS. 19, 20 and 21. With reference to FIG. 18, with this function, the user can select particular rigs for the search engine 204 to retrieve from the database 100 by Load Saved Query 1802 or Display Rig List 1804 or Input Market Criteria 1806.

With reference to the screens of FIGS. 19, 20, and 21, FIG. 19 illustrates how a user selects Rigs from those in the database using the View Summary by Rig Name option 1904. View Summary by Criteria 1906 enables the user to select one or more rig types 1914 and one or more geographic regions or locations 1920, as well as selecting either or both competitive and non-competitive rigs, and has the further option of including rigs under construction, as illustrated at 1922 and 1924 respectively.

FIG. 20 illustrates how the report engine 206 can generate the customized rig utilization summary based on results produced by the search engine 204 which searches the all drilling rig information to provide details on the location and current status of all rigs in the global fleet of rigs. The display produced by the Interface Engine 300 includes the utilization statistics in both numerical table form, shown at 2002 and pie chart form, shown at 2004, along with a display of the user selected market criteria that generated the results, shown at 2008 in FIG. 20. With reference to FIG. 21, selecting the Global Fleet Utilization Statistics button 2008 cause the system 10 to display statistics in table form illustrated by screen 2120.

Market analysis tools are available by way of Rig Market tab 1000. One important available tool is the Search Supply function 718 shown in the flow chart of FIG. 22 and illustrated by the screens of FIGS. 23A through 29. The user can be a rig owner user 16a or rig contractor user 16b who needs to know what rigs are available that might be competing for a particular drilling project. A Well Operator/Non Operator User 16b might use the Supply Search function 718 to search for a rig to begin or continue a drilling project. Any category of user might use the tool to check rig market supply conditions for planning, utilization, selection or deployment purposes. Once electing to use the Search Supply function 718, the Interface Engine 300 makes available to the user categories of information pulled from the database 110.

Figure 23A:
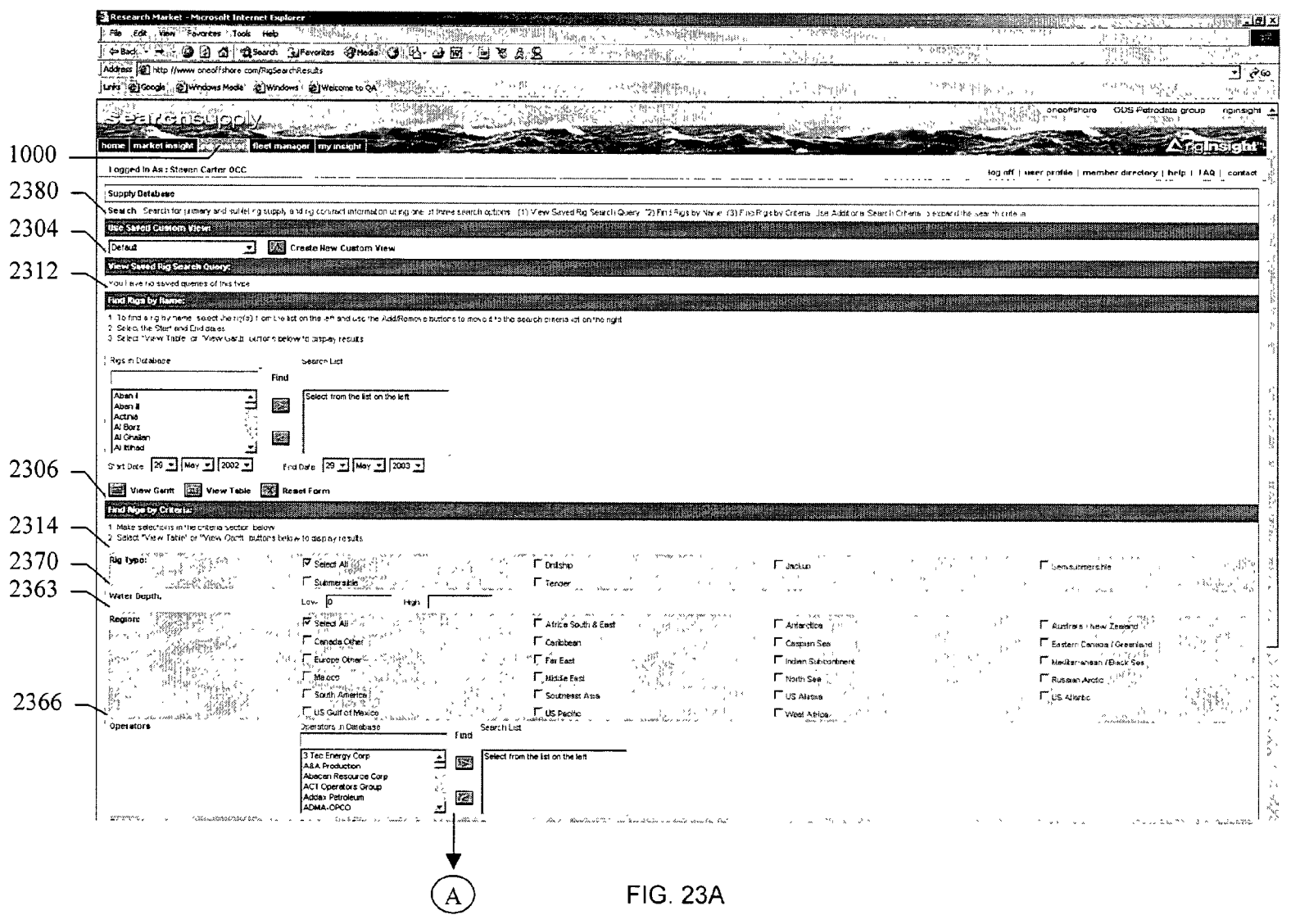

If the user has previously created a set of search criteria and saved the criteria, the user can begin by loading Saved Query 2204 by calling up that query from the database 100 using the View Saved Rig Search Query option 2304 as illustrated in the Screen of FIG. 23A. Alternatively, the user can select rig names 2212 from the list of names in the database, as shown in FIG. 23A at 2312. A third option provided by the system 10 is build Query 2206 or change the saved query using drop down menus and check lists containing various search parameter options that call on data stored in the database 100. The user builds a query by using the Find Rigs by Criteria option 2306. Available search criteria match the categories of information in the database 100 that relate to rig projects that dictate available rig supply at any point in time and rig technical specifications that define rig capability. Those criteria include rig type 2314, water depth 2370, region or locations 2362, operators 2366, and contractors 2316, and rig status 2322. Additional criteria are available for specifying more details about the rig technical specs by way of the additional criteria function 2213, invoked by selecting the Additional Criteria button 2313 on FIG. 23, which displays a drop down list of all rig technical specifications contained in the database 101, as illustrated at 2413 in FIG. 24.

Figure 22:
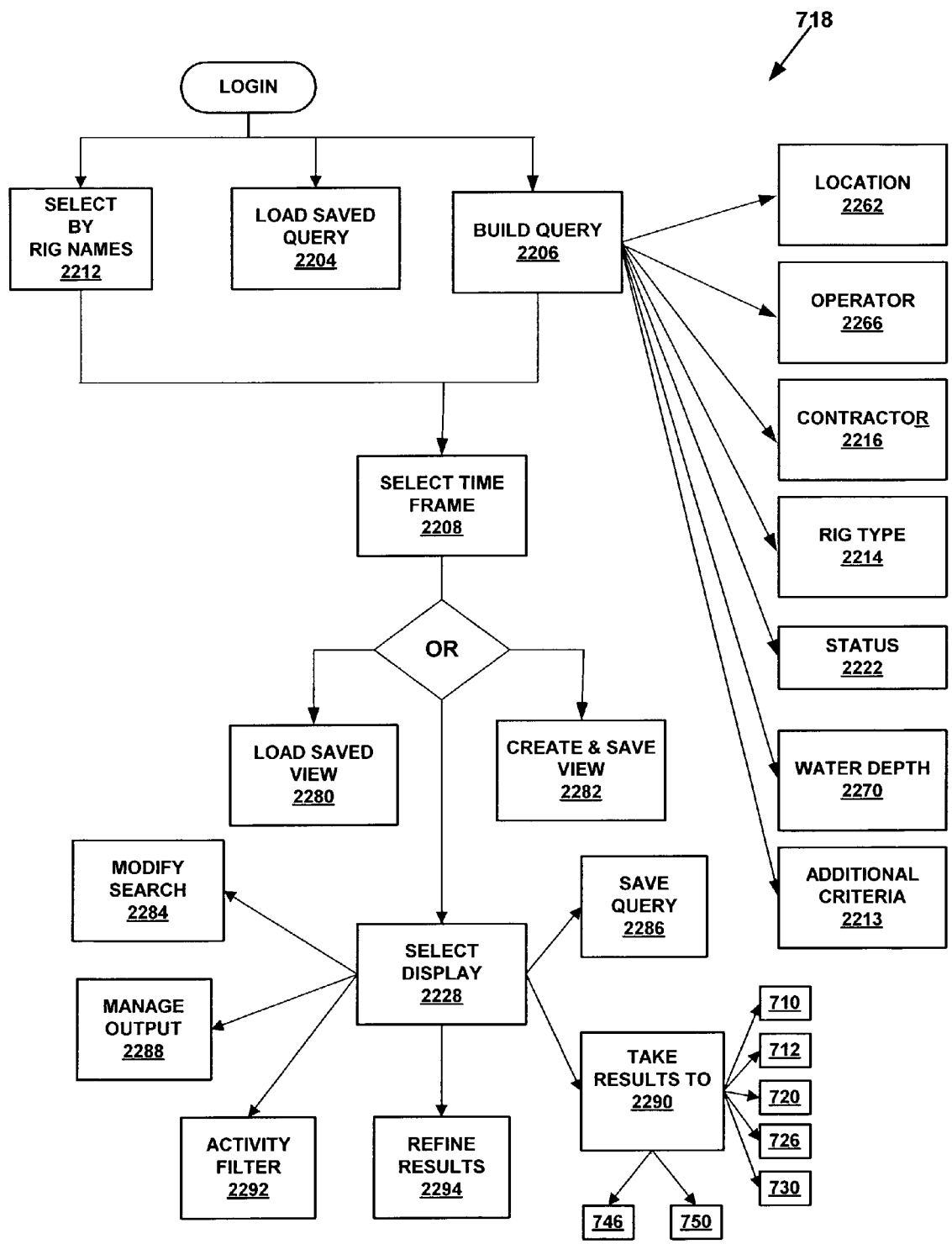
FIG. 22 is a flow chart illustration of an exemplary embodiment of the search supply feature of the invention.
Figure 23B:
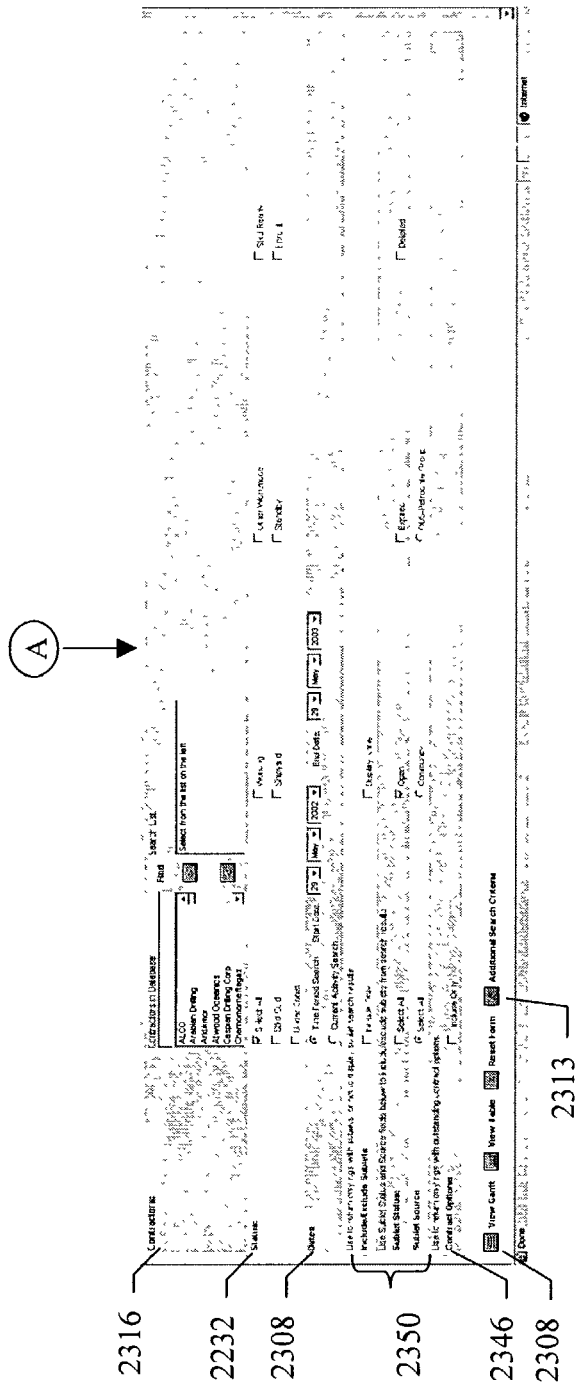
Figure 24:
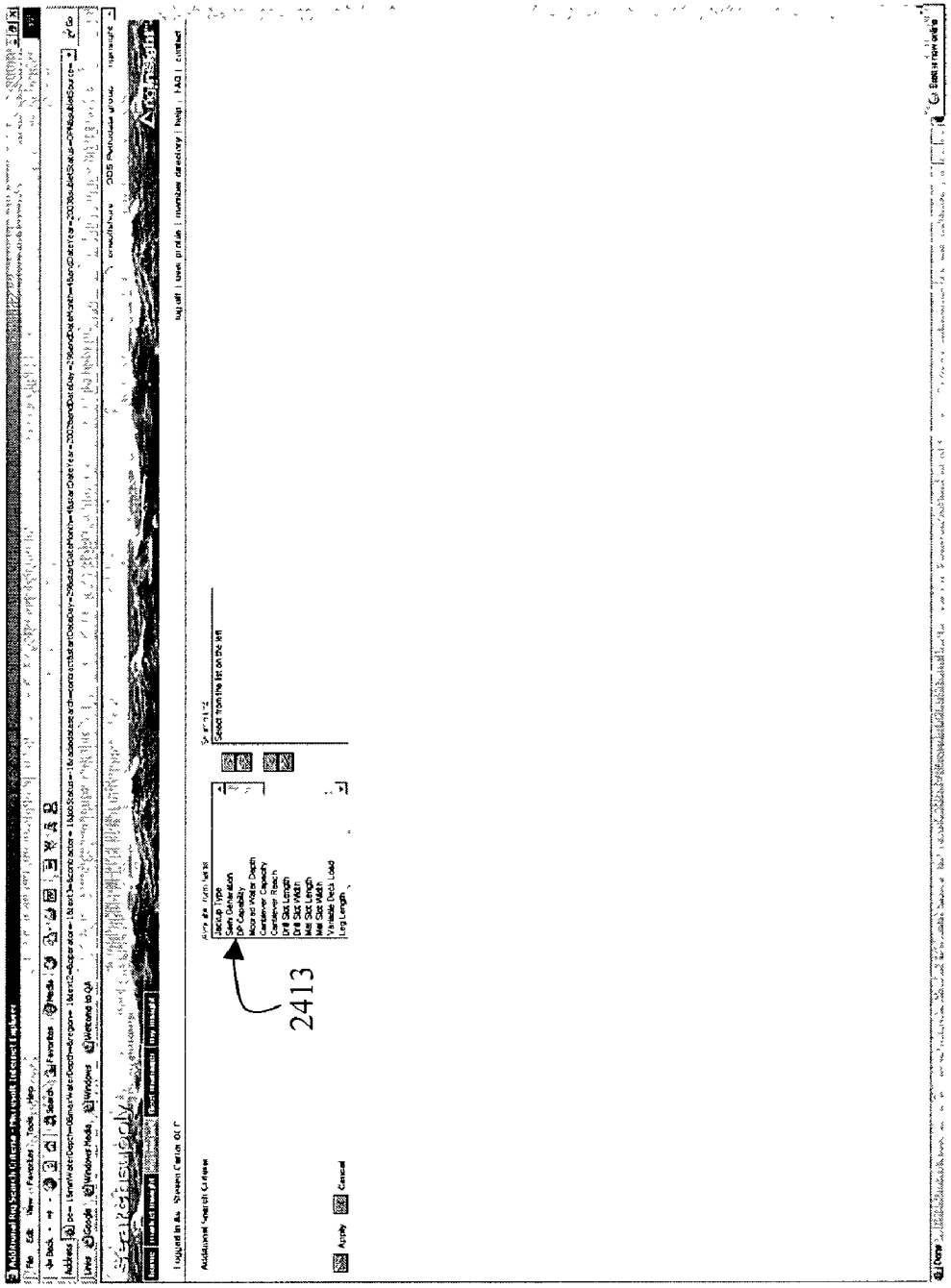

The user must select a time frame 2208 to be covered by the supply search results by entering Dates 2308. Additional rig activity options for the search are available as by way of sublet options 2350 which pull sublet information 150 and 2346 which pulls options information both from the contract data portion 140 of the database 100. Once the query is entered into the system 100, the Search Engine 204 portion of the Business Logic Engine 200 operates on the query to create results data for display by the Interface Engine 300. The Load Saved View function 2280 and the Create & Save View function 2282 shown in the flow chart of FIG. 22 are available to a user on the search supply screen under the heading Used Saved Custom View 2380 shown in FIG. 23A. After entering all of the search and view criteria, the user calls on the Search Engine 204 and the Report Engine 206 by selecting to view the results in either a Gantt or Table view by selecting the buttons shown in FIG. 23B at 2308.

Figure 25:
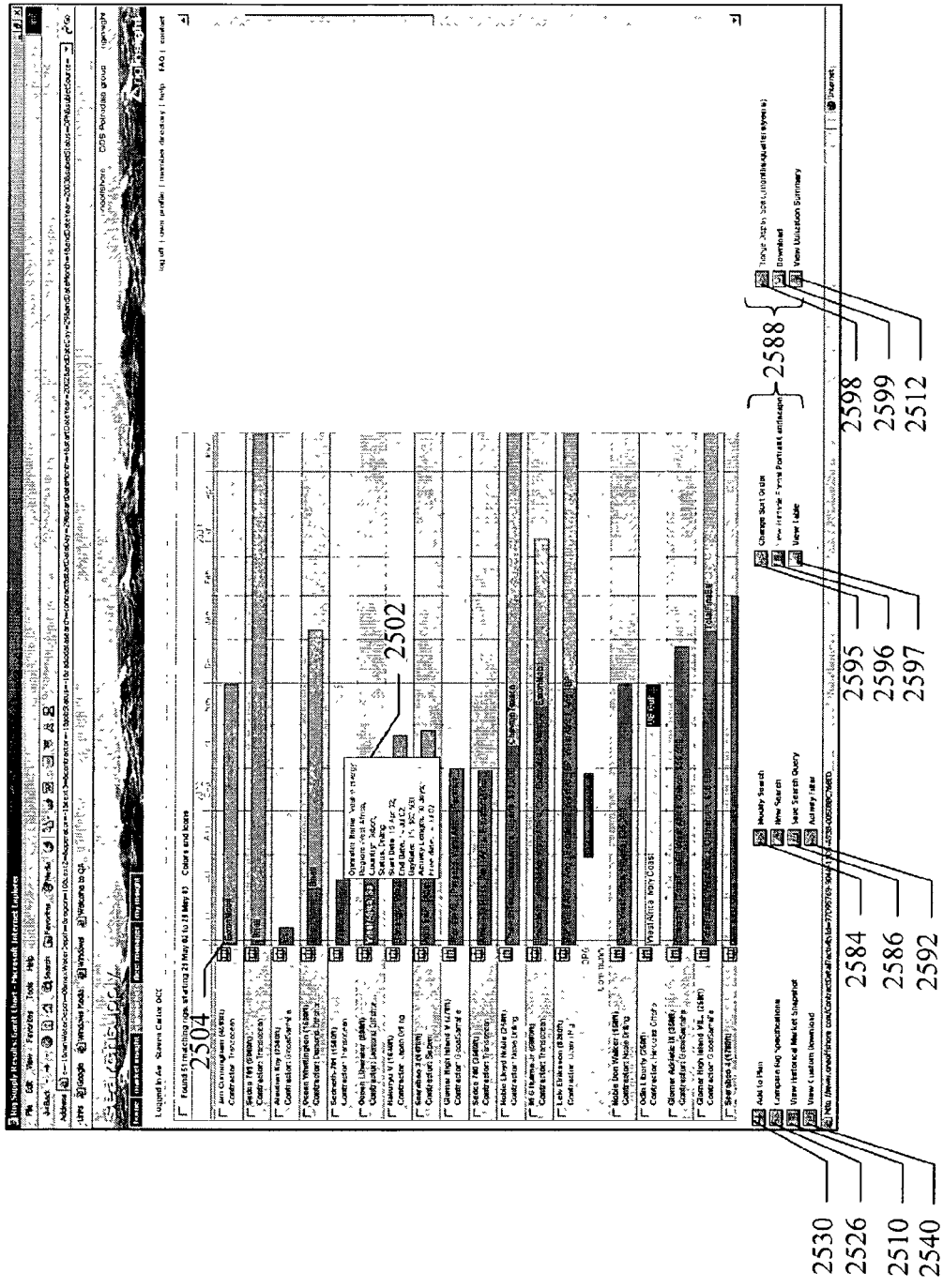

With reference to FIG. 25, there is shown an example of the results of a supply search in Gantt view. The illustrative search yielded 51 matching rigs, the first 17 of which are shown in the screen capture of the Gantt view in FIG. 25. This view includes a line for each named rig with all activity for that rig during the selected time frame shown in the Gantt view bars for each rig. To see all of the Rig Data 110 for any listed named rig, the user simply clicks on the rig name. To see all of the Activities Data 160 relating to a particular named project shown in the Gantt view bars, a user simply rolls over the bar. A sample of that activity detail display drawn from the Activities Data 160 in the database 100 is shown in FIG. 25 at 2502. The rig type of each rig is conveniently displayed by way of Rig Type icons 2504.

Once the data is displayed, the user has a number of further options for viewing and saving and using the collection of information retrieved from the database 100, as shown by the buttons at the bottom of the screen in FIG. 25. The user can Modify Search 2584 by invoking the modify search function 2284, Save Search Query button 2586 by invoking the Save Query function 2286, Manage Output 2288 by selecting any of the Output buttons 2588, or Take Results 2290 to any of several other functional features including the View Market Snapshot 710 and the View Utilization Data 712 functions discussed above, as well as the Search Demand 720, Compare Rigs 726, and Build Fleet Management Plan 730. The search results can also be taken to and used with the View & Compare Rig Performance 745 and Create Custom Data File 750 functions, to be discussed below. Illustrating the Take Results To function 2290 are correspondingly numbered buttons 2510, 2512, 2526, and 2530.

The Manage Output function illustrated by the buttons 2588 include changing the sort order, 2595, and viewing a printable format for the results 2596, as well as changing to a table view 2597, changing the display scale 2598, and downloading the results in a data file format suitable for use with other database or spreadsheet software 2599. In addition, if the user has previously chosen download options and saved them, or wishes to specify custom download options, the user can View Custom Download shown at 2540 in FIG. 25.

Figure 26:
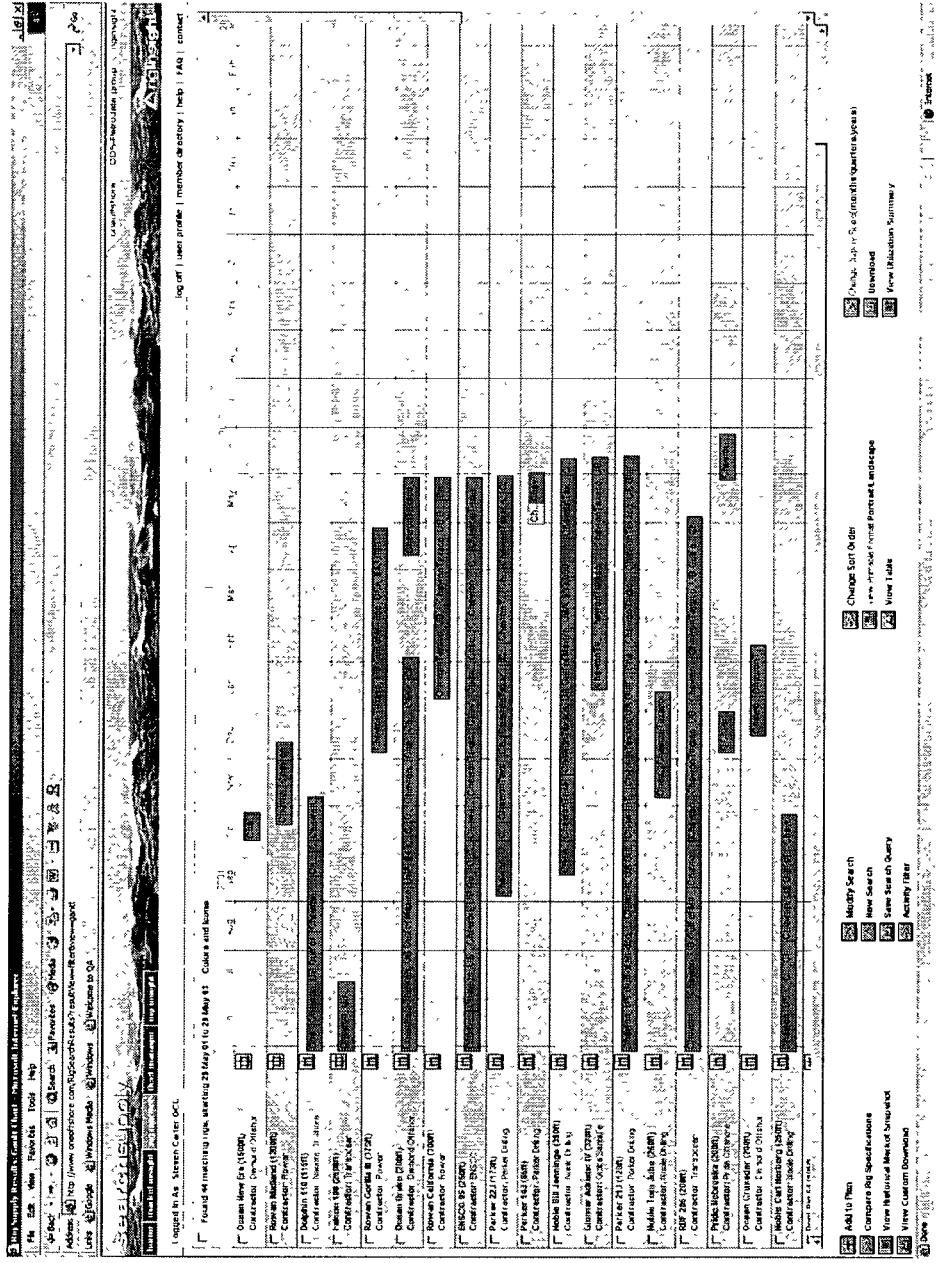

As noted above, the Gantt view shows all activities for all rigs during the entire time period designated by the search query. The search results can be filtered using the Activity Filter 2292 by way of the Activity Filter button 2592. FIG. 26 illustrates the result of invoking the Activity Filter function 2292, which removes from the Gantt view all rig activities that do not match the rig activity data selections made by the user in the search query. In other words, in the exemplary embodiment, the first data display of FIG. 25 shows all activities for all of the rigs matching the user selected Rig Data 110 and where any activity matches user selected Activities Data 160. The display of FIG. 26 shows the results of the Activity Filter 2292 removing from the matching rigs the activity data that does not match the user selected Activities Data 160 portion of the search query.

Figure 27:
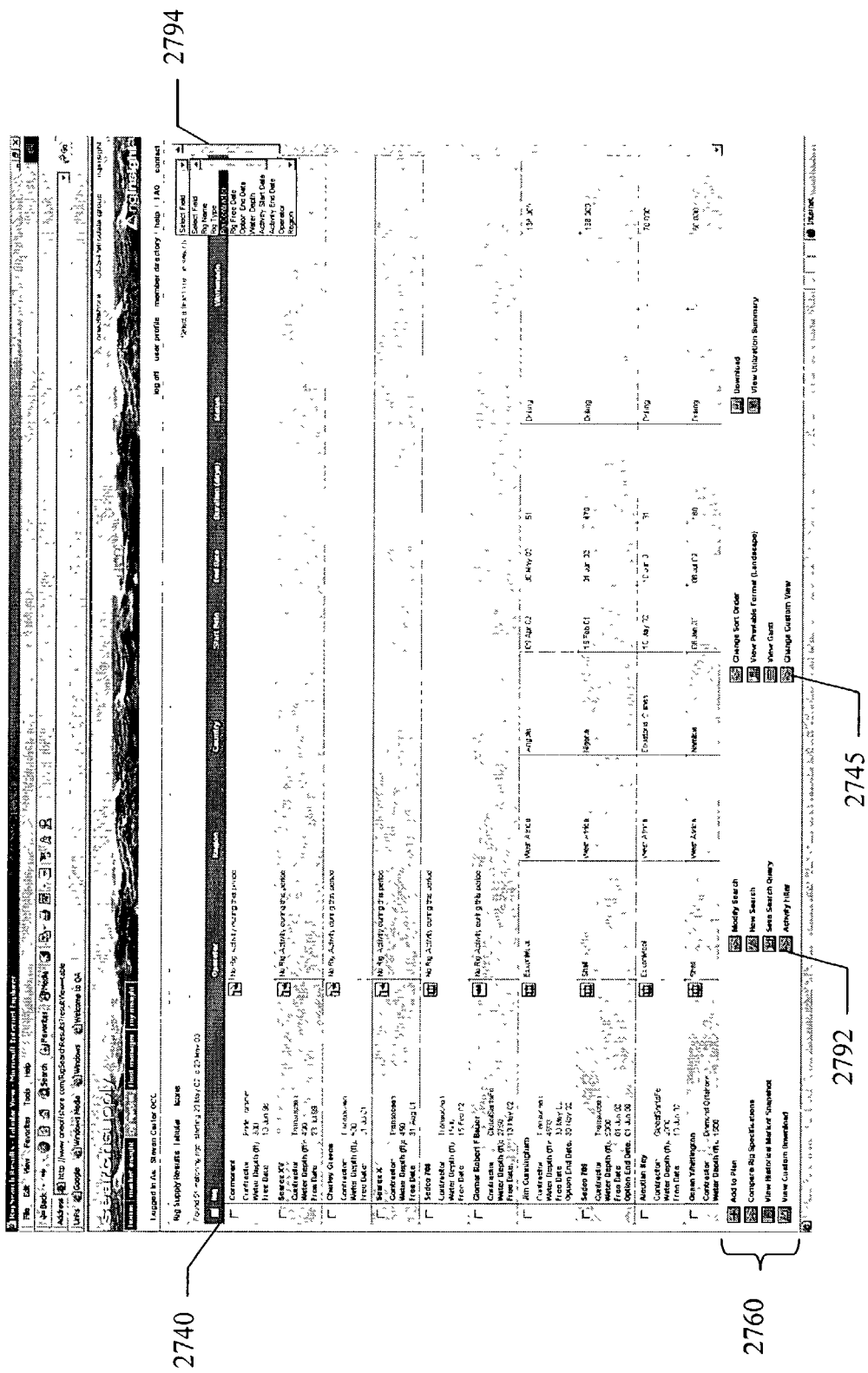
Figure 28:
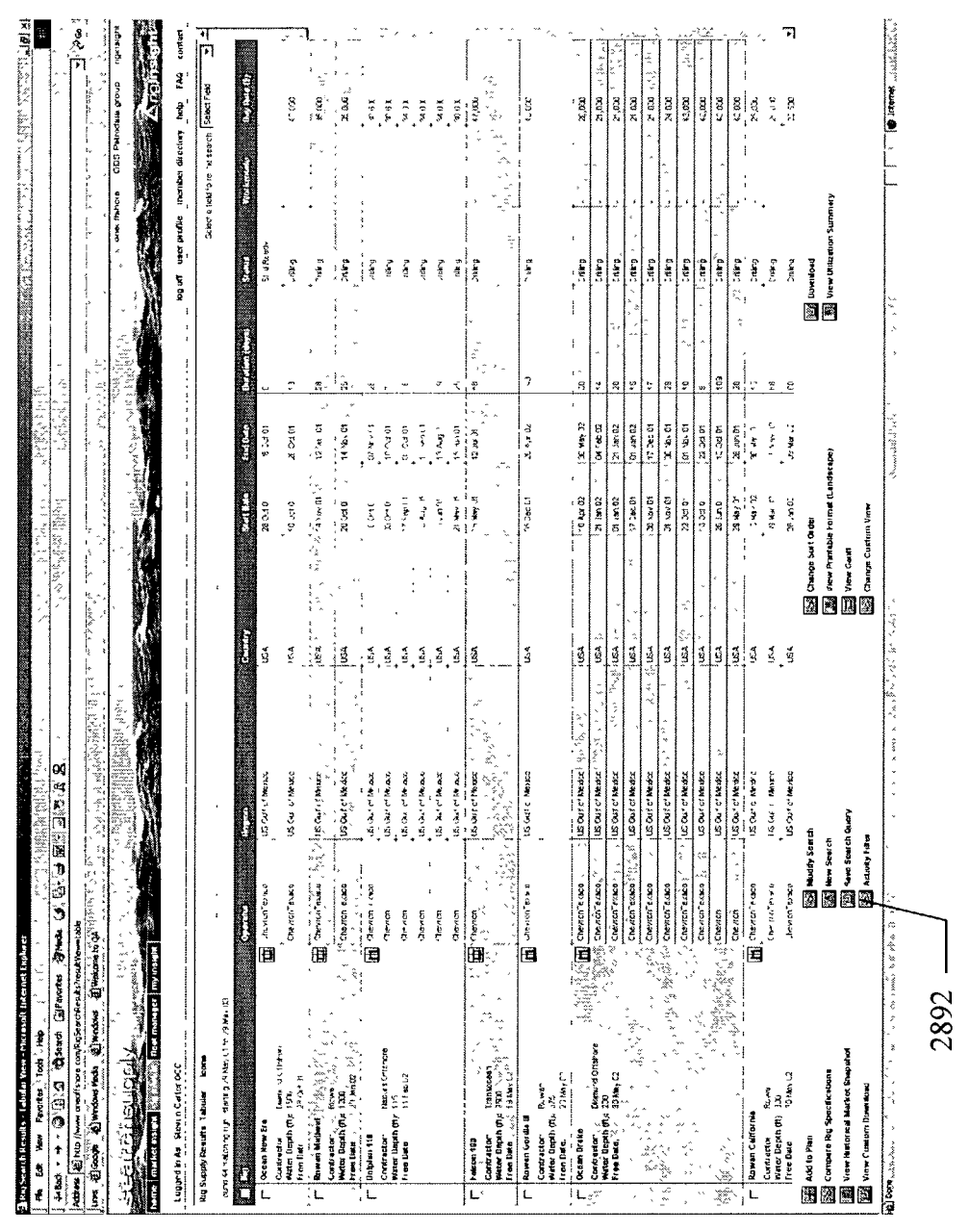
Figure 29:
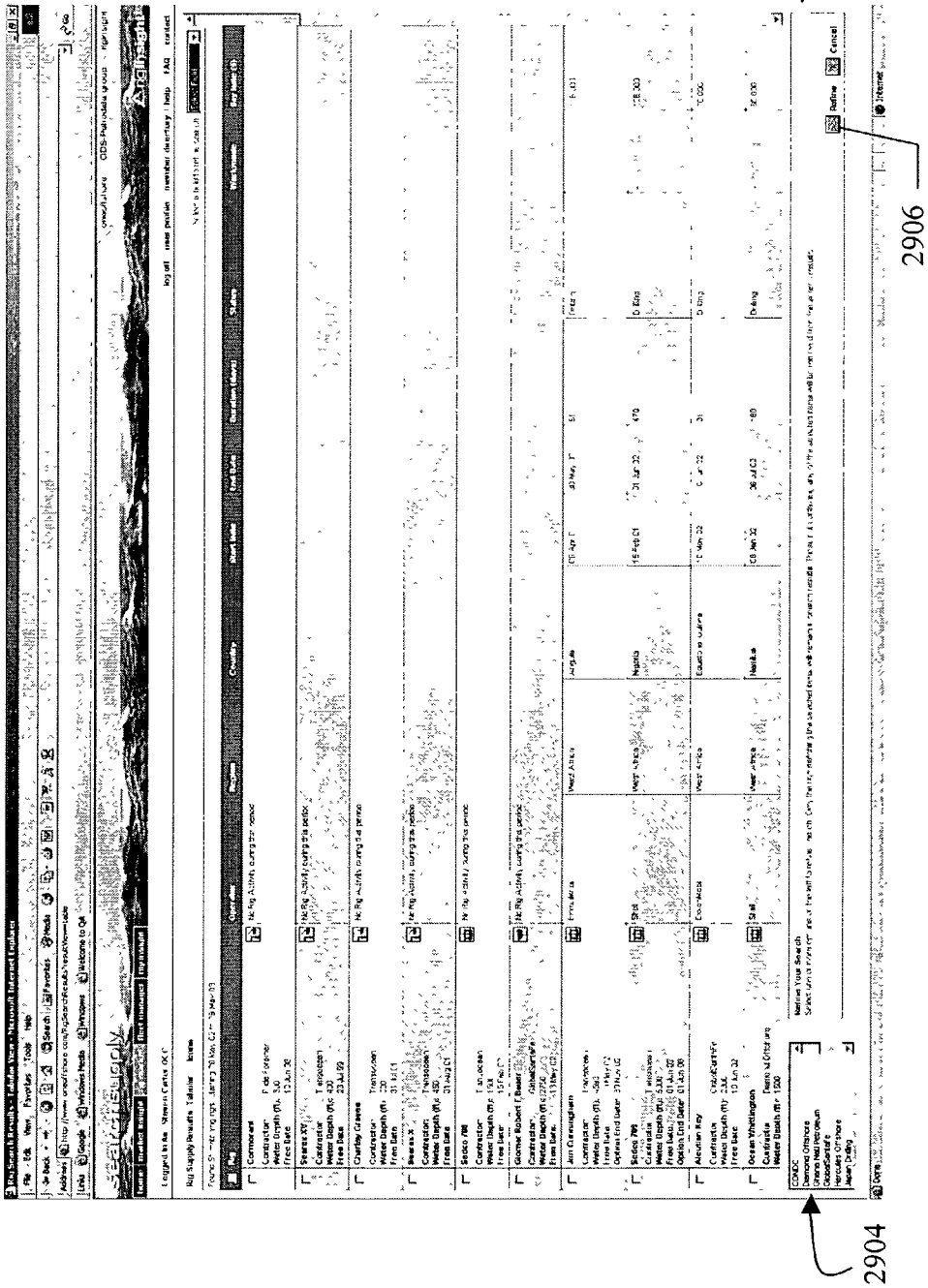

Turning now to the Table View display of search results, with reference to FIG. 27, search results are shown again listed by rig name, with rig details displayed in the rig name column, a rig type icon, with the remaining data displayed in separate columns headed Operator, Region, Country, Start Date, End Date, Duration, Status, Workmode and Day Rate columns, as shown at 2740 in FIG. 27. The columns presented can be modified using Change Custom View 2745. The Table View display includes the option to Refine the search according to any one of the listed fields shown in FIG. 27 at 2750. While viewing the results in the Table Format, the user has the same set of options as those available from the Gantt view, illustrated by the button options 2760 at the bottom of FIG. 27. The Activity Filter 2292 applied to the table view yields filtered results as illustrated in FIG. 28 invoked by using the Activity Filter button 2892. The search itself can also be further refined from the Table view using the Refine Your Search 2902 option shown at the bottom of FIG. 29. When this option is invoked, a list box 2004 containing numerous potential criteria selections that could be refined to eliminate some of the displayed data is made available for selection and then activated by way of the Refine button 2906.

Figure 30:
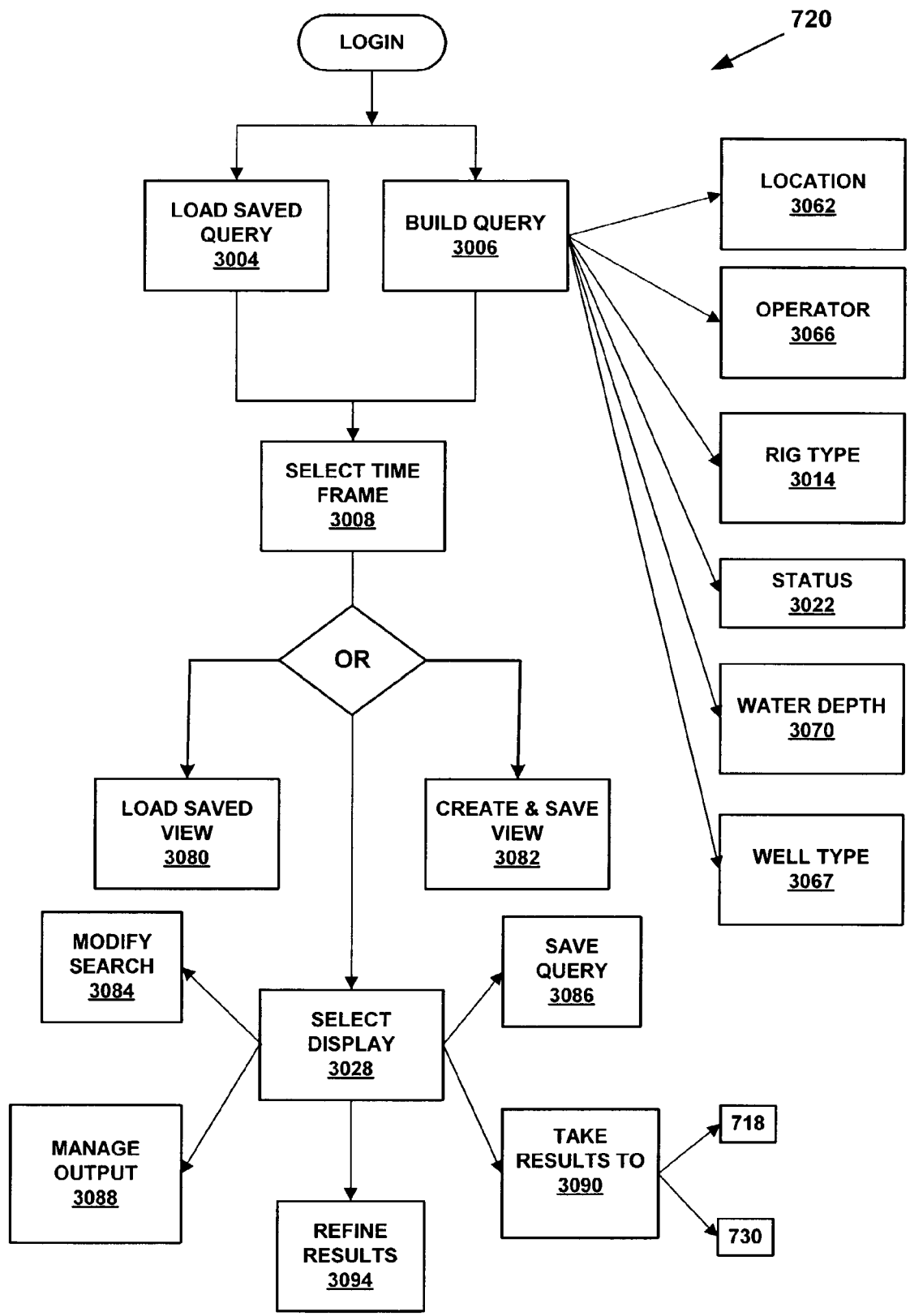
FIG. 30 is a flow chart illustration of an exemplary embodiment of the search demand feature of the invention.

The database 100 information relating to the demand side of the rig market can be explored using the Demand Search 720 feature of the invention, illustrated by the flow chart of FIG. 30 and the screen captures of FIGS. 31 through 34. The Demand Search functions in the same way as the Supply search function discussed above except that the portions of the database from which information is drawn relates to the demand rather than supply side of the rig market. The user can load saved query 3004 or build query 3006. For building the query, the system selects the categories of database information relevant to a demand search which include: location 3062, to draw query information from the location 161 data in the activities data 160 portion of the database 100; operator 3066, to draw query information from the operator 163 data in the activities data 160 portion of the database 100; rig type 3014 to draw from the type 114 location in the rig data 110 portion of the database 100;, status 3064 to draw from the status 1164 location in the activities data 160 portion of the database 100; and well type 3067 and water depth 3070 to draw from the well type 164 and water depth 166 portions of the activities data 160. The user 16 then needs to select time frame 3008, can load saved view 3080 or create & save view 3082 and then select a display option 3028. The user can modify search 3084, manage output 3088, refine results 3094, save query 3086 or take results to other functionalities of the system 10 by way of the take results to function 3090. Other functions where a demand search query result would be useful include search supply 718 or build fleet management plan 730.

Figure 31:
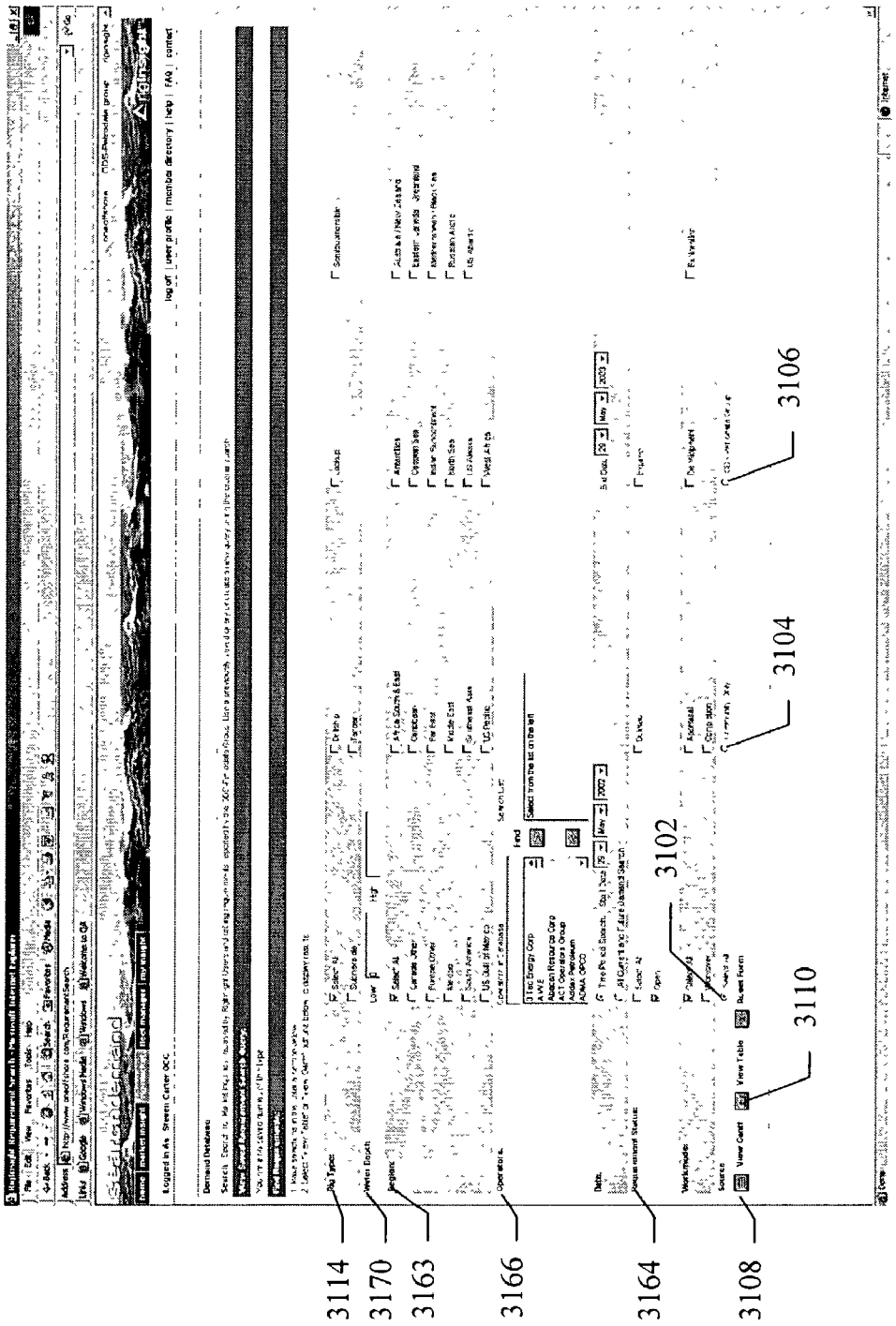
FIGS. 31, 32, 33, and 34 are screen capture illustrations of the search demand feature of the invention.

The differences between the search demand 720 and the search supply 718 functions are best illustrated by an example of a search query and the results generated by the Interface engine 300 of the system 10. As shown in FIG. 31, the user 16 has used the build query 3006 function to find market demand by making selections in query boxes labeled rig type 3114, water depth 3170, region 3162, operators 3166, and two status 3164 boxes labeled requirement status and workmode.

Note that in the screen shown in FIG. 31, the user also has the option of choosing to search in the entire database 100 by using Select All source button 3102, or to search only in the demand information supplied by members of the community of users by way of community only source button 3104 or to search only published shown in FIG. 31 at 3016. The business logic engine 200 of the system 10 flags incoming data received from community members as either private or community data, based on the users choices when using the various functions of the system that receive data from users. Only the Users Community Data can be searched in this function 720. See the discussion below of the market inquiry function 722 shown in FIG. 35.

As with the supply search 718, the interface engine 300 of the system 10 can generate the demand search 720 results in both a Gantt View and Table view. The illustrated demand search yielded 190 matching operators meeting the users' requirements inquiry, the first 14 of which are shown in the screen capture of the Gantt view in FIG. 32 by way of results Gantt chart 3200. The demand search Gantt view includes a line for each operator's requirement or rig that matches the demand query, with all activity conducted by that operator during the selected time frame being displayed in the Gantt view bars for each operator. To see all of the Activities Data 160 relating to a particular rig project shown in a Gantt bar, such as Gantt bar 3202 in FIG. 32, a user simply clicks on the bar.

Figure 32:
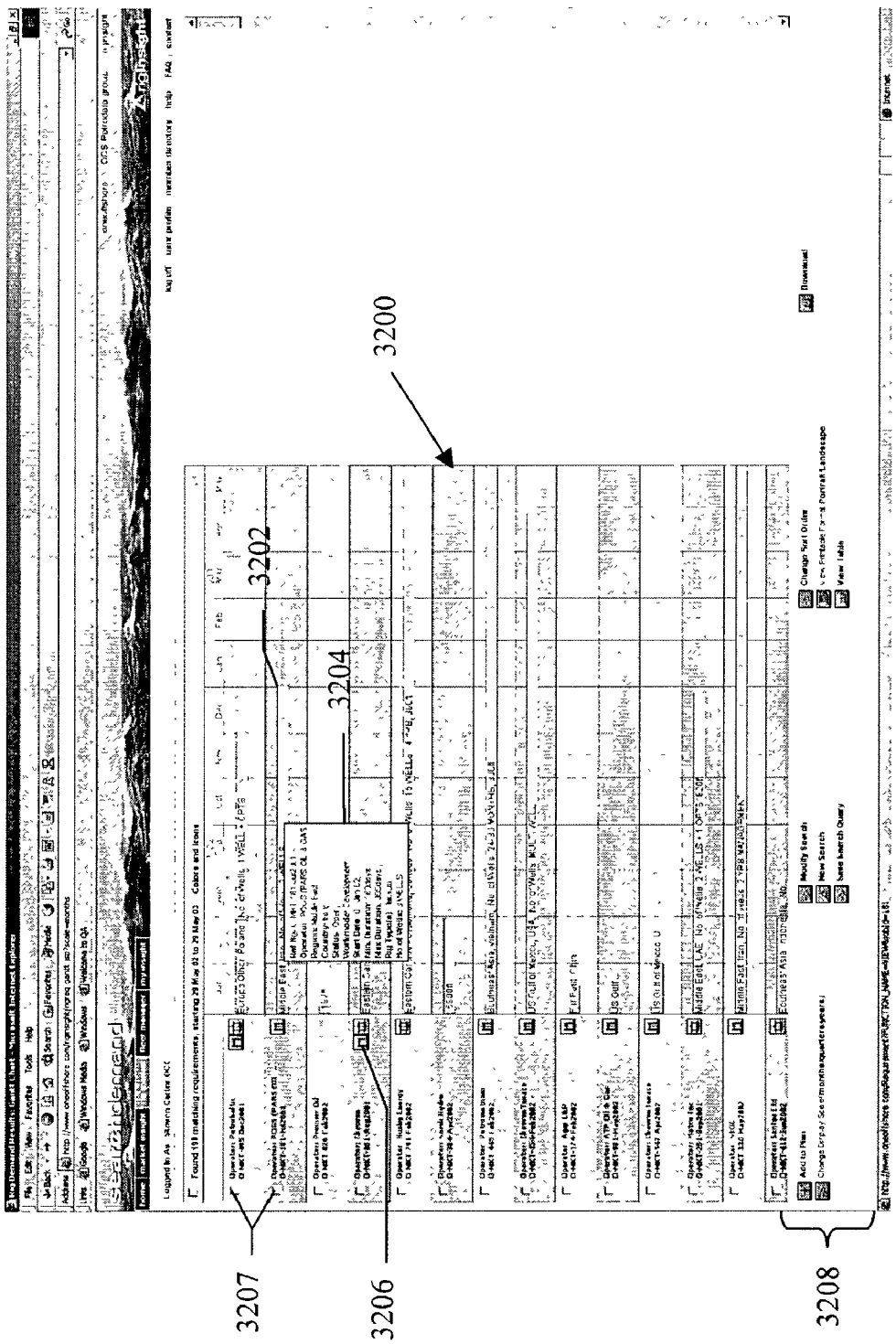

A sample of that activity detail display drawn from the Activities Data 160 in the database 100 is shown in FIG. 32 at 3204. The Gantt box 3204 shows full activity details pulled from the activities data 160 for a drilling rig project in the middle Eastern region operated by Pars Oil to which the system 10 has assigned reference number 0-MKT-101-Jul2001. As shown in the Gantt box 3204, this particular operator project included three wells being operated during the user's selected query time frame of May 29, 2002 through May 29, 2003. As shown in the box 3204, those details include project reference number, project operator, region and country, project status, workmode, start date, minimum duration, maximum duration, rig type(s) and number of wells included in the project. The rig type of each rig involved in that activity is conveniently displayed by way of Rig Type icons 3206. From the demand search Gantt view display, the user 16 can invoke any of the functions available after the select display 3028 function (see FIG. 30) is invoked by way of the option buttons 3208 shown at the bottom of the screen capture of FIG. 32.

Figure 33:
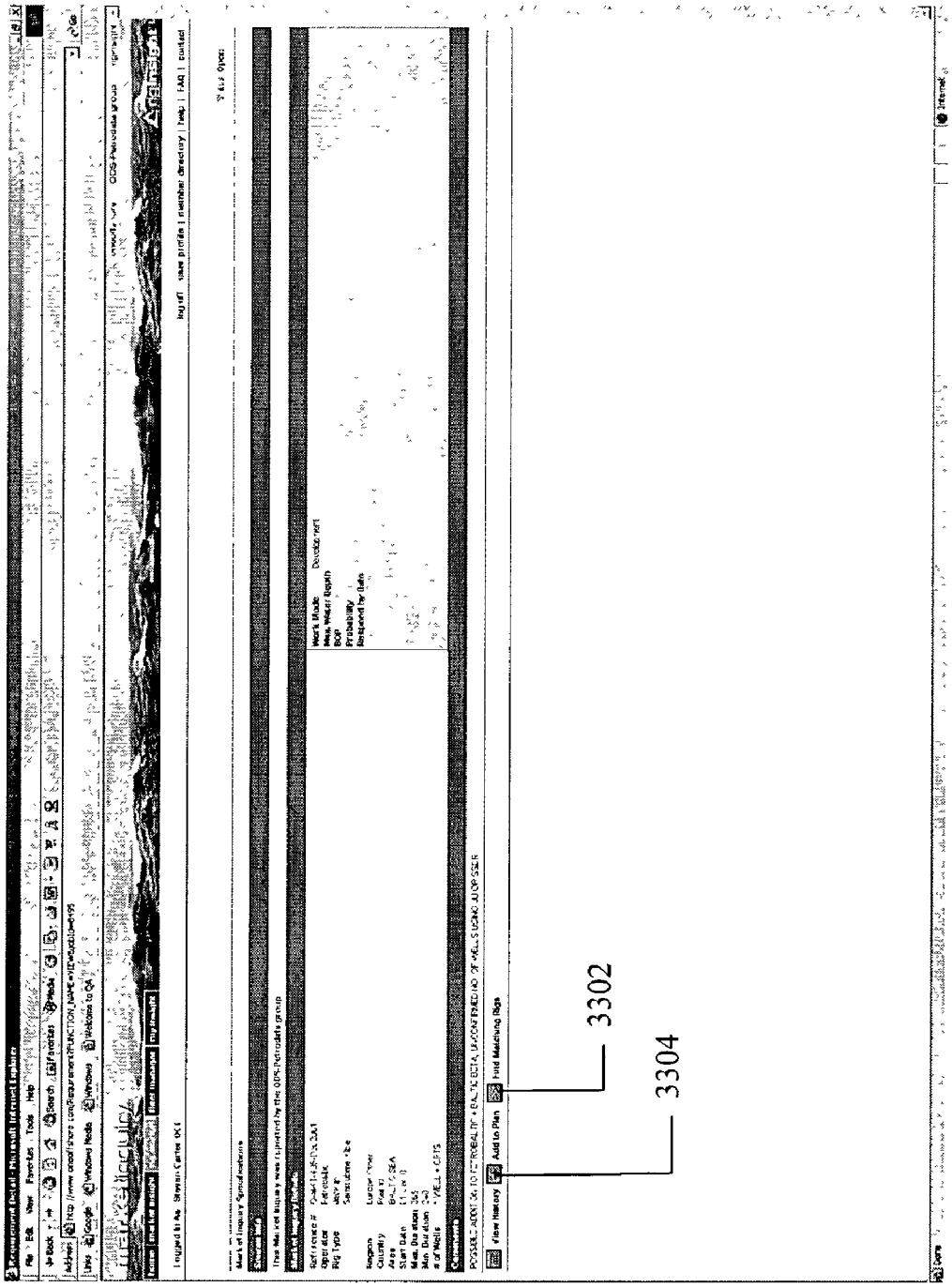
Figure 34:

Clicking on the unique reference number shown at 3207 assigned by the system 10 to the market inquiry or requirement in the Gantt chart 3200 takes the user to the details of the users query as shown in the screen capture of FIG. 33. From this screen, the system the user 16 can take the data that the search engine 200 retrieved from the database 100 in response to the query to find matching rigs on the supply side of the market. This functionality of the system 10 is illustrated by the Find Matching Rigs button 3302. When this button is selected, the system 10 populates the supply search function 718 with the data retrieved in response to the demand search. The screen capture of FIG. 33 illustrates how, for any particular projected within the demand search results a user can find rigs that might meet the project demand and with that information can send out a market inquiry to owners of those rigs in accordance with create/save/issue market inquiries function 722 discussed below. The screen of FIG. 33 also illustrates the availability to the user of taking selected portions of the search results to a fleet management plan by way of Add to Plan button 3204. When invoked, the Add to Plan button 3204 causes the system 10 to populate the fleet management plan (discussed below) with selected requirements and Market Inquiry from the demand search results. The search engine 204 and report engine 206 assure that the information collected in response to a user defined search is available for use with all of the tools included in the business logic engine 200. See FIG. 4. That functionality of the business logic engine 200 enables a participant in a market either as an equipment supplier or an equipment user to be a more effective participant in the market.

A table view of the same demand search results discussed above is shown in the screen 3400 shown in FIG. 34. This screen provides a means for filtering the search results by way of the refine search option shown at 3402 in FIG. 34. Using this option, the user can select one or more of the fields available in the activities data 160 portion of the database 100 and further refine the search criteria used to build the query.

A key feature of the invention is the means for enabling and capturing in the database detailed communications of requirements for rig supply (market inquiry) or notifications of excess supply (sublets) among drilling rig market participants and at the same time capturing, storing and making available to market participants key market data gleaned from those communications. This feature is part of the collaboration tools 216 provided by the business logic engine 200 which feature is illustrated in the exemplary embodiment as the create/save/issue market inquiries function 722 and the create/save/issue and sublet function 724 made available under Rig Market tab 1000. With reference to the flow chart of FIG. 35 and the display screens of FIGS. 36 through 40, the first step for a rig contractor user 16c invoking the market inquiries function 722 is complete data collection form 3502. This is done by way of entering information in the Create/Edit Requirement box 3602 shown in FIG. 36. The box 3602 includes Contact name 3602 which the business logic engine 200 uses to retrieve contact details previously entered using the member profile 800 screen shown in FIG. 8A. The box also includes rig type, region, start date, maximum duration, minimum duration, number of wells, Work Mode, Maximum Water Depth, Maximum BOP Probability, Respond by Date and a text field for comments. Once entered, the entered information is displayed in Market inquiry Specifications box 3606 so that the user can preview data 3504. At this point the user can edit 3506 or save 3508 the entered data.

Once the Market Inquiry is saved, the user can use the upload document 3508 function to select documents to be associated in the database 100 with the demand or requirement defined by the entered data. This function is invoked by way of the Manage Attachments button 3608 shown on the bottom right side of FIG. 36. When this function is invoked, the interface engine 300 displays screen 3700 shown in FIG. 37. The screen 3700 displays in the Market Inquiry Specifications box 3702 all inquiry criteria entered by the user 16c and provides buttons for the user to invoke the upload documents 3508 function by way of Add Attachment button 3704. When selected, the add attachment button 3704 calls up a dialog box for locating documents on a local storage medium to upload to the database 100. When successfully uploaded, document details will be displayed in the Attachment Info box 3703 along with a user completed file description, submission date and boxes showing the "share" status of attachments and selection boxes 3714 to change share designations for attachments. function 3510. In addition to the Add Attachment 3704 button, Delete Attachment 3706, Edit Requirement 3708 and Share Attachment 3712 options are also available from the manage attachments screen 3700.

Figure 35:
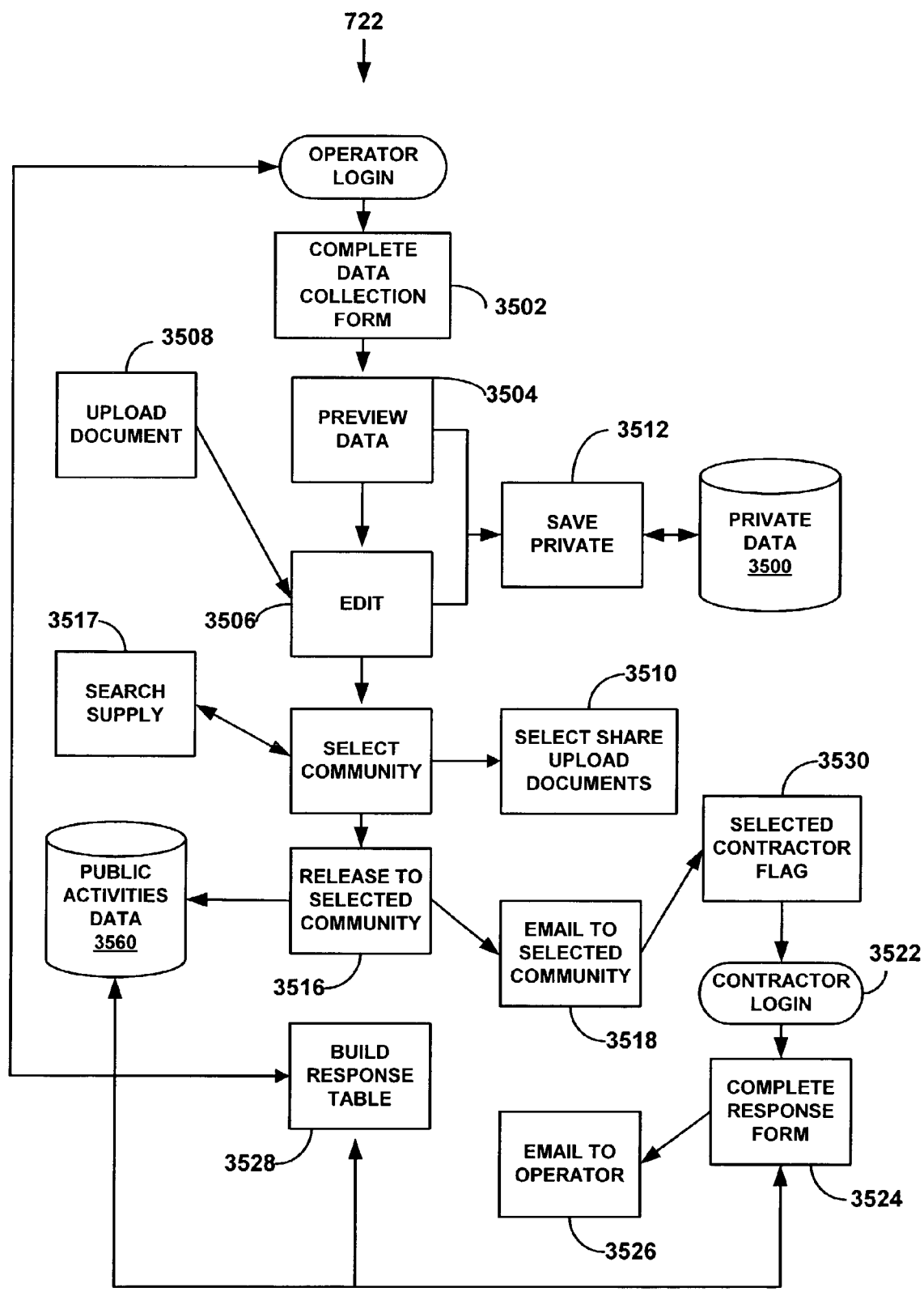
FIG. 35 is a flow chart illustration of the market inquiries feature of the invention.
Figure 36:
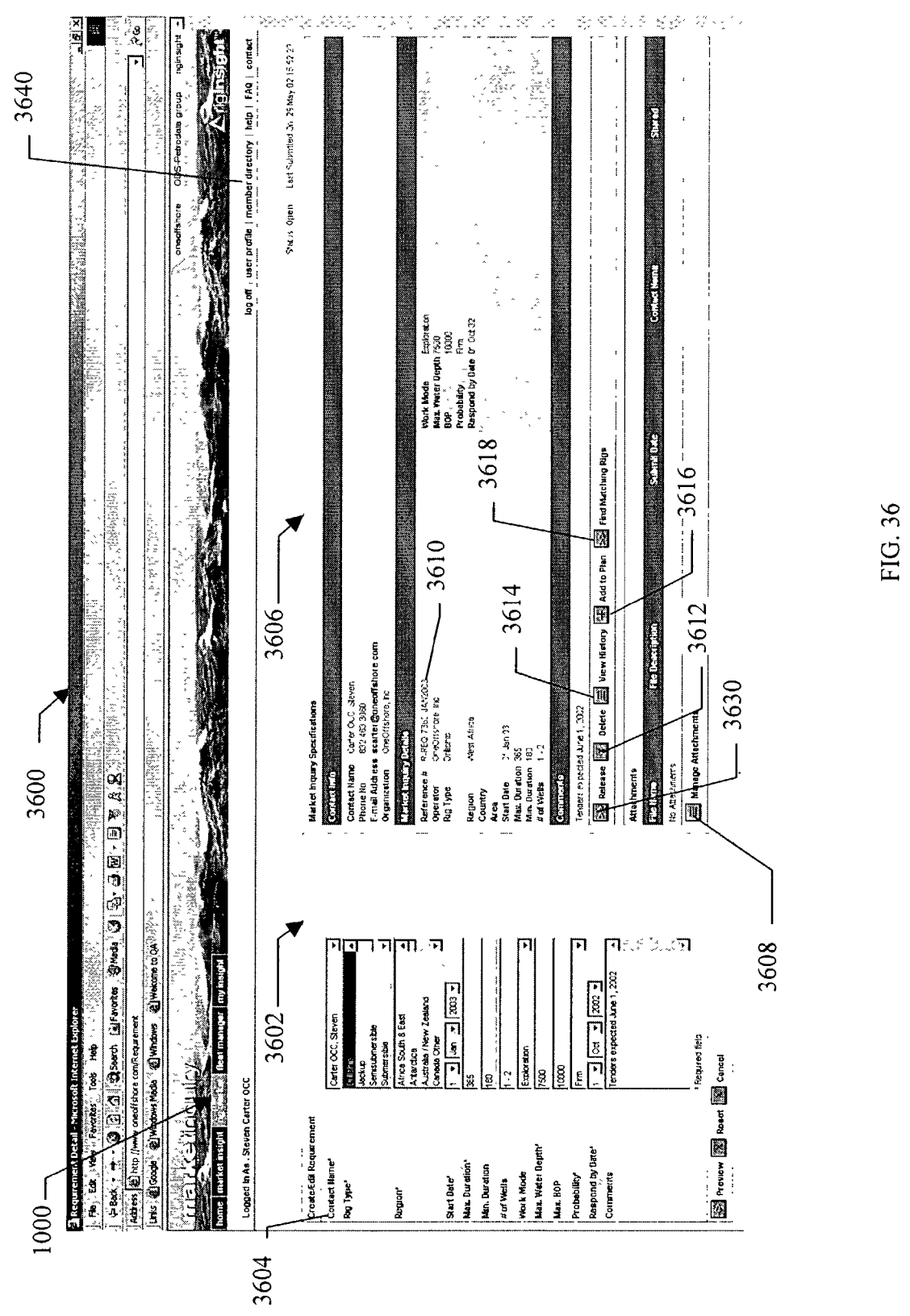
Figure 46:
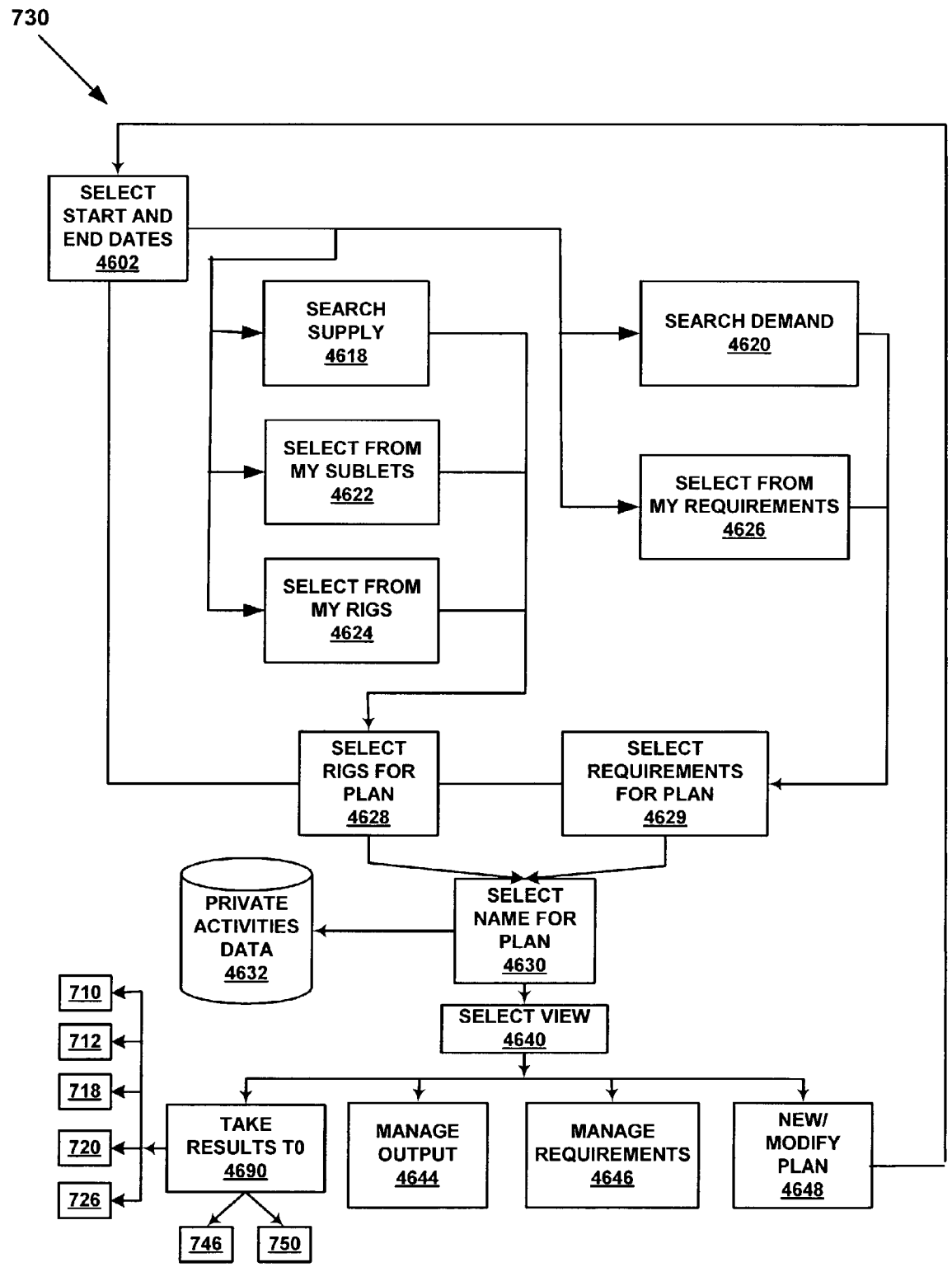
FIG. 46 is a flow chart illustration of the fleet management plan feature of the invention.

At any point after previewing the data but before electing to release data to the community, the user can use the save private function 3512 to store the collected data and associated document in the database 100 as non public information as illustrated in FIG. 35 as private data 3500. That information is stored in the database 100 under a unique requirements reference number assigned by the system 10 and there flagged by the business logic engine as private data, i.e., viewable only to users in the same organization as the creator of the Market Inquiry. In the illustrated inquiry, that reference number is shown in FIG. 36 at 3610 and in FIG. 37 as 3710. The system 10 then maintains the market query as individual or company data retrievable only by the user individual or company. Once saved, the data is available to that user for use in connection with other features of the system 10. In the illustrated embodiment, the system 10 provides several options to the user once a market inquiry is entered and saved. The user can Delete 3612 View History 3614, Add to Plan 3616, Find Matching Rigs 3618, or Release 3620. Selecting the Find Matching Rigs button 3618 invokes the search engine 204 of the business logic engine 200 to enable the user to use the search supply function 718. To include the data with the fleet management plan function 730 (discussed below in connection with FIG. 46, the user 16*c* selects the Add to Plan button 3616 which invokes the fleet planning tool 212 of the business logic engine 200. If the user elects to send out a market inquiry for response by those who might meet the user's requirements, the user selects the Release button 3620.

Figure 37:
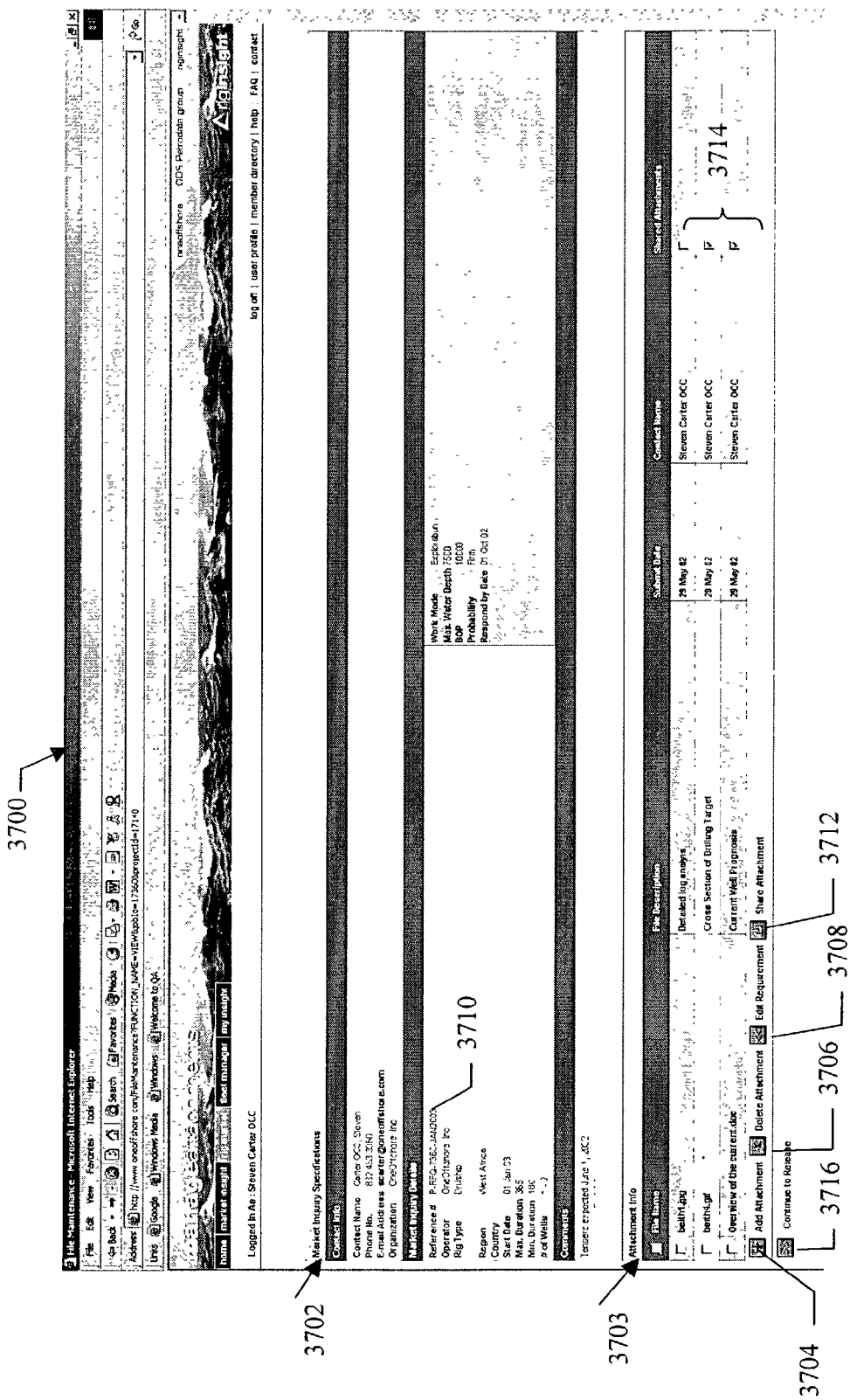
Figure 38:
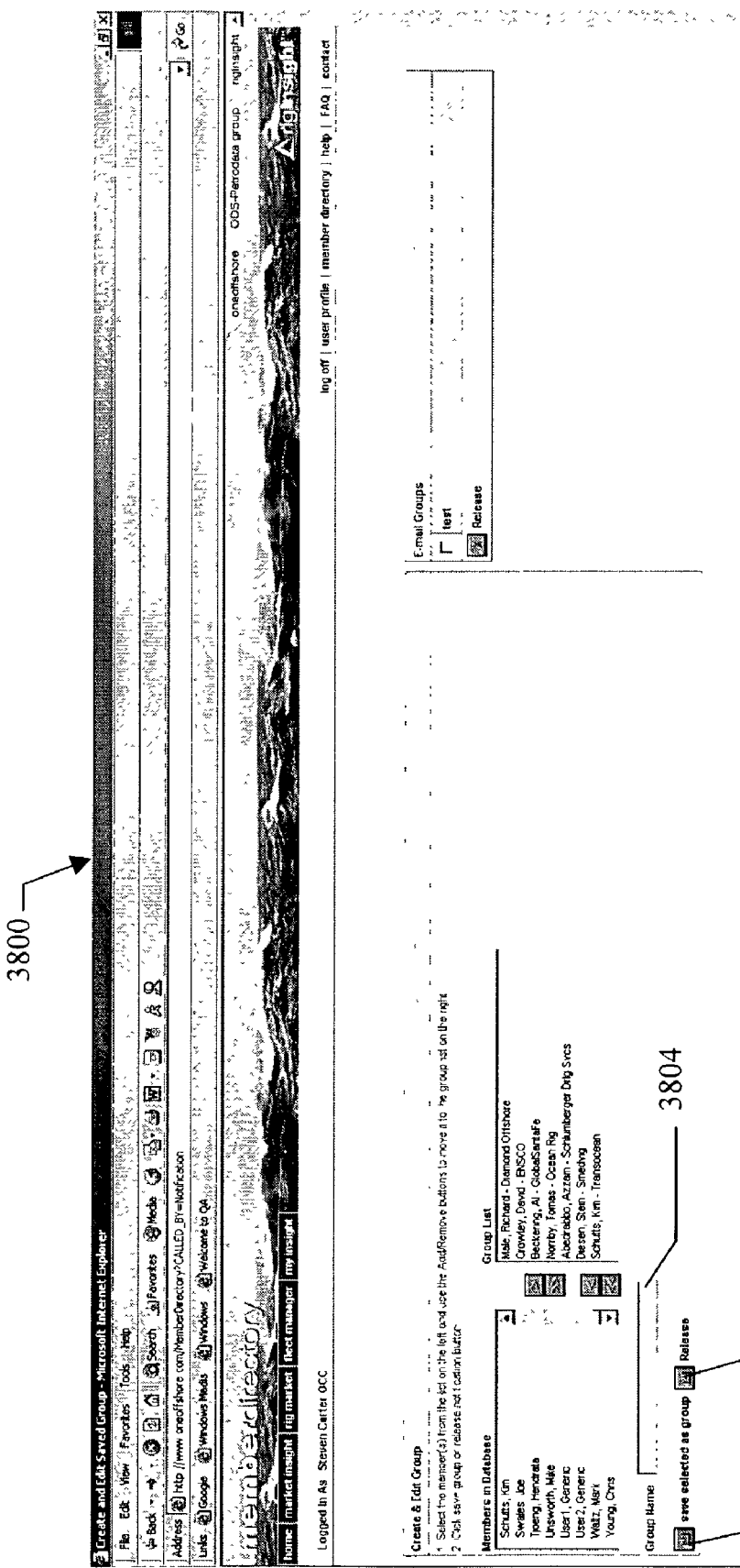

Before any data is actually released to any members of the community, the market inquiries function 722 provides the user with the opportunity to refine the inquiry and change the selection of attachments that will accompany the released inquiry or to change the shared status of attachments by returning to the manage attachments screen 3700. If the user decides to move forward with releasing the inquiry, the system makes that option available by the Continue to Release button 3716 as shown in FIG. 37. The user must then select from the community of participating operators, contractors and rig owner those to whom the user wishes to release requirements, illustrated as select community 3514 in the flow chart of FIG. 35. For this purpose, the user can elect to browse through the system member directory using member directory option 3640 shown at the top of the screen 3600 in FIG. 36. Selecting this option invokes the search & access member directory function 738 which causes the system 10 to retrieve and display the member directory information as illustrated by member directory screen 3800 shown in FIG. 38. With this screen the user can select particular members and release the market inquiry as designed to the selected community members by selecting the Release button 3802. Before releasing by selecting the Release button 3802, the user has the option of naming the group of selected members in the Group Name box 3804 and saving that named group using the save button 3806.

Before selecting from the available list, the user might first want to invoke the search supply function 718 to decide appropriate community members who could have rigs available to meet the users requirements. This option is conveniently provided by way of the Find Matching Rigs button 3618 shown in FIG. 36 and as the search supply function 3517.

Once the user elects to release the market inquiry, Communications Engine 500 takes over and sends emails to the selected community members, illustrated in the flow chart of FIG. 35 as email to selected community 3518. The collaboration tools 216 flag the selected community member (as shown as selected contractor flag 3520 in FIG. 35) who receives a notice of an incoming demand message posting from the Communications Engine 500.

Figure 39:
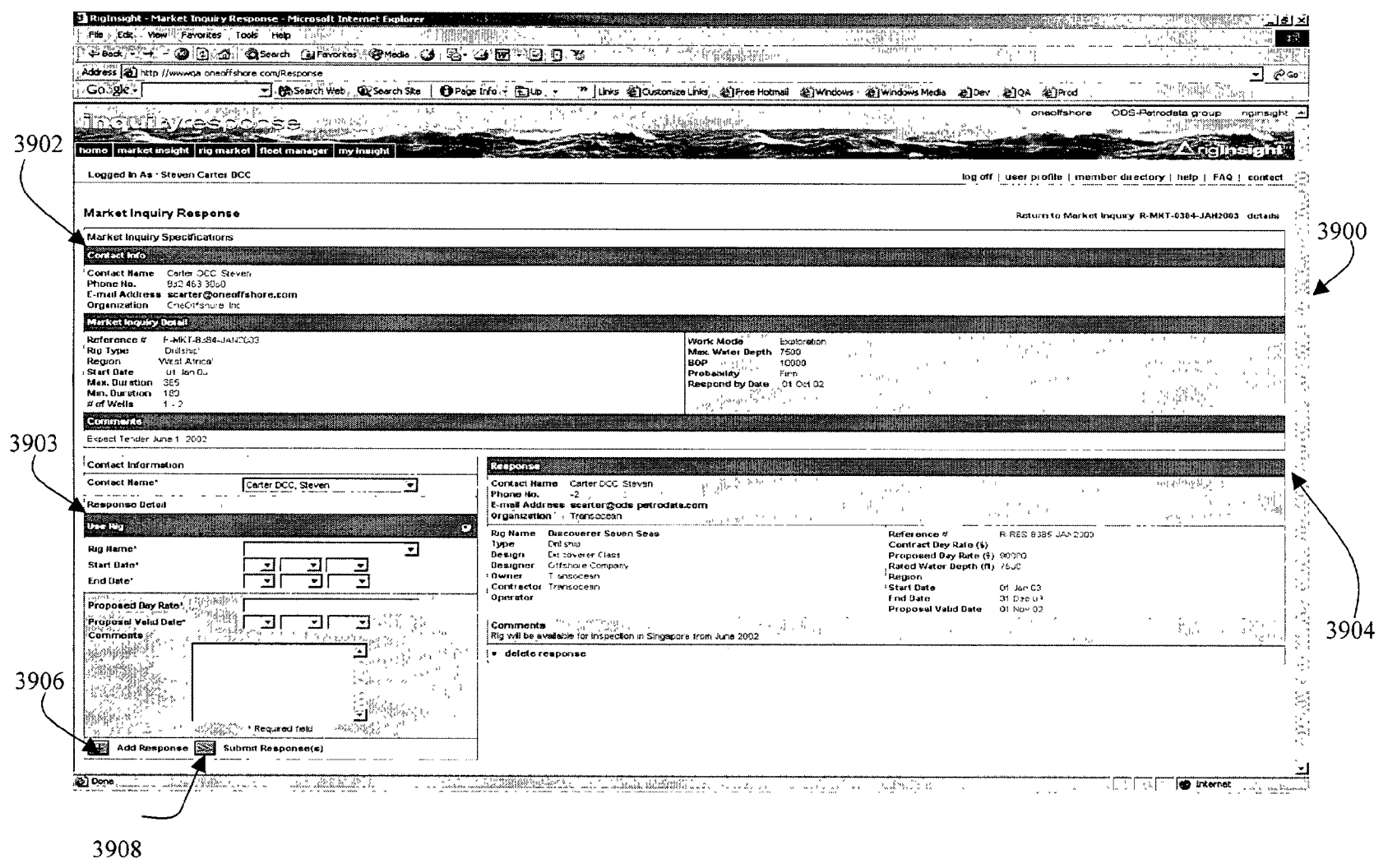

A selected community member choosing to respond can login to the system 3522 and the collaboration tools 216 in cooperation with the Interface Engine 300 presents the user with a response form as shown in FIG. 39 by way of "inquiry responses" screen 3900. As shown in FIG. 39, the system 10 provides a responding user with full details of the inquiry in the market inquiry specifications box 3902 and provides the responding user with data entry fields in the Response Detail box 3903 which requires the user to enter a rig name, start date, end date, proposed day rate, proposal valid date and a free text field for comments Once a response is entered, response details are shown on the lower right side of the screen in the Response box 3904. Once satisfied with the data entered in the Response Detail box 3902, the responding user can add another response and review it using Add Response button 3966 and then submit all of the entered responses to the market inquiring party.

An inquiry responding user submits one or more responses to the system 10 by selecting Submit Response button 2908 which sends the response through the Internet 14 to the Web Host 12 where the collaboration tool 216 of the business logic engine 200 sends the response by email to the inquiring operator user 16*c*, shown in FIG. 35 as email to operator 3526. The response is also treated as incoming data by the incoming data processor 400 which sends the information to the database 100 for inclusion in Demand Data 176 portion of the Activities Data 160. The business logic engine 200 operates on the data to build response table 3528 which then becomes available for review by the market inquiry initiating user when user logs onto the system 10.

Figure 40:
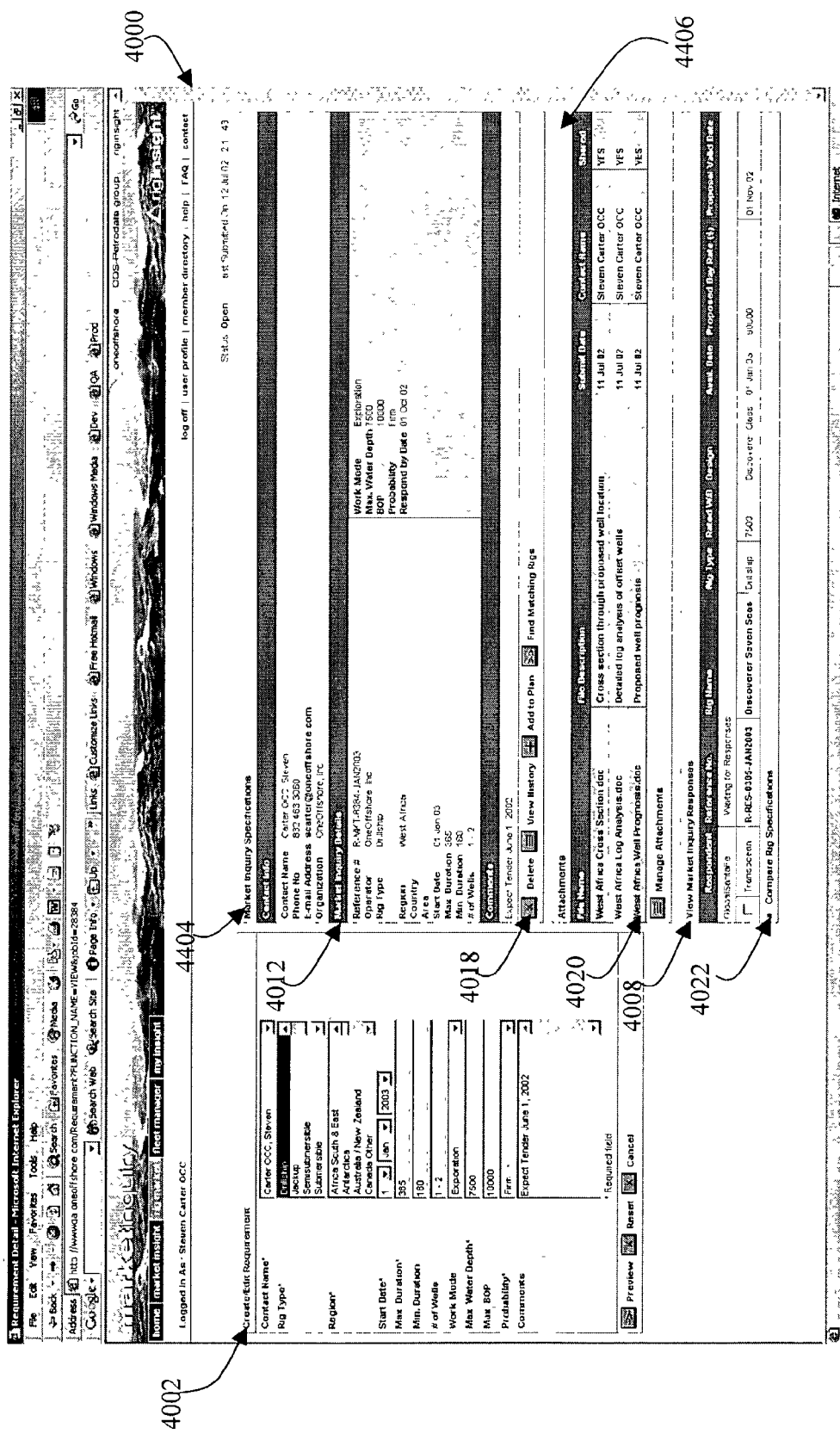

FIG. 40 illustrates the manner in which the system 10 provides the user with the ability to analyze, assess and compare market inquiry responses. As illustrated by the screen 4000, the system 10 provides the user with Create/Edit Requirement box 4002 which displays the requirements as they were sent in the initial market inquiry. The screen also displays full Market Inquiry Specifications in box 4004, and an opportunity to view or manage documents attached to the inquiry by way of Attachments box 4006. All responses to the inquiry received through the system are listed in the response table shown in View Market Inquiry Responses box 4008. All information relevant to making a decision about a rig and contractor to fulfill a drilling project requirement sent through the system 10 is conveniently made available to the market inquiry initiating user through the screen 4000. The user can edit an existing requirement 4002 and can add market inquiry details to a fleet management or project management plan using the Add to Plan button 4010. The user can search the database of rig data 106 for rigs matching the market inquiry details 4012 using Find matching rigs 4014. The user can View history 4016, Delete 4018, and Manage Attachments 4020. The user can view response details and use the search engine to compare responses, e.g., by selecting Compare Rig Specifications button 4022. Because the system 10 includes data received from users by way of market inquiries and responses to those inquiries in the database 100, the system is constantly enhancing the quantity and quality of demand and supply information available to system users 16 to enable them to make better informed decisions as they participate in this market.

Figure 41:
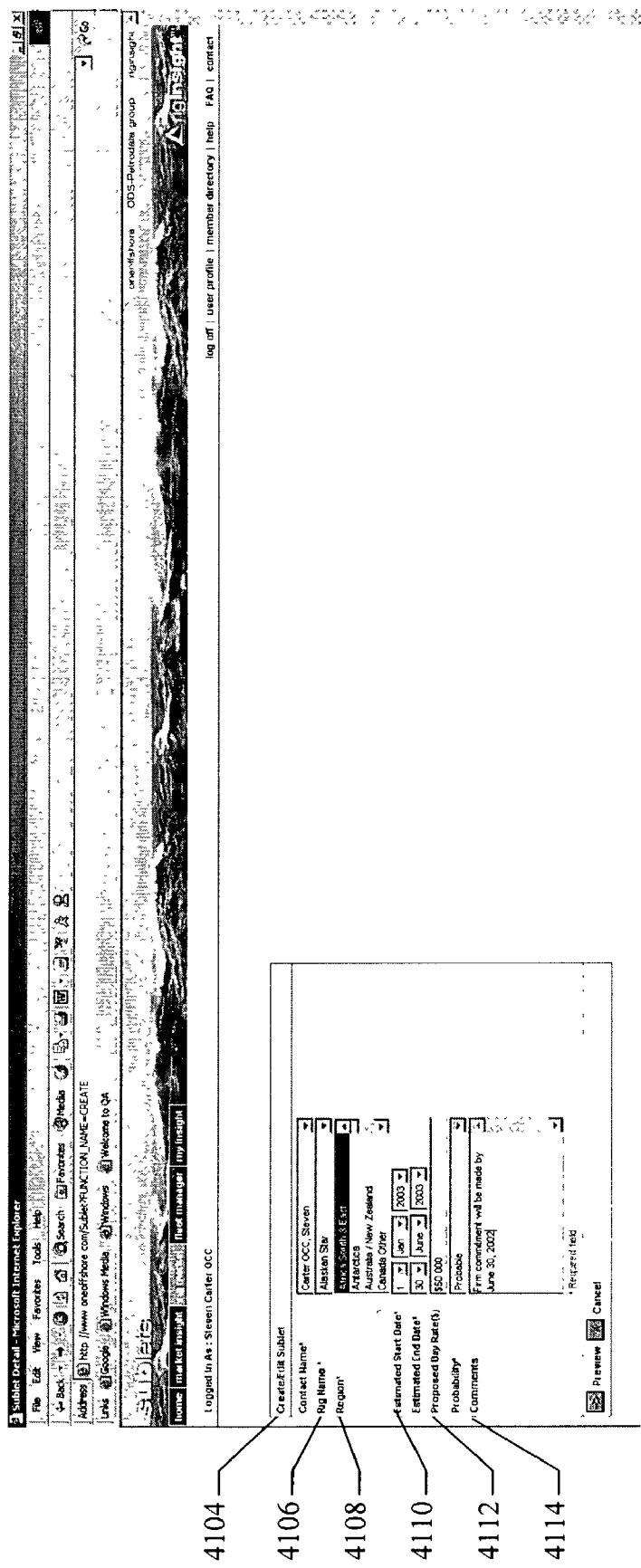
FIG. 41 is a screen capture illustration of the illustrated embodiment of the sublets inquiries feature of the invention.

The collaboration tools 216 further enable users to exchange supply and demand information relating to subleasing of rigs by way of the Sublets function 724 illustrated by the screen in FIG. 41. The process of creating, saving and issuing or releasing a sublet inquiry is the same as the process of creating, saving and issuing market inquiries discussed above in connection with FIGS. 35 through 40. For a sublet inquiry, the user only needs to supply contact information 4104, rig name 4106, location or region 4108 within which the named rig can be deployed, the time frame of availability by way of an estimated start date 4110 and estimated end date 4112, probability of availability 4113 and any comments 4114.

Figure 42:
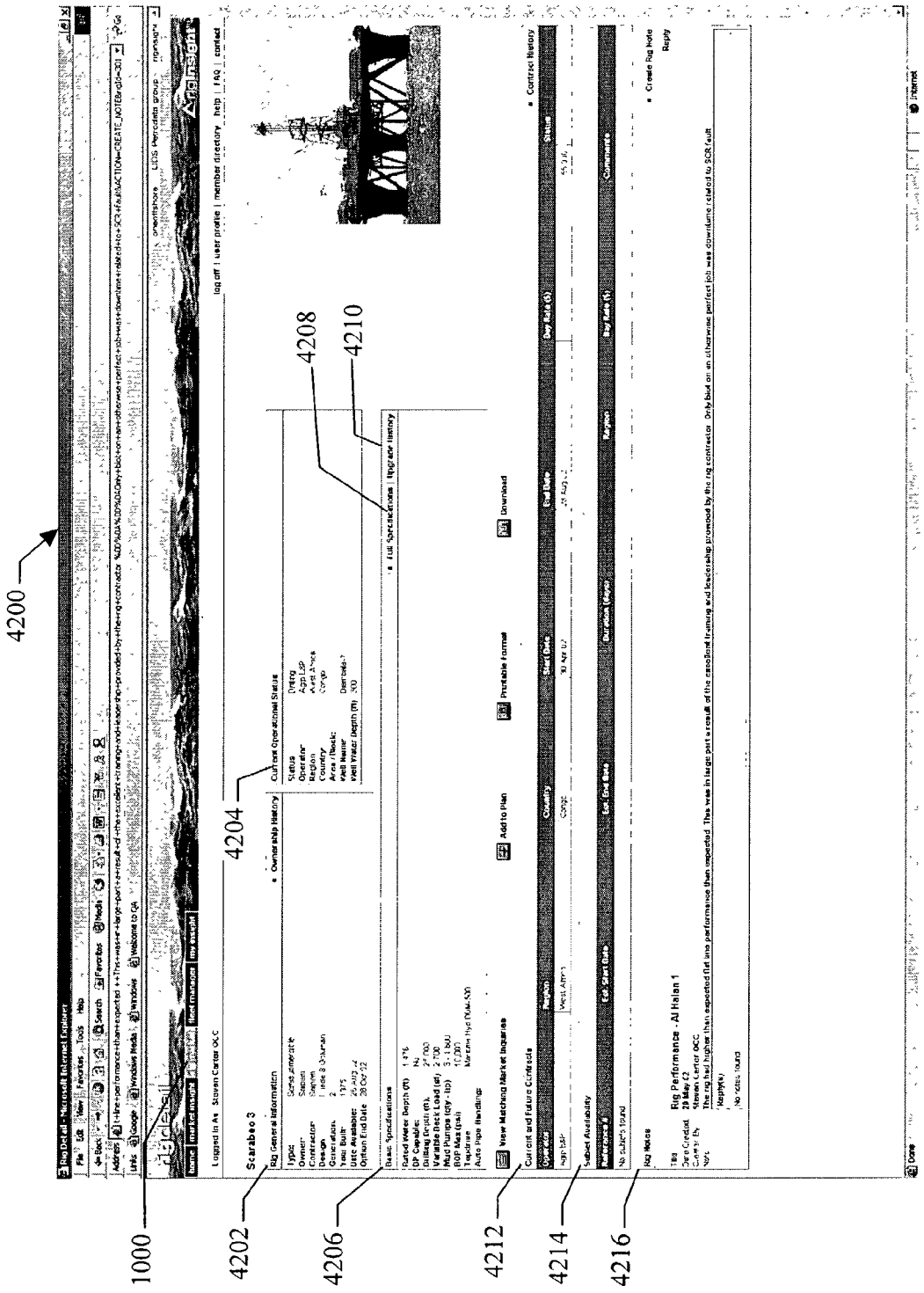
FIG. 42 is a screen capture illustrating the rig detail display feature of the invention.

In the above discussion of the search and inquiries features of the invention, reference has been made to rig names and to technical specifications for each named rig in the database. While using the various search capabilities of the system 10, the system 10 provides the user with the ability to view all information related to a particular piece of equipment that is available in the database 100. That information can be obtained from any portion of the database including the publications 102, rig data 110, contract data 140 and activities data 160 portions of the database by simply clicking on a rig name in any display of that rig name. For example, in the list of rigs displayed as a result of a supply search, clicking on the rig name calls up a rig detail screen, such as the illustrative screen capture of FIG. 42. Invoking the rig detail function causes the search engine 204 to call up from the database all information relating to that named rig and the interface engine 300 displays that information in user friendly manner. Basic elements of the rig detail screen 4200 include general information 4202 and current operational status 4204 of the rig, basic specifications 4206 and full technical specifications 4208 and upgrade history 4210, current and future contracts 4212, sublet availability 4214 and any Rig Notes 4216 that may have been included by a user in connection with a market or sublet inquiry submitted through the system 10.

Figure 43:
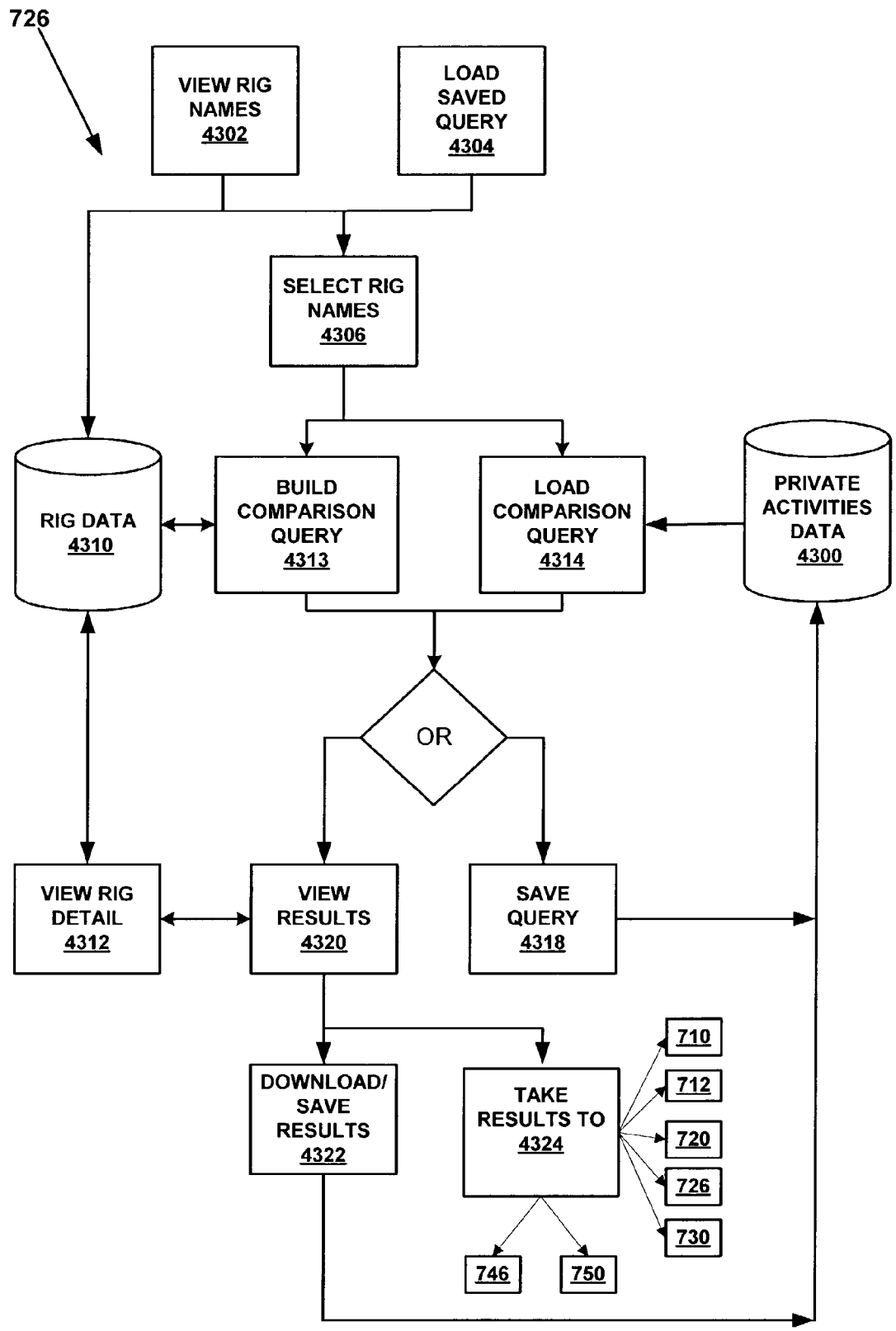
FIG. 43 is a flow chart illustration of the illustrated embodiment of the compare rigs feature of the invention.
Figure 44:
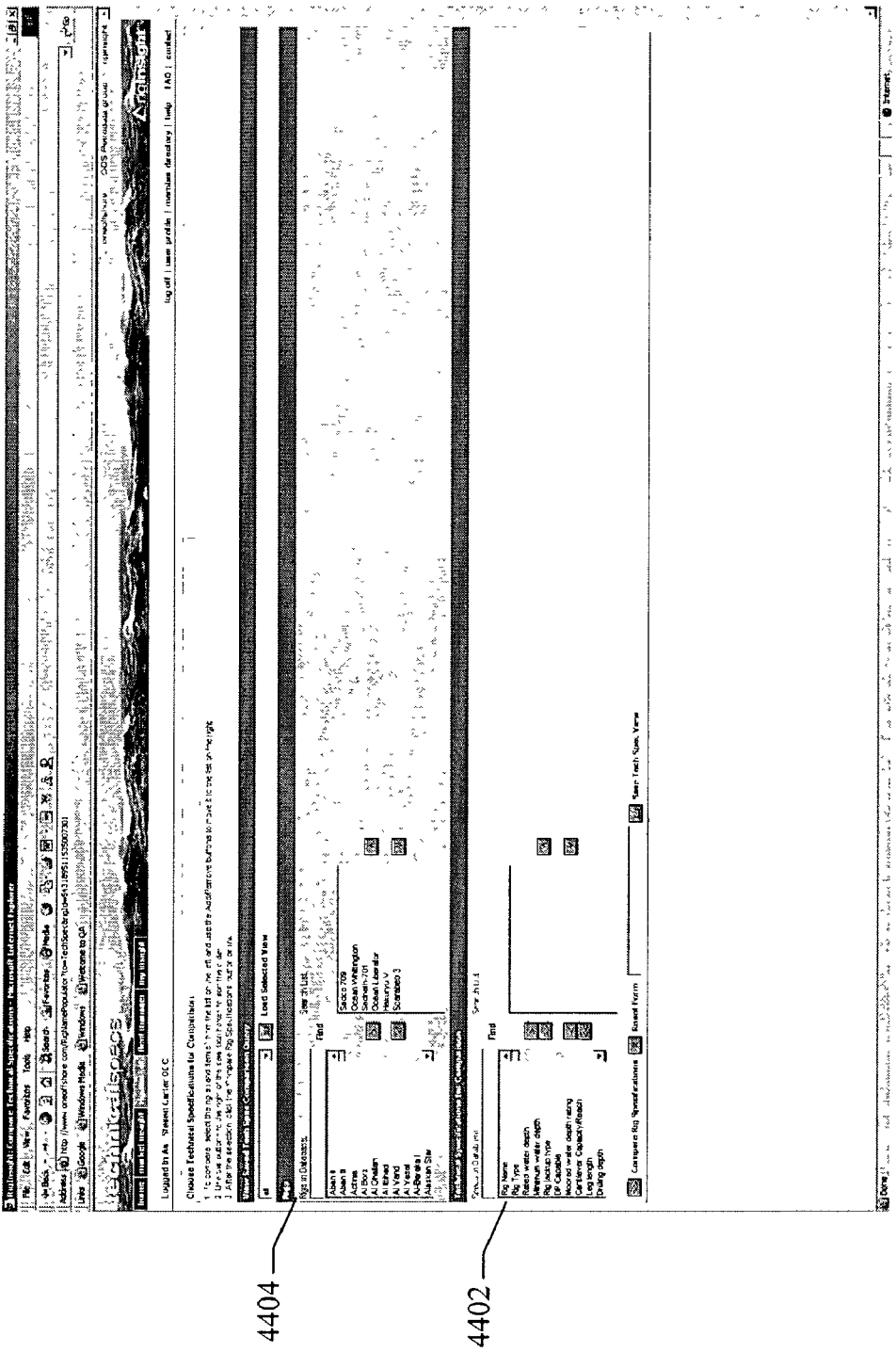
FIGS. 44 and 45 are screen captures illustrating the compare rigs feature of the invention.
Figure 45:
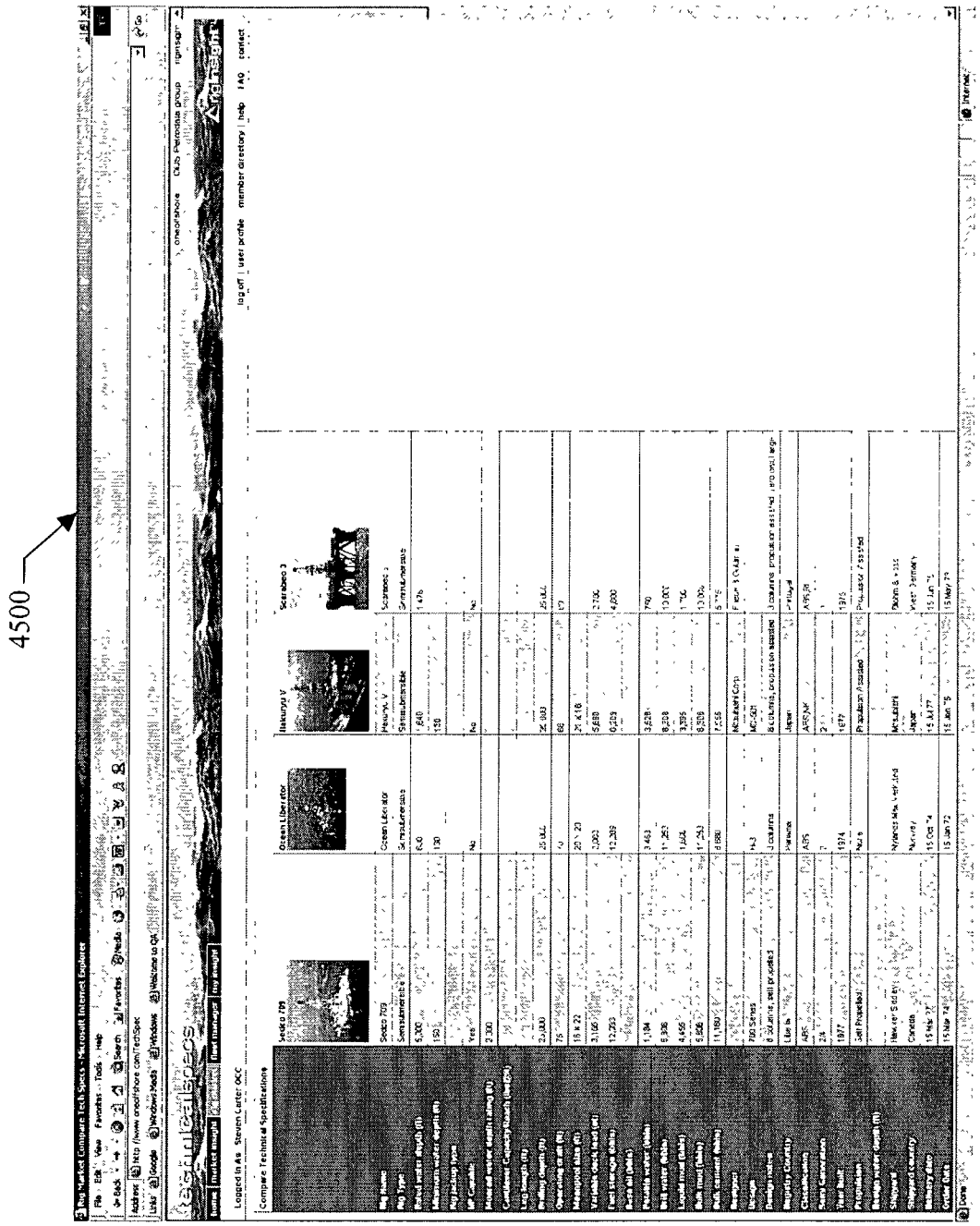

Another function useful alone or in conjunction with other functions of the system 10 is the compare rig tech specs function 726 illustrated in the flow chart of FIG. 43 and by way of the screens shown in FIGS. 44 and 45. The Rig tech specs 113 portion of the rig data 110 available for comparison in the exemplary embodiment of the invention are listed in Appendix A to this application. For this function, when a user 16 invokes this function from the rig market tab 1000, the Business Logic Engine 200 pulls knowledge base information from the rig data 110 contained in the database 100. The process and outputs for the compare rig tech specs function 726 are similar to the process and output for the other functions discussed above. As with the supply and demand search functions discussed in detail above, the user can select a rig name list 4304 from a previous supply or demand search or view a list of rig names 4302. Once a list of rig names is chosen for comparison, the user specifies elements contained in the rig specifications 113 portion of the database 100 to use in the comparison by selecting from Specs in Database as shown at 4402 in the screen capture of FIG. 44 or by loading a saved Tech Spec Comparison Query as shown at 4404 in FIG. 44. If the user elects to load a saved query, the system 10 then pulls a saved query from the private data available to this user The compare/contrast tool 208 then operates on the query and communicates the results of its operation to the interface engine 300 which causes the system 10 to display the comparison results. As illustrated in the screen capture of FIG. 45, the display can conveniently be presented in a table view to provide the user with side by side comparison of the selected rigs, with each selected specification listed side by side for each rig as shown in the screen capture 4500. With reference again to the flow chart of FIG. 43, with the results displayed, the user can then download and/or save those results 4322 or take the results to use with other functions 4324 of the system 10. Note that if the comparison is saved, it is stored as personalized data of the user as illustrate in the FIG. 43 flow chart at 4300.

Figure 47:
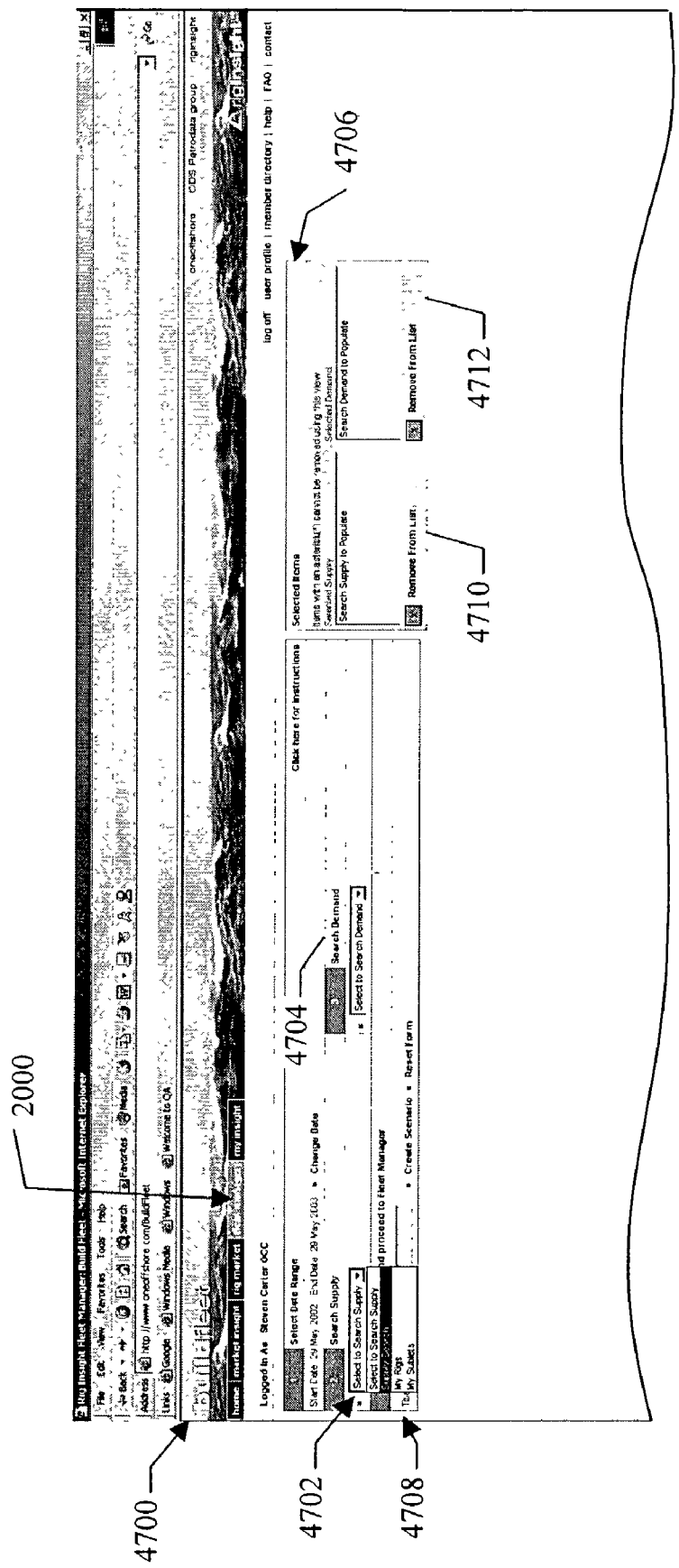
FIGS. 47, 48, 49 and 50 are screen captures illustrating the fleet management plan feature of the invention.

One of the fleet planning tools 212 included in the system 10 is the Build Fleet Management Plan function 730 made available by the system 10 to a user 16 by way of the "fleet manager" tab 2000. The function 730 is another key feature of the invention that enables users to utilize the integrated and related demand and supply market data provided by the system 10 to improve the efficiency and cost effectiveness of participation in an equipment market comprised of equipment users and equipment providers by allowing users to develop planning scenarios for their owned or contracted fleet. As illustrated in the flow chart of FIG. 46, any and all of the above described search functions can be used to build one or more plans or scenarios for utilizing one or more rigs in a fleet over a given time period using select start and end dates function 4602, as illustrated in the flow chart of FIG. 46. The user can select rigs to include in the fleet plan in several ways. Rigs can be selected by search supply 4618, which utilizes the search supply function 718, discussed above with reference to FIGS. 30 through 34, and illustrated in the build fleet screen 4700 shown in FIG. 47. Alternatively, the user can use the results of an earlier saved supply search by using the add to plan option shown on FIG. 25 at 2530 to go directly to the fleet management plan function 730 from the search supply function 718. Alternatively, the user can select using the select my rigs function 4624 or using the select my sublets function 4622.

On the demand side of the plan, the demand search 718 function can be used to populate the plan using the search demand function 4620 or the user can use select from my requirements function 4626 to call up from the database 100 a previously saved and named set of requirements. In the illustrated embodiment, the build fleet screen 4700 includes an option to Search demand shown at 4704 in FIG. 47 and in its drop down box (not shown) a My Requirements option to call up the previously saved requirements. After selecting the method of searching for the demand and supply sides of the plan, the Interface Engine 300 of the system 10 provides the user with a display beneath the build fleet data entry screen as illustrated by the screen capture of FIG. 48. From this list, supply and demand to be added to the plan can be selected. In the illustrated embodiment of the build fleet screen 4700, on the right side of that screen, selected rigs will appear in the Selected Items box 4706, with supply rigs on one side of the box 4706, e.g., at 4710 and the demand side at 4712. Once the user is satisfied with the rigs in the supply and demand boxes within the Selected Items box 4706, the user can select name for plan 4630 by way of the "title" box 4708 and it will thereby be saved as the user's private data as private activities data 4632.

Figure 48:
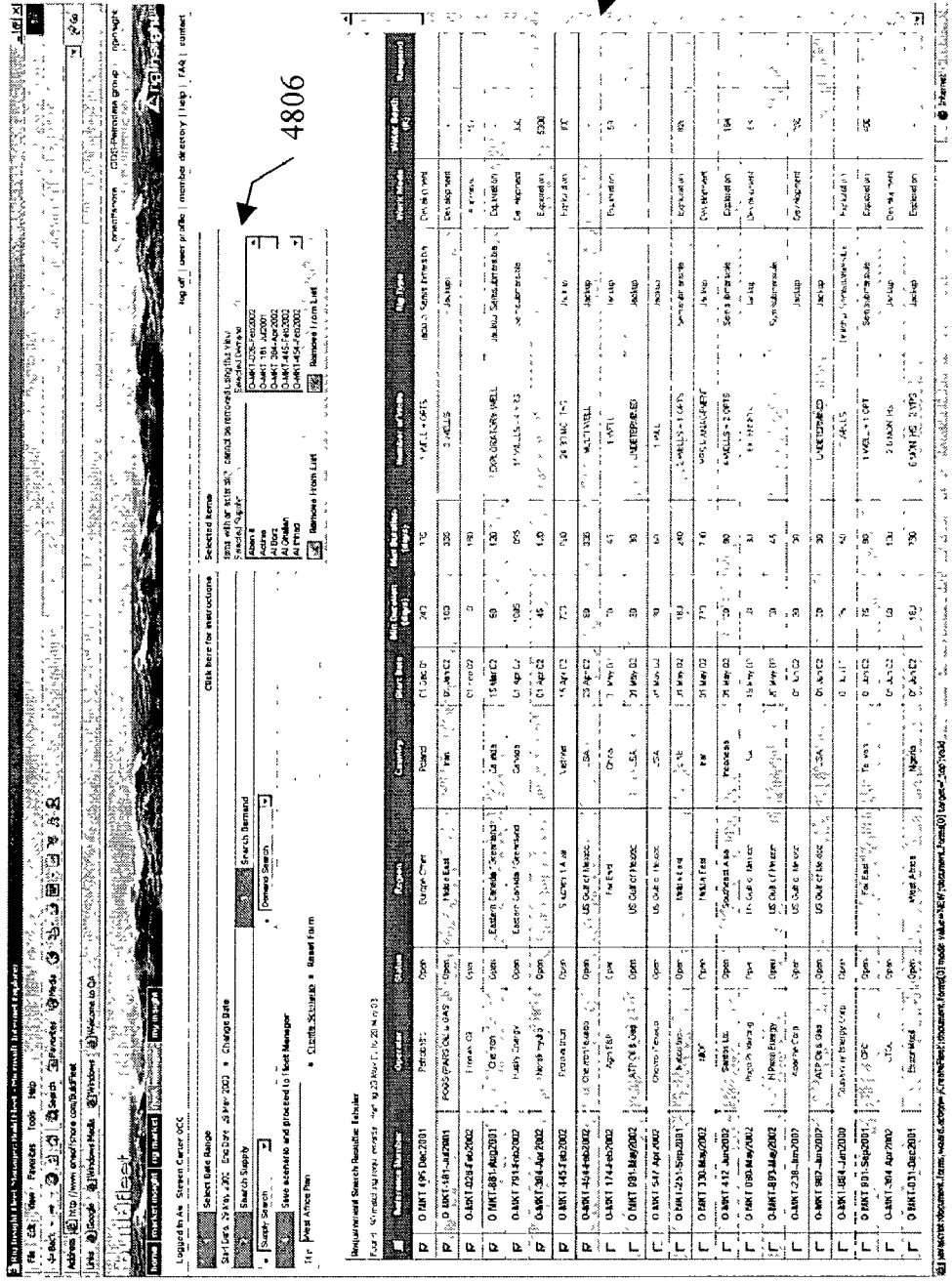

With reference to the illustrative saved fleet plan (named "West Africa") shown in FIG. 48, the selected supply and demand items are shown in the Selected Items box 4806, with the results of a demand search shown in table view 4810. In the table view 4810, the first column includes rigs by name and requirements by requirement numbers followed by columns showing details drawn from the database 100 including Operator, Region, Country, Start Date, End Date, Duration, Status and Day Rate.

Figure 49:
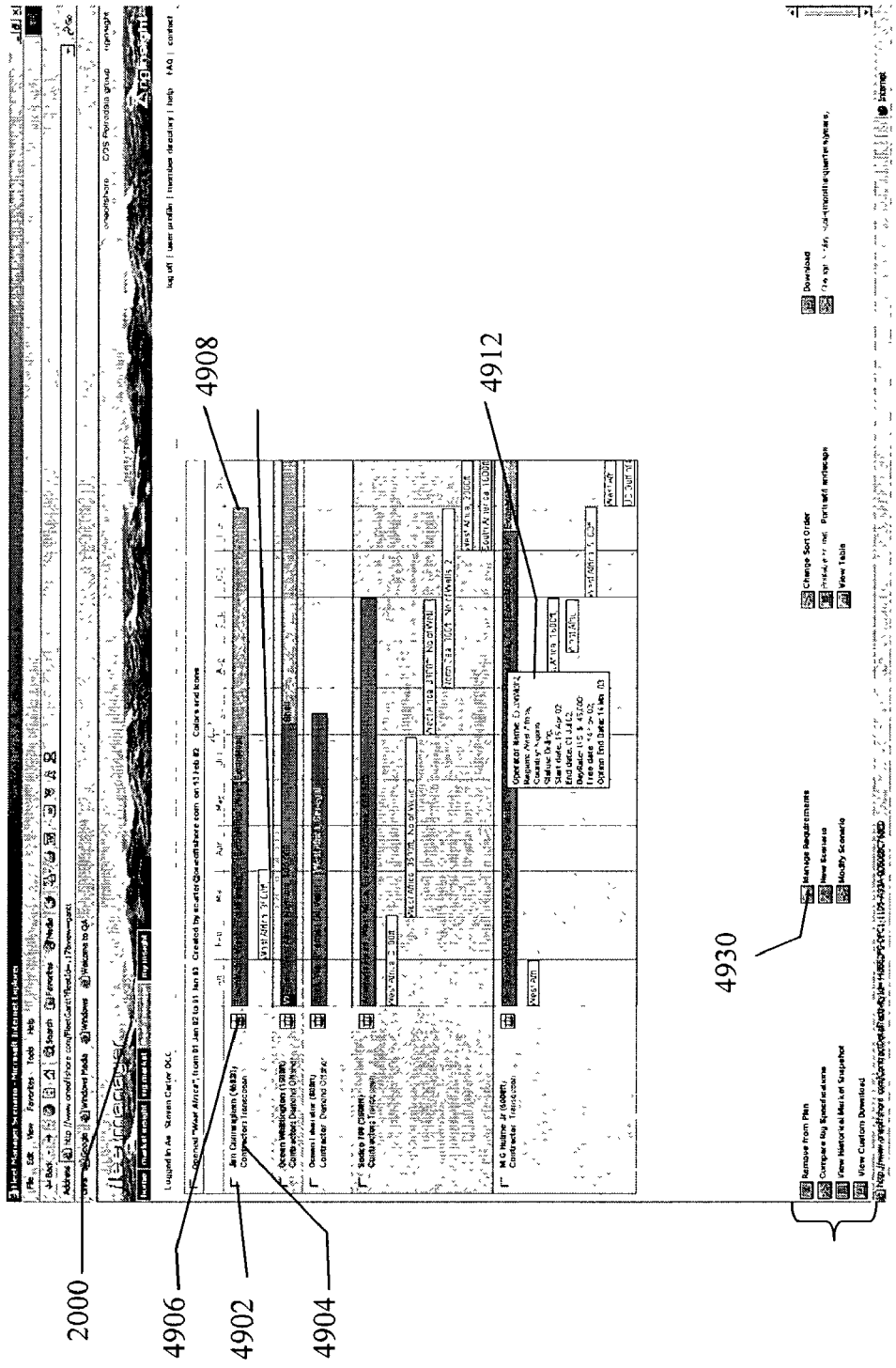

If the user elects to a Gantt view by way of the select view function 4610, rigs and demand in the plan are graphically presented as shown in FIG. 49 as fleet manager screen capture 4900. The display is similar to the Gantt chart view of the results of a supply or demand search except that supply and demand are displayed together. In the illustrated screen 4900, rig name 4902 and contractor 4904 appear in the first column along with a rig type icon 4906 and the Gantt bars for that rig show its activity in a dark background bar 4908 and requirements matching that rig in a light background bar 4910. Activity details for rigs and requirements details for requirements are shown in Gantt boxes such as rig activity detail box 4912.

When either a Gantt or Table View of the plan displayed, the system 10 provides the user with several options to use the plan with other functions of the system 10 such as compare rigs 726 or view market snapshot 710 by providing take results to function 4690. Output from the fleet planning tool 212 can be managed by way of manage output function 4644, and the user can modify the plan or create a new plan by the new/modify plan function 4648. This functionality is presented to the user by the interface engine 300 as option buttons similar to those provided with the search supply and search demand screens discussed above. Those are shown at the bottom of the screen of FIG. 49 as option buttons 4920.

Figure 50:
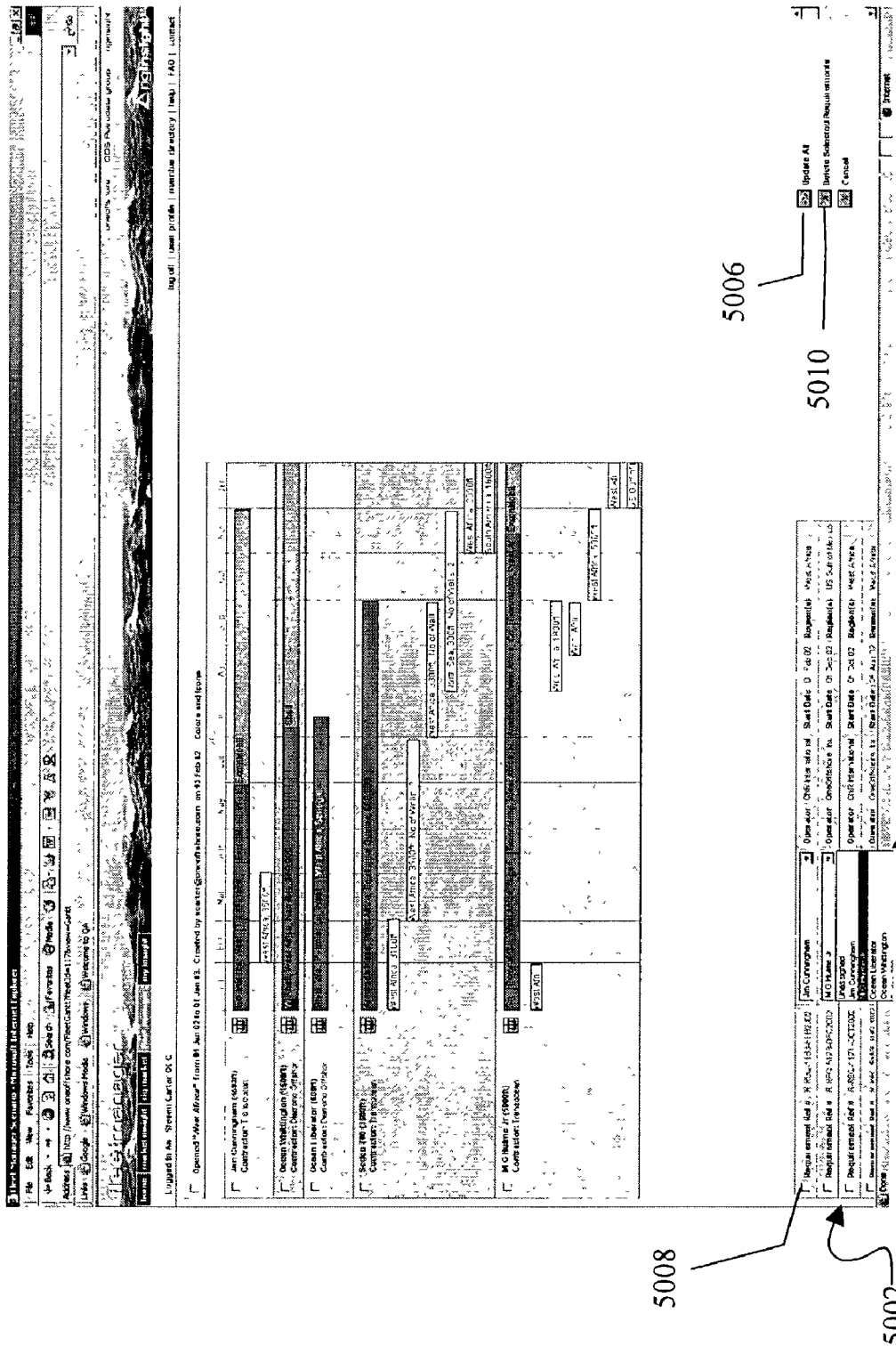

One function specific to the fleet management plan function 370 is the manage requirements function 4646, illustrated by the screen capture of FIG. 50. When this option is selected, the interface engine presents the user with a list of all requirements that the user selected for the plan to enable the user to delete from the list or change assignments of rigs to requirements. As illustrated in FIG. 50, the system 10 presents the user with the requirements list 5002 sorted by requirement reference number followed by a drop down box 5004 that contains options to assign the requirement to a particular rigs or mark the requirement as unassigned. The user can change the assigned rig designate it as unassigned using the drop down box 5004. The user can update the chart using Update All button 5006 and can select requirements to be deleted by checking box 5008 next to any requirement and using Delete Selected Requirements button 5010. When the user elects to update, the system updates the Gantt chart to graphically show the new, deleted, or changed rig assignments to requirements.

Figure 51:
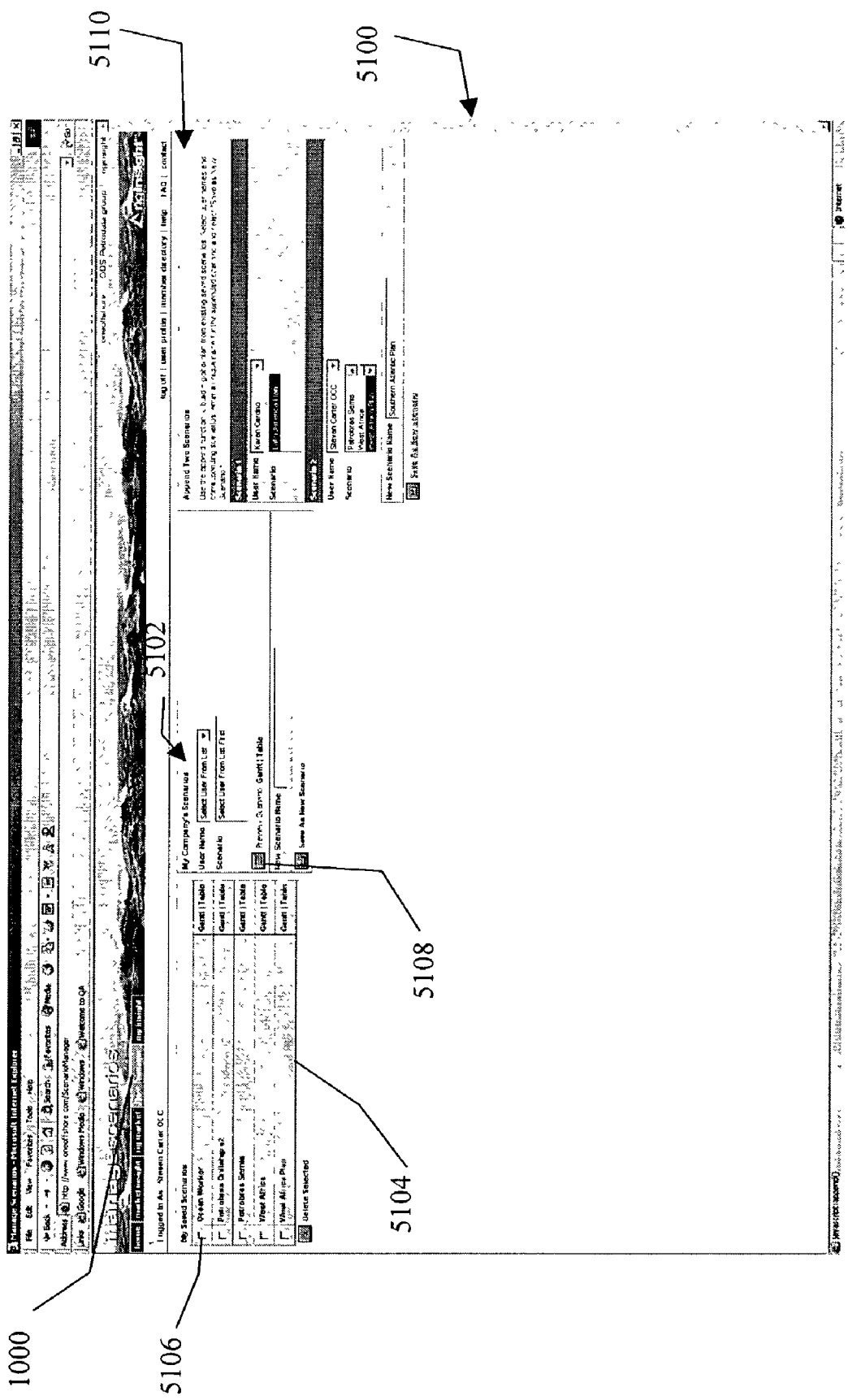
FIG. 51 is a screen captures illustrating management of fleet management plans in accordance with the fleet management plan feature of the invention.

One important feature associated with the build fleet management plan function 730 is the manage & share & append fleet management plans function 734 which uses the collaboration tools portion 216 of the business logic engine 200. With this feature, as illustrated in the screen capture 5100 shown in FIG. 51, the user can access the plan of colleagues within the same organization using the My Company's Scenarios box 5102 by selecting one or more user names for a particular named plan or Scenario. In connection with this feature, the system provides the user with the opportunity to view a read only version of the plan in either a Gantt or table view. Alternatively, the functionability allows the user to take a copy of a colleagues plan and save as the user. In the illustrative screen capture 5100, the user is presented with a list of their own named plans at 5104, with check boxes 5106 and the option to view, edit or delete selected. The user can also append plans together and give the collection a new name using the Append Two Scenarios box 5110.

Figure 52:
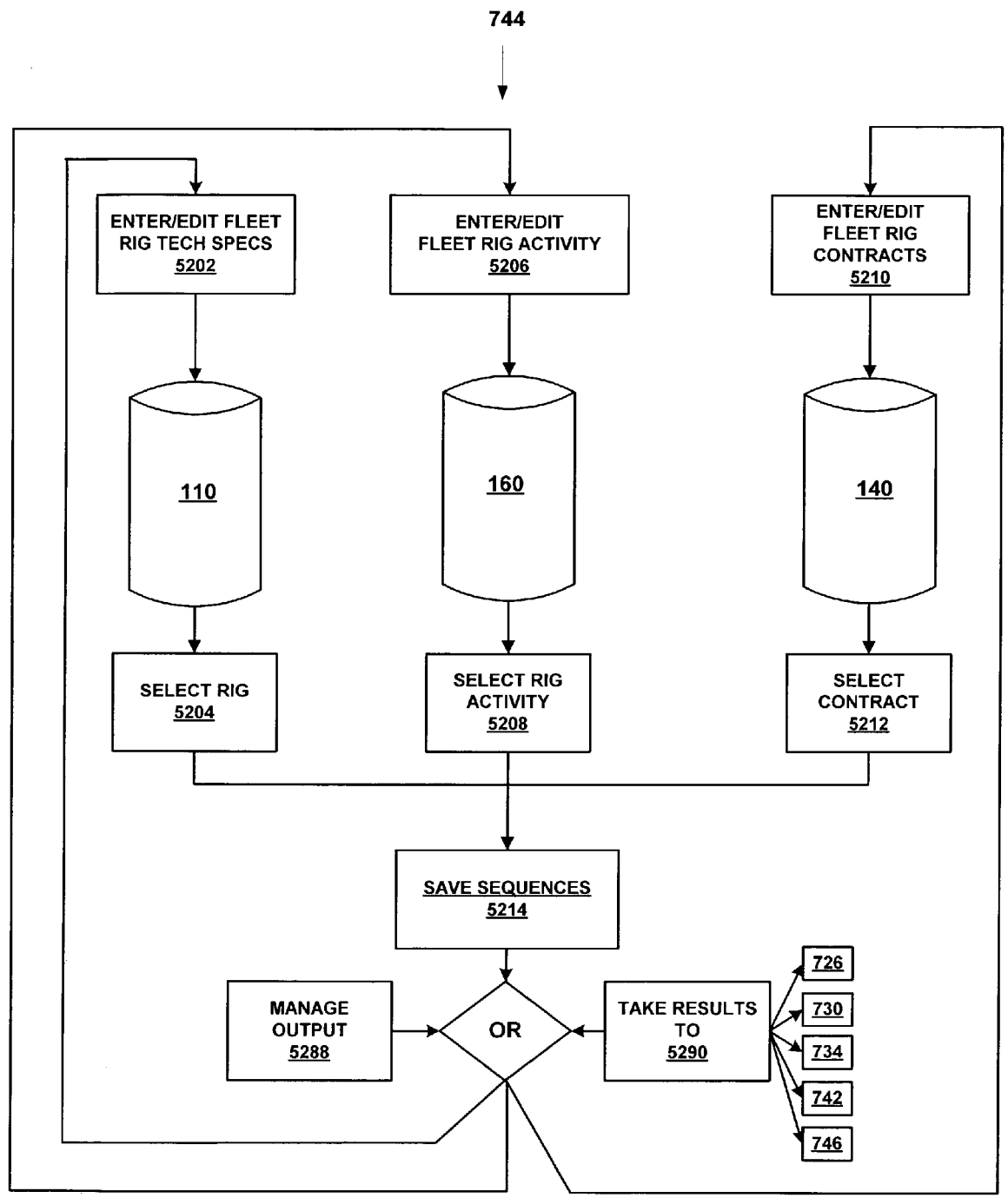
FIG. 52 is a flow chart illustration of the build and maintain drilling sequences feature of the invention. [744]

Turning now to the drilling sequences tool 214 which provides the build & maintain drilling sequence function 744, FIG. 52 is a flow chart illustrating the functionality provided by that tool. To use that tool, the system 10 presents the user with a screen through which the user can enter/edit Fleet Rig Tech Specs 5202. The system 10 also presents the user with a screen for entering/editing fleet rig activity 5206 which adds or modifies the activities data 160 in the database 100 to provide information to the user to enable the user to select rig activity 4208 for building a drilling sequence. The system 10 further presents the user with a screen for entering/editing fleet rig contracts 5210 to enable the user to select and/or modify activity 5212 from the contract data 140 in the database 100. Once a drilling sequence is developed, the system presents the user with the opportunity to name and save the sequence 5214, to manage output 4288 from the drilling sequence tool 744 and to take those results to 5290 other functions of the system, including, for example the functions compare rigs 726, build fleet management plan 730, Manage & Share & Append Fleet management plans 734, Optimize fleet deployment 742, and View & Compare Rig Performance 746.

As can be appreciated, comparing rig performance is preferably done by collecting and storing rig performance data in the database 100. That data can be obtained from users of the system entering that data into their private "My Insight" data based on past experience with projects performed by particular rigs or can be made community data if market participant users are willing to share performance data. Basic performance data for use with the View & Compare Rig Performance function 746 can be pulled from the performance data 170 portion of the database and can include any of the subcategories shown in FIG. 35 as data elements 171 through 191. The invention envisions that market participants will share rig performance data and will add to the performance subcategories as data in the database 100 grows with usage of the system of the invention.

Figure 53:
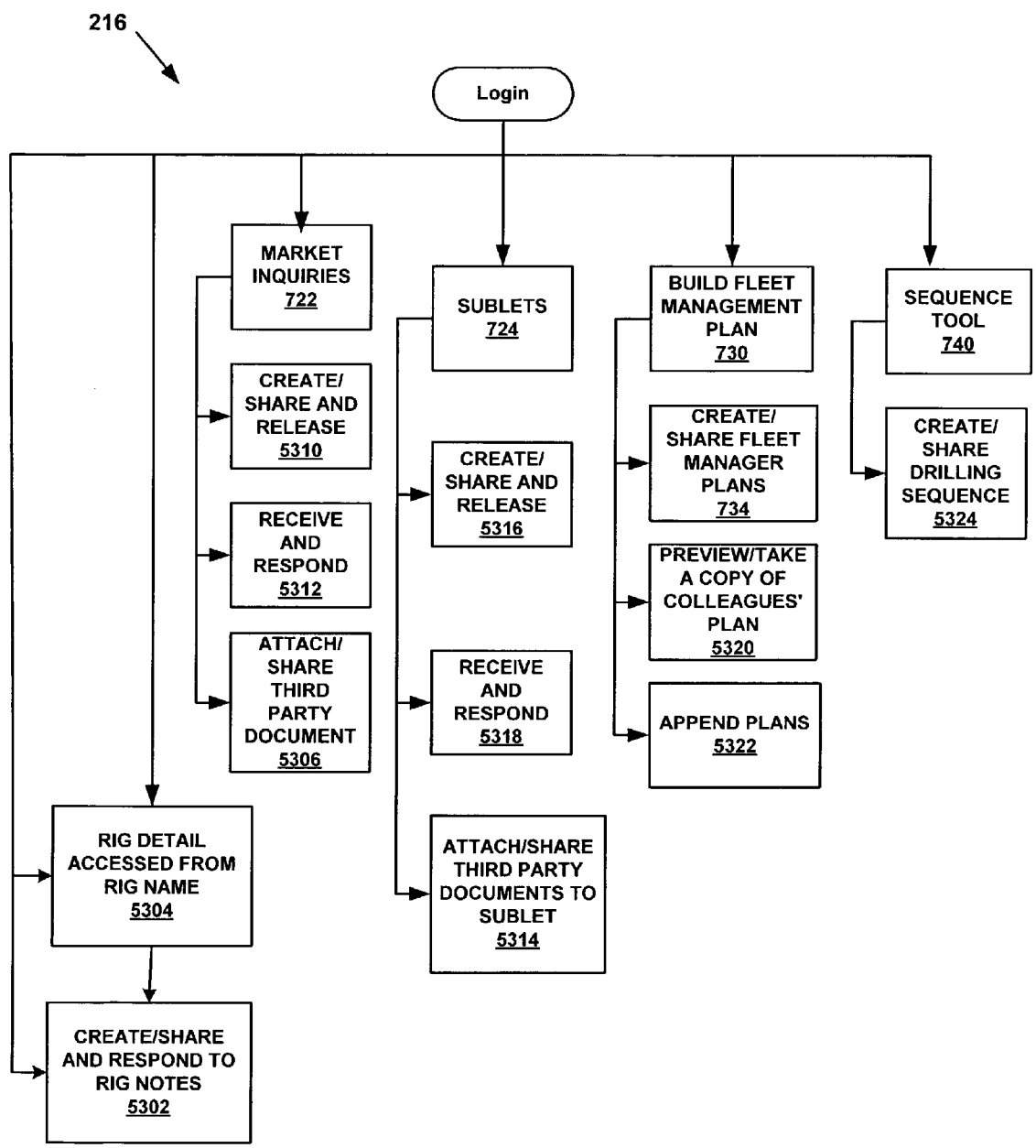
FIG. 53 is a schematic overview of the collaboration tools of the invention.

As can now be appreciated, in light of the above detailed discussion of specific functional features of the invention, a key feature of the knowledge base system 10 of the present invention is the provisions of the collaboration tools 216 which enable members of the community of system 10 users to share information and collaborate within and among system user companies in their market participation efforts. FIG. 53 illustrates the kinds of information that can be shared among members of the community of users of the knowledge base system in the context of the offshore drilling rig market to which the above described exemplary embodiment of the invention is directed. Community members can share rig details by creating, sharing and responding to Rig Notes 5302 by way of rig detail accessed from rig name 5304. Community members can share documents relating to the market by attach third party document 5306 to market inquiries 722, and can create/share and release 5308 those inquiries and receive and respond 5312 to those inquiries. Community members can share documents relating to sublets 724 by attach third party documents to sublet 5314, can create/share and release 5316 sublets and receive and respond 5318 to sublets 724. Community members can share fleet manage management plans 730 using the collaboration tools that facilitate the create/share fleet management plans function 734, providing the ability to preview/take a copy of colleagues' plan 5320 and to append plan 5322. With the system 10's collaboration tools 216, the user can create/share drilling sequence 5324 using the sequence tool 740.

Figure 54:
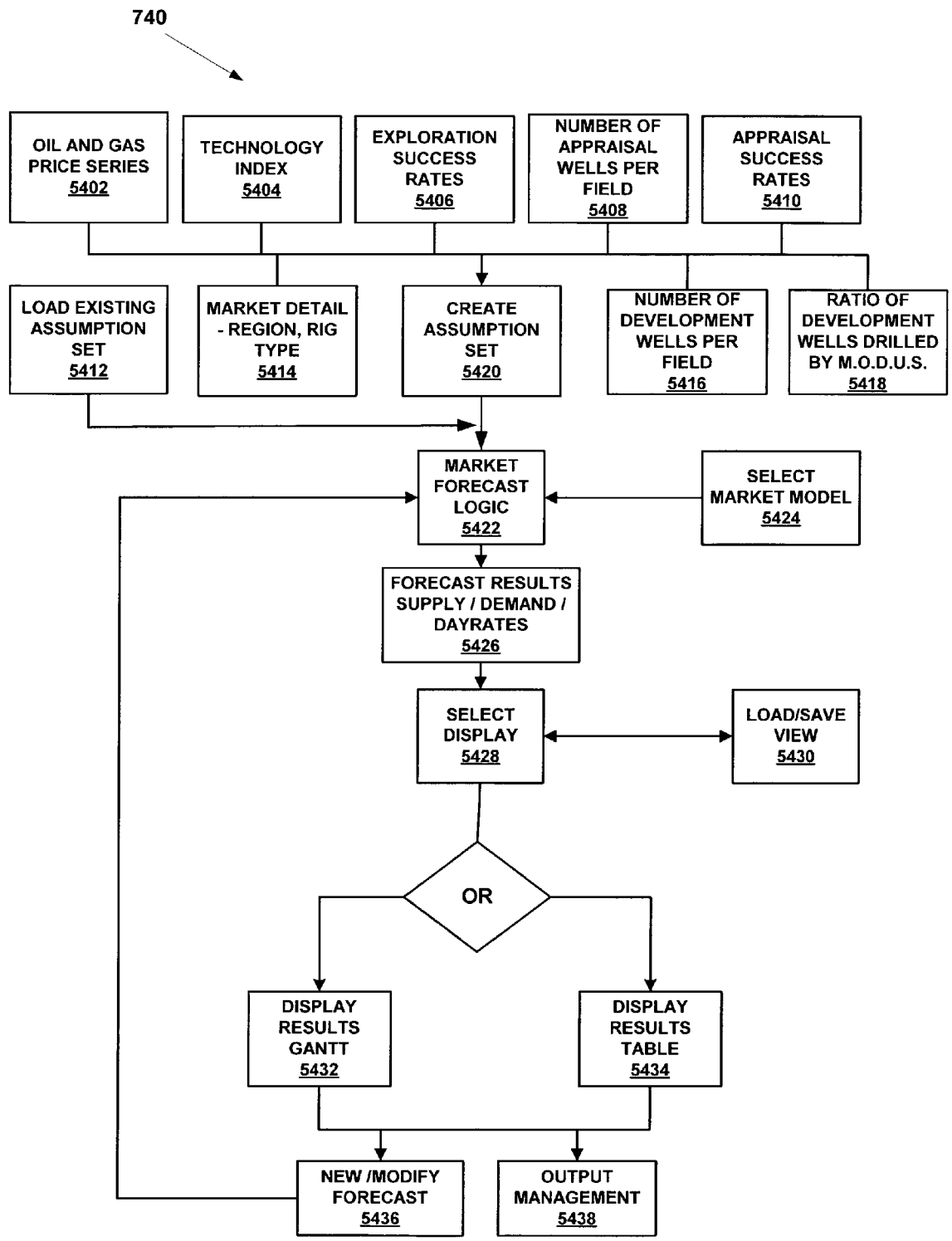
FIG. 54 is a flow chart illustration of the market forecasting tools of the invention.

As can now be appreciated, the organization of the database 100 in combination with the tools provided by the business logic engine 200 and user friendly displays provided by the interface engine 300 provide an ideal environment for using the knowledge base system to facilitate market forecasting. As shown in FIG. 54, the create market forecast tool 740 draws from all portions of the database 100 and uses forecasting logic from the forecasting tools 210 to operate on that information to provide forecasting scenarios. In the exemplary embodiment, the market forecast tools 210 is shown for forecasting supply and demand rig day rates. The process includes making a set of assumptions to develop a particular market forecast based on an oil and gas price series

5402, a technology index 5404, exploration success rates 5406, number of appraisal wells per field 5408, and appraisal success rates 5410, market detail, including region and rig type 5414, number of development wells per field 5416, and ratio of development wells drilled by Mobile Offshore Drilling Units (M.O.D.U.S.) 5418 to create assumption set 5420. For exploration and production regions which are heavily dependent on state owned operators, such as Brazil, Norway, and China, the assumptions set should also include gross domestic production and oil production trend assumptions (not shown). Alternatively, a previously saved set of assumptions could be retrieved by way of load existing assumption set 5412. An existing market model must be selected and applied to actual data drawn from the database 100 to create a set of assumptions and market model, illustrated in the flow chart of FIG. 54 as select market model 5424. The forecasting tool 210 then operates on the assumptions and selected model by applying market forecast logic 5422 to forecast results such as supply/demand/day rates 5426.

The forecast logic 5422 operates as follows: The demand history for each regional/equipment market is regressed against a set of pre-selected inputs that have proven to correlate highly to the market. These include leading, lagging and coincident indicators. The program runs a regression analysis between the historical rig demand and selected inputs to find a best fit (highest r-squared) that results in a data forecast within an acceptable future demand range. This data forecast in turn drives a supply forecast where supply defined in terms of working rigs, idle rigs, cold-stacked rigs, rigs in shipyard and rigs in transit. The supply forecast is based on (a) traditional interaction between supply and demand, (b) worldwide equipment availability and (c) average age of equipment. The supply and demand dynamic is then used to forecast day rates. Historical day rates, which are defined as day rates recorded in the month the contract was signed, are forecasted based on regression analysis between historical day rates and a data series which can include historical marketed utilization (demand/marketed supply), gross utilization (demand/gross supply), utilization of lower specification units (both marketed and gross utilization), oil and gas prices, and other variables to account for periods where utilization rates cross certain thresholds.

The system 10 then provides options similar to the other features so the user can select display 5428, and load/save view 5430 the system will then display results Gantt 5432 or display results table 5434 as selected. From that point, the system 10 can provide the user with the option of a new/modify forecast function 5436 or manage output 5438 similar to other functions within the system 10.

Figure 55:
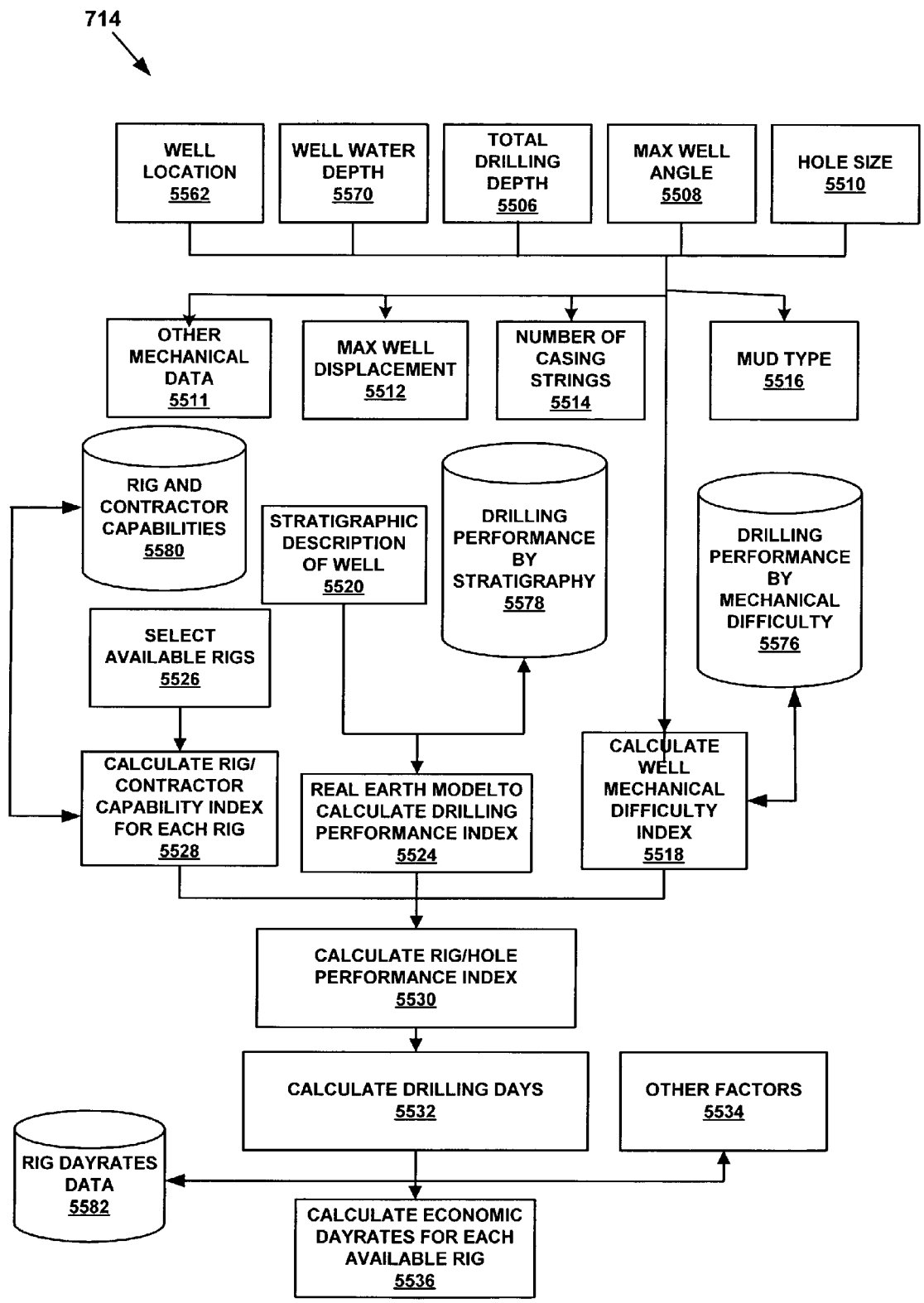
FIG. 55 is a flow chart illustration of the calculate rig day rates feature of the invention.

The calculate economic rig day rate function 704 is another forecasting tool feature of the invention that utilizes the collective and shared information provided by the system 10 to enable participants in the market to estimate a rig day rate (daily usage rate) that presents a price that is likely to be competitive as in accordance with the then current supply and demand conditions, the user capability and the difficulty of the proposed users as defined by the well mechanical characteristics and the prognosed stratigraphy through which the well must be drilled. FIG. 55 illustrates the process by which economic rig day rates, normalized for rig performance and rig capabilities rates may be calculated. The process begins by characterizing the drilling activity for which an economic day rate is to be calculated in terms of parameters that have a significant effect on the difficulty and duration of the drilling project. For example, drilling activity data 160 factors and subfactors to be included in the analysis could include well location 5562, well water depth 5570, total drilling depth 5506, maximum well angle 5508, hole size 5510, maximum well displacement 5512, number of casing strings 5514, mud type 5516, and other mechanical data 5511. In the exemplary embodiment, a suitable index determining algorithm is applied to those factors, subfactors and well drilling performance history factors 5576 to calculate well mechanical difficulty index 5518. That index is then stored in the database 100 together with well drilling performance history 5576.

Another related factor affecting the difficulty and duration of the drilling project is the stratigraphy of the well to be drilled. Accordingly the illustrated process for calculating economic day rates adds as a factor stratigraphic description of well 5520 and users a real earth model to calculate drilling performance index 5522. This index, like the well mechanical difficulty index 5518, can be stored in the database 100 for future recall and to add to information in the knowledge base system. In the illustrated process, that index is stored as (or retrieved from) the performances data 170 in the database 100, shown as drilling performance by stratigraphy 5578. Both the stored data 5578 and the entered data 5520 are used with a real earth model to calculate drilling performance index 5524.

A third index to be determined in the day rate calculation process relates to the rig to be used for the drilling project having a rig/contractor capability index 5528. The knowledge base system can be used to find suitable rigs for the project using the search supply function 718, shown in FIG. 55 as select available rigs 5526. Once available rigs are selected, a suitable indexing algorithm is applied to calculate rig/contractor capability index for each rig 5528. In the illustrated process, that index is stored as (or retrieved from) the performances data 170 in the database 100.

In the illustrated embodiment, a suitable algorithm is applied to these three indices to combine them into an index of combined rig and hole performance, shown in FIG. 55 as calculate rig/hole performance index 5530. The rig/hole performance index 5530 is then used to calculate the number of days it would take to accomplish the drilling project being analyzed, shown in FIG. 55 as calculate drilling days 5532. Other factors can be considered in terms of their affect on day rates depending on the particular project being analyzed, such as mobilization and demobilization costs associated with the rig chosen to perform the project, an upgrades that might be needed to the rig to perform the project, spread rate factors, and others, all shown in FIG. 55 as other factors 5534. The economic effect of these additional factors can be stored in (or retrieved from) the database 100 shown as rig day rates data 5582. the process then produces calculated economic day rates for each available rig 5536.

Figure 56:
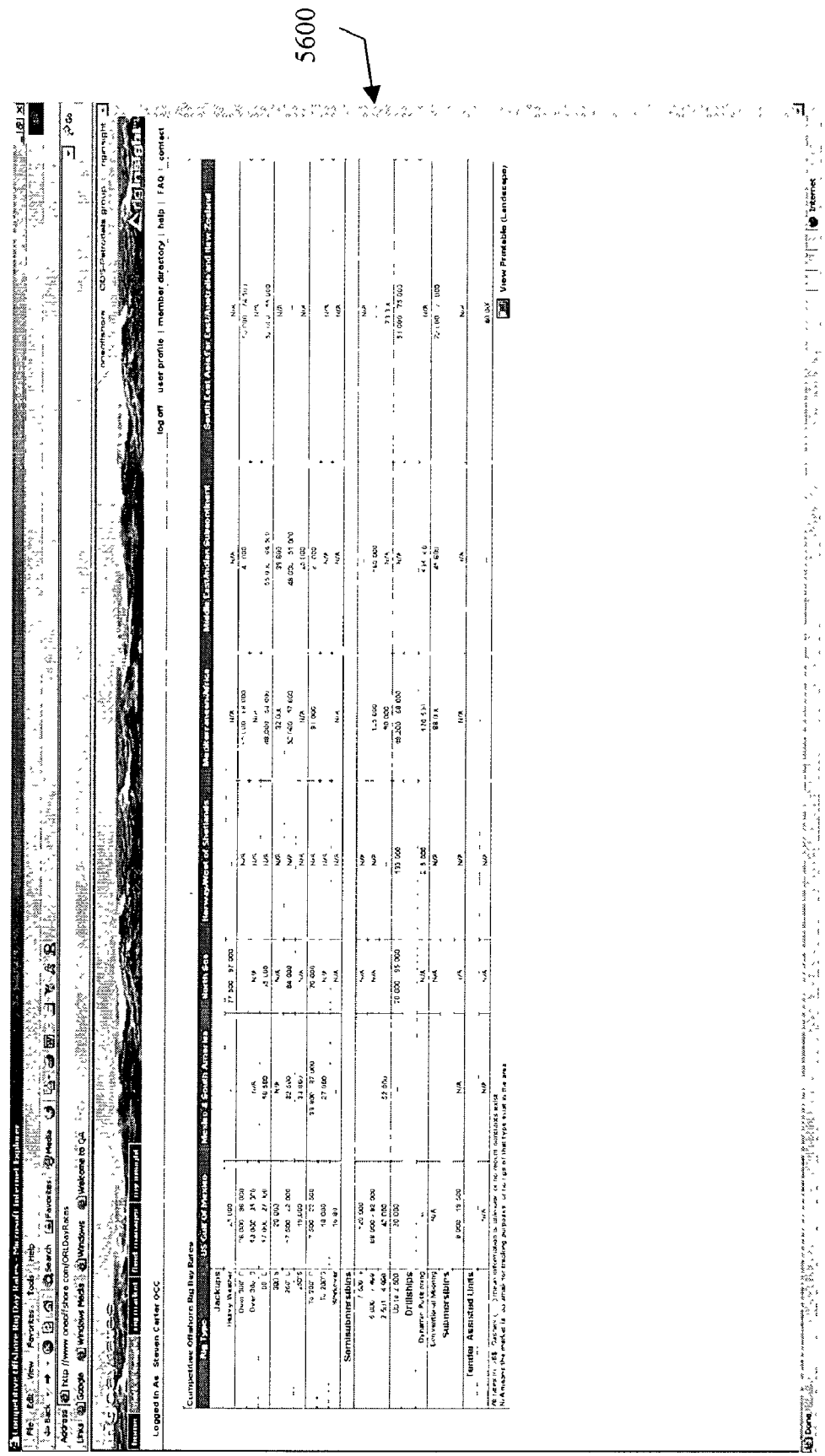
FIG. 56 is a screen capture illustration of the display of rig day rates in accordance with the invention.

In line with the underlying premise that sharing information among participants in a market such as the highly specialized offshore drilling rig equipment market, the system 10 provides under the market insight tab 900 the ability of users to view current market day rates for rigs in the system by rig types and region. The screen capture 5600 shown in FIG. 56 illustrates the screen that the interface engine 300 would cause to be displayed on receiving a request from the business logic engine to retrieve rig day rate data from the database 100.

Figure 57:
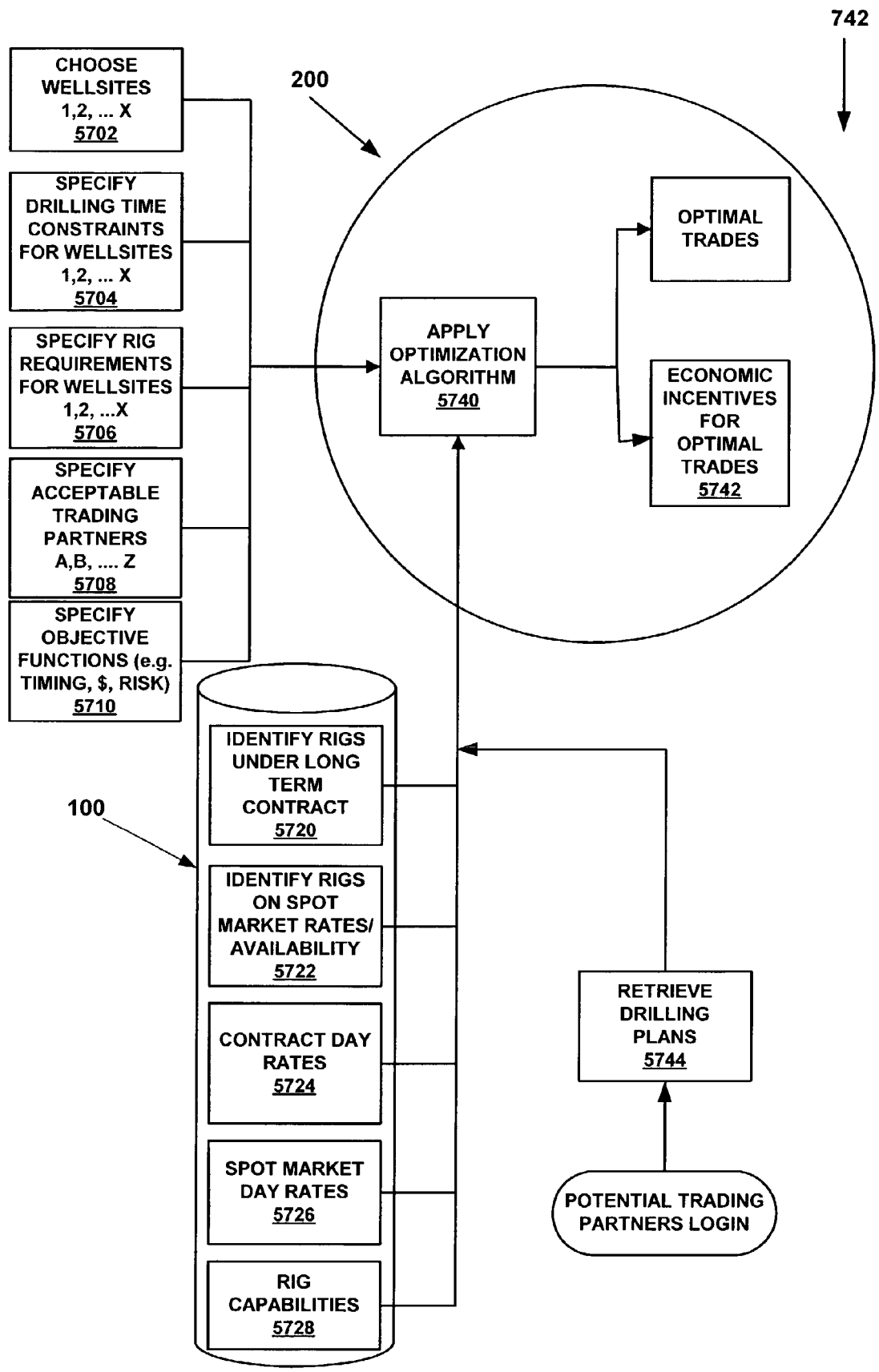
FIG. 57 is a flow chart illustration of an exemplary embodiment of the optimize fleet deployment feature of the invention.

The fleet optimization tool 218 of the business logic engine 200 enables a user to optimize the deployment of one or more rigs in a rig fleet. This optimization routine can be applied either to a user owned or contracted fleet or across several fleets of selected trading partners who might benefit from some elements of cross company optimization. As illustrated in the flow chart of FIG. 57, in an exemplary embodiment, several factors or assumptions are first made by the user including choose wellsites 1,2, . . . X 5702, specify drilling time constraints for wellsites 1,2, . . . X 5704, specify rig requirements for wellsites 1,2, . . . X 5706, specify acceptable trading partners A, B, . . . Z 5708, and Specify Objective Functions (e.g. timing, $, risk) 5710. The database 100 would supply the other variables needed, including identifying rigs under long term contract 5720, identifying rigs on the spot market, with rates and availability 5722, supplying contract day rates 5724, supplying spot market day rates, and rig capabilities 5728 for rigs identified by the search engine 204 or user as meeting the rig requirements specified by the user in the specify rig requirements step 5706. The fleet optimization tool in the business logic engine would then apply optimization algorithm 5740 to identify rig substitutions, scheduling changes, and, if one or more potential trading partners have been selected for cross company optimization the optimal trades 5742 and the economic incentives for optimal trades 5744.

Figure 58:
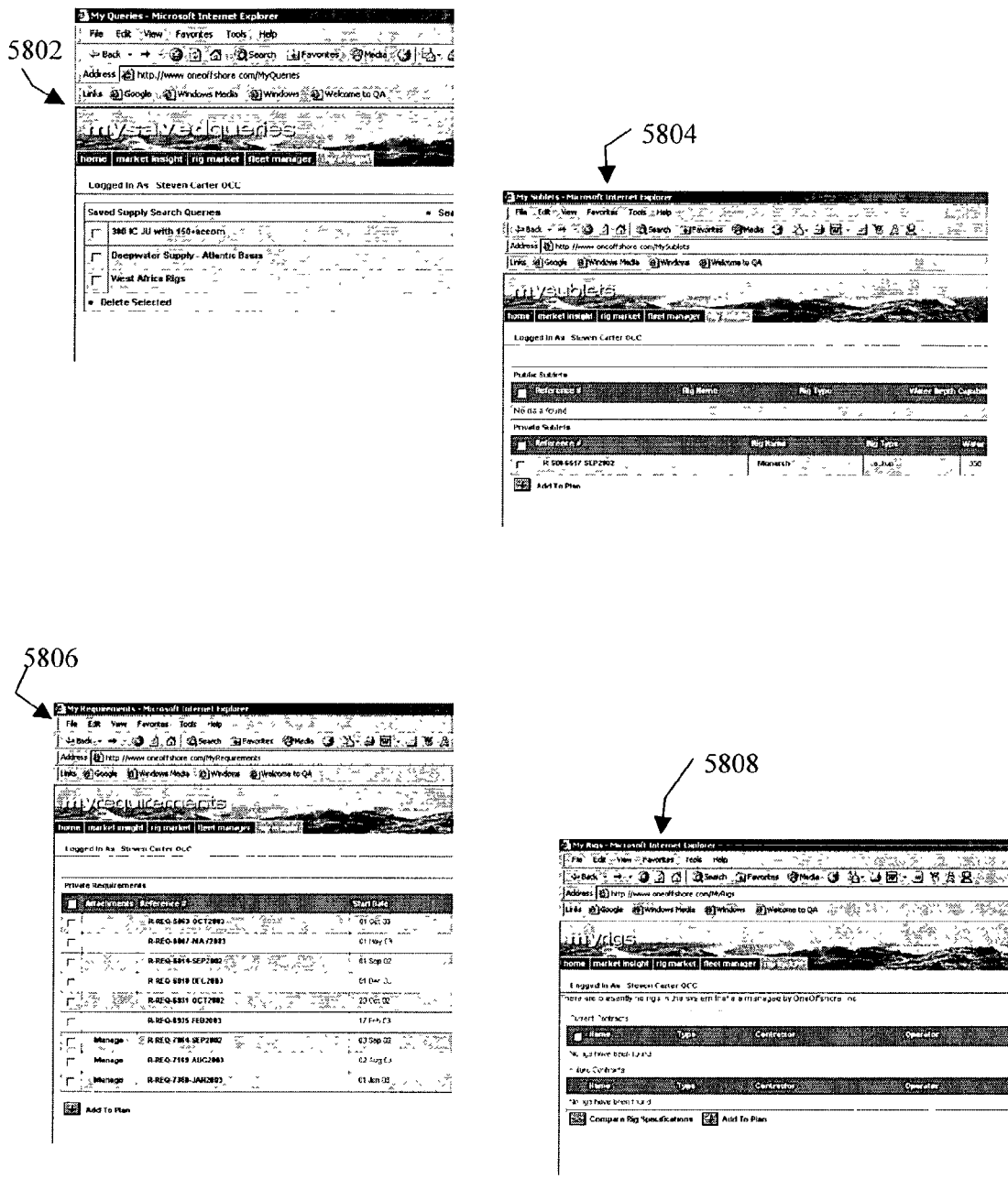
FIG. 58 is a screen capture illustration of the view and access my information function of the invention.

Several features of the invention discussed above enable the user to designate information to be stored as private information. The system 10 makes that private information available to designated users by way of view & access my info function 736 shown in FIG. 7. This function is illustrated by the collection of partial screens shown in FIG. 58. In the illustrated embodiment, this function is invoked when a user selects the My Insight tab 3000 from the screen display generated by the Interface Engine. The My Insight tab 3000 provides the means for user access to private information which the system 10 has flagged for access by that user. An example of user input that causes the Business Logic Engine to flag information is a user designation of users by way of the My Company's Scenarios box 5102 shown in FIG. 51. FIG. 58 illustrates the types of private information made available to a user when user selects the My Insight tab 3000. In the illustrated exemplary embodiment, each category of private information is displayed by the Interface Engine 200 in screens titled "my saved queries" 5802, "my sublets" 5804, "my requirements" 5806, and "my rigs" 5808. Those categories reflect the organization imposed on incoming data by the business logic engine 200, and provide the user with another gateway to take private information, combine it with published and community information and use the information for effective planning and economical participation in the market.

Figure 59:
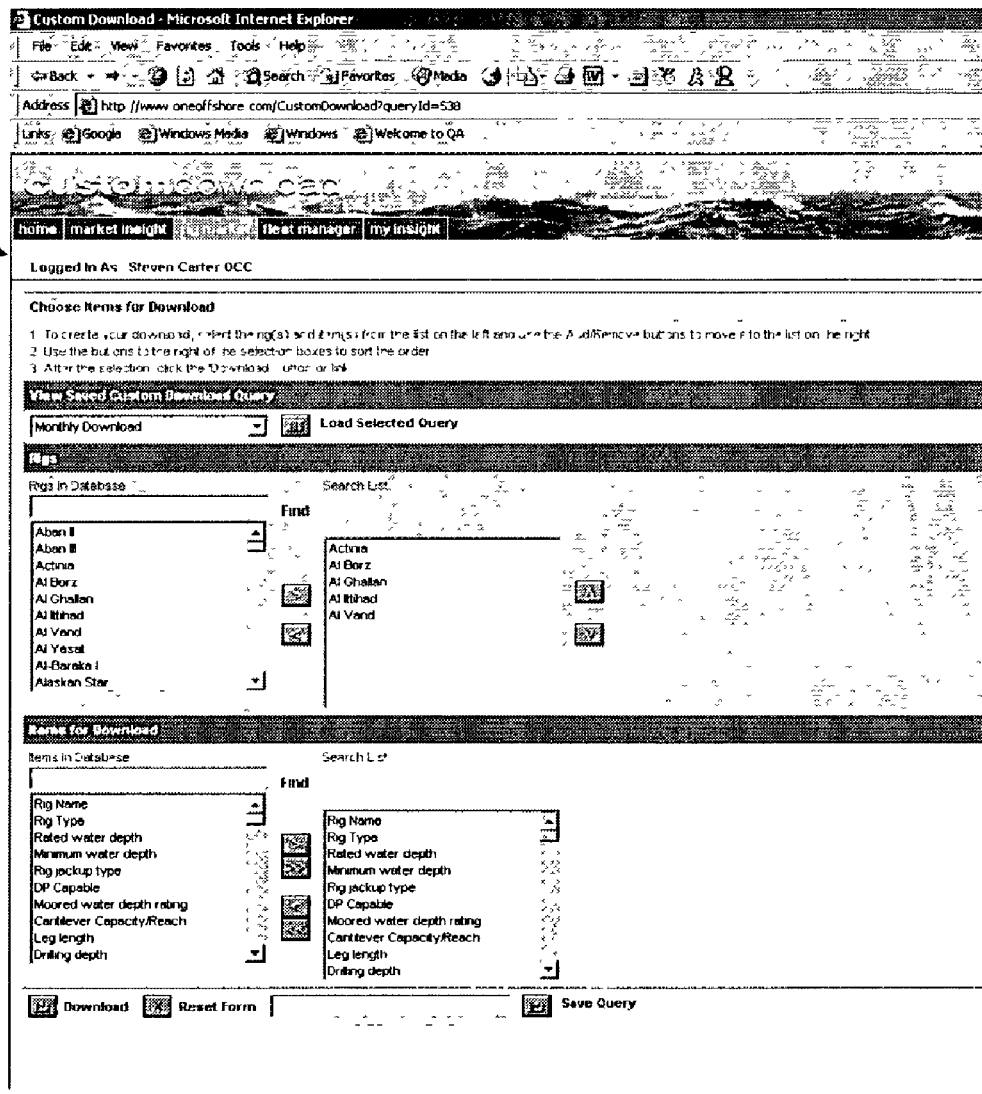
FIG. 59 is a screen capture illustration of the create custom data file function of the invention.

Another feature of the invention is create custom data file function 750 illustrated in the functions flow chart of FIG. 7. For this function, the business logic engine 200 and the interface engine 300 provide the user with the ability to take any collected data displayed on the screen to another computer program as a flat data file in a file format suitable for importing into the users data program. That feature can be invoked from any search results or list of rigs generated by the system when it is displayed by selecting the custom download button such as the download button 2540 shown in FIG. 25 and discussed above in connection with the search supply function 718. In the illustrated exemplary embodiment, selecting a download button causes the interface engine to display custom download screen 5900 shown in FIG. 59. The screen 5800 where a user can select a previously saved query by way of the View Saved Custom Download Query box 5802, or select Rigs 5804 from those in the database and select from any rig data category 110 in the database 100 particular data items to include in the query using the Items for Download box 5806.

Other functions provided by the system 10 and shown in FIG. 7 that enhance the users ability to draw from and use information from both the public and private data in the database 100 include periodic reports function 716 illustrated above in connection with the define personalized data function which can be used to set up particular information to be retrieved from the database on any periodic basis. Another useful functionality is create report agent function 732 by which a user can set up a query to be sent to the web host 12 at fixed time intervals, e.g., daily, weekly or monthly for reply by the web host to the user with a report showing the information in the database responsive to the query.

Another feature of the invention is the ability to create and use work flow templates 702 which can draw details about projects and rigs contained in the database 100 into document templates that contain steps in the process of defining a project, selecting a rig, responding to a tender request, locating equipment to meet the requirements of the project and a timeline for sending out market inquiries or sublets to suitable equipment users for the demand side of the market. Similarly, the work flow templates function 702 can be implemented to facilitate and enhance the efficiency of processes on the supply side of the market.

Figure 60:
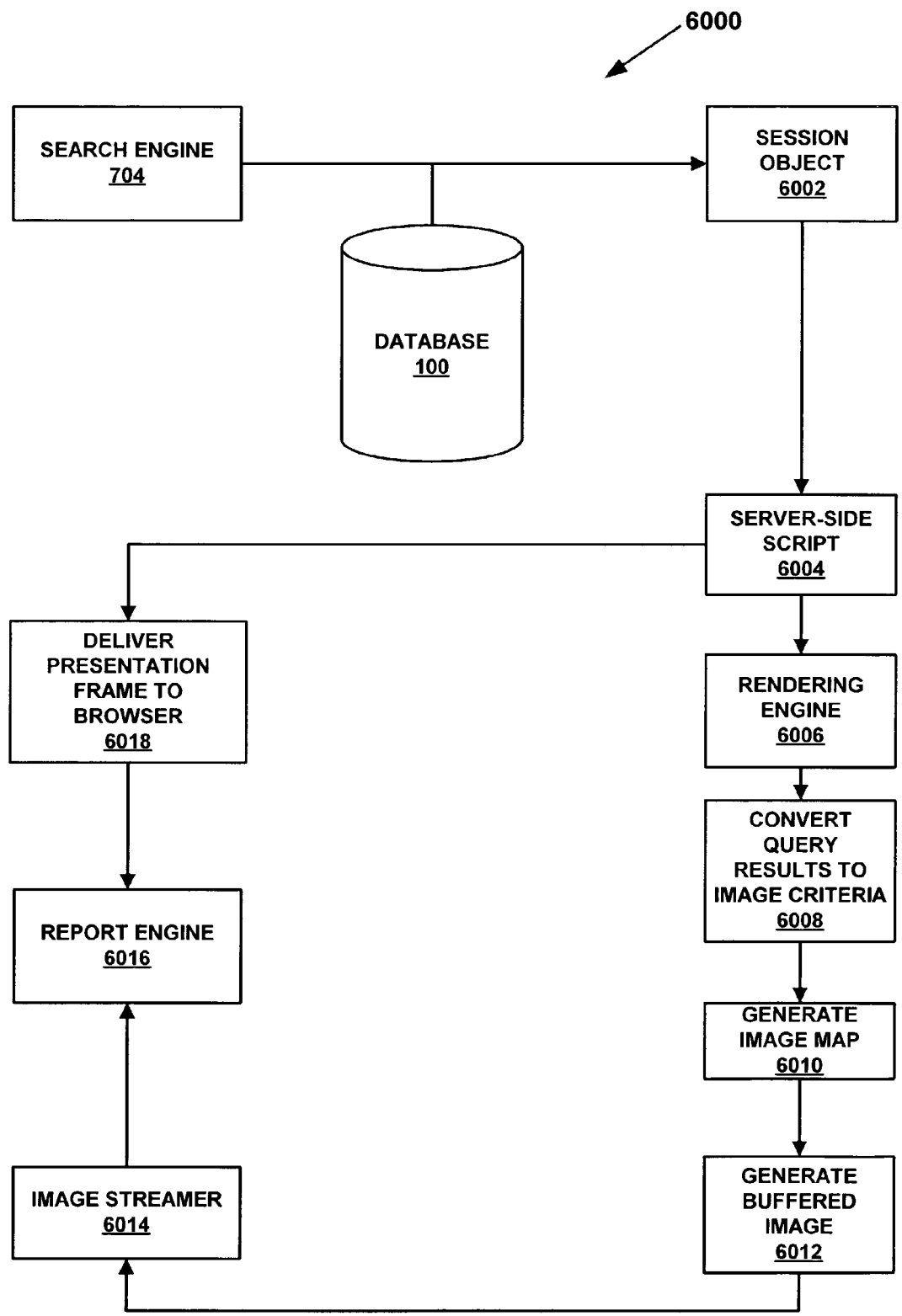
FIG. 60 is a flow chart illustrating of the computer program that creates the Gantt views.

FIG. 60 is a flow chart of the steps performed by computer program code to generate the Gantt views shown in FIGS. 25, 26 and 32. The Gantt view generating code 6000 is generated by the host computer side of the system and is independent of the client or user's browser or platform yet is fully interactive. Moreover, the Gantt view generating code 6000 is optimized to render the Gantt view interactive data display screen quickly through the user's browser.

As shown in FIG. 60, the Gantt view generating code 6000 creates a Session Object 6002 from the original search criteria entered by a user 16 and the results retrieved by the search engine 704 operating on the criteria to retrieve data from the database 100 to be display in the Gantt view. Then a Server-Side Script 6004 generates an html page with embedded <img> tags having an "src" component that forms Rendering Engine 6006. When an <img> tag calls the rendering engine, the code 6000 pulls the original search criteria from the session object 6002 in a convert query results to image criteria step 6008. The code 6000 then calculates the width and height of the image to be rendered, and, using this information and the search results, generates an image map 6010 which enables certain parts of the image to be hyperlinks. The code 6000 then generates a buffered "canvas" object, illustrated as Generate Buffered Image step 6012, on which to draw data for display, e.g. width, height, start and end dates. The rendering engine also pulls search results from the session object 6002, i.e. a data table of the results generated by the Search Engine in the Session Object creation step 6002 and draws on the buffered "canvas" object the number of rows, the depth of rows, and the background color of rows for the Gantt chart display, shown as Draw on canvas step 6018. In addition, for each result object in the result set in the Session Object 6002, the rendering engine identifies one or more objects to be drawn on the "canvas" object, and draws each result object on the buffered "canvas" object—Each result object becomes a chart element that relates to a discrete event in time. The size (height and length of the chart element) is calculated based on the scale of the "canvas" and the duration of the subject event in time, and each chart element is colored according to its result status. When the image is complete in memory, a compression algorithm is applied to encode the buffered image object as a streamed encoded image to be sent by thereby creating image streamer 6014 to a report engine 6016. The server-side script 6004 also delivers a presentation frame to a user's browser 6018 through the request object to enable the user to retrieve the resulting Gantt chart image from the report engine 6016.

An example of the collection of fields that are preferably included in the database 100 as rig data 110 is presented in Table I below:

TABLE 1

Rig Data

| Rig Table Field | Tpye | Unit | Description |
|---|---|---|---|
| AttritionCause | t_DescMed | | Reason Rig was retired |
| AttritionDate | t_Date | | Date rig went or is going out of service |
| BareBoatLnk | t_Link | Link | Link to division table to identify charter bareboat company of rig |
| CurrentAreaLnk | t_Link | Link | Link to current area rig is in |
| CurrentBlockLnk | t_Link | Link | Link to current block rig is in |
| CurrentContractInfo | t_DescShort | | CurrentContractInfo |
| CurrentCountryLnki | t_Linki | Linki | Link to current country rig is in |
| CurrentFarmoutLnk | t_Link | | Current Farmout Company Link to Division Table |
| CurrentFarmoutName | t_Name | | Name of Current Farmout Company |
| CurrentRegionLnki | t_Linki | Linki | Link to current region rig is in |
| CurrentShorebase | t_Name | | Current Shorebase Name |
| CurrentSpudDate | t_Date | | Current Spud Date of well |
| CurrentSpudDateEstimated | t_YesNo | | Is Spud Date Estimated |
| CurrentTargetDepth | t_Number | Feet | Current Target Depth of well |
| CurrentTurnkeyCompanyLnk | t_Link | | Current Turnkey Company Link to Division Table |
| CurrentTurnkeyCompanyName | t_Name | | Name of current Turnkey Company |
| CurrentWell | t_DescShort | | |
| CurrentWellLocation | t_DescShort | | Current Location of Well |
| CurrentWellType | t_DescShort | | Current Type of Well |
| CurrentWellWaterDepth | t_Number | Feet | Current Well Water Depth |
| CurrentWorkoverDepth | t_Number | Feet | Current workover depth |
| DataDateFrom | t_Date | | Date Record Information is From |
| DataDateTo | t_Date | | Date Record Information is To |
| DayRate | t_Money | USD | USD per day for Vessel use |
| DesignWaterDepth | t_Number | Feet | Water depth rigs was designed to handle. |
| FixtureDate | t_Date | | FixtureDate |
| IdleDate | t_Date | | Date Rig goes idle |
| JackupType | t_DescShort | | IS—Ind Leg Slotted, IC—Ind Leg Cant, MS—Matt Slotted, MC—Matt Cantilever |
| Notes | t_DescLong | | Notes on rig |
| NotesClient | t_DescLong | | Client Notes Field Polaris |
| NotesStatusFuture | t_DescLong | | Notes Field |
| ODSFile | t_DescShort | | File where ODS information was originated - if ODS |
| OfficialRigName | t_Name | | Official rig name |
| OriginalShipCountry | t_CityStateCountry | | Original Ship Country |
| OriginalShipCountry | | | |
| OriginalShipLocation | t_DescLong | | Original Ship Location |
| OriginalShipLocation | | | |
| OriginalShipyard | t_Name | | Original Ship Yard |
| OriginalShipYard | | | |
| PrimaryRigLnk | t_Link | Link | Link to primary rig within table |
| RigArea | t_Name | | Rig Area |
| RigClass | t_DescShort | | Classification of Rig |
| RigCompetitive | t_YesNo | | Does rig compete for open bids. |
| RigCompetitiveType | t_DescShort | | Type of non-competive Rig |
| RigContractCode | | | |
| RigContractCodei | | | |
| RigContracted | t_Number | | |
| RigConvWaterDepth | t_Number | Feet | Water depth for a DP rig being moored in a conventional matter |
| RigCountry | t_DescShort | | Country Rig is registered in |
| RigDeckLoad | t_Number | Tons | What the maximum load allowed for the deck is |
| RigDPCapable | | | |
| RigDPCapable | t_YesNo | | Is Rig DP Capable Yes/No |
| RigFieldName | t_Name | | Rig Field Name |
| RigFieldName | | | |
| RigFreeDate | t_Date | | Date Rig went Idle |
| RigFunction | t_DescShort | | Main function of the rig |
| RigGeneration | t_DescShort | | What generation the rig is from 1st, 2nd, 3rd, 4th, 5th |
| RigID | t_id | UID | Unique identifier for the rig |
| RigInServiceDate | t_Date | | When rig originately went in service, used to tell how many years rig has been in service |

TABLE 1-continued

| | | | |
|---|---|---|---|
| RigJackingSystem | t_DescShort | | Type of Jacking system used on Rig, Hydraulic, etc . . . |
| RigLaborContractorLnk | t_Link | Link | Link to Division table representing current labor contractor |
| RigManagerLnk | t_Link | Link | Link to Division table representing Manager of rig |
| RigMoorType | t_DescShort | | Conventional, Directional Propultion, NA |
| RigName | t_Name | | Rigname used |
| RigOperatorLnk | t_Link | Link | Link to Division table representing current operator of rig |
| RigOptionDate1 | t_Date | | Rig Option Date One |
| RigOptionDate2 | t_Date | | Rig Option Date Two |
| RigOwnerLnk | t_Link | Link | Link to division table representing the rig owner |
| RigOwnerName | t_Name | | |
| RigPrimeContractorLnk | t_Link | Link | Company which contracts the Rig out. |
| RigRatedWaterDepth | t_Number | Feet | What the rated water depth of the rig is |
| RigRegion | t_DescShort | | Region Rig operates out of |
| RigStateProv | t_DescShort | | State or Province of Country rig is registered in |
| RigStatusFutureDate | t_Date | | Date Future Status ID takes effect |
| RigStatusFutureLnk | t_Link | Link | Identifier to denote future status ID |
| RigStatusLnki | t_Link | Link | Identifier to denote current status of rig |
| RigTypeLnki | t_Linki | Linki | Link to rigtype table describing type of rig |
| RigWorkMode | t_DescShort | | Accomodation, Appraisal Drilling, Development, Exploration Drilling. |
| RigZone | t_DescShort | | MMS Gulf of Mexico Zone, C, W, E |
| Status | t_DescShort | | Status of Rig |
| StatusCode | t_DescShort | | Status Code of Rig |
| UN | t_Number | | OneOffshore Rig Number (Originated from ODS) |

| RigDetails Table Field | Type | Units | Description |
|---|---|---|---|
| CantileverCapacity | t_Number | Tons | Maximum capacity of Cantilever |
| CantileverReach | t_Number | eet | Length or Reach of Cantilever unit in feet |
| CantileverWidth | t_Number | Feet | Width of Cantilever unit in feet |
| CementingUnit | t_DescShort | | Name of Cementing unit |
| CementingUnitMfg | t_Link | Link | Link to division for manufacture of cementing unit. |
| CementingUnitPSI | t_Number | PSI | PSI for cementing unit |
| DataDateFrom | t_Date | | Date Record Information is From |
| DataDateTo | t_Date | | Date Record Information is To |
| Derrick | t_YesNo | | If true Derrick, else Mask |
| DerrickCapacity | t_Number | Tons | Derrick/Mask capacity tons |
| DerrickHeight | t_Number | Feet | Derrick/Mask Height in feet |
| DerrickMfgLnk | t_Link | Link | Link to Division identifying the manufacture of the Derrick or Mask |
| DerrickMfgName | t_DescShort | | |
| DerrickWidth | t_Number | Feet | Width of Derrick in feet |
| DiverterDiameter | t_Float | Inches | Diameter of Diverter |
| DiverterLnk | t_Link | Link | Link to Division defining Manufacture of Diverter |
| DiverterPSI | t_Number | PSI | PSI of Diverter |
| DiverterType | t_DescShort | | Type of Diverter on board |
| DrawWorksHP | t_Number | HP | Horsepower rating of the Drawworks |
| DrawWorksMfgLnk | t_Link | Link | Link to Division table describing Drawworks Manufacture |
| DrawworksMfgName | t_DescShort | | |
| DrawWorksModel | t_DescShort | | Description of Model of DrawWorks |
| DrillingDepthMax | t_Number | Feet | Maximum drilling depth of rig |
| DrillingLineSize | t_Float | Inches | Size of Drilling Line in inches |
| DrillingSlotLength | t_Float | Feet | Size of Drilling Slot in feet |
| DrillingSlotWidth | t_Float | Feet | Size of Drilling Slot in feet |
| DynamicPositionType | t_DescShort | | Type fo dynamic positioning system on board if any |
| HeliDeckCapacity | t_Number | Tons | Maximum weight Helideck will support |
| HeliDeckSizeLength | t_Number | Feet | Length of Helideck in feet |
| HeliDeckSizeWidth | t_Number | Feet | Width of Helideck in feet |
| LegLength | t_Number | Feet | Leg Length in feet |
| LegQty | t_Number | Qty | Number of legs on rig |
| LegSpacing1 | t_Number | Feet | Distance One for Legspacing in feet |
| LegSpacing1Type | t_DescShort | | Longitudinal, Transverse, Equidistant |
| LegSpacing2 | t_Number | Feet | Distance Two for Legspacing in feet |
| LegSpacing2Type | t_DescShort | | Longitudinal, Transverse, Equidistant |
| MatHeight | t_Number | Feet | Height of Mat in feet |
| MatLength | t_Number | Feet | Length of Mat in feet |
| MatSlotLength | t_Float | Feet | Length of Slot in Mat in feet |

TABLE 1-continued

| | | | |
|---|---|---|---|
| MatSlotWidth | t_Float | Feet | Width of Slot in Mat in feet |
| MatWidth | t_Number | Feet | Width of Mat in feet |
| MoonPoolLength | t_Float | Feet | Length of Moon Pool in Feet |
| MoonPoolWidth | t_Float | Feet | Width of Moon Pool in Feet |
| OperatingDeckLoad | t_Number | Tons | Operating Variable Deck load |
| OperatingDisplacement | t_Float | Tons | Operating Displacement of rig, short tons |
| OperatingDraft | t_Float | Feet | Operating draft of rig, transit draft for jackups |
| PipeHandlingMfgLnk | t_Link | Link | Automatic Pipe Handling Manufacture |
| PipeHandlingModel | t_DescShort | | Automatic Pipe Handling Model |
| PreventorControl | t_DescShort | | |
| PreventorControlsMfgLnk | t_Link | Link | Blowout Preventor Controls Manufacture Link |
| PreventorControlsMfgName | t_Name | | Preventor Controls Manufactuer Name |
| PreventorControlsType | t_DescShort | | Type of blow out preventor controls on board |
| PreventorDiameterMax | t_Number | Inches | Maximum Diameter of Preventor in inches |
| PreventorWorkingPressureMax | t_Number | PSI | Maximum Working Pressure for Preventor |
| PropulsionSystem | t_DescShort | | Type of propulsion system on board |
| RigCost | t_Money | USD | Total cost of rig |
| RigCostEstimated | t_YesNo | | Is Rig Cost an Estimate |
| RigCountryLnk | t_Linki | Linki | Current Country Rig is working out of |
| RigDateDelivery | t_Date | | Date rig was completed/delivered |
| RigDateDeliveryOrig | t_Date | | Original Rig Delivery Date |
| RigDateOrder | t_Date | | Date rig was ordered |
| RigDeckFree | t_Number | Feet | Amount of free deck space in square feet |
| RigDesign | t_DescMed | | Name of design of rig |
| RigDesignerLnk | t_Link | Link | Link to Division table defining Rig Designer |
| RigDesignerName | t_DescShort | | |
| RigDesignNotes | t_DescLong | | Notes on rig design |
| RigHullBreadth | t_Float | Feet | Width of hull at widest point |
| RigHullDepth | t_Float | Feet | hull depth for jackups |
| RigHullLength | t_Float | Feet | Length of hull |
| RigHullNewDeliv | t_YesNo | | Was the hull built new for the rig or was it used from another vessel |
| RigHullNumber | t_DescShort | | Assigned by the shipyard that built the rig. |
| RigLnk | t_Link | Link | Link to Unique Identifier in master Rigs table |
| RigMarketed | t_YesNo | | If true or yes, the rig is being marketed by the rigowner |
| RigOrderDate | t_Date | | Date rig was ordered |
| RigPontoons | t_Number | Qty | Total pontoons on rig |
| RigQuarters | t_Number | Persons | Quarters or beds capacity of rig |
| RigRegistryCountry | t_Name | | Country Rig is currently Registered in |
| RigROVSystem | t_DescShort | | Type of ROV unit available, Magnum 30 . . . |
| RigSpeculative | t_YesNo | | Was rig built on a speculative order |
| SCRMfgLnk | t_Link | Link | SCR System Manufacture |
| SCRMfgName | t_DescShort | | |
| ShaleShakerMfgLnk | t_Link | Link | Shaleshaker Manufactuer Link |
| ShaleShakerQty | t_Number | Qty | Number of ShaleShaker |
| ShaleShakerType | t_DescShort | | Type of Shale Shaker |
| SolidsControl | t_DescShort | | Type of Shaker unit |
| StorageBaseOil | t_Number | CubicFeet | Base Oil Storage |
| StorageCementBulk | t_Number | CubicFeet | Bulk Cement Storage |
| StorageFuel | t_Number | CubicFeet | Storage of Fuel |
| StorageMudBulk | t_Number | Square-Feet | Bulk Mud Storage |
| StorageMudLiquid | t_Number | CubicFeet | Total Liquid Mud storage |
| StorageSack | t_Number | CubicFeet | Sack Storage |
| StorageWaterDrilling | t_Number | CubicFeet | Total storage of drilling water |
| StorageWaterPotable | t_Number | CubicFeet | Maximum gallans of Potable water storage |
| SubseaHandling | t_DescShort | | Method of handling subsea equipment |
| SurvivalDeckLoad | t_Number | Tons | Deckload during a survival situation |
| SurvivalDisplacement | t_Number | Tons | Displacement of rig when conditioned for storm or other survival situations |
| SurvivalDraft | t_Number | Feet | Draft of rig when conditioned for storm or other survival situations |
| TopDriveDeliveryDate | t_DescShort | | Date Top drive is to be delivered |
| TopDriveMfg | t_Name | | Manufacture of Top Drive unit |
| TopDriveModel | t_DescShort | | Model of Top Drive Motor |
| TopDriveOutput | t_DescShort | | Maximum HP Rating of Topdrive unit |
| TransitDeckLoad | t_Number | Tons | Variable deckload during transit |
| TransitDisplacement | t_Number | Tons | Displacement of rig during transit |
| TransitDraft | t_Number | Feet | Draft of rig during transit |
| TurnkeyCompanyLnk | t_Link | Link | The company that turnkeying rig, links to division table |
| TurnkeyCompanyName | t_DescShort | | |
| WorkingWaterDepthMax | t_Number | Feet | Maximum working water depth of rig |
| WorkingWaterDepthMin | t_Number | Feet | Minimum working water depth of rig |

TABLE 1-continued

| | | | |
|---|---|---|---|
| WorkOverDepth | t_Number | Feet | Rated workover drilling depth |
| YearBuilt | t_Number | Other | Year Rig was manufactured |

| RigBuildDetails Table Field | Type | Units | Description |
|---|---|---|---|
| BuildCompanyLnk | t_Link | Link | Link to DivisionID that represents company referenced in BuildType |
| BuildCompletedDate | t_Date | | Date Build was completed |
| BuildCosts | t_Money | USD | Total Cost of Build |
| BuildCostsActual | t_YesNo | | if true the costs given are actuals, otherwise they are estimates |
| BuildNotes | t_DescLong | | Notes concerning Build |
| BuildOrderDate | t_Date | | Date build was ordered |
| BuildStartDate | t_Date | | Date Build started |
| BuildTypeLnk | t_Link | Link | Link to Build type describing the entry |
| BuildYardLnk | t_Link | Lini | Link to Yard in BuildYard that represents the yard that work was done |
| RigBuildDetailsID | t_id | UID | Unique identifier for record |
| RigLnk | t_Link | Link | Link to Rig this entry pertains to |

| RigAnchors Table Field | Type | Units | Description |
|---|---|---|---|
| AnchorCapacity | t_Number | Tons | Capacity of Anchor |
| AnchorChainDiameter | t_Number | Inches | Diameter of anchor chain in inches |
| AnchorChainLength | t_Number | Feet | Length of chain for Anchor in feet |
| AnchorMfgLnk | t_Link | Link | Link to Division table for Anchor Manufacture |
| AnchorMfgName | t_Name | | |
| AnchorQty | t_Number | Qty | Number of anchors of this type |
| AnchorType | t_DescShort | | Type of anchor |
| AnchorWeight | t_Number | Lbs | Weight of Anchors of this type in pounds |
| DataDateFrom | t_Date | | Date Record Information is From |
| DataDateTo | t_Date | | Date Record Information is To |
| RigAnchorsID | t_id | UID | Unique Identifier for Anchor table |
| RigLnk | t_Link | Link | Link to primary record in Rigs table |

| RigCrane Table Field | Type | Units | Description |
|---|---|---|---|
| CraneBoomLength | t_Number | Feet | Length of boom on crane in feet |
| CraneCapacity | t_Number | Tons | Capacity of Crane in tons |
| CraneMfgLnk | t_Link | Link | Link to Manufacture for crane in the division table |
| CraneModel | t_DescShort | | Model of Crane on board |
| CraneNotes | t_DescMed | | Notes on Crane |
| CraneQty | t_Number | Qty | Quantity of cranes on board |
| CraneReach | t_Float | Feet | Crane Reach for Capacity |
| CraneReachCapacity | t_Number | Tons | Crane reach at capacity |
| CranMfgName | t_Name | | |
| DataDateFrom | t_Date | | Date Record Information is From |
| DataDateTo | t_Date | | Date Record Information is To |
| RigCraneID | t_id | UID | Unique identifier for RigCrane table |
| RigLnk | t_Link | Link | Link to Rig table for master record |

| RigEngine Table Field | Type | Units | Description |
|---|---|---|---|
| DataDateFrom | t_Date | | Date Record Information is From |
| DataDateTo | t_Date | | Date Record Information is To |
| EngineHP | t_Number | HP | Horsepower of this model of engine |
| EngineMfgLnk | t_Link | Link | Link to Division table describing manufacture of this engine model |
| EngineMfgName | t_Name | | |
| EngineModel | t_DescShort | | Model of Engine |
| EngineQty | t_Number | Qty | Quantity of engines of this model |
| RigEngineID | t_id | UID | Unique identifier for RigEngine table |
| RigLnk | t_Link | Link | Rig this record pertains to |
| RigPropellors | t_Number | Qty | Number or Propellors for these engines |

| RigGenerator Table Field | Type | Units | Description |
|---|---|---|---|
| DataDateFrom | t_Date | | Date Record Information is From |
| DataDateTo | t_Date | | Date Record Information is To |
| GeneratorKW | t_Number | KW | Kilowatt output of generator |
| GeneratorMfgLnk | t_Link | Link | Link to Division for Manufacture of Generator |
| GeneratorMfgName | t_Name | | |
| GeneratorModel | t_DescShort | | Model of Generator |
| GeneratorQty | t_Number | Qty | Quantity of generators of this type |

TABLE 1-continued

| Field | Type | Units | Description |
|---|---|---|---|
| RigGeneratorID | t_id | UID | Unique Identifier for the table |
| RigLnk | t_Link | Link | Link to Rig table for primary link |

| RigMooringLine Table Field | Type | Units | Description |
|---|---|---|---|
| DataDateFrom | t_Date | | Date Record Information is From |
| DataDateTo | t_Date | | Date Record Information is To |
| MooringLineDiameter | t_Float | Inches | Mooring Line Diameter in inches |
| MooringLineLength | t_Number | Feet | Mooring Line length in feet |
| MooringLineMfgLnk | t_Link | Link | Link to Division table for Manufacture of Mooring Line |
| MooringLineMfgName | t_Name | | |
| MooringLineQty | t_Number | Qty | Mooring Line Quantity |
| MooringLineType | t_DescShort | | Mooring Line type |
| RigLnk | t_Link | Link | Link to Division table for master Rig record |
| RigMooringLineID | t_id | UID | Unique Identifier for RigMooringLine |

| RigMudPumps Table Field | Type | Units | Description |
|---|---|---|---|
| DataDateFrom | t_Date | | Date Record Information is From |
| DataDateTo | t_Date | | Date Record Information is To |
| MudPumpHP | t_Number | HP | The Horsepower of this type MudPumps |
| MudPumpMfgLnk | t_Link | Link | Link to Division table for Manufacture of Mud Pump |
| MudPumpMfgName | t_Name | | |
| MudPumpPressure | t_Number | PSI | Pressure of Mud Pump |
| MudPumpQty | t_Number | Qty | Quantity of Mud Pumps of this type |
| MudPumpType | t_DescShort | | Type of Mud Pump on Rig |
| RigLnk | t_Link | Link | Link to Rig |
| RigMudPumpsID | t_id | UID | Unique Identifier for table |

| RigPreventors Table Field | Type | Units | Description |
|---|---|---|---|
| DataDateFrom | t_Date | | Date Record Information is From |
| DataDateTo | t_Date | | Date Record Information is To |
| PreventorDiameter | t_Float | Inches | Diameter of Preventor in inches |
| PreventorMfgLnk | t_Link | Link | Link to Division table describing Manufacture. |
| PreventorMfgName | t_Name | | |
| PreventorQty | t_Number | Qty | Quantity of this type preventor |
| PreventorType | t_DescShort | | Type of Preventor, Double U Rams, Annular |
| PreventorWorkingPressure | t_Number | PSI | Working Pressure of Preventor |
| RigLnk | t_Link | Link | Rig this Preventor Pertains to |
| RigPreventorsID | t_id | UID | Unique Identifier for Rig Preventor, not used other than Replication |

| RigPreviousNames Table Field | Type | Units | Description |
|---|---|---|---|
| RigLnk | t_Link | Link | Link to Current Rig for Current RigName |
| RigNameDateFrom | t_Date | | Date Name started being used |
| RigNameDateTo | t_Date | | Date Name ciesed to be used |
| RigNamePrevious | t_DescShort | | Previous Name of Rig |
| RigPreviousNamesID | t_id | UID | Unique identifier for the table |

| RigRiser Table Field | Type | Units | Description |
|---|---|---|---|
| DataDateFrom | t_Date | | Date Record Information is From |
| DataDateTo | t_Date | | Date Record Information is To |
| RigLnk | t_Link | Link | Link to Rig table for primary record |
| RigRiserID | t_id | UID | Unique identifier of Riser Table |
| RiserDiameter | t_Float | Feet | Riser Diameter in feet |
| RiserLength | t_Number | Feet | Riser Length in feet |
| RiserMfgLnk | t_Link | Link | Manufacture link in Division |
| RiserMfgName | t_Name | | |

| RigRiserTensioner Table Field | Type | Units | Description |
|---|---|---|---|
| DataDateFrom | t_Date | | Date Record Information is From |
| DataDateTo | t_Date | | Date Record Information is To |
| RigLnk | t_Link | Link | Link to primary record in Rigs table |
| RigRiserTensionerID | t_id | UID | Unique Identifier of Riser Tensioner Table |

TABLE 1-continued

| | | | |
|---|---|---|---|
| TensionerCapacity | t_Number | Tons | Riser Tensioner Capacity |
| TensionerMfgLnk | t_Link | Link | Link to division table for Manufacture |
| TensionerMfgName | t_Name | | |
| TensionerQty | t_Number | Qty | Quantity of this type tensioner |
| TensionerType | t_DescShort | | Type of tensioner |

| RigWellHeadConnector Table Field | Type | Units | Description |
|---|---|---|---|
| DataDateFrom | t_Date | | Date Record Information is From |
| DataDateTo | t_Date | | Date Record Information is To |
| RigLnk | t_Link | Link | Link to Rig table for master record |
| RigWellheadConnectorID | t_id | UID | Unique identifier for table |
| WellheadConnectorDiameter | t_Float | Inches | Diameter of Wellhead Connector |
| WellheadConnectorMfgLnk | t_Link | Link | Link to Division table for Manfacture |
| WellheadConnectorMfgName | t_Name | | |
| WellheadConnectorModel | t_DescShort | | Model of Wellhead Connector |
| WellheadConnectorWPressure | t_Number | PSI | Wellhead Connector Working Pressure |

| RigWinch Table Field | Type | Units | Description |
|---|---|---|---|
| DataDateFrom | t_Date | | Date Record Information is From |
| DataDateTo | t_Date | | Date Record Information is To |
| RigLnk | t_Link | Link | Link to Rig record |
| RigWinchID | t_id | UID | Unique Identifier for Winch table |
| WinchCapacity | t_Number | Tons | Capacity of Winch in tons |
| WinchMfgLnk | t_Link | Link | Link to division for Winch Manufacture |
| WinchMfgName | t_Name | | |
| WinchNotes | t_DescMed | | Notes on Winch |
| WinchQty | t_Number | Qty | Number of Winches of this type |
| WinchType | t_DescShort | | Type of Winch, dbl, sng |

| RigStatus Table Field | Type | Unit | Description |
|---|---|---|---|
| RigStatus | t_Name | | Status Name, descriptive name of rigstatus |
| RigStatusCategory | t_Name | | Category of rigstatus, Working, Non Working, UnderConstruction |
| RigStatusDesc | t_DescMed | | Description of status |
| RigStatusIDi | t_idi | UIDi | Unique Identifier for Status table |
| RigStatusShort | t_Name | | Short Name of Status, WO-Drl for drilling, and so on |

| RigType Table Field | Type | Units | Description |
|---|---|---|---|
| RigType | t_Name | | Semi submersible, Jackup, Tender, Ship, Platform |
| RigTypeDesc | t_DescMed | | Description of Rig Type |
| RigTypeIDi | t_idi | UIDi | Unique identifier for table |
| RigTypeShort | t_Name | | Short name for RigType |

| RigContracts Table Field | Type | Units | Description |
|---|---|---|---|
| AreaLnk | t_Link | | |
| ContactInfo | t_DescLong | | Contact Information |
| ContractAgreedDate | t_Date | | Date Contract was aggreed to |
| ContractDayRate | t_Money | USD | Day rate of Contract |
| ContractDetails | t_DescLong | | Detail notes of contract |
| ContractEndDate | t_Date | | End date for Contract |
| ContractEstimated | t_YesNo | | if yes or true contract information is an estimate |
| ContractName | t_Name | | Name of contract |
| ContractOperatorLnk | t_Link | Link | Who the contract was issued to |
| ContractOperatorName | t_Name | | Name of company contract was issued to |
| ContractOwnerLnk | t_Link | Link | Who the contract was issued from, the owner of the vessel |
| ContractOwnerName | t_Name | | The name of the owner of the vessel |
| ContractStartDate | t_Date | | Start date for Contract |
| ContractValue | t_Money | USD | Value of contract is determined by the number of day X the dayrate, then adjusted |

TABLE 1-continued

| | | | |
|---|---|---|---|
| CountryOfContract | t_DescShort | | Country Contract takes place from |
| ODSFile | t_Name | | |
| PrimaryContractorLnk | t_Link | | Primary Contractor Link |
| ProjectJobsLnk | t_Link | Link | Link to ProjectJobs for job description and scope of job |
| RigContractsID | t_id | UID | Unique identifier for table |
| RigContractsStatusLnki | t_Link | | Rig Contract Status Link |
| RigLnk | t_Link | Link | Link to Rig Contract pertains to |
| RigStatusLnki | t_Linki | Linki | Status of rig on contract |
| SubContractLnk | t_Link | Link | if not null, then RContractID of child (Farmout) |

Rig Activities (Events) Data

| ProjectJobs Table Field | Type | Units | Description |
|---|---|---|---|
| AreaLnk | t_Link | Link | Link to Area where job resides |
| AreaNotes | t_DescShort | | Notes on Area where job is |
| BlockLnk | t_Link | | Link to Block Table |
| Contract | t_YesNo | | If yes, this job has a contract |
| ContractClientLnk | t_Link | Link | Client of Contract, if there is a contract |
| ContractClientName | t_Name | | Name of Contract Client free form entry |
| ContractDetails | t_DescShort | | Details about the contract |
| DateCreated | t_Date | | Date Project Jobs record was created |
| DateModified | t_Date | | Date Projects Jobs record was modified |
| DayRate | t_Money | | Rate at time of Contract |
| DayRateConfidential | t_YesNo | | If true, DayRate is confidential |
| DayRateEstimate | t_YesNo | | If true dayrate is an estimate or approximate |
| DayRateNotes | t_DescShort | | Notes on dayrate |
| FieldsLnk | t_Link | | |
| FixtureDate | t_Date | | Fixture Date |
| FixtureDate | t_Date | | Fixture Date |
| JobDateComplete | t_Date | | Actual date job will be complete |
| JobDateEComplete | t_Date | | Estimated completion date for job |
| JobDateEStart | t_Date | | Estimated start date for job |
| JobDateStart | t_Date | | Actual date job will start |
| JobDescription | t_DescMed | | Description of work involved |
| JobNotes | t_DescMed | | Note on Project Job |
| PolarisEntry | | | Polaris Entry |
| PolarisFile | t_Name | | File or Table from Polaris where data originated |
| ProjectJobsID | t_id | UID | Unique Identifier for table |
| ProjectJobsStatusLnki | t_Linki | Linki | Shows status of Job |
| ProjectJobsTypeLnki | t_Linki | Linki | Described what Job is for, Rig, Vessel, Platform . . . |
| ProjectWorkMode | t_DescShort | | Comma delimited list of workmode IDs from the WorkMode Table |
| RigContractLnk | t_Link | | Link to Rig Contracts Table |
| ShoreBase | t_Name | | Shorebase name |
| StateProv | t_CityStateCountry | | State or Providence |
| SubLetComment | t_DescMed | | Comments descibing sublet availablility in contract |
| SubLetDate | t_Date | | Date Sublet availability begins |
| SubLetDays | t_Number | | Number of days sublet window will be |
| SubLetProbableScale | t_Number | | 1 to 10 rating of probability of sublet window |
| TurnkeyCompanyLnk | t_Link | | Link to Division Table for Turnkey Company Name |
| TurnkeyCompanyName | t_Name | | DivisionName |
| VesselContractorLnk | t_Link | Link | Contractor of Vessel at time of job |
| VesselContractorName | t_Name | | Name of vessel contractor free form entry |
| VesselLnk | t_Link | | Links to appropriate vessel table, like Rig, Platform |
| VesselStatusLnki | t_Linki | Linki | Links to appropriate vessel status table, like RigStatus, PlatformStatus . . . |
| WellLocation | t_DescShort | | Current Well Location |
| WellName | t_DescShort | | Name of Well |

TABLE 1-continued

| | | | |
|---|---|---|---|
| WellOCS | | | WellOCS |
| WellSPudDate | t_Date | | Well Spud Date |
| WellSpudDateEstimated | t_YesNo | | Estimated Spud Date of Well |
| WellTargetDepth | t_Number | Feet | Target Depth of well |
| WellTypeLnki | t_Link | | WellType Link |
| WellWaterDepth | t_Number | Feet | Well Water Depth |
| WellWaterDepthEst | t_YesNo | Feet | Estimated Well Water Depth |
| WellWorkoverDepth | t_Number | Feet | Well Workover depth |

Although the above detailed description relates specifically to a system for collecting, storing, presenting and analyzing information relating to the deployment and operation of offshore drilling rigs by the oil and gas drilling industry, as can now be appreciated, the present invention and its many features and embodiments has broad applicability to markets where market participants can benefit from collecting and sharing market information to enhance the economic efficiencies of their participation in the market. Because the market for utilization of offshore drilling rigs is one that involves extremely volatile demand and extremely inelastic supply and traditionally little or no transparency of supply or demand or day rates. As a result of the nature of that market, the present invention is particularly well suited to that market because the users ability to effectively participate in this market is significantly enhanced by creating market transparency and user scenarios and plans with information provided through the host computer.

As can be appreciated, the communications feature of the present invention can provide participants in virtually any equipment market with essential business tools that can lead to greater economic efficiencies because it enables participants to effectively and quickly communicate information on the available supply of equipment, their geographic location of the equipment, and availability of the equipment for projects for which the equipment is well suited. The efficiencies of any equipment market can also benefit from the invention because it provides owners of equipment fleets with the informational tools to predict and plan their deployment of that equipment. Hence, although the present invention was conceived and reduced to practice in the context of the rig market, it is applicable to any equipment market. and, as can now be appreciated, various aspects and features of the present can be used in the context of virtually any market where equipment owners and users will benefit from sharing historical and current supply and demand information to create economic efficiencies in that particular market.

Although illustrative embodiments have been shown and described, a wide range of modification, changes, and substitution is contemplated in the foregoing disclosure. In some instances, some features of the disclosed embodiments may be employed without a corresponding use of the other features. Accordingly, it is appropriate that the appended claims be construed broadly and in a manner consistent with the scope of the invention.

What is claimed is:

1. A computer implemented system for managing and processing supply and demand information for participants in an equipment market, the system comprising:
   a data processor programmed to receive and store electronically received data, designated by an user, as private information or public information and combinations thereof in a relational database in an electronic storage medium, wherein the computer implemented system assigns the private information an unique requirements reference number;
   a business logic engine comprising computer readable program code stored on a host computer wherein a business logic program code comprises:
      a search engine for selectively retrieving data from the relational database;
      an interface engine for communication between a system user and the data processor and the business logic engine whereby the business logic engine operates on data processed by the data processor and the interface engine displays the results of operation by the business logic engine, wherein the interface engine generates graphical output for creating an interactive chart view, wherein the interactive chart view is supported solely by a host computer, a means for generating a graphical user interface with a tabular output; and
   a communications engine for receiving a market inquiry on equipment from both a demand side market participant and a supply side market participant and forwarding the inquiry to the supply side market participant or the demand side market participant and for receiving a response to the inquiry from the supply side market participant or demand side market participant and forwarding the received response to the demand side market participant or supply side market participant, and wherein the equipment comprises drilling and production equipment for oil and natural gas.

2. The system of claim 1 wherein the search engine and communications engine each comprise computer readable program code and wherein the business logic engine further comprises computer readable program code modules selected from the group comprising a personalization tool module, a search engine module, a report engine module, a forecast tool module, an equipment planning tool module, an equipment usage sequences tool module, collaboration tool module, an equipment deployment optimization tool module and a day rate calculation tool module.

3. The system of claim 1 wherein the data processor, communications engine and business logic engine are stored on the host computer coupled to the Internet.

4. A method for creating a plan for equipment usage comprising the steps of:
   providing a database contained in a computer storage medium for storing information relevant to participation in an equipment market, wherein the database comprises:
      a plurality of equipment records containing information about specific pieces of equipment within an equipment category wherein each record comprises a unique equipment identifier and data associated with that identifier wherein the associated data is selected from the data group comprising: technical specifications for the equipment, type of equipment, equipment owner, equipment contractor, current equipment activity, current equipment status, equipment availability date, equipment ownership history, and equipment technical upgrade history; and one or more equipment related activity records, wherein each record comprises a unique activity identifier and data associated with that identifier, the associated data comprises public data and private data selected from the data group comprising: activity location, activity status, activity operator, activity technical specifications, and equipment rental rate for the activity; querying a database to identify and select an equipment group; creating work flow templates and using the work flow templates to draw details from the equipment records into a document template, and generating periodic reports based on the document template and information stored in the database.

5. A method for analyzing supply and demand information in an equipment market having a discrete number of market participants comprising:

creating a database from published information sources containing equipment supply data and equipment demand data;

selectively adding to the database information received from one or more of the discrete market participants, identifying the data as private data or public data in a relational database in an electronic storage medium, assigning the private data an unique requirements reference number;

providing a graphical user interface for the discrete number of market participants to organize and access selected information and to provide public data and private data for inclusion in the database; and providing analytical tools for operating on the public data or private data in the database wherein the analytical tools include an optimization tool and a forecasting tool for both supply side market participants and demand side market participants.

6. The method of claim 5 wherein the selectively adding step comprises selectively allowing access to the private data.

7. An Internet based knowledge base system for participants in a market for equipment wherein the participants include owners of the equipment and users of the equipment, the system comprising:

a relational database for receiving and storing information relevant to the market, said relevant information comprising:

equipment information, comprising equipment technical specifications and equipment activity information; and market participant information, comprising participant identification information and participant market activities information;

computer readable program code for selectively retrieving information from the database in response to input queries from one or more of the market participants;

computer readable program code for selectively receiving information from market participants and storing the information in the relational database as private information or public information in a relational database in an electronic storage medium, wherein the internet based knowledge base system assigns the private information an unique requirements reference number; and computer readable program code for enabling the market participant to receive public and private information about availability of equipment and needs for equipment, wherein the program code automatically generates real time reports on a fixed time interval.

8. The system of claim 7 wherein the equipment comprises drilling rigs for drilling in underwater formations and wherein the equipment technical specifications and equipment activity information comprises data comprises rig performance information selected from the group comprising well specifications, well location, water depth, drilled depth, well angle, hole size, casing design, mud type, displacement, mechanical details, rig name, operator, hole problem incidents, health, safety and environment (HSE) incidents, lost time incidents, downtime incidents, drilling costs, downtime, flat time and total time, stratigraphic description and stratigraphic penetration indices.

9. The system of claim 8 wherein the equipment technical specifications and equipment activity include mechanical specifications, type of equipment, equipment owner, equipment contractor, current equipment activity, current equipment status, equipment availability date, equipment ownership history, and equipment technical upgrade history.

* * * * *